United States Patent
Tamai et al.

(10) Patent No.: US 6,799,283 B1
(45) Date of Patent: Sep. 28, 2004

(54) DISK ARRAY DEVICE

(75) Inventors: Masaaki Tamai, Sakurai (JP); Takeshi Kokado, Katano (JP); Yukiko Ito, Moriguchi (JP); Hiroshi Yokota, Suita (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/453,216

(22) Filed: Dec. 3, 1999

(30) Foreign Application Priority Data

| Dec. 4, 1998 | (JP) | 10-345294 |
| Feb. 19, 1999 | (JP) | 11-042340 |
| Jul. 26, 1999 | (JP) | 11-211320 |

(51) Int. Cl.$^7$ .............................. G06F 11/00
(52) U.S. Cl. .............................. 714/6; 714/7
(58) Field of Search .......................... 714/6, 7

(56) References Cited

U.S. PATENT DOCUMENTS

| 4,214,280 A | * | 7/1980 | Halfhill et al. | 360/31 |
| 5,537,566 A | * | 7/1996 | Konno et al. | 711/114 |
| 5,841,748 A | * | 11/1998 | Yamamuro | 369/47.14 |
| 5,872,905 A | * | 2/1999 | Ono et al. | 714/5 |
| 5,915,081 A | * | 6/1999 | Yamamoto et al. | 714/6 |
| 5,968,182 A | * | 10/1999 | Chen et al. | 714/5 |
| 6,021,509 A | * | 2/2000 | Gerdt et al. | 714/7 |
| 6,052,798 A | * | 4/2000 | Jeddeloh | 714/8 |
| 6,321,345 B1 | * | 11/2001 | Mann et al. | 714/6 |
| 6,397,347 B1 | * | 5/2002 | Masuyama et al. | 714/6 |

FOREIGN PATENT DOCUMENTS

| JP | 2-81123 | 3/1990 |
| JP | 5-2830 | 1/1993 |
| JP | 5-127839 | 5/1993 |
| JP | 9-69027 | 3/1997 |

OTHER PUBLICATIONS

Chen et al., "RAID: High–Performance, Reliable Secondary Storage", Jun. 1994, ACM Computing Surveys, vol. 26, No. 2, pp. 153–155.*
"A Case for Redundant Arrays of Inexpensive Disks", by David A. Patterson, Garth Gibson, Randy H. Katz, University of California, Berkley, Dec. 1987.
Japan Standards Association X6053–1996.

* cited by examiner

*Primary Examiner*—Robert Beausoliel
*Assistant Examiner*—Michael Maskulinski
(74) *Attorney, Agent, or Firm*—Wenderoth, Lind & Ponack L.L.P.

(57) ABSTRACT

Data blocks and redundant data are distributed across disk drives. In response to a first read request transmitted from a host device, a controller issues second read requests to read the data blocks and the redundant data from the disk drives. Further, the controller detects the disk drive which is no longer required to read the data block or redundant data from among the disk drives, and issues a read termination command to the detected disk drive to terminate reading therefrom. In a disk array device with such structure, even reading of one parity data with much time required does not affect other reading.

19 Claims, 69 Drawing Sheets

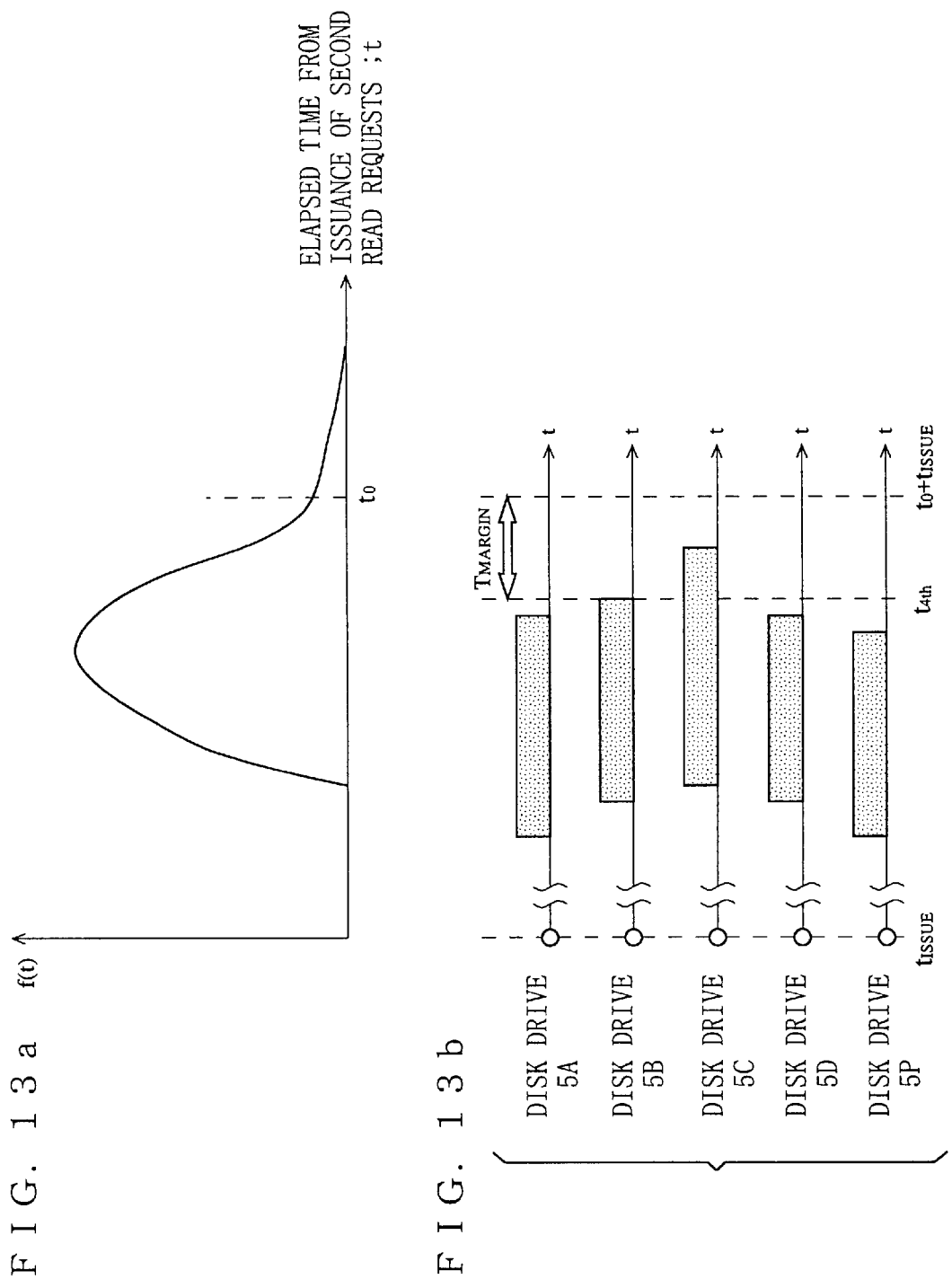

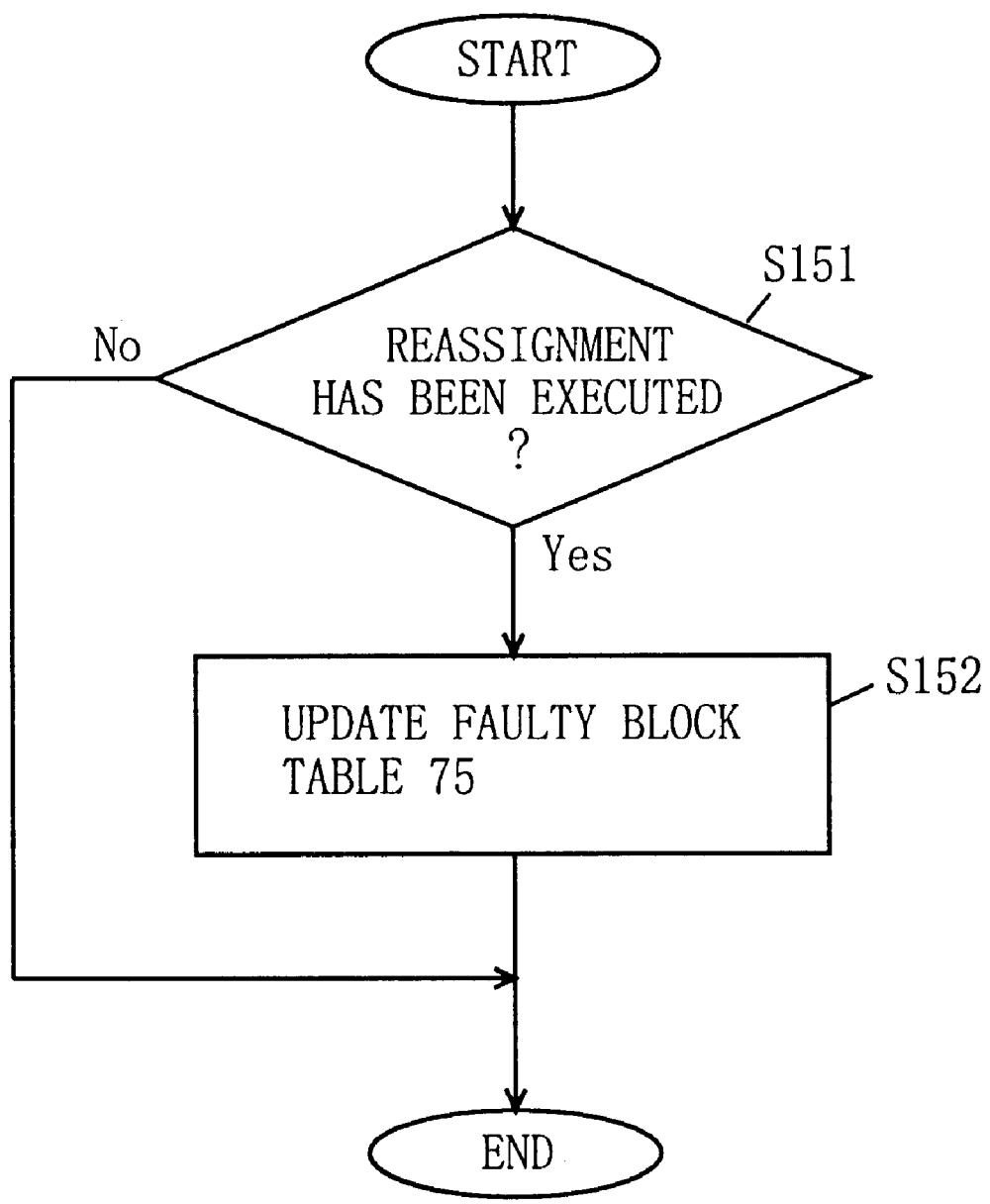
F I G. 3 8

FIG. 42a

| BYTE | BIT | | | | | | | |
|---|---|---|---|---|---|---|---|---|
| | 7 | 6 | 5 | 4 | 3 | 2 | 1 | 0 |
| 0 | 1 | 1 | 0 | 0 | 0 | LUN | | |

Identify (SCSI MESSAGE)

FIG. 42b

| BYTE | BIT | | | | | | | |
|---|---|---|---|---|---|---|---|---|
| | 7 | 6 | 5 | 4 | 3 | 2 | 1 | 0 |
| 0 | 20h | | | | | | | |
| 1 | QUEUE TAG | | | | | | | |

Queue_Tag (SCSI MESSAGE)

FIG. 43a

| BIT BYTE | 7 | 6 | 5 | 4 | 3 | 2 | 1 | 0 |
|---|---|---|---|---|---|---|---|---|
| 0 | 2Bh (OPERATION CODE) ||||||||
| 1 | LUN ||| DPO | FUA | Reserved || RelAdr |
| 2 | (MSB) |||||||  |
| 3 | LOGICAL BLOCK ADDRESS |||||||  |
| 4 |  |||||||  |
| 5 |  ||||||| (LSB) |
| 6 | Reserved ||||||||
| 7 | (MSB) | TRANSFER DATA LENGTH |||||| |
| 8 |  |||||||(LSB) |
| 9 | CONTROL BYTE ||||||||

Read_IO (SCSI COMMAND)

FIG. 43b

| BIT BYTE | 7 | 6 | 5 | 4 | 3 | 2 | 1 | 0 |
|---|---|---|---|---|---|---|---|---|
| 0 | 2Ah (OPERATION CODE) ||||||||
| 1 | LUN ||| DPO | FUA | Reserved || RelAdr |
| 2 | (MSB) |||||||  |
| 3 | LOGICAL BLOCK ADDRESS |||||||  |
| 4 |  |||||||  |
| 5 |  ||||||| (LSB) |
| 6 | Reserved ||||||||
| 7 | (MSB) | TRANSFER DATA LENGTH |||||| |
| 8 |  |||||||(LSB) |
| 9 | CONTROL BYTE ||||||||

Write_IO (SCSI COMMAND)

FIG. 45

| BYTE | BIT | | | | | | | |
|---|---|---|---|---|---|---|---|---|
| | 7 | 6 | 5 | 4 | 3 | 2 | 1 | 0 |
| 0 | COMMAND TYPE ||||||||
| 1 | IDENTIFICATION NUMBER ★1 ||||||||
| 2 | LUN ||| CONTROL INFORMATION |||||
| 3 | (MSB) LOGICAL BLOCK ADDRESS (LBA) ||||||||
| 4 | LOGICAL BLOCK ADDRESS (LBA) ||||||||
| 5 | LOGICAL BLOCK ADDRESS (LBA) ||||||||
| 6 | LOGICAL BLOCK ADDRESS (LBA) (LSB) ||||||||
| 7 | (MSB) DATA LENGTH ||||||||
| 8 | DATA LENGTH (LSB) ||||||||
| : | DATA ||||||||

FIG. 46

| BYTE | BIT | | | | | | | |
|---|---|---|---|---|---|---|---|---|
| | 7 | 6 | 5 | 4 | 3 | 2 | 1 | 0 |
| 0 | COMMAND TYPE ||||||||
| 1 | IDENTIFICATION NUMBER ★1 ||||||||
| 2 | PRIORITY | DISK GROUP NUMBER || CONTROL INFORMATION |||||
| 3 | (MSB) LOGICAL BLOCK ADDRESS (LBA) ||||||||
| 4 | LOGICAL BLOCK ADDRESS (LBA) ||||||||
| 5 | LOGICAL BLOCK ADDRESS (LBA) ||||||||
| 6 | LOGICAL BLOCK ADDRESS (LBA) (LSB) ||||||||
| 7 | (MSB) DATA LENGTH ||||||||
| 8 | DATA LENGTH (LSB) ||||||||
| : | DATA ||||||||

FIG. 61

| BIT\BYTE | 7 | 6 | 5 | 4 | 3 | 2 | 1 | 0 |
|---|---|---|---|---|---|---|---|---|
| 0 | HEADER | | | | | | | |
| 0 | Reserved | | | | | | | |
| 1 | Reserved | | | | | | | |
| 2 | (MSB) DEFECT LIST | | | | | | | |
| 3 | LENGTH (n+1) (LSB) | | | | | | | |
| | DEFECT DESCRIPTOR | | | | | | | |
| 0 | (MSB) LBA OF DEFECTIVE | | | | | | | |
| : | BLOCK (LBA)−1 | | | | | | | |
| 3 | (LSB) | | | | | | | |
| : | | | | | | | | |
| n−3 | (MSB) LBA OF DEFECTIVE | | | | | | | |
| : | BLOCK (LBA)−x | | | | | | | |
| n | (LSB) | | | | | | | |

| BIT\BYTE | 7 | 6 | 5 | 4 | 3 | 2 | 1 | 0 |
|---|---|---|---|---|---|---|---|---|
| 0 | colspan="8" 07h (OPERATION CODE) | | | | | | | |
| 1 | LUN | | | Reserved | | | | |
| 2 | Reserved | | | | | | | |
| 3 | Reserved | | | | | | | |
| 4 | Reserved | | | | | | | |
| 5 | CONTROL BYTE | | | | | | | |

FIG. 63

1104 FIRST STORAGE PART

1109 ALTERNATE AREA INFORMATION

ALTERNATE AREA | ALTERNATE AREA ≈ ... ≈ ALTERNATE AREA
ALTERNATE AREA | ALTERNATE AREA ≈ ... ≈ ALTERNATE AREA
ALTERNATE AREA | ALTERNATE AREA ≈ ... ≈ ALTERNATE AREA
...
ALTERNATE AREA | ALTERNATE AREA ≈ ... ≈ ALTERNATE AREA

F I G. 7 1 a   PRIOR ART
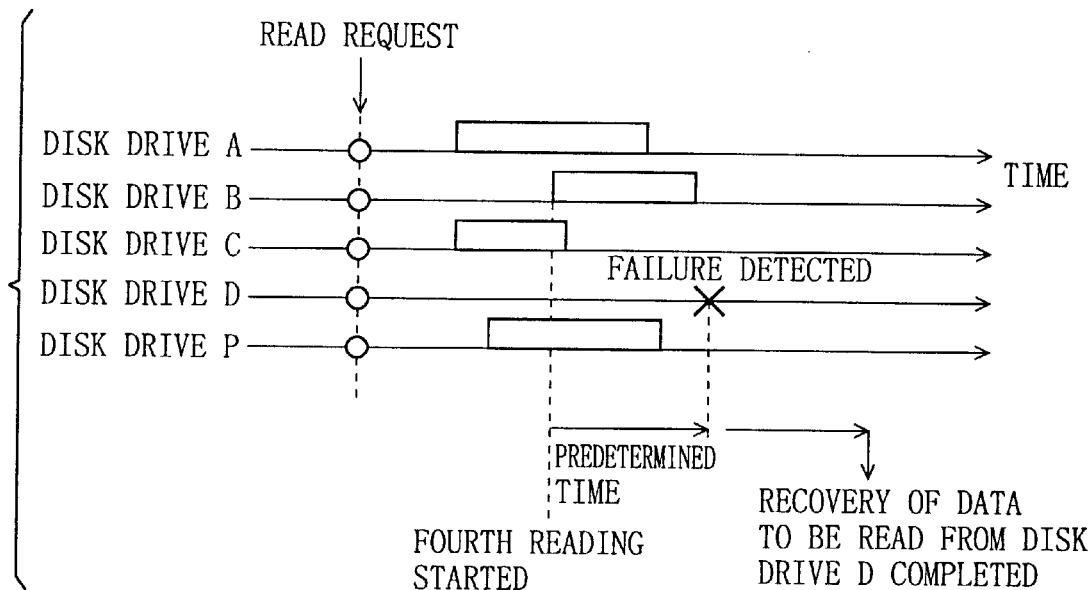
F I G. 7 1 b   PRIOR ART
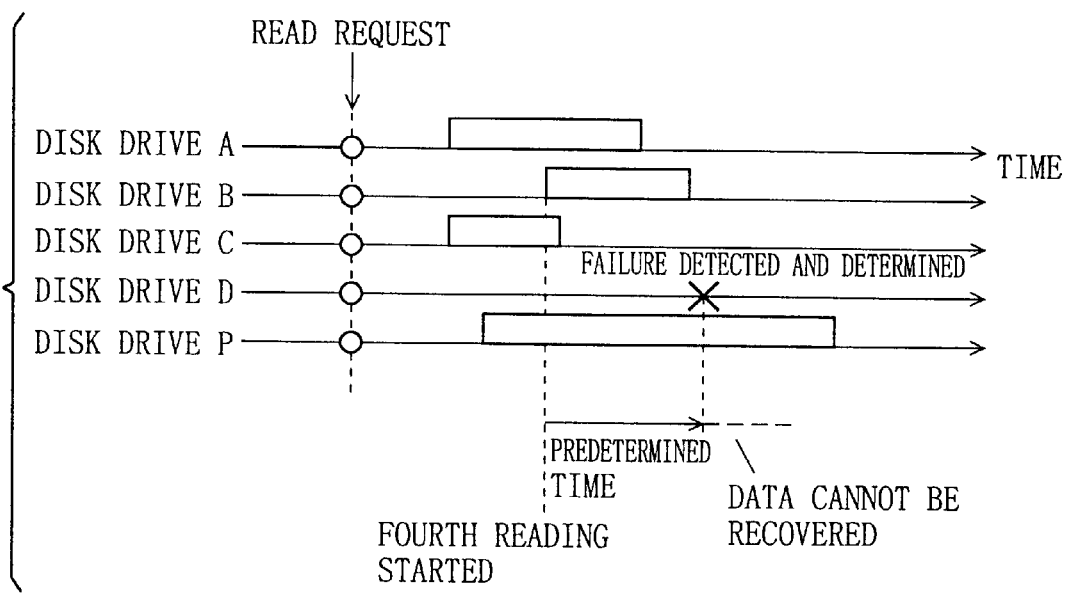

DISK ARRAY DEVICE

BACKGROUND OF THE INVENTION

1. Field of the Invention

This invention relates to disk array devices and more specifically, to a disk array device in which multiple disks (typically, magnetic disks or optical disks) construct a disk array capable of storing a large volume of data, transferring data at high speed, and further providing higher system reliability.

2. Description of the Background Art

Typical disk array devices include a RAID (Redundant Array of Inexpensive Disks). The RAID is discussed in detail in "A Case for Redundant Arrays of Inexpensive Disks", by David A. Patterson, Garth Gibson, Randy H. Katz, University of California Berkeley, December 1987, and others. Six basic architectures of the RAID from levels 0 to 5 have been defined. Described below is how a RAID adopting the level 3 architecture (hereinafter referred to as RAID-3) controls input/output of data. FIG. 69 is a block diagram showing the typical structure of the RAID-3. In FIG. 69, the RAID includes a controller 6901, and five disk drives 6902A, 6902B, 6902C, 6902D, and 6902P. A host device is connected to the controller 6901, making a read/write request of data to the RAID. When receiving data to be written, the controller 6901 divides the data into data blocks. The controller 6901 generates redundant data using these data blocks. After creation of the redundant data, each data block is written into the disk drives 6902A to 6903D. The redundant data is written into the disk drive 6902P.

Described next is the procedure of creating redundant data with reference to FIGS. 70a and 70b. Data to be written arrives at the controller 6901 by a unit of a predetermined size (2048 bytes, in this description). Here, as shown in FIG. 70a, currently-arrived data is called D-1. The data D-1 is divided into four by the controller 6901, and thereby four data blocks D-A1, D-B1, D-C1, and D-D1 are created. Each data block has a data length of 512 bytes.

The controller 6901 then creates redundant data D-P1 using the data blocks D-A1, D-B1, D-C1, and D-D1 by executing a calculation given by:

$$D\text{-}P1i = D\text{-}A1i \text{ xor } D\text{-}B1i \text{ xor } D\text{-}C1i \text{ xor } D\text{-}D1i \qquad (1)$$

Here, since each of the data blocks D-A1, D-B1, D-C1, D-D1, and D-P1 has a data length of 512 bytes, i takes on natural numbers from 1 to 512. For example, when i=1, the controller 6901 calculates the redundant data D-P11 using each first byte (D-A11, D-B11, D-C11, and D-D11) of the data blocks D-A1, D-B1, D-C1, and D-D1. Here, D-P11 is a first byte of the redundant data. When i=2, the controller 6901 calculates the redundant data D-P12 using each second byte (D-A12, D-B12, D-C12, and D-D12) of the data blocks D-A1, D-B1, D-C1, and D-D1. Thereafter, the controller 6901 repeats the calculation given by the equation (1) until the last byte (512nd byte) of the data blocks D-A1, D-B1, D-C1, and D-D1 to calculate redundant data D-P11, D-P12, . . . D-P1512. The controller 6901 sequentially arranges the calculated redundant data D-P11, D-P12, . . . D-P1512 to generate the redundant data D-P1. As clear from the above, the redundant data D-P1 is parity of the data blocks D-A1, D-B1, D-C1, and D-D1.

The controller 6901 stores the created data blocks D-A1, D-B1, D-C1, and D-D1 in the disk drives 6902A, 6902B, 6902C, and 6902D, respectively. The controller 6901 also stores the generated redundant data D-P1 in the disk drive 6902P. The controller 6901 stores the data blocks D-A1, D-B1, D-C1, D-D1, and D-P1 in the disk drives 6902A, 6902B, 6902C, 6902D and 6902P, respectively, as shown in FIG. 70b.

The controller 6901 further controls reading of data. Here, assume that the controller 6901 is requested to read the data D-1 by the host device. In this case, when each of the disk drives 6902A, 6902B, 6902C, and 6902D operates normally, the controller 6901 reads the data blocks D-A1, D-B1, D-C1, and D-D1 from the disk drives 6902A, 6902B, 6902C, and 6902D, respectively. The controller 6901 assembles the read data blocks D-A1, D-B1, D-C1, and D-D1 to compose the data D-1 of 2048 bytes. The controller 6901 transmits the composed data D-1 to the host device.

There is a possibility that a failure or fault may occur in any disk drives. Here, assuming that the disk drive 6902C has failed and the host device has sent a read request for the data D-1. In this case, the controller 6901 first tries to read the data blocks D-A1, D-B1, D-C1, and D-D1 from the disk drives 6902A, 6902B, 6902C, and 6902D, respectively. However, since the disk drive 6902C is eventually failed, the data block D-C1 is not read therefrom. Assume herein, however, that the data blocks D-A1, D-B1, and D-D1 are read from the disk drives 6902A, 6902B, and 6902D normally. When recognizing that the data block D-C1 cannot be read, the controller 6901 reads the redundant data D-P1 from the disk drive 6902P.

The controller 6901 then recovers the data block D-C1 by executing a calculation given by the following equation (2) using the data blocks D-A1, D-B1, and D-D1 and the redundant data D-P1.

$$D\text{-}C1i = D\text{-}A1i \text{ xor } D\text{-}B1i \text{ xor } D\text{-}D1i \text{ xor } D\text{-}P1i \qquad (2)$$

Here, since each of the data blocks D-A1, D-B1, and D-D1, and the redundant data D-P1 has a data length of 512 bytes, i takes on natural numbers from 1 to 512. The controller 6901 calculates the redundant data D-C11, D-C12, . . . D-C1512 by repeatedly executing the calculation given by the equation (2) from the first byte to 512nd byte. The controller 6901 recovers the data block D-C1 based on these calculation results. Therefore, all of the data blocks D-A1 to D-D1 are stored in the controller 6901. The controller 6901 assembles the stored data blocks D-A1 to D-D1 to compose the data D-1 of 2048 bytes. The controller 6901 transmits the composed data D-1 to the host device.

As described above, there is a possibility that the RAID in FIG. 69 cannot read the requested data block from a faulty disk drive (any one of the disk drives 6902A to 6902D). The RAID, however, operates calculation of parity given by the equation (2) using the data blocks read from the other four normal disk drives and the redundant data. The calculation of parity allows the RAID to recover the data block stored in the faulty disk drive.

In recent years, the RAID architecture, as an example of a disk array, is often implemented also in video servers which provide video upon a user's request. In video servers, data to be stored in the disk drives 6902A to 6902D of the RAID includes two types: video data and computer data (typically, video title and total playing time). Since video data and computer data have different characteristics, requirements of the RAID system are different in reading video data and computer data.

More specifically, computer data is required to be reliably transmitted to the host device. That is, when a data block of computer data cannot be read, the RAID has to recover the data block by operating calculation of parity. For this purpose, the RAID may take some time to transmit the computer data to the host device. On the other hand, video data is replayed as video at the host device. When part of video data arrives late at the host device, the video being replayed at the host device is interrupted. More specifically, video data in general is far larger in size than 2048 bytes, which are read at one time. The video data is composed of several numbers of data of 2048 bytes. Therefore, when requesting the video data to be replayed, the host device has to make a read request of data of 2048 bytes several times. On the other hand, the RAID has to read the video data from the disk drives 6902A to 6902D within a predetermined time from the arrival of each read request. If reading of the data of 2048 bytes is delayed even once, the video being replayed at the host device is interrupted. Therefore, the RAID is required to sequentially transmit the data of 2048 bytes composing the video data to the host device. Described below are RAID systems disclosed in Japanese Patent Laying-Open No. 2-81123 and No. 9-69027, which satisfy such requirements.

A first RAID disclosed in Japanese Patent Laying-Open No. 2-81123 is now described. The first RAID includes a disk drive group composed of a plurality of disk drives. The disk drive group includes a plurality of disk drives for storing data (hereinafter referred to as data-drives) and a disk drive for storing redundant data created from the data (hereinafter referred to as parity-drive). When reading data from the plurality of data-drives, the first RAID checks whether reading from one of the data-drives is delayed for more than a predetermined time after the reading from the other data-drives starts. The first RAID determines that the data-drive in which reading is delayed for more than the predetermined time is a faulty drive. After detecting the faulty drive, the first RAID recovers the data to be read from the faulty drive, using data in the other data-drives and redundant data in the parity-drive.

As shown in FIG. 71a, the first RAID determines that the data-drive D has failed when the data-drive D does not start reading after the lapse of the predetermined time from the start of a fourth reading (data-drive B). To recover the data block of the data-drive D, the first RAID operates calculation of parity. In general disk drives, however, the time from a start to an end of reading is not constant. Some disks may complete reading in a short period of time, while others may take a long time to complete reading after several failures. Therefore, in the first RAID, as shown in FIG. 71b, even though the parity-drive P starts reading earlier than the data-drive B which starts reading fourth, the data-drive B may complete its reading earlier than the parity-drive P. In this case, even after the lapse of the predetermined time after the data-drive B starts reading, the redundant data has not been read from the parity-drive P. Therefore, the first RAID cannot recover the data-block of the data-drive D. As a result, transmission of the data composing the video data being read is delayed, and the video being replayed at the host device might be interrupted.

A second RAID disclosed in Japanese Patent Laying-Open No. 9-69027 is now described. The second RAID also includes a plurality of data-drives for storing data, and a parity-drive for storing redundant data created from the data. The second RAID does not read the redundant data from the parity-drive under normal conditions. That is, when a read request arrives, the second RAID tries to read the data blocks from the plurality of data-drives. The second RAID previously stores time (hereinafter referred to as predetermined time) by which the plurality of data-drives have to have completed reading. In some cases, the second RAID detects the data-drive which has not completed reading after the lapse of the predetermined time from the time of transmission of a read request to each data-drive. In this case, the second RAID reads the redundant data from the parity-drive to recover the data block which has not yet been completely read.

However, the redundant data is started to be read after the lapse of the predetermined time (after timeout) from the time of transmission of the read request for the data block. Therefore, as shown in FIG. 72a, it disadvantageously takes much time to recover the unread data block. Furthermore, in some cases, the second RAID successfully reads a data block immediately after timeout as shown in FIG. 72b. In this case, the second RAID may transmit the data faster with the data block read immediately after the timeout. Once the redundant data is started to be read, however, the second RAID does not use the data block read immediately after the timeout, and as a result, data transmission to the host device may be delayed. This delay may cause interruption of video being replayed at the host device.

In most cases, in the disk drive where reading of the data block is delayed, read requests subsequent to the read request currently being processed wait for a read operation. Therefore, when the disk drive fails to read the data block and retries reading of the data block, processing of the subsequent read requests is delayed. As evident from above, in the conventional disk array device including the above first and second RAID, a read failure may affect subsequent reading.

Referring back to FIG. 69, the controller 6901 stores the four data blocks D-A1 to D-D1 and the redundant data D-P1 in the disk drives 6902A to 6902D and 6902P, respectively. The four data blocks D-A1 to D-D1 and the redundant data D-P1 are generated from the same data D-1 of 2048 bytes. Thus, a set of data blocks and redundant data generated based on the same data received from a host device is herein called a parity group. Also, a set of a plurality of disk drives in which data blocks and redundant data of the same parity group are written is herein called a disk group.

In the disk array device such as RAID, a failure may occur in any disk drive therein. The disk array device, however can recover the data block of the faulty disk drive by operating calculation of parity using the other data blocks and the redundant data of the same parity group. In the above description, the disk array device assembles data to be transmitted to the host device using the recovered data block. If the faulty disk drive is left as it is, calculation of parity is executed whenever the data block is tried to be read from the faulty disk drive, which takes much time. As a result, data transmission to the host device is delayed, and video being replayed at the host device is interrupted. Therefore, some disk array devices executes reconstruction processing. In the reconstruction processing, the data block or the redundant data in the faulty disk drive is recovered, and the recovered data block or redundant data is rewritten in another disk drive or a normal area in the faulty disk drive.

However, when another failure occurs in another disk drive of the same parity group while the defective disk drive is left as it is, reconstruction cannot be executed. Therefore, reconstruction is required to be executed as early as possible. An example of such reconstruction is disclosed in Japanese Patent Laying-Open No. 5-127839. A disk array device disclosed in this publication (hereinafter referred to as first disk array device) includes a disk array composing a plurality of disk drives, and a disk controller for controlling the disk array. The disk controller monitors states of operation of the disk array. When reconstruction is required, the disk controller selects and executes one of three types of reconstruction methods according to the state of operation of the disk array. In one method, reconstruction occurs during idle time of the array. In a second method reconstruction is interleaved between current data area accessing operations of the array at a rate which is inversely proportional to an activity level of the array. In a third method, the data are reconstructed when a data area being accessed is a data area needing reconstruction.

As described above, in some cases, both computer data and video data are written in each disk drive of the disk array device. Therefore, both read requests for reading the computer data and those for reading the video data arrive at the disk array device from the host device. When a large number of read requests for the computer data arrive, the disk array device has to execute reading of the computer data repeatedly, and as a result, reading of the video data may be delayed. This delay may cause interruption of the video being replayed at the host device.

The first disk array device executes reconstruction on the faulty disk drive while processing read requests being transmitted from the host device. Such reconstruction is executed on the entire disk drives of the same disk group with one operation. That is, reconstruction cannot be executed unless the entire disk drives of the same disk group are in an idle state.

In RAID-4 or RAID-5, each disk drive operates independently, and therefore if any one of the disk drives is in an idle state, the other disk drives of the same disk group may be under load conditions. As a result, the first disk array device cannot take sufficient time to execute reconstruction, and thus efficient reconstruction cannot be made.

Further, the conventional disk array device may execute reassignment. The structure of a disk array device of executing reassigning is similar to that shown in FIG. 69. Reassignment processing is now described in detail. Each disk drive composing a disk array has recording areas in which a defect may occur due to various reasons. Since the disk drive cannot read/write a data block or redundant data from/in a defective area, an alternate recording area is reassigned to the defective recording area. In the alternate recording area, the data block or redundant data stored in the defective recording area or to be written in the defective area is stored. Two types of such reassignment have been known.

One reassignment is so-called auto-reassign executed by each disk drive composing the disk array. Each disk drive previously reserves part of its recording areas as alternate areas. When the data block or redundant data cannot be read/written from/in the recording area specified by the controller, the disk drive assumes that the specified area is defective. When detecting the defective area, the disk drive selects one of the reserved alternate areas, and assigns the selected alternate area to the detected defective area.

The other reassignment is executed by the controller. The controller previously reserves part of its recording areas as alternate areas, and manages information for specifying the alternate areas. When the disk drive cannot access the recording area specified by the controller, the disk drive notifies the controller that the recording area is defective. When receiving the notification of the defective area, the controller selects one of the alternate areas from the managed information, and reassigns the selected alternate area to the defective area.

In some recording areas, reading or writing may be eventually successful if the disk drive repeats access to these recording areas (that is, if the disk drive takes much time to access thereto). In the above two types of reassignment, however, the alternate area cannot be assigned to the recording area to which the disk drive takes much time to access because reading/writing will eventually succeed even though much time is required. When the data block composing the video data is stored in such a recording area, however, it takes much time to read the data block. As a result, video being replayed at the host device may be interrupted.

SUMMARY OF THE INVENTION

Therefore, an object of the present invention is to provide a disk array device capable of reading data (data block or redundant data) from a disk array to transmit the same to a host device and writing data from the host device in the disk array in a short period of time.

The present invention has the following features to solve the problem above.

A first aspect of the present invention is directed to a disk array device executing read operation for reading data recorded therein in response to a first read request transmitted thereto, the disk array device with data blocks generated by dividing the data and redundant data generated from the data blocks recorded therein, comprising:

m disk drives across which the data blocks and the redundant data are distributed; and a control part controlling the read operation;

the control part issuing second read requests to read the data blocks and the redundant data from the m disk drives in response to the first read request sent thereto;

detecting the disk drive reading from which of the data block or the redundant data is no longer necessary from among the m disk drives; and issuing a read termination command to terminate the detected disk drive.

As described above, in the first aspect, when it is determined that reading of one of the data blocks or the redundant data is not necessary, this reading is terminated. Therefore, the disk drive which terminated this reading can advance the next reading. Thus, it is possible to provide the disk array device in which, if reading of one disk drive is delayed, this delay does not affect other reading.

According to a second aspect, in the first aspect, when (m−1) of the disk drives complete reading, the control part:

determines that reading being executed in one remaining disk drive is no longer necessary; and issues a read termination command to the remaining disk drive.

As described above, in the second aspect, also when reading of one disk drive takes too much time, this reading is terminated. Therefore, it is possible to provide the disk array device in which, if reading of one disk drive is delayed, this delay does not affect other reading.

According to a third aspect, in the first aspect, when detecting that two or more of the disk drives cannot complete reading, the control part:

determines that reading being executed in other disk drives is no longer necessary; and issues a read termination command to the determined disk drive.

In the third aspect, when calculation of parity cannot be executed, reading presently being executed can be terminated. Therefore, since unnecessary reading is not continued, it is possible to provide the disk array device in which unnecessary reading does not affect other reading.

According to a fourth aspect, in the first aspect, when the (m−1) the disk drives complete reading, the control part:

determines that reading not yet being executed in one remaining disk drive is no longer necessary; and issues a read termination command to the remaining disk drive.

In the fourth aspect, unnecessary reading is not continued, it is possible to provide the disk array device in which unnecessary reading does not affect other reading.

A fifth aspect of the present invention is directed to a disk array device executing read operation for reading data recorded therein in response to a first read request from a host device, the disk array device with data blocks generated by dividing the data and redundant data generated from the data blocks recorded therein, comprising:

m disk drives across which the data blocks and the redundant data are distributed;

a parity calculation part operating calculation of parity from (m−2) of the data blocks and the redundant data to recover one remaining data block; and a control part controlling the read operation;

the control part:

issuing second read requests to read the data blocks and the redundant data from the m disk drives in response to the first read request sent thereto;

when (m−1) of the disk drives complete reading, detecting whether a set of the data blocks and the redundant data has been read from the (m−1) disk drives;

when detecting that the set of the data blocks and the redundant data has been read, issuing a recovery instruction to the parity calculation part to recover the data block not read from the one remaining disk drive after waiting for a predetermined time period from a time of detection; and when the one remaining data block is recovered by the calculation of parity in the parity calculation part, executing operation for transmitting the data to the host device, wherein the predetermined time period is selected so as to ensure data transmission to the host device without delay.

In the fifth aspect, after a set of the data blocks and redundant data is read from (m−1) disk drives, the controller waits for a predetermined time until the remaining one data block is read. If the remaining one data block has been read by the predetermined time, calculation of parity is not required. Thus, it is possible to reduce the number of operation of calculation of parity.

According to a sixth aspect, in the fifth aspect, when detecting that the set of the data blocks and the redundant data has not been read, the control part transmits the data to the host device without waiting for the predetermined time period from the a time of detecting.

In the sixth aspect, if only the data blocks are read from the (m−1) disk drives, the controller does not wait for a predetermined but transmits the data to the host device. Therefore, it is possible to achieve the disk array device capable of reading a larger volume of data per unit of time.

According to a seventh aspect, in the fifth aspect, the predetermined time period is selected based on a start of reading in each of the disk drives and a probability of completing the reading.

In the seventh aspect, in most cases, the remaining one data block is read. Therefore, it is possible to reduce the number of operation of calculation of parity.

An eighth aspect of the present invention is directed to a disk array device executing read operation for reading data recorded therein in response to a first read request from a host device, the disk array device with data blocks generated by dividing the data and redundant data generated from the data blocks recorded therein, comprising:

m disk drives across which the data blocks and the redundant data are distributed;

a parity calculation part operating calculation of parity from (m−2) of the data blocks and the redundant data to recover one remaining data block; and a control part controlling the read operation; the control part:

issuing second read requests to read the data blocks and the redundant data from the m disk drives in response to the first read request sent thereto;

when (m−1) of the disk drives complete reading, detecting whether a set of the data blocks and the redundant data has been read from the (m−1) disk drives;

when detecting that the set of the data blocks and the redundant data has been read, issuing a recovery instruction to the parity calculation part to recover the data block not read from the one remaining disk drive after waiting for a predetermined time period from a time of detection; and when the one remaining block is recovered by the calculation of parity in the parity calculation part, executing operation for transmitting the data to the host device, wherein the recovery instruction is issued while the parity calculation part is not operating calculation of parity.

In the eighth aspect, the controller reliably issues a recovery instruction only when calculation of parity is not executed. This prevents a needless load on the parity calculator, achieving effective use of the parity calculator.

According to a ninth aspect, in the eighth aspect, the disk array device further comprises:

a table including a time period during which the parity calculation part can operate calculation of parity, wherein the control part further issues the recovery instruction when the parity calculation part does not operate calculation of parity by referring to the time period included in the table.

A tenth aspect of the present invention is directed to a disk array device executing read operation for reading data recorded therein in response to a first read request from a host device, the disk array device with data blocks generated by dividing the data and redundant data generated from the data blocks recorded therein, comprising:

m disk drives across which the data blocks and the redundant data are distributed;

a parity calculation part operating calculation of parity from (m−2) of the data blocks and the redundant data to recover one remaining data block; and a control part controlling the read operation, the control part:

in response to the first read request received thereto, determining whether (m−1) of the disk drives have previously failed to read each data block or not;

when determining that the (m−1) disk drives have not previously failed to read each of the data block, issuing second read requests to the (m−1) disk drives to read only each the data blocks; and the when the data blocks are read from the (m−1) disk drives, executing operation for transmitting the data to the host device.

In the tenth aspect, in some cases, a second read request may not be issued for the redundant data. That is, when the redundant data is not required, such unnecessary redundant data is not read. As a result, it is possible to increase a volume of data which can be read per unit of time.

According to an eleventh aspect, in the tenth aspect, the control part:

when determining that the (m−1) disk drives have previously failed to read each the data block, issues second read requests to the m disk drives to read (m−1) of the data blocks and the redundant data;

when the (m−1) disk drives complete reading, detects whether a set of the data blocks and the redundant data has been read from the (m−1) disk drives or not;

when detecting that the set of the data blocks and the redundant data has been read, issues a recovery instruction to the parity calculation part to recover the data block not read from one remaining disk drive; and when the one remaining data block is recovered by the calculation of parity in the parity calculation part, executes operation for executing operation for transmitting the data to the host device.

In the eleventh aspect, a second read request is issued for reading the redundant data when required. Therefore, it is possible to immediately operate calculation of parity.

According to a twelfth aspect, in the eleventh aspect, the disk array device further comprises:

a table registering therein recording areas of the data blocks which have previously been failed to be read by the disk drives, wherein the control part determines whether to issue the second read requests to the (m−1) disk drives or to the m disk drives.

According to a thirteenth aspect, in the twelfth aspect, the disk array device further comprises:

a reassignment part, when a defect occurs in a recording area of the data block or redundant data in the m disk drives, executing reassign processing for assigning an alternate recording area to the defective recording area, wherein when the reassignment part assigns the alternate recording area to the defective recording area of the data block registered in the table by the reassignment part, the control part deletes the defective recording area of the data block from the table.

In the thirteenth aspect, an alternate recording area is assigned to the defective recording area, and the data block or redundant data is rewritten in this alternate area. Therefore, in the table, the number of data blocks which require long time in read operation can be reduced. Therefore, it is possible to provide the disk array device capable of reading a larger volume of data per unit of time.

According to a fourteenth aspect, in the thirteenth aspect, the disk array device further comprises:

a first table storage part storing a first table in which an address of the alternate recording area previously reserved in each of the m disk drives can be registered as alternate recording area information; and a second table storage part storing a second table in which address information of the alternate recording area assigned to the defective recording area can be registered, wherein the reassignment part:

when the second read requests are transmitted from the control part to the m disk drives, measures a delay time in each of the disk drives;

determines whether each of the recording area of the data blocks or the redundant data to be read by each second read request is defective or not based on the measured delay time;

when determining that the recording area is defective, assigns the alternate recording area to the defective recording area based on the alternate recording area information registered in the first table of the first table storage part; and registers the address information of the assigned alternate recording area in the second table of the second table storage part;

the control part issues the second read requests based on the address information registered in the second table of the second table storage part; and the delay time is a time period calculated from a predetermined process start time.

In the fourteenth aspect, the reassignment part determines whether the recording area is defective or not based on an elapsed time calculated from a predetermined process start time. When a delay in the response returned from the disk drive is large, the reassignment part determines that the recording area being accessed for reading is defective, assigning an alternate recording area. This allows the disk array device to read and transmit the data to the host device, while suppressing occurrence of a delay in response.

According to a fifteenth aspect, in the first aspect, the disk array device further comprises:

a reassignment part, when a defect occurs in a recording area of the data block or redundant data in the m disk drives, executing reassign processing for assigning an alternate recording area to the defective recording area.

According to a sixteenth aspect, in the fifteenth aspect, the disk array device further comprises:

a first table storage part storing a first table in which an address of the alternate recording area previously reserved in each of the m disk drives can be registered as alternate recording area information; and a second table storage part storing a second table in which address information of the alternate recording area assigned to the defective recording area can be registered, wherein the reassignment part:

when the second read requests are transmitted from the control part to the m disk drives, measures a delay time in each of the disk drives;

determines whether each of the recording areas of the data blocks or the redundant data to be read by each second read request is defective or not based on the measured delay time;

when determining that the recording area is defective, assigns the alternate recording area to the defective recording area based on the alternate recording area information registered in the first table of the first table storage part; and registers the address information of the assigned alternate recording area in the second table of the second table storage part;

the control part issues the second read requests based on the address information registered in the second table of the second table storage part; and the delay time is a time period calculated from a predetermined process start time.

According to a seventeenth aspect, in the sixteenth aspect, the reassignment part assigns the alternate recording area to the defective recording area only when determining successively a predetermined number of times that the recording area is defective.

In the seventeenth aspect, when determining successively determines for a predetermined number of times that the recording area may possibly be defective, the reassignment part assigns an alternate recording area to that recording area. Therefore, if the reassignment part sporadically and wrongly determines that the recording area is defective, the alternate recording area is not assigned to that recording area. Therefore, it is possible to provide the disk array device which assigns an alternate recording area only to a truly defective area.

According to an eighteenth aspect, in the sixteenth aspect, the predetermined process start time is a time when each of the second read requests is transmitted to each of the m disk drives.

According to a nineteenth aspect, in the sixteenth aspect, the predetermined process start time is a time when the m disk drives start reading based on the second read requests.

A twentieth aspect of the present invention is directed to a data input/output method used for a disk array device comprising a disk array constructed of recording mediums for recording redundant data and an array controller for controlling the disk array according to an access request transmitted from a host device, the method comprising:

generating, by the array controller, a read or write request to the disk array with predetermined priority based on the received access request;

enqueuing, by the array controller, the generated read or write request to a queue included therein according to the predetermined priority;

selecting, by the array controller, the read or write request to be processed by the disk array from among the read or write requests enqueued to the queue according to the predetermined priority; and processing, by the disk array, the selected read or write request.

In the twentieth aspect, the array controller converts the received access request to a read or write request with predetermined priority. The disk array processes the read or write request selected by the array controller according to priority. Therefore, in the disk array device including the disk array in which redundant data is recorded, it is possible to generate a read or write request with relatively high priority for the access request required to be processed in real time, while a read or write request with relatively low priority for the access request not required to be processed in real time. Thus, the disk array device can distinguish the access request from the host device according to the requirement of real-time processing. Consequently, the access request required to be processed in real time is processed in the disk array device without being affected by the access request not required to be processed in real time.

According to a twenty-first aspect, in the twentieth aspect, the array controller includes queues therein corresponding to the priority; and the generated read request or write request is enqueued to the queue corresponding to the predetermined priority.

In the twenty-first aspect, since the queue is provided for each level of priority, it is possible to distinguish the access request from the host device according to the requirement of real-time processing, and various processing in the disk array device is effectively processed.

According to a twenty-second aspect, in the twentieth aspect, the array controller includes queues therein corresponding to the predetermined priority for each of the recording mediums, the array controller generates the read or write request with the predetermined priority for each of the recording mediums 25 based on the received access request; and the array controller enqueues the read or write request generated for each of the recording mediums to the queue in the corresponding recording medium according to the predetermined priority.

In the twenty-second aspect, since the queue is provided for each recording medium and each level of priority, it is possible to distinguish the access request from the host device for each recording medium according to the requirement of real-time processing, and various processing in the disk array device is further effectively processed.

According to a twenty-third aspect, in the twentieth aspect, the predetermined priority is set based on whether processing in the disk array is executed in real time or not.

In the twenty-third aspect, the predetermined priority is set based on the requirement of real-time processing. Consequently, the access request required to be processed in real time is processed in the disk array device without being affected by the access request not required to be processed in real time.

According to a twenty-fourth aspect, in the twentieth aspect, when an I/O interface is between the information recording device and the host device conforms to SCSI, the predetermined priority is previously set in a LUN or LBA field of the access request.

In the twenty-fourth aspect, the predetermined priority is previously set in the access request. Therefore, the host device can notify the disk array device of the level of priority of the read or write request, that is, with how much priority the read or write request is required to be processed.

A twenty-fifth aspect of the present invention is directed to a disk array device including a disk array constructed of recording mediums for recording redundant data and controlling the disk array according to an access request transmitted from a host device, comprising:

a control part generating a read or write request to the disk array with predetermined priority based on the received access request;

a queue managing part enqueuing the read request or write request generated by the control part to a queue included therein according to the predetermined priority; and a selection part selecting the read or write request to be processed by the disk array from among the read or write requests enqueued to the queue, wherein the disk array processes the read request or write request selected by the selection part.

In the twenty-fifth aspect, the received access request is converted into a read or write request with predetermined priority. The disk array processes the read or write request selected by the selection part according to the level of priority. Therefore, in the disk array device including the disk array in which redundant data is recorded, it is possible to generate a read or write request with relatively high priority for the access request required to be processed in real time, while a read or write request with relatively low priority for the access request not required to be processed in real time. Thus, the disk array device can distinguish the access request from the host device according to the requirement of real-time processing. Consequently, the access request required to be processed in real time is processed in the disk array device without being affected by the access request not required to be processed in real time.

According to a twenty-sixth aspect, in the twenty-fifth aspect, the queue managing part includes queues therein corresponding to the priority, and the read or write request generated by the control part is enqueued to the queue corresponding to the predetermined priority.

In the twenty-sixth aspect, since the queue is provided for each level of priority, it is possible to distinguish the access request from the host device according to the requirement of real-time processing, and various processing in the disk array device is effectively processed.

According to a twenty-seventh aspect, in the twenty-fifth aspect, the queue managing part includes queues therein corresponding to the predetermined priority for each of the recording mediums;

the queue managing part generates the read or write request with the predetermined priority for each of the recording mediums based on the received access request; and the queue managing part enqueues the read or write request generated for each of the recording mediums to the queue in the corresponding recording medium according to the predetermined priority.

In the twenty-seventh aspect, since the queue is provided for each recording medium and each level of priority, it is possible to distinguish the access request from the host device for each recording medium according to the requirement of real-time processing, and various processing in the disk array device is further effectively processed.

A twenty-eighth aspect of the present invention is directed to, in an information recording device comprising a disk array constructed of recording mediums for recording redundant data and an array controller for controlling the disk array according to an access request transmitted from a host device, a data reconstruction method for recovering data recorded on a faulty recording medium in the disk array and reconstructing the data, the method comprising:

generating, by the array controller, a read or write request required for data reconstruction to the disk array with predetermined priority;

enqueuing, by the array controller, the generated read or write request to a queue included therein according to the predetermined priority;

selecting, by the array controller, the read or write request to be processed from among the read or write requests enqueued to the queue according to the predetermined priority;

processing, by the disk array, the selected read or write request; and executing, by the array controller, data reconstruction based on processing results of the read or write request by the disk array.

In the twenty-eighth aspect, the array controller generates a read or write request for data reconstruction. The generated read or write request has predetermined priority. The disk array processes the read or write request selected by the array controller according to the level of priority. Therefore, when the disk array device which executes reconstruction processing provides relatively low priority for the read or write request for data reconstruction, the read or write request is processed without affecting other real-time processing. On the other hand, when the disk array device provides relatively high priority, the read or write request is processed with priority, ensuring the end time of data reconstruction.

According to a twenty-ninth aspect, in the twenty-eighth aspect, the array controller includes queues therein corresponding to the predetermined priority for each of the recording mediums;

the array controller generates the read or write request required for data reconstruction with the predetermined priority for each recording medium; and the array controller enqueues the generated read or write request to the queue in the corresponding recording medium according to the predetermined priority.

In the twenty-ninth aspect, since the queue is provided for each recording medium and each level of priority, and further, since the array controller generates a read or write request with predetermined priority for each recording medium, it is possible to distinguish the access request from the host device for each recording medium according to the requirement of real-time processing, and various processing in the disk array device is further effectively processed.

According to a thirtieth aspect, in the twenty-eighth aspect, the read and write requests generated by the array controller are given lower priority to be processed in the disk array.

In the thirtieth aspect, since having relative lower priority, the read or write request is processed without affecting other real-time processing.

According to a thirty-first aspect, in the twenty-eighth aspect, the read and write requests generated by the array controller are given higher priority to be processed in the disk array.

In the thirty-first aspect, since having relatively higher priority, the read or write request is processed with priority, ensuring the end time of data reconstruction.

A thirty-second aspect of the present invention is directed to a data input/output method used in an information recording device comprising a disk array constructed of recording mediums for recording redundant data and an array controller for controlling the disk array according to an access request transmitted from a host device, recovering the data recorded on the recording medium which has a failure in the disk array, and reconstructing the data in a spare recording medium;

when the access request for data to be reconstructed in the spare recording medium is transmitted from the host device to the information storage device, the method comprises:

the array controller;

reading data for recovery required for recovering the data recorded in the failed recording medium from the disk array;

recovering data recorded in the failed recording medium by executing a predetermined calculation with the data for recover read from the disk array;

generating a write request with predetermined priority to write the recovered data in the spare recording medium;

enqueuing the generated write request to a queue therein according to the predetermined priority; and selecting the generated write request as the write request to be processed by the disk array according to the predetermined priority; and the disk array:

processing the write request selected by the array controller, and writing the recovered data in the spare recording medium, wherein the write request is given relatively lower priority.

In the thirty-second aspect, when the host device transmits an access request for data to be reconstructed in the spare recording medium, the array controller recovers the data to write in the spare recording medium. Therefore, next time the disk array device executes data reconstruction, it is not required to recover the data requested to be accessed. The time required for data reconstruction is thus shortened.

A thirty-third aspect of the present invention is directed to a disk array device which reassigns an alternate recording area to a defective recording area of data, comprising:

a read/write control part for specifying a recording area of data, and producing an I/O request to request read or write operation;

a disk drive, when receiving the I/O request transmitted from the read/write control part, accessing to the recording area specified by the I/O request to read or write the data; and a reassignment part when receiving the I/O request transmitted from the read/write control part, calculating an elapsed time from a predetermined process start time as a delay time and determining whether the recording area specified by the I/O request is defective or not based on the delay time, wherein when determining that the recording area of the data is defective, the reassignment part instructs the disk drive to assign the alternate recording area to the defective recording area.

In the thirty-third aspect, the reassignment part determines whether the recording area of the data specified by the received I/O request is defective or not based on a delay time calculated from a predetermined process start time. The reassignment part can determine the length of a delay in response from the disk drive based on the delay time. When determining that the recording area is defective, the reassignment part instructs the disk drive to assign an alternate recording area. That is, when the process time for one recording area in the disk drive is long, the reassignment part determines that that recording area is defective, instructing the disk drive to perform reassign processing. The disk array device thus suppress occurrence of a long delay in response, allowing data input/out in real time.

According to a thirty-fourth aspect, in the thirty-third aspect, the reassignment part assigns the alternate recording area to the defective recording area only when determining successively a predetermined number of times that the recording area is defective.

In the thirty-fourth aspect, when the reassignment part determines successively for a predetermined number of times that one recording area is defective, an alternate recording area is assigned to that recording area. Therefore, the reassignment part can suppress a sporadic determination error due to thermal aspiration in the disk drive and the like. Therefore, the reassignment part can instruct the disk drive to assign an alternate recording area only to a truly defective area.

According to a thirty-fifth aspect, in the thirty-third aspect, the predetermined process start time is a time when the I/O request is transmitted from the read/write control part.

According to a thirty-sixth aspect, in the thirty-third aspect, the predetermined process start time is a time when the I/O request transmitted from the read/write control part is started to be processed in the disk drive.

In the thirty-fifth or thirty-sixth aspect, the predetermined process time is the time when the I/O request is transmitted to the disk drive or the time when the I/O request is started to be processed. Therefore, the reassignment part can recognize the delay time correctly.

According to a thirty-seventh aspect, in the thirty-third aspect, the reassignment part further instructs the disk drive to terminate the read or write operation requested by the I/O request when the recording area of the data is defective.

In the thirty-seventh aspect, the reassignment part instructs the disk drive to terminate processing of the I/O request specifying the recording area which is now determined to be defective. When the reassignment part determines that the recording area is defective, the disk drive can terminate processing the I/O request for that defective area, suppressing occurrence of an additional delay in response.

A thirty-eighth aspect of the present invention is directed to a disk array device which reassigns an alternate recording area to a defective recording area of data, comprising:

a read/write control part specifying a recording area of the data, and producing an I/O request to request read or write operation;

a disk drive, when receiving the I/O request from the read/write control part, accessing to the recording area specified by the I/O request to read or write the data; and a reassignment part, when the recording area specified by the I/O request from the read/write control part is defective, instructing the disk drive to reassign the alternate recording area to the defective recording area, wherein when instructed to reassign by the reassignment part, the disk drive assigns a recording area in which time required for the read or write operation is within a predetermined range, as the alternate recording area.

In the thirty-eighth aspect, the disk drive takes the recording area in which the time required for read or write operation is within a predetermined range as the alternate recording area. Therefore, the disk array device can suppress occurrence of a large delay in response, allowing input/ output of data in real time.

According to a thirty-ninth aspect, in the thirty-eighth aspect, the predetermined range is selected based on overhead in the disk array device.

In the thirty-ninth aspect, the predetermined range is easily selected based on overhead, which is a known parameter. Therefore, the design of the disk array device can be more simplified.

According to a fortieth aspect, in the thirty-eighth aspect, when part or all of the recording areas of the data are defective, the reassignment part assumes that the whole recording areas are defective.

In the fortieth aspect, in the disk array device, the alternate recording area is assigned not by a fixed-block unit, which is a managing unit in the disk drive. Therefore, the disk array device can prevent data fragmentation, suppressing occurrence of a large delay in response more.

According to a forty-first aspect, in the thirty-eighth aspect, the reassignment part transmits a reassign block specifying a logical address block of the defective recording area to the disk drive for reassignment; and the disk drive assigns a physical address with which the time required for read or write operation is within the predetermined range to a logical address specified by the reassign block transmitted from the reassignment part as the alternate recording area.

In the forty-first aspect, the disk drive assigns a physical address in which the time required for read or write operation is within a predetermined range as the alternate recording area to the physical address on which reassign processing is to be performed. Therefore, the disk array device can suppress occurrence of a large delay in response, allowing input/output of data in real time.

According to a forty-second aspect, in the thirty-eighth aspect, when the read/write control part requests the disk drive to read the data, and the recording area of the data is defective, the data recorded in the defective recording area is recovered based on predetermined parity and other data; and the read/write control part specifies the assigned alternate recording area, and requests the disk drive to write the recovered data.

According to a forty-third aspect, in the thirty-eighth aspect, when the read/write control part requests the disk drive to write data and the recording area of the data is defective, the read/write control part specifies the assigned alternate recording area, and the requests again the disk drive to write the data.

When the disk drive assigns an alternate recording area to one recording area, the data recorded thereon might be impaired. Therefore, in the forty-second or forty-third aspect, the read/write control part requests the disk array to write the data recovered based on the parity or other data, or specifies the alternate recording area to request again the disk array to write the data. Therefore, the disk array device can maintain consistency before and after assignment of the alternate recording area.

A forty-fourth aspect of the present invention is directed to a reassignment method of assigning an alternate area to a defective recording area of data, comprising:

transmitting an I/O request for requesting the disk drive to read or write operation by specifying a recording area of the data according to a request from outside; and when the I/O request is transmitted in the transmission step, calculating an elapsed time from a predetermined time as a delay time and determining whether the recording area specified by the I/O request is defective or not based on the delay time, wherein when the recording area is defective in the determination step, the disk drive is instructed to assign the alternate recording area to the defective recording area.

A forty-fifth aspect of the present invention is directed to a reassignment method of assigning an alternate recording area to a defective recording area of data, comprising:

transmitting an I/O request for requesting the disk drive to read or write operation by specifying a recording area of the data according to a request from outside; and when the recording area specified by the I/O request transmitted in the transmission step is defective, instructing the disk drive to assign the alternate recording area to the defective recording area, wherein in the instructing step, the disk drive is instructed to assign the recording area with which time required for read or write operation is within a predetermined range as the alternate recording area.

A forty-sixth aspect of the present invention is directed to a disk array device which assigns an alternate recording area to a defective recording area of data, comprising:

a read/write control part for transmitting an I/O request for requesting read or write operation by specifying a recording area of the data according to a request from outside;

a disk drive, when receiving the I/O request from the read/write control part, accessing to the recording area specified by the I/O request and reading or writing the data;

a reassignment part, when receiving the I/O request from the read/write control part, calculating an elapsed time from a predetermined process start time as a delay time, and determining whether the recording area specified by the I/O request is defective or not based on the delay time;

a first storage part storing an address of the alternate recording area previously reserved in the disk drive as alternate recording area information; and a second storage part storing address information of the alternate recording area assigned to the defective recording area, wherein when determining that the specified recording area is defective, the reassignment part assigns the alternate recording area to the defective recording area based on the alternate recording area information stored in the first storage part, and stores the address information on the assigned alternate recording area in the second storage part, and the read/write control part generates the I/O request based on the address information stored in the second storage part.

In the forty-sixth aspect, the reassignment part determines whether the recording area is defective or not based on the delay time calculated from a predetermined process start time. Therefore, when a delay in the response returned from the disk drive is large, the reassignment part determines that the recording area being accessed for reading is defective, assigning an alternate recording area. This allows the disk array device to input and output data in real time, while suppressing occurrence of a large delay in response.

According to a forty-seventh aspect, in the forty-sixth aspect, the reassignment part assigns the alternate recording area to the defective recording area only when determining successively a predetermined number of times that the recording area is defective.

According to a forty-eighth aspect, in the forty-sixth aspect, the predetermined process start time is a time when the I/O request is transmitted from the read/write control part.

According to a forty-ninth aspect, in the forty-sixth aspect, the predetermined process start time is a time when the I/O request transmitted from the read/write control part is started to be processed in the disk drive.

According to a fiftieth aspect, in the forty-sixth aspect, the reassignment part further instructs the disk drive to terminate the read or write operation requested by the I/O request when detecting that the recording area of the data is defective.

According to a fifty-first aspect, in the forty-sixth aspect, the first storage part stores a recording area with which overhead in the disk drive is within a predetermined range as the alternate recording area.

In the fifty-first aspect, the first storage part manages the alternate recording areas in which the time required for read or write operation in the disk drive is within a predetermined range. Therefore, the data recorded on the alternate recording area assigned by the reassignment part is inputted/outputted always with a short delay in response. The disk array device thus can input and output data in real time, while suppressing occurrence of a large delay in response. Furthermore, the predetermined range is easily selected based on overhead, which is a known parameter. Therefore, the design of the disk array device can be more simplified.

According to a fifty-second aspect, in the fifty-first aspect, the first storage part further stores the alternate recording area by a unit of a size of the data requested by the I/O request.

In the fifty-second aspect, since the first storage part manages the alternate recording areas in a unit of the requested data, the alternate recording area to be assigned is equal to the requested data in size. Therefore, the reassignment part can instruct reassignment with simple processing of selecting an alternate recording area from the first storage part.

According to a fifty-third aspect, in the fifty-second aspect, whether the overhead is within the predetermined range or not is determined for the recording areas other than the alternate recording area by the unit, and the reassignment part assigns the alternate area to the recording area in which the overhead is not within the predetermined range.

In the fifty-third aspect, the reassignment part instructs assignment of an alternate recording area to the defective recording area at the timing other than that determined based on the delay time. The disk array device thus can input and output data more effectively in real time, while suppressing occurrence of a large delay in response. Furthermore, the predetermined range is easily selected based on overhead, which is a known parameter. Therefore, the design of the disk array device can be more simplified.

According to a fifty-fourth aspect, in the forty-sixth aspect, the address information stored in the second storage part is recorded in the disk drive.

In the fifty-fourth aspect, with the address managing information recorded on the disk drive, the second storage part is not required to manage the address information when the power to the disk array device is off. That is, the second storage part is not required to be constructed by a non-volatile storage device, which is expensive, but can be constructed by a volatile storage device at a low cost.

According to a fifty-fifth aspect, in the fifty-fourth aspect, the disk array device further comprises:

a non-volatile storage device storing an address of a recording area of the address information in the disk drive.

In the fifty-fifth aspect, since the non-volatile storage device stores the address information, even when a defect occurs the storage area of the address information in the disk drive, the address information is secured. It is thus possible to provide a disk array device with a high level of security.

According to a fifty-sixth aspect, in the forty-sixth aspect, the disk array device further comprises:

a plurality of disk drives including data recording disks device and a spare disk drive; and a count part counting a used amount or remaining amount of alternate recording area, wherein the reassignment part determines whether to copy the data recorded in the data recording disk drives to the spare disk drive based on a count value in a count part, thereby allowing the spare disk drive to be used instead of the data recording disk drive.

In the fifty-sixth aspect, when there are shortages of alternate recording areas in the disk drive for recording data, a spare disk drive is used. Therefore, there occurs no shortage of alternate recording areas for reassignment at any time. The disk array device thus can input and output data more effectively in real time, while suppressing occurrence of a large delay in response.

A fifty-seventh aspect of the present invention is directed to a reassignment method of assigning an alternate recording area to a defective recording area of data, comprising:

transmitting an I/O request for requesting read or write operation by specifying a recording area of the data; and when the recording area specified by the I/O request transmitted in the transmission step is defective, assigning the alternate recording area to the defective recording area, wherein in the assign step, when the specified recording area is defective, the alternate recording area is selected for the defective recording area by referring to alternate recording area information for managing an address of the alternate recording area previously reserved in the disk drive, the selected alternate recording area is assigned to the defective recording area, and further address information for managing an address of the assigned alternate recording area is created; and in the transmission step, the I/O request is generated based on the address information created in the assign step.

According to a fifty-eighth aspect, in the fifty-seventh aspect, in the assign step, when the I/O request is transmitted, an elapsed time from a predetermined process start time is calculated as a delay time, and it is determined whether the recording area specified by the I/O request is defective or not based on the delay time.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 13a and 13b are diagrams illustrating a probability distribution curve f(t) and a time margin $t_{MARGIN}$;

FIG. 38 is a flow chart showing the procedure of the controller 7 after the arrival of a REASSIGN-COMPLETED notification;

FIG. 42a shows a data format of Identify;

FIG. 43b shows a data format of Simple_Queue_Tag;

FIG. 43a shows a data format of Read_10;

FIG. 43b shows a data format of Write_10

FIG. 45 is a diagram showing a format of a first process request to be generated by a host interface 31;

FIG. 46 is a diagram showing a format of a first read request to be generated by a controller 33;

FIG. 61 is a diagram showing formats of REASSIGN BLOCKS;

FIG. 63 is a diagram illustrating alternate area information 1109 stored in a first storage part 1104;

FIGS. 71a and 71b are diagrams illustrating the problems in a first disk array device disclosed in Japanese Patent Laying-Open No. 2-81123.

DESCRIPTION OF THE PREFERRED EMBODIMENTS (First Embodiment)

Figure 1:
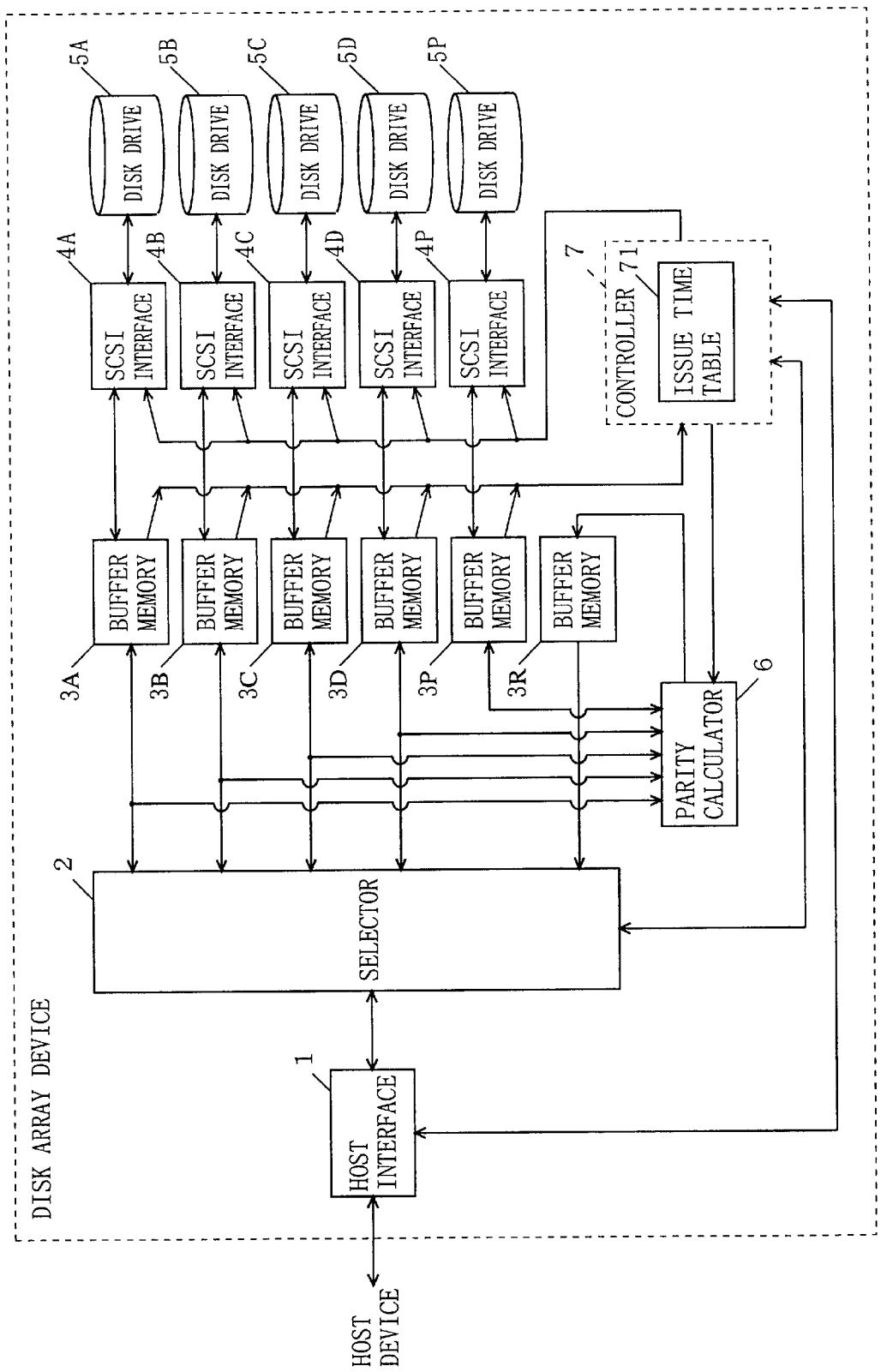
FIG. 1 is a block diagram showing the structure of a disk array device according to a first embodiment of the present invention.

FIG. 1 is a block diagram showing the structure of a disk array device according to a first embodiment of the present invention. In FIG. 1, the disk array device includes a host interface 1, a selector 2, six buffer memories 3A to 3D, 3P, and 3R, five SCSI interfaces 4A to 4D and 4P, five disk drives 5A to 5D and 5P, a parity calculator 6, and a controller 7. Note that the controller 7 includes an issue time table 71, which is not used in the first embodiment but required in a second embodiment and thus described later.

Figure 2:
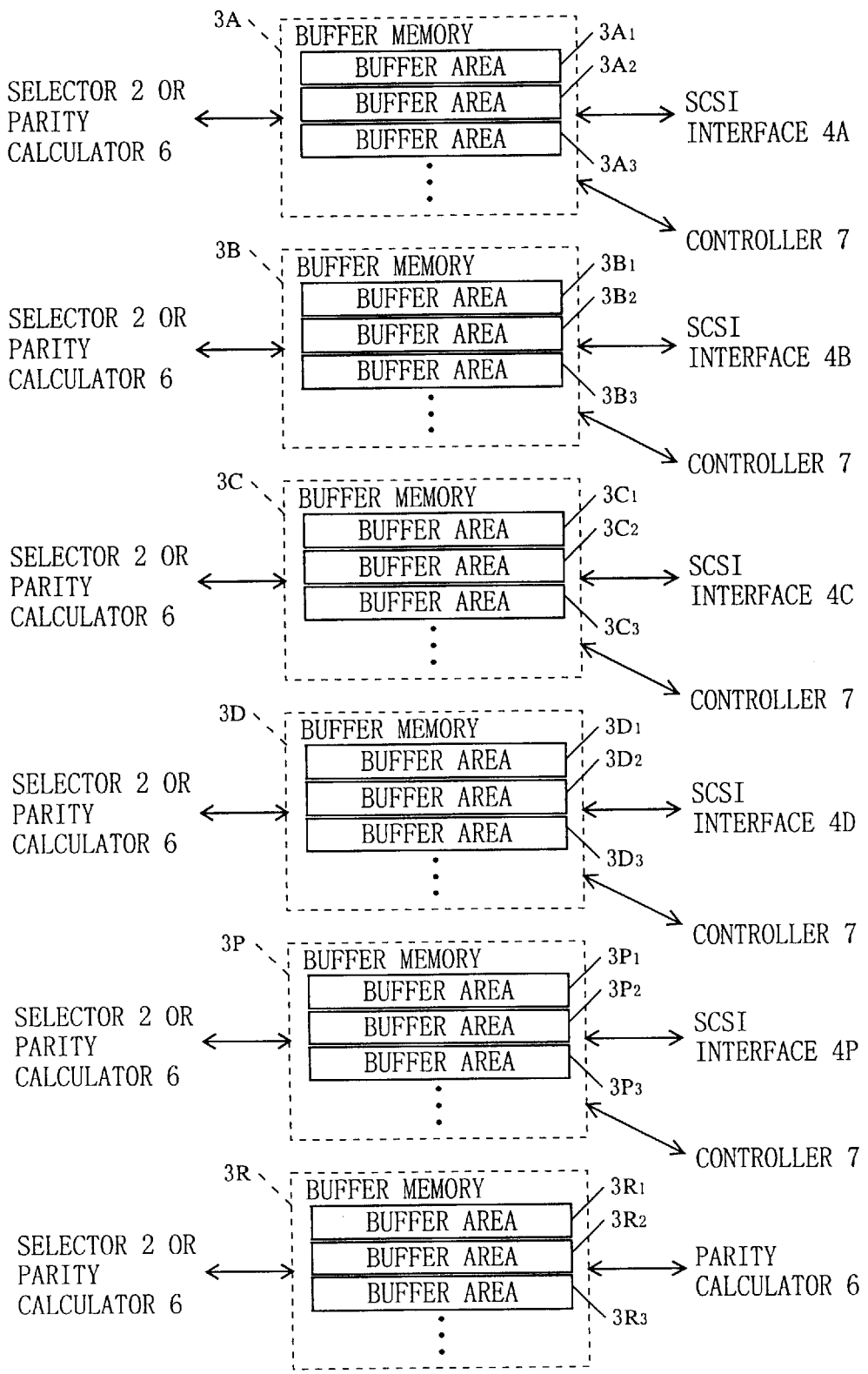
FIG. 2 is a diagram showing the detailed structure of buffer memories 3A to 3D, 3P and 3R shown in FIG. 1.

FIG. 2 shows a detailed structure of the buffer memories 3A to 3D, 3P, and 3R in FIG. 1. In FIG. 2, the storage area of the buffer memory 3A is divided into a plurality of buffer areas $3A_1$, $3A_2$, $3A_3$ . . . Each of the buffer areas $3A_1$, $3A_2$, $3A_3$ . . . has a storage capacity (512 bytes, in the first embodiment) for being able to store single data block or redundant data. Further, an identifier (generally, a top address of each buffer area) for specifying each buffer area is allocated to each buffer area.

Each storage area of the other buffer memories 3B to 3D, 3P, and 3R is also divided into a plurality of buffer areas. The identifier is also allocated to each buffer area in the same manner as described for the buffer area $3A_1$.

Referring back to FIG. 1, a host device (not shown) is placed outside the disk array device. The host device is connected so as to bi-directionally communicate with the disk array device. To write data into the disk array device, the host device transmits a write request and data of 2048 bytes to the disk array device. For easy understanding of the first embodiment, assume that the data to be transmitted from the host device is 2048 bytes in size. The transmission data from the host device is generated, typically, by dividing video data by 2048 bytes.

In response to the write request and data, the RAID starts a write operation. Already being described in detail in Background Art section, this write operation is briefly described herein for the first embodiment with reference to FIGS. 3a and 3b. Assume that transmission data D-1 (refer to FIG. 3a) is inputted from the host device through the host interface 1 to the selector 2 of the disk array device. The selector 2 divides the data D-1 into four, generating data blocks D-A1, D-B1, D-C1, and D-D1 of 512 bytes each. The selector 2 transfers the data block D-A1 to the buffer memory 3A, the data block D-B1 to the buffer memory 3B, the data block D-C1 to the buffer memory 3C, and the data block D-D1 to the buffer memory 3D. The buffer memories 3A to 3D store the transferred data blocks D-A1 to D-D1, respectively.

The data blocks D-A1 to D-D1 are also sent to the parity calculator 6, The parity calculator 6 performs calculation of parity described in Background Art section, generating redundant data D-P1 of 512 bytes from the data blocks D-A1 to D-D1. The redundant data D-P1 is transferred to the buffer memory 3P, and stored therein.

Now, the buffer memories 3A to 3D store the data blocks D-A1 to D-D1, respectively, and the buffer memory 3P stores the redundant data D-P1. These data blocks D-A1 to D-D1 and redundant data D-P1 are generated based on the same data D-1 of 2048 bytes, and therefore belong to the same parity group. As described in Background Art section, the parity group is a set of data blocks and redundant data generated based on the same data (2048 bytes) from the host device. Assume herein that the data blocks D-A1 to D-D1 and redundant data D-P1 belong to a parity group n.

A write request is inputted through the host interface 1 to the controller 7. In response to the write request, the controller 7 assigns storage locations for the currently-created parity group n. The storage locations for the data blocks are selected from the storage areas in the disk drives 5A to 5D, while the storage location for the redundant data is selected from the storage areas in the disk drive 5P. The controller 7 notifies the SCSI interface 4A of the storage location selected from the storage areas in the disk drive 5A. Similarly, the controller 7 notifies the SCSI interfaces 4B to 4D, and 4P of the storage locations selected from the storage areas in the disk drives 5B to 5D and 5P, respectively.

In response to the notification from the controller 7, the SCSI interface 4A fetches the data block D-A1 from the buffer memory 3A connected thereto, and stores the data block D-A1 in the selected storage area (location) in the disk drive 5A. Similarly, the other SCSI interfaces 4B to 4D store the data blocks D-B1 to D-D1 of the buffer memories 3A to 3D in the selected storage areas (locations) in the disk drives 5B to 5D, respectively. The SCSI interface 4P stores the redundant data D-P1 of the buffer memory 3P in the selected storage area (location) in the disk drive 5P.

In the disk array device, the above write operation is performed whenever transmission data arrives from the host device. As a result, as shown in FIG. 3b, the data blocks and redundant data of the same parity group are stored in the disk drives 5A to 5D and 5P. For example, for the parity group n (dotted part), the data blocks D-A1, D-B1, D-C1, and D-D1 and the redundant data D-P1 are generated. The data blocks D-A1, D-B1, D-C1, and D-D1 are stored in the disk drives 5A to 5D, while the redundant data is stored in the disk drive 5P. Also for other parity groups, data blocks and redundant data are stored in the disk drives 5A, 5B, 5C, 5D, and 5P, as the parity group n.

In the above write operation, the redundant data is stored only in the disk drive 5P, which is a fixed disk drive. As clear from above, the write operation is described based on the RAID-3 architecture. However, the disk array device according to the first embodiment is not restricted to RAID-3, but may be constructed according to the RAID-5 architecture. RAID-5 is different from RAID-3 in that redundant data is not stored in a fixed disk drive, but distributed across disk drives included in the disk array device.

To read data from the disk array device, the host device transmits a first read request to the disk array device. The first read request includes information specifying storage locations of the data.

In response to the first read request, the disk array device starts a read operation that is distinctive of the present embodiment, which is now described in detail with reference to flow charts in FIGS. 4a and 4b.

The procedure to be executed by the controller 7 when the first read request arrives is now described with reference to FIG. 4a. The first read request arrives through the host interface 1 at the controller 7 (step S1). The controller 7 extracts the storage locations of the data from the first read request. The controller 7 then specifies the storage location of the parity group generated based on the storage locations of the data (four data blocks and its redundant data). Note that the operation of specifying the storage location of the parity group from those of the data is known art, and is defined according to the RAID architecture.

The controller 7 then issues a set of second read requests to read the parity group (step S2). Since the parity group is distributed over the disk drives 5A to 5D and 5P in the first embodiment, the controller 7 issues five second read requests. The second read requests are respectively transmitted to the corresponding SCSI interfaces 4A to 4D and 4P.

The second read request to the SCSI interface 4A specifies the storage location of the data block in the disk drive 5A, and similarly, the second read requests to the SCSI interfaces 4B to 4D specify the storage locations of the data blocks in the disk drive 5B to 5D, respectively. Further, the second read request to the SCSI interface 5P specifies the storage location of the redundant data in the disk drive 5P.

The disk drive 5A receives the second read request through the SCSI interface 4A, and then reads the data block from the storage location specified by the second read request. The read data block is transmitted to the SCSI interface 4A. The second read request specifies not only the storage location of the disk drive 5A but that of the buffer memory 3A. More specifically, the second read request specifies the buffer memory area (refer to FIG. 2) included in the buffer memory 3A in which the read data block is to be stored. The SCSI interface 4A stores the data block read from the disk drive 5A in any one of the buffer areas $3A_1$, $3A_2$, $3A_3$ . . . specified by the second read request. After the data block of 512 bytes is stored in the buffer area $3A_i$ (i is a natural number), the buffer memory 3A sends a "first READ-COMPLETED" to the controller 7 to notify that the read operation from the disk drive 5A has been completed.

Similarly, the disk drives 5B to 5D each start reading the data block in response to the second request sent through the corresponding SCSI interfaces 4B to 4D. The data blocks read from the disk drives 5B to 5D are stored through the SCSI interfaces 4B to 4D in the buffer areas $3B_i$ to $3D_i$, respectively. Then, the buffer memories 3B to 3D each transmit a first READ-COMPLETED to the controller 7 to notify that the read operation from the disk drives 5B to 5D has been completed.

Also, the disk drive 5P starts reading the redundant data after receiving the second read request from the SCSI interface 4P. The read redundant data is stored through the SCSI interface 4P in the buffer area $3P_i$. After the redundant data is stored in the buffer area $3P_i$, the buffer memory 3P transmits a first READ-COMPLETED to the controller 7 to notify that the read operation from the disk drive 5P is completed.

Note that, in most cases, the first READ-COMPLETED's from the buffer memories 3A to 3D and 3P arrive at the controller 7 at different times. For example, when reading from the disk drive 5A takes a long time, the first READ-COMPLETED arrives at the controller 7 later than the signals from the other disk drives. As clear from the above, the first READ-COMPLETED's arrive at the controller 7 in the order in which the reading from the disk drives 5A to 5D and 5P has been completed.

Figure 4A:
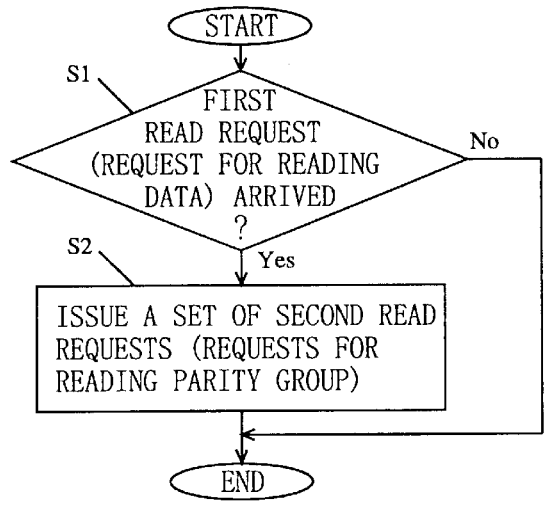
FIGS. 4a and 4b are flow charts showing the procedure executed by a controller 7 according to the first embodiment.
Figure 4B:
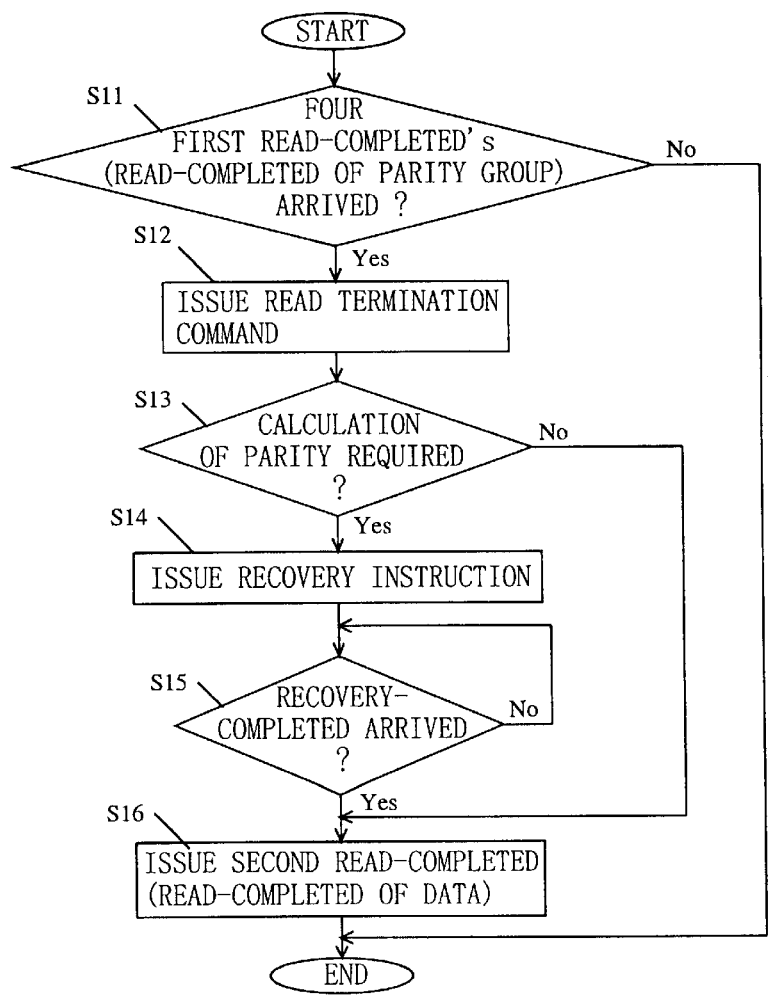

Referring to FIG. 4b, described next is the procedure to be executed by the controller 7 after four first READ-COMPLETED's arrive. When receiving four first READ-COMPLETED's (step S11), the controller 7 advances to step S12 without waiting for the remaining first READ-COMPLETED. That is, the controller 7 determines that reading from any four of the disk drives 5A to 5D has been completed, and that reading from the remaining disk drive is delayed.

The controller 7 then specifies the buffer memory (any one of the buffer memories 3A to 3D and 3P) which has not yet sent a first READ-COMPLETED to distinguish the disk drive (any one of the disk drives 5A to 5D and 5P) in which reading has not yet been completed. The controller 7 issues a read-termination command to forcefully terminate the reading being executed from the disk drive (step S12). The read-termination command is sent to the disk drive which has not completed reading through the SCSI interface connected thereto, thereby terminating the reading.

After step S12, the controller 7 determines whether calculation of parity is required or not (step S13). At this time, the controller 7 has received the first READ-COMPLETED's from four of the buffer memories 3A to 3D, and 3P. Here, assume that the controller 7 has received the first READ-COMPLETED's from the buffer memories 3A to 3D. In this case, four data blocks are stored in the buffer memories 3A to 3D, and therefore the controller 7 determines that the data requested from the host device can be transmitted. Therefore, the controller 7 determines that calculation of parity is not required, and the procedure directly advances from step S13 to step S16.

Consider next a case where the controller 7 receives the first READ-COMPLETED from the buffer memory 3P. In this case, the redundant data and three data blocks are stored in the disk drive 5P and three of the disk drives, but one data block has not yet been read. The controller 7 therefore determines that the data required by the host device cannot be transmitted until the unread data block is recovered. The controller 7 then advances from step S13 to step S14, producing a recovery instruction to request the parity calculator 6 to operate calculation of parity (step S14).

In response to the recovery instruction, the parity calculator 6 fetches the redundant data and three data blocks from the buffer memory area $3P_i$ and three buffer memory areas (any of three buffer areas $3A_i$ to $3D_i$) which store these data blocks. The parity calculator 6 operates calculation of parity as described in the Background Art section to recover the unread data block from the redundant data and three data blocks. The recovered data block is stored in a buffer memory area $3R_i$ in the buffer memory 3R. When the calculation of parity ends, the parity calculator 6 issues a recovery-completed signal indicating an end of calculation of parity, and transmits the signal to the controller 7. When receiving the recovery-complete signal (step S15), the controller 7 determines that four data blocks are stored in the buffer memory areas and that the data requested from the host device can be transmitted. The procedure then advances to step S16.

In step S16, the controller 7 generates a "second READ-COMPLETED", and transmits the same to the selector 2.

The second READ-COMPLETED specifies four buffer memory areas storing the data blocks. In response to the second READ-COMPLETED, the selector 2 sequentially selects the specified buffer memory areas, and sequentially reads the four data blocks therefrom. The selector 2 further assembles data of 2048 bytes out of the read four data blocks. The assembled data is transmitted through the host interface 1 to the host device.

Figure 5A:
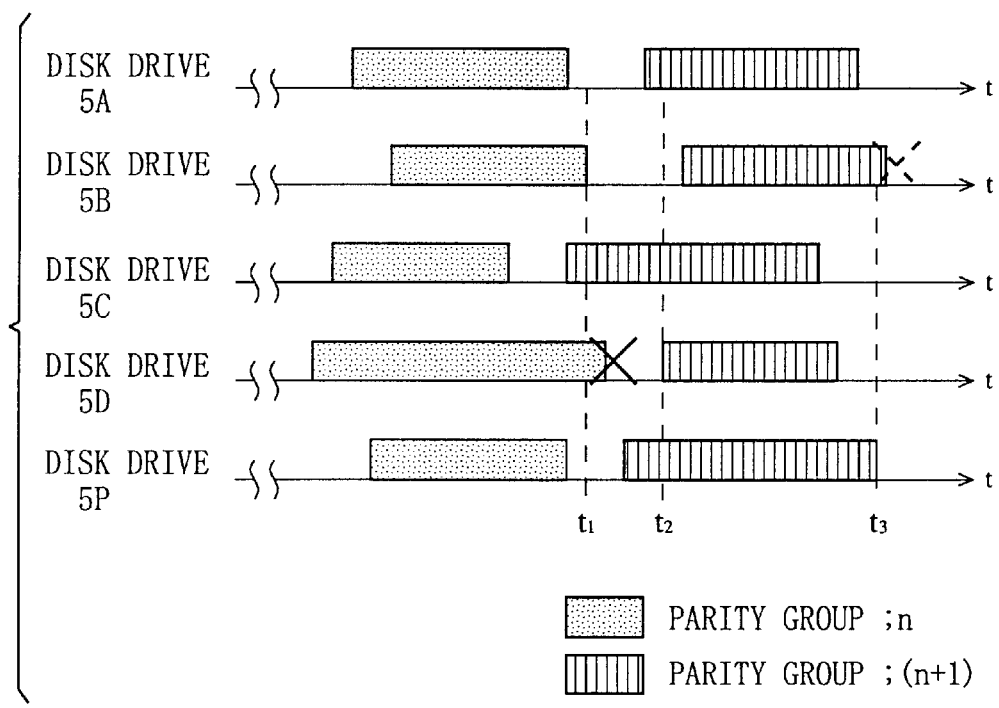
FIGS. 5a and 5b are diagrams illustrating one technical effect of the disk array device shown in FIG. 1.

Described next is a specific example of the above described read processing of the disk array device of the present invention. Here, assume that the host device requests reading of data from the parity group n and then a parity group (n+1) as shown in FIG. 3b. FIG. 5a is a schematic diagram showing read timing of the parity groups n and (n+1) in a time axis.

The controller 7 first issues a set of second read requests to read the parity group n, and then another set of second read requests to read the parity group (n+1) (step S2 in FIG. 4a). As shown in FIG. 5a, as shown by dotted parts, the disk drive 5D first starts reading of the data block. Then the disk drives 5C, 5A, 5P, and then 5B, in this order, start reading the data block or redundant data. Before the lapse of a time $t_1$, the disk drives 5C, 5A, and 5P have completed the reading. The disk drive 5B is the fourth which completes reading, at the time $t_1$. However, reading by the disk drive 5D is delayed, and being continued after the time $t_1$.

Therefore, immediately after the time $t_1$, four first READ-COMPLETED's from the buffer memories 3A, 3B, 3C, and 3P arrive at the controller 7 (step S11 in FIG. 4b). The controller 7 issues a read-termination command to the disk drive 5D which does not complete reading (step S12). In response to the read-termination command, the disk drive 5D terminates the reading, as shown in FIG. 5a by x in solid lines.

The controller 7 then executes steps S13 to S16 of FIG. 4b, as described above.

Referring back to FIG. 5a, at a time $t_2$ after the time $t_1$, the disk drive 5D starts reading the data block of the parity group (n+1) (refer to a vertically-lined part). Before the time $t_2$, the disk drives 5A, 5C, and 5P have already started reading. The disk drive 5B starts reading slightly after the time $t_2$. By a time $t_3$ after the time $t_2$, the disk drives 5C, 5D, 5A, and 5P have completed reading. Therefore, this time, the reading of the disk 5B is forcefully terminated by a read-termination command from the controller 7, as shown by x in broken lines.

As evident from the above specific example, in the disk array device of the present invention, when four data blocks are stored in the buffer memory areas, the redundant data is not required. When three data blocks and redundant data are stored, the remaining one data block is not required. The disk array device issues a read-termination command to the disk drive which is reading the unnecessary data block to forcefully terminate the reading (step S12 of FIG. 46), which is distinctive of the present disk array device.

Figure 5B:
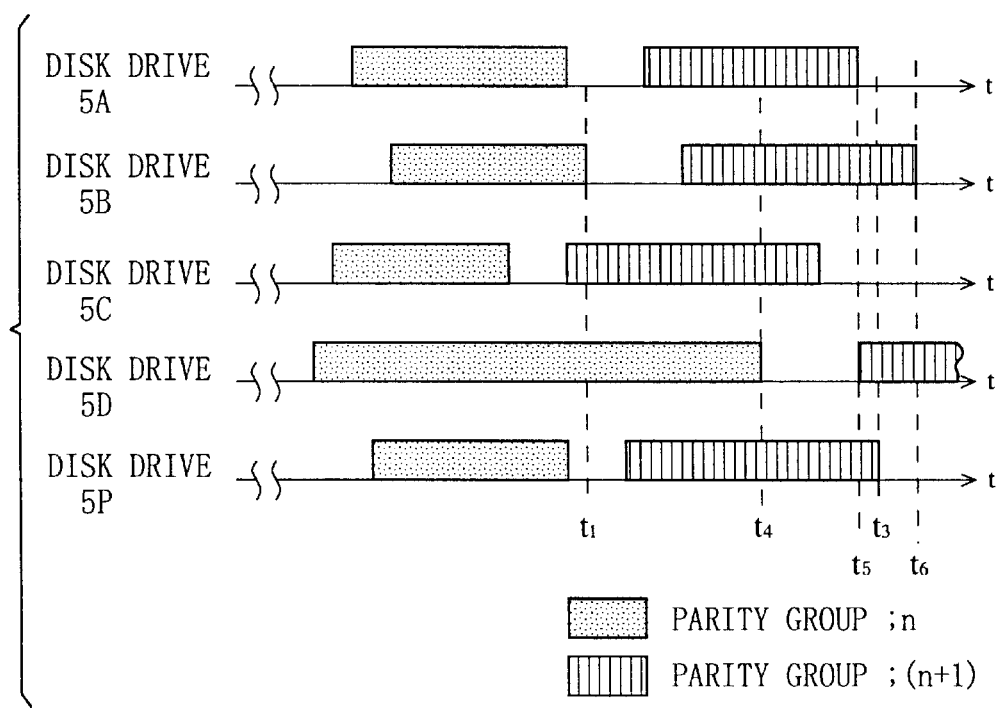

To highlight the distinctive characteristics of the present disk array device, described next is read operation by a disk array device which does not execute step S12 of FIG. 4b (hereinafter referred to as a no-termination disk array device), with reference to FIG. 5b. FIG. 5b is a schematic diagram showing read timing of the parity groups n and (n+1) in a time axis in the no-termination array disk device. The conditions in FIG. 5b are the same as those in FIG. 5a except that the no-termination disk array device does not execute step S12 of FIG. 4b. The host device requests data reading from the parity group n, and then the parity group (n+1), under the same conditions as described above.

The controller 7 issues a set of second read requests in the order in which the first read requests arrive to read data from the parity groups n and (n+1). As shown in FIG. 5b, like in FIG. 5a, reading of the data blocks or redundant data starts in the order as the disk drives 5D, 5C, 5A, 5P, and 5B. The disk drives 5C, 5A, 5P, and 5B have completed reading by the time $t_1$, as is the same in the FIG. 5a, while the disk drive 5D continues reading. Without a read-termination command, reading of the disk drive 5D is not forcefully terminated immediately after the time $t_1$, ending at a time $t_4$ long after the time $t_1$. Note that the data of the parity group n can be transmitted to the host device at the time $t_1$, as shown in FIG. 5a.

By the time $t_4$, the disk drives 5A, 5B, 5C, and 5P have already started reading of the data blocks and redundant data of the parity group (n+1). The disk drive 5D, however, starts reading of the data block of the parity group (n+1) at a time $t_5$ after the time $t_4$. The disk drives 5C, 5A, 5P have completed reading by the time $t_6$, and the disk drive 5B completes reading at time $t_6$. Thus, the data of the parity group (n+1) is transmitted immediately after the time $t_6$.

In FIG. 5a and FIG. 5b, with three data blocks and the redundant data at the time $t_1$, the data block stored in the disk drive 5D can be recovered, and thus the data of the parity group n can be transmitted to the host device without requiring reading from the disk drive 5D.

Therefore, as shown in FIG. 5a, the disk array device of the present invention forcefully terminates reading from the disk drive 5D immediately after the time $t_1$, allowing the disk drive 5D to read the data block of the parity group (n+1) in short order. On the other hand, as shown in FIG. 5b, the no-termination disk array device does not terminate unnecessary reading from the disk drive 5D after the time $t_1$ until the time $t_4$. Due to this time for unnecessary reading, as shown in FIG. 5b, reading data of the parity group (n+1) is delayed.

As described above, the disk array device of the present invention terminates incomplete reading of the disk drive, allowing the disk drive to start another reading in short order without continuing unnecessary reading. A reading delay does not affect subsequent reading.

Further, in FIG. 5a, since the disk drive 5D starts reading the data block at time $t_2$, the disk array device can transmit the data of the parity group (n+1) to the host device immediately after the time $t_3$. Therefore, the disk array device can transmit the required two pieces of data (parity groups n and (n+1)) to the host device immediately after the time $t_3$. On the other hand, in FIG. 5b, the disk drive 5D starts reading as late as at the time $t_5$. This delayed reading affects subsequent reading such that the no-termination disk array device cannot transmit the data of the parity group (n+1) at the time $t_3$, and thus cannot transmit the required two pieces of data (parity groups n and (n+1)) to the host device at the time $t_3$.

As clear from above, according to the disk array device of the present invention, the whole volume of data read from the disk drives 5A to 5P (so-called disk array) per unit of time increases. Therefore, the present disk array device can continuously transmit data to the host device. As a result, video data being replayed at the host device has a lower tendency to be interrupted.

Figures 6A, 6B:
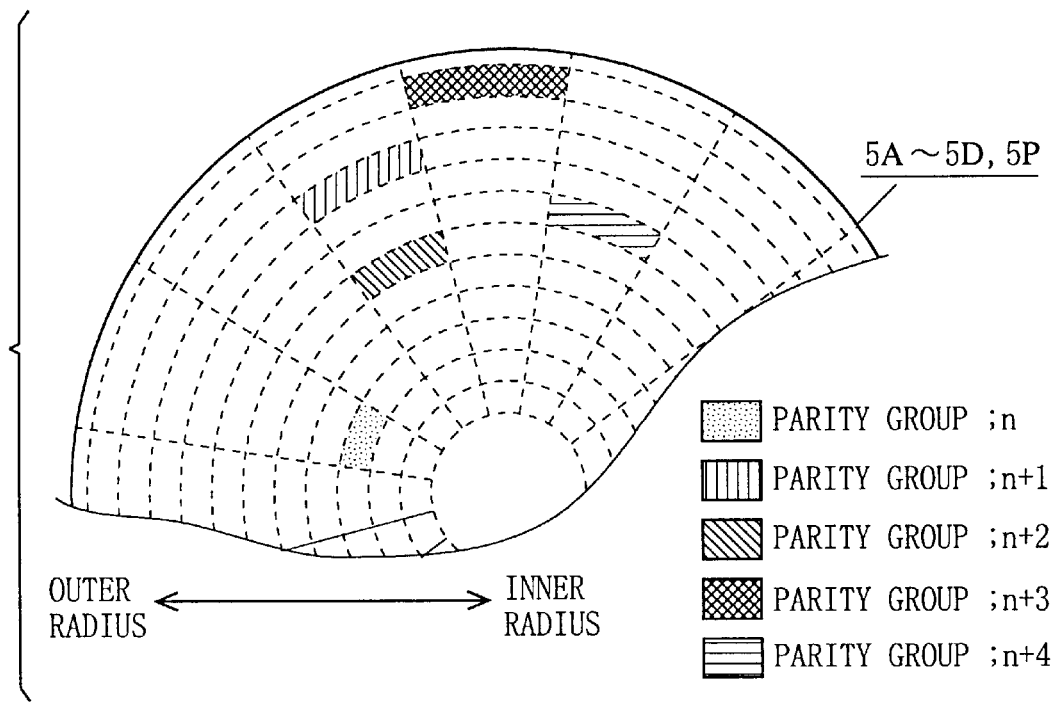
FIGS. 6a and 6b are diagrams illustrating a change in reading order in disk drives 5A to 5D and 5P shown in FIG. 1.

In some cases, a disk drive of a type shown in FIGS. 6a and 6b are used for the disk drives 5A to 5D and 5P of the first embodiment. FIG. 6a shows physical recording positions of the data blocks or redundant data of the parity group n to (n+4) in any one of the disk drives. In FIG. 6a, the data block or redundant data of the parity group n is recorded on a track at the most inner radius of the disk. Further, the data block or redundant data of the parity group (n+2) is recorded on a track, then the parity groups (n+4), (n+1), and (n+3), in the direction of the outer radius of the disk.

Consider that the controller 7 issues second read requests for reading the data block or redundant data to the disk drive of FIG. 6a in the order as the parity groups n, (n+1), (n+2), (n+3), and (n+4). The disk drive of FIG. 6a executes reading so as to shorten a seek distance of a read head without reading in the order in which the second read requests arrive. For example, the disk drive changes the order of reading so that the read head moves linearly from the inner to outer radius of the disk. As a result, the data blocks and redundant data are read in the order as the parity groups n, (n+2), (n+4), (n+1), and (n+3). The disk drive thus can efficiently read more data blocks and redundant data per unit of time.

Described next is reading processing of the present disk array device when the above disk drive which changes the order of reading is used for all or part of the disk drives 5A to 5D and 5P shown in FIG. 1. Here, assume that the host device requests data reading in the order as the parity groups n, (n+1), (n+2), (n+3), and (n+4) shown in FIG. 3b. FIG. 7 is a schematic diagram showing read timing of the parity groups n to (n+4) in a time axis in the disk array device of the present invention.

First, the controller 7 issues second read requests as in the requested order. Therefore, the second read requests arrive in each of the disk drives 5A to 5D and 5P in the order as the parity groups n, (n+1), (n+2), (n+3), and (n+4). The disk drives 5A to 5D and 5P, however, determine the order of reading independently, and thus the actual reading order in each disk drive is not necessarily equal to the requested order and may be different from one another. Furthermore, in FIG. 7a, the disk drives 5A, 5B, and 5P have completed reading the data blocks and redundant data of the parity group (n+2) by a time $t_7$ and the disk drive 5D completes reading the data block of the same parity group at the time $t_7$ (refer to hatched parts), while the disk drive 5C completes reading the data block of the parity group (n+4) at the time $t_7$ (refer to a horizontally-lined part). In this case, the controller 7 receives the fourth first READ-COMPLETED for the parity group (n+2) immediately after the time $t_7$ (step S11 of FIG. 4b). Therefore, a read termination command is sent to the disk drive 5C (step S12), which therefore does not read the data block of the parity group (n+2).

Similarly, the disk drives 5A, 5B, 5C and 5P have completed reading of the data blocks and redundant data of the parity group (n+4) by a time $t_8$ (refer to vertically-lined parts). In this case, the controller 7 issues a read termination command for the parity group (n+4) immediately after the time $t_8$ to the disk drive 5D. The disk drive 5D therefore does not read the data block of the parity group (n+4).

Figure 7A:
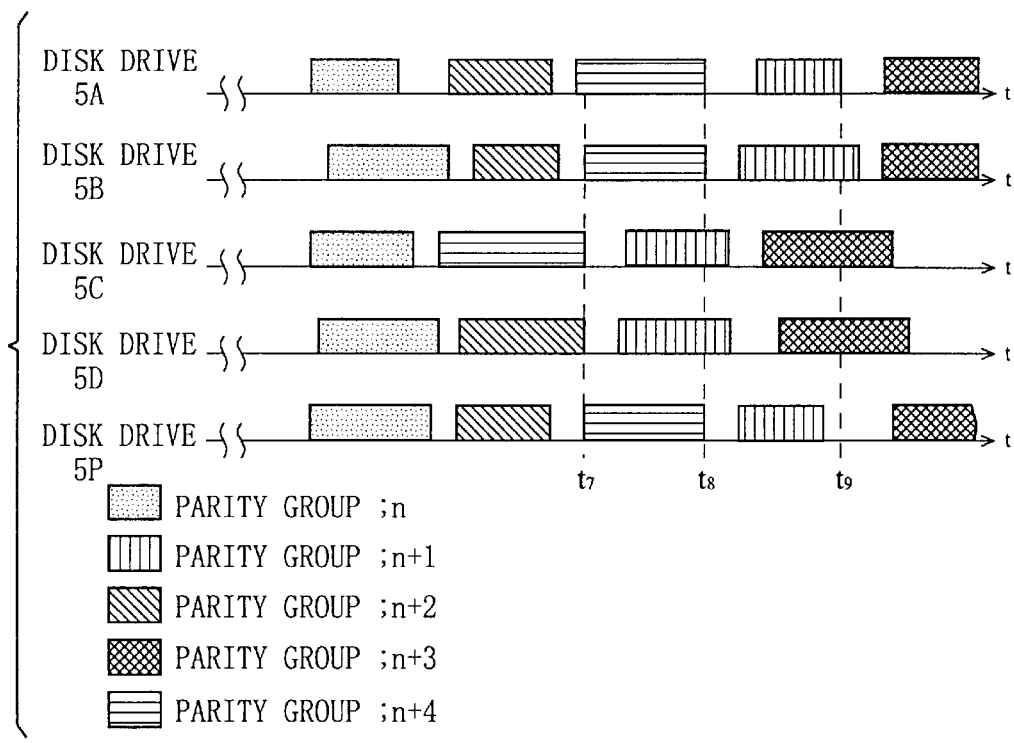
FIGS. 7a and 7b are diagrams illustrating another technical effect of the disk array device shown in FIG. 1.
Figure 7B:
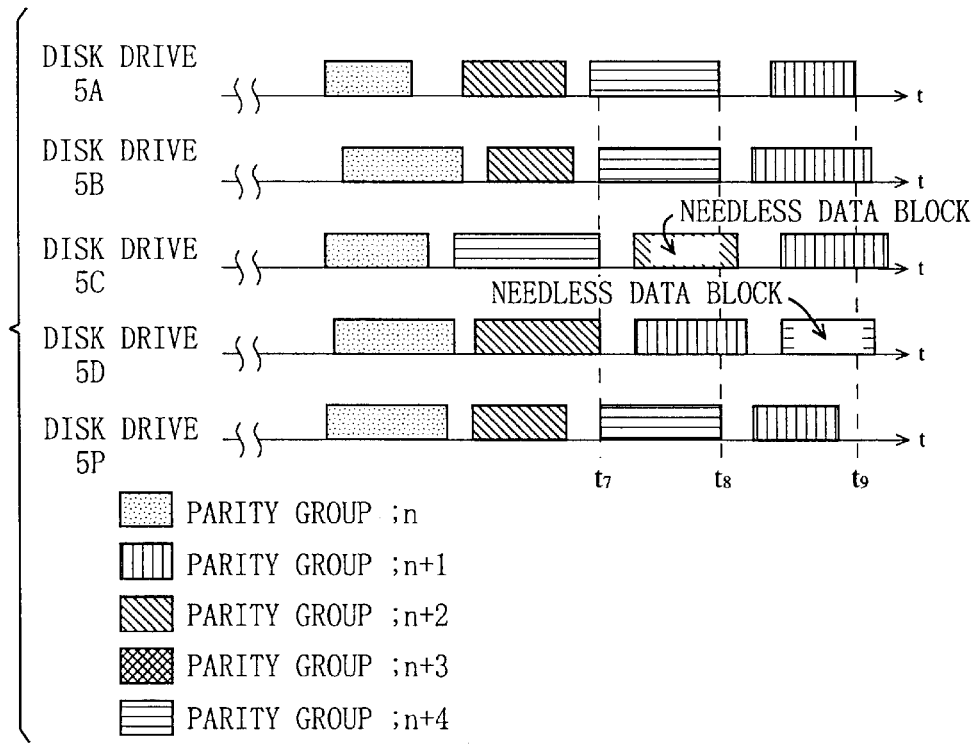

To highlight the distinctive characteristics of the present 20 disk array device, described next is read operation by a disk array device which does not execute step S12 of FIG. 4b, with reference to FIG. 7b. FIG. 7b is a schematic diagram showing read timing of the parity groups n to (n+4) in a time axis in the disk array device. The conditions in FIG. 7b are the same as those in FIG. 7a except that the disk array device does not execute step S12 of FIG. 4b. The host device requests data reading from the parity groups n, (n+1), (n+2), (n+3) and then (n+4) sequentially in this order under the same conditions as described above.

The disk drives 5A to 5D and 5P determine the reading order independently from one another. In FIG. 7(b), as in FIG. 7(a), the disk drive 5A, 5B, 5D and 5P have completed reading the data blocks and redundant data of the parity group (n+2) by the time $t_7$. The disk drive 5C, however, has not yet started reading the data block of the parity group (n+2) by the time $t_7$. In the no-termination disk array device as shown in FIG. 7b, the disk drive 5C is not provided with a read termination command, and therefore will start reading the data block of the parity group (n+2) in the course of time. This reading, however, is not necessary and a waste of time because the data block of the parity group (n+2) recorded in the disk drive 5C can be recovered at the time $t_7$.

Similarly, the disk drives 5A, 5B, 5C and 5P have completed reading the data blocks and redundant data of the parity group (n+4) by the time $t_8$. The disk drive 5D, however, has not yet started reading the data block of the parity group (n+4), and will start the reading in the course of time. This reading is also unnecessary and a waste of time.

As clear from the above, when a data block becomes in a state of being recoverable, the disk array device of the present invention sends a read termination command to the disk drive which has not yet started reading the data block. In response to the read termination command, the disk device will not start unnecessary reading, and starts only necessary reading. Therefore, the present disk array device can quickly transmit the requested data to the host device. In FIG. 7a, four pieces of data of the parity groups n, (n+2), (n+4), and (n+1) can be transmitted to the host device at a time $t_9$. On the other hand, in FIG. 7b, with unnecessary reading by the disk drives 5C and 5D, only three pieces of data n, (n+2), and (n+4) can be transmitted 10 at the time $t_9$.

As clear from above, according to the disk array device of the present invention, the volume of data to be read per unit of time increases, and data can be continuously transmitted to the host device. As a result, video data being replayed at the host device has a lower tendency to be interrupted.

The disk drive shown in FIGS. 6a and 6b does not process the second read requests in the arrival order but changes the reading order. In the disk drive, therefore, a plurality of second read requests may wait to be processed. Further, as evident from above, the controller 7 may cancel the second read request which waits to be processed, but cannot terminate a specific second read request waiting to be processed in some cases. In this case, the controller 7 once terminates the entire processing of the second read requests in the disk drives, and then issues new second read requests except the request to be terminated. The controller 7 thus can cancel the specific second read request.

(Second Embodiment)

Described next is a disk array device according to a second embodiment of the present invention. The configuration of the disk array device is the same as that shown in FIG. 1. For a clear understanding of technical effects of the second embodiment, any of the disk drives 5A to 5D and 5P does not execute reading in the arrival order but changes the reading order so as to shorten the seek distance (the distance required for seeking) of the read head as shown in FIG. 6b.

The disk array device of the second embodiment performs write operation as described in the first embodiment whenever transmission data from the host device arrives. To read data from the disk array device, the host device transmits a first read request specifying storage locations of the data to the disk array device.

Figure 8A:
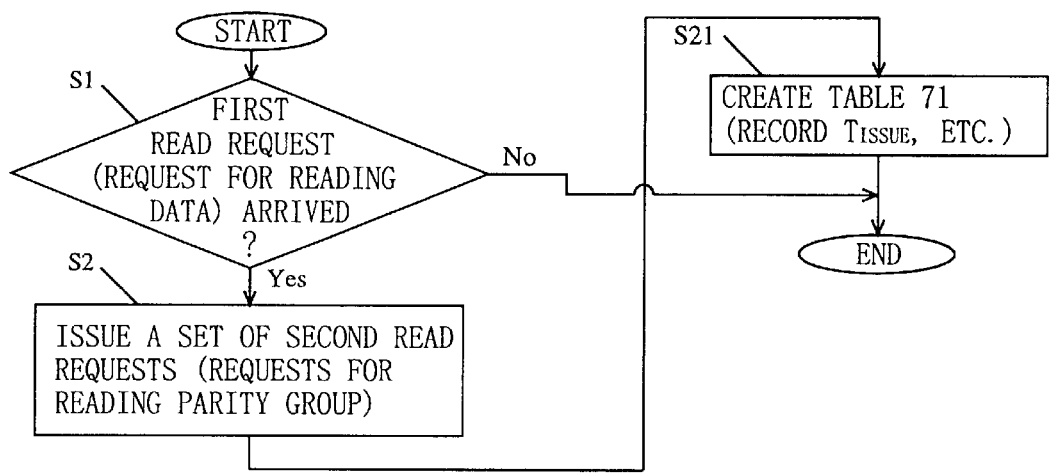
FIGS. 8a and 8b are flow charts illustrating the procedure of the controller 7 according to a second embodiment of the present invention.

In response to the first read request, the disk array device starts a read operation that is distinctive of the present embodiment, which is now described in detail with reference to flowcharts in FIGS. 8a and 8b. Since the flowchart in FIG. 8a partially includes the same steps as those in FIG. 4a, the steps in FIG. 8a are provided with the same step numbers as those in FIG. 4a and their description is simplified herein.

Figure 9:
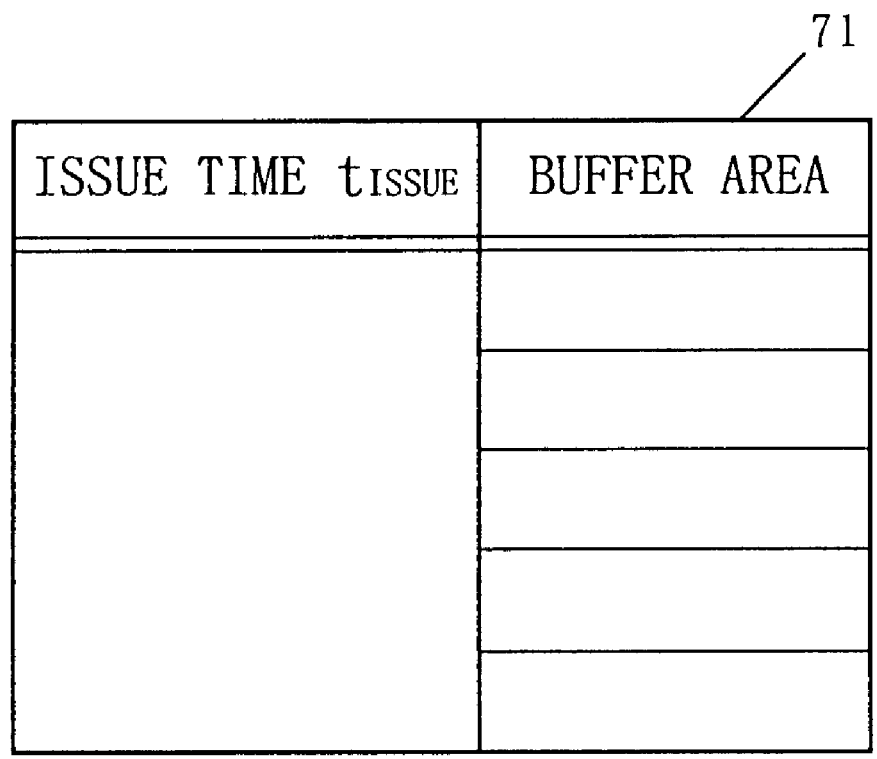
FIG. 9 is a diagram showing an issue time table 71 in the controller 7.

In response to the first read request, the controller 7 issues a set of second read requests (steps S1 and S2). The controller 7 then creates an issue time table 71 as shown in FIG. 9 in its storage area (step S21). As described in the first embodiment, the second read requests sent to the SCSI interfaces 4A to 4D and 4P indicate the buffer memory areas $3A_i$ to $3D_i$ and $3P_i$ (refer to FIG. 2) in which the data blocks or redundant data from the disk drives 5A to 5D and 5P are to be stored, respectively. The issue time table 71 includes the buffer memory areas $3A_i$ to $3D_i$ and $3P_i$ in which the data blocks and redundant data of the parity group to be read are stored, and also an issue time $t_{ISSUE}$ when the controller 7 issued the second read requests.

The controller 7 executes processing as described in the first embodiment (refer to FIG. 4b) to transmit the data requested by the host device. Since the processing when four first READ-COMPLETED's arrive does not directly relate to the subject of the second embodiment, its description is omitted herein.

The controller 7 previously stores a limit time $T_{LIMIT}$ by which four first READ-COMPLETED's have to have arrived from the issue time $t_{ISSUE}$. By the limit time $T_{LIMIT}$, at least four disk drives are supposed to have completed reading after the second read requests are issued. If any two of the disk drives 5A to 5D and 5P have not completed reading by the limit time $T_{LIMIT}$, transmission of the data requested by the host device is delayed, causing interruption of the video being replayed at the host device.

As described in the first embodiment, the disk array device tries to read the data blocks and redundant data from the five disk drives 5A to 5D and 5P. The disk array device, however, can transmit the data requested to be read to the host device when four data blocks, or three data blocks and the redundant data are stored in the buffer memories. Therefore, the data transmission to the host device is not delayed if at least four disk drives have completed reading before the limit time $T_{LIMIT}$ elapses.

On the contrary, if two disk drives have not completed reading by the limit time $T_{LIMIT}$, the data transmission to the host device is totally delayed, and reading by the other three disk drives goes to waste. To avoid such waste of reading, the controller 7 executes processing according to a flow chart shown in FIG. 8b.

The controller 7 first determines whether four first READ-COMPLETED's have arrived by the limit time $T_{LIMIT}$ (step S31). In step 31, the controller 7 obtains a present time $t_{PRE}$ from a time-of-day clock therein at predetermined timing, and selects the issue time $t_{ISSUE}$ in the issue time table 71 shown in FIG. 9. The controller 7 previously stores the limit time $T_{LIMIT}$ as described above. When $(t_{PRE}-t_{ISSUE})>T_{LIMIT}$ is satisfied, the controller 7 fetches the information on the buffer memory areas $3A_i$ to $3D_i$ and $3P_i$ corresponding to the selected issue time $t_{ISSUE}$ from the issue time table 71 (refer to FIG. 9). As described above, each first READ-COMPLETED includes information on the buffer memory area in which the data block or redundant data is stored. When a first READ-COMPLETED arrives, the controller 7 extracts the information on the buffer memory areas included in the first READ-COMPLETED, and stores the same therein.

The controller 7 then compares the information on the buffer memory areas fetched from the issue time table 71 with the information on the buffer memory area extracted from the first READ-COMPLETED which has arrived at the controller 7. The comparison results allow the controller 7 to determine whether four first READ-COMPLETED's have arrived by the limit time $T_{LIMIT}$ or not.

Figure 8B:
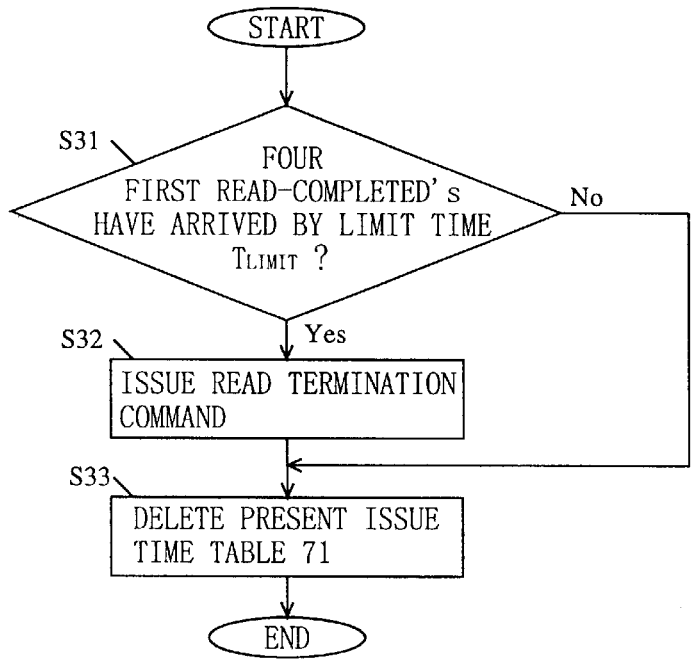

In step S31, if four first READ-COMPLETED's have arrived by the limit time $T_{LIMIT}$, the controller 7 deletes the currently-selected issue time table 71 (step S33), and ends the processing of FIG. 8b. If four READ-COMPLETED's have not yet arrived, the controller 7 specifies one or more disk drives which have not completed reading (any of the disk drives 5A to 5D and 5P) according to the comparison results. The controller 7 issues a read termination command to terminate reading of the specified disk drives (step S32). In response to the read termination command, the specified disk drives terminate the reading currently being executed or reading not yet executed. The controller 7 then deletes the selected issue time table 71 (step S33), and ends the processing.

Figure 10A:
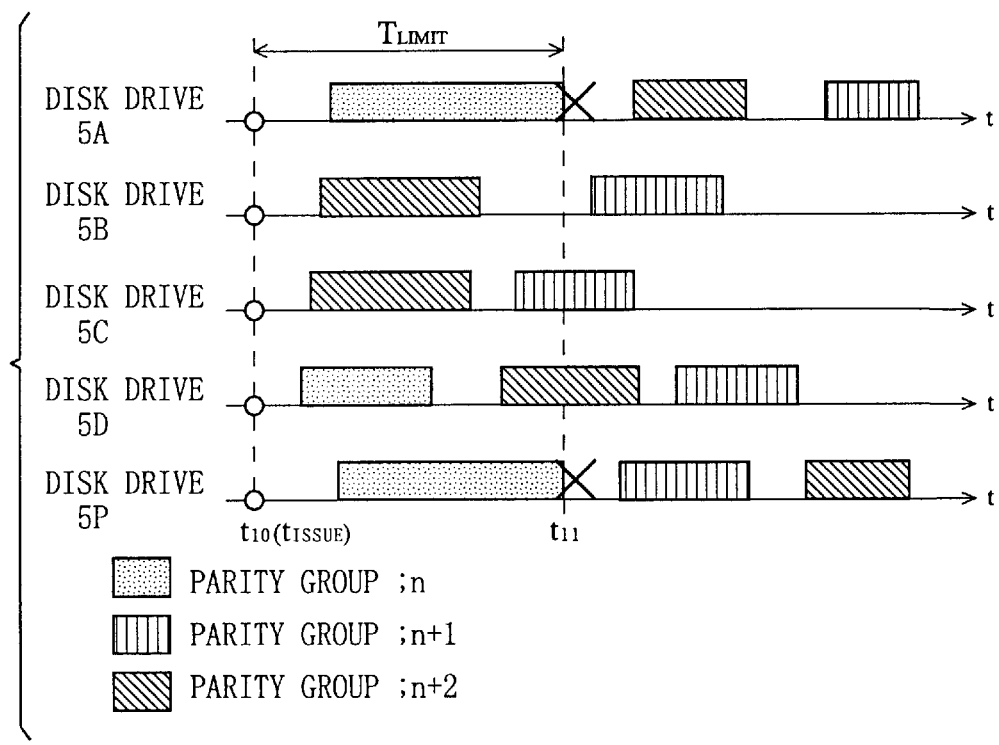
FIGS. 10a and 10b are diagrams illustrating one technical effect of the second embodiment.

Described next is a specific example of read operation of the present disk array device with reference to FIG. 10a. Assume that the host device requests data reading of the parity groups n, (n+1), and then (n+2) as shown in FIG. 2b. FIG. 10a is a schematic diagram showing read timing of the parity groups n to (n+2) in a time axis in the present array disk device.

In response to a request from the host device, the controller 7 issues a set of second read requests for reading data of the parity group n at time a time $t_{10}$ (refer to FIG. 10a). The controller 7 then creates one issue time table 71 of FIG. 9 for read operation of the parity group n (step S21 in FIG. 8a). This issue time table 71 is hereinafter referred to as an issue time table $71_n$, for convenience in description. The issue time table $71_n$ includes information on the buffer memory areas $3A_i$, $3B_i$, $3C_i$, $3D_i$, and $3P_i$, and also includes the time $t_{10}$ as the issue time $t_{ISSUE}$. Similarly, second read requests for reading data of the parity group (n+1), and then for the parity group (n+2) are issued after the time $t_{10}$. The issue time table 71 is created for each of the read operations of the parity groups (n+1) and (n+2).

The second read requests for the parity groups n, (n+1), and (n+2) are sent to each of the disk drives 5A to 5D and 5P. Each disk drive determines its reading order independently. For example, the disk drive 5A tries to read in the order as the parity groups n, (n+2), and then (n+1); the disk drive 5B as (n+2), n, and then (n+1); the disk drive 5C as (n+2), (n+1), and then n; the disk drive 5D as n, (n+2), and then (n+1); and the disk drive 5P as n, (n+1), and then (n+2). According to these reading orders, as shown in FIG. 10a, the disk drives 5A, 5D and 5P first start reading the data blocks and redundant data of the parity group n (refer to dotted parts), while the disk drives 5B and 5C start reading the parity group (n+2) (refer to hatched parts).

Assume that a time $t_{11}$ equals to $t_{10}+T_{LIMIT}$ and $(t_{PRE}-t_{ISSUE})>T_{LIMIT}$ is satisfied. At the time $t_{11}$, the controller 7 fetches the information on the buffer memory areas $3A_1$ to $3D_1$ and $3P_1$ written with the issue time $t_{ISSUE}$ ($t_{10}$) from the issue time table $71_n$ (refer to FIG. 9). By the time $t_{11}$, only the disk drive 5D has completed reading of the data block of the parity group n, and therefore the controller 7 has received only the first READ-COMPLETED specifying the buffer memory area 3D, from the buffer memory 3D. The controller 7 thus recognizes that two or more first READ-COMPLETED's have not arrived by the limit time $T_{LIMIT}$ and that reading of the parity group n in the disk drives 5A to 5C and 5P has not yet been completed. The controller 7 thus specifies the disk drives (in this case, the disk drives 5A to 5C and 5P) which are taking too much time to read the data of the parity group n.

The controller 7 issues a read termination command to the specified disk drives 5A to 5C and 5P (step S32 of FIG. 8b) to terminate reading of the parity group n.

Accordingly, the disk drives 5A and 5P terminate reading of the parity group n, as shown by × in FIG. 10a immediately after the time $t_{11}$. As a result, the disk drive 5A starts reading of the parity group (n+2) (refer to a hatched part), while the disk drive 5P starts reading of the parity group (n+1) (refer to a vertically-lined part). In response to the read termination commands, the disk drive 5B, which was supposed to read the parity groups (n+2), n, and then (n+1), does not start reading the parity group n, but reading the parity group (n+1) after completing reading of the parity group (n+2). Also the disk drive 5C does not follow the predetermined reading order, not reading the data block of the parity group n.

As described above, in some cases, the controller 7 of the present disk array device detects that two or more data blocks of the same parity group, or at least one data block and the redundant data of the same parity group are not read within the limit time $T_{LIMIT}$. In this case, the controller 7 specifies the disk drives which have not yet completed reading of the parity group. The controller 7 then issues a read termination command to the specified disk drives to terminate reading. This is the characteristic operation of the present disk array device.

Figure 10B:
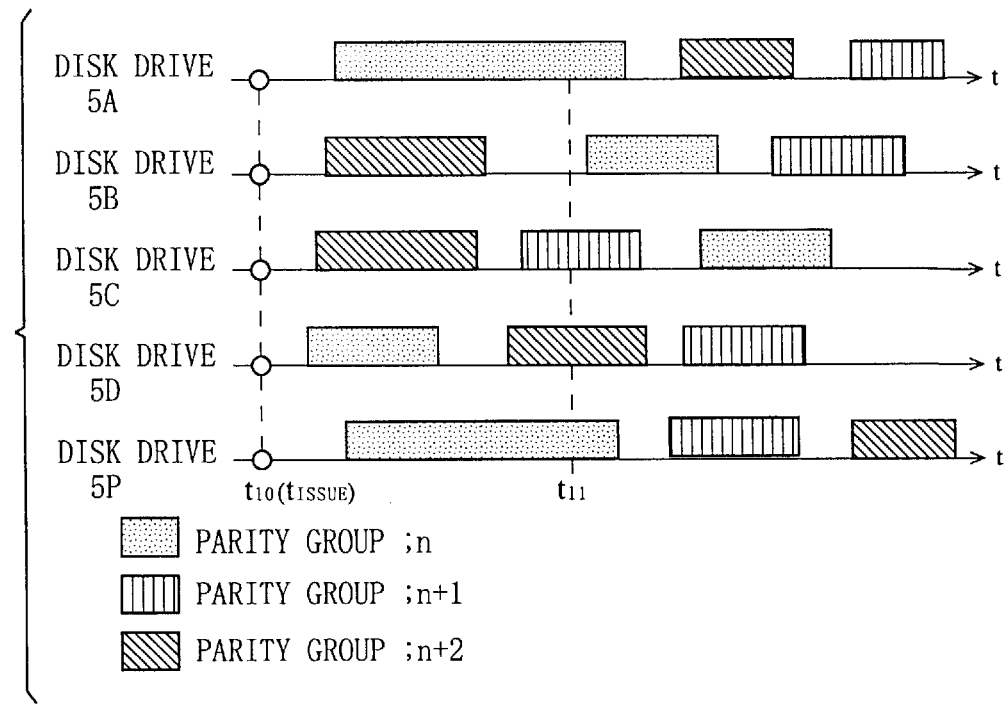

To highlight this distinctive characteristic of the present disk array device, described next is read processing by a disk array device which does not execute the flow chart of FIG. 8b, with reference to FIG. 10b. FIG. 10b is a schematic diagram showing read timing of the parity groups n to (n+2) in a time axis in the disk array device which does not execute the flow chart of FIG. 8b. The conditions in FIG. 10b are the same as those in FIG. 10a except that the disk array device does not execute the flow chart of FIG. 8b. The host device requests reading of the parity groups n, (n+1), and then (n+2) sequentially in this order under the same conditions as described above.

The controller 7 issues a set of second read requests for reading the parity group n at a time $t_{10}$ (refer to FIG. 10b). Similarly, the controller 7 issues second read requests for reading the parity group (n+1), and then (n+2) after the time $t_{10}$.

The disk drives 5A to 5D and 5P determine their reading order independently. Assume herein that the reading orders are the same as described for the disk array device of the second embodiment. According to these reading orders, as shown in FIG. 10b, the disk drives 5A to 5D and 5P start reading the data blocks and redundant data of the parity groups n, (n+1) and (n+2).

As described above, the disk array device does not execute the processing shown in FIG. 8b. Therefore, the disk drives 5A and 5P do not terminate the read operation even though they take longer time than the limit time $t_{LIMIT}$ to read the parity group n. Furthermore, it is highly possible that the data blocks of the parity group n stored in the disk drives 5A and 5P may have a failure. Therefore, the disk array device cannot assemble and transmit the data of the parity group n. Here, note that, despite that, the disk drives 5B and 5C start unnecessary reading of the data block of the parity group n.

As evident from FIGS. 10a and 10b, with execution of the processing of FIG. 8b, upon realizing that data being read cannot be transmitted to the host device, the disk array device of the second embodiment terminates all reading of the parity group. Therefore, in the case of FIG. 10a, the disk drives 5A, 5B, 5C, and 5P can start reading the next parity group earlier than the case of FIG. 10b, thereby terminating unnecessary reading and quickly starting the next reading. Further, the disk drives 5B and 5C skip reading of the parity group data of which cannot be transmitted to the host device, and start reading of the next parity group. As a result, the disk array device can read a larger volume of data per unit of time, and thus continuously transmit data to the host device, allowing video data being replayed at the host device to have a lower tendency to be interrupted.

(Third Embodiment)

In the previous embodiments, the controller 7 immediately issues a recovery instruction to the parity calculator 6 after three data blocks and the redundant data are stored in the buffer memories. However, the calculation of parity requires a large amount of arithmetic operation, and the larger the number of operations of calculation of parity, the more the disk array device is loaded. In a disk array device of a third embodiment, the controller 7 controls timing of issuing a recovery instruction to reduce the number of operation of calculation of parity.

Figure 11:
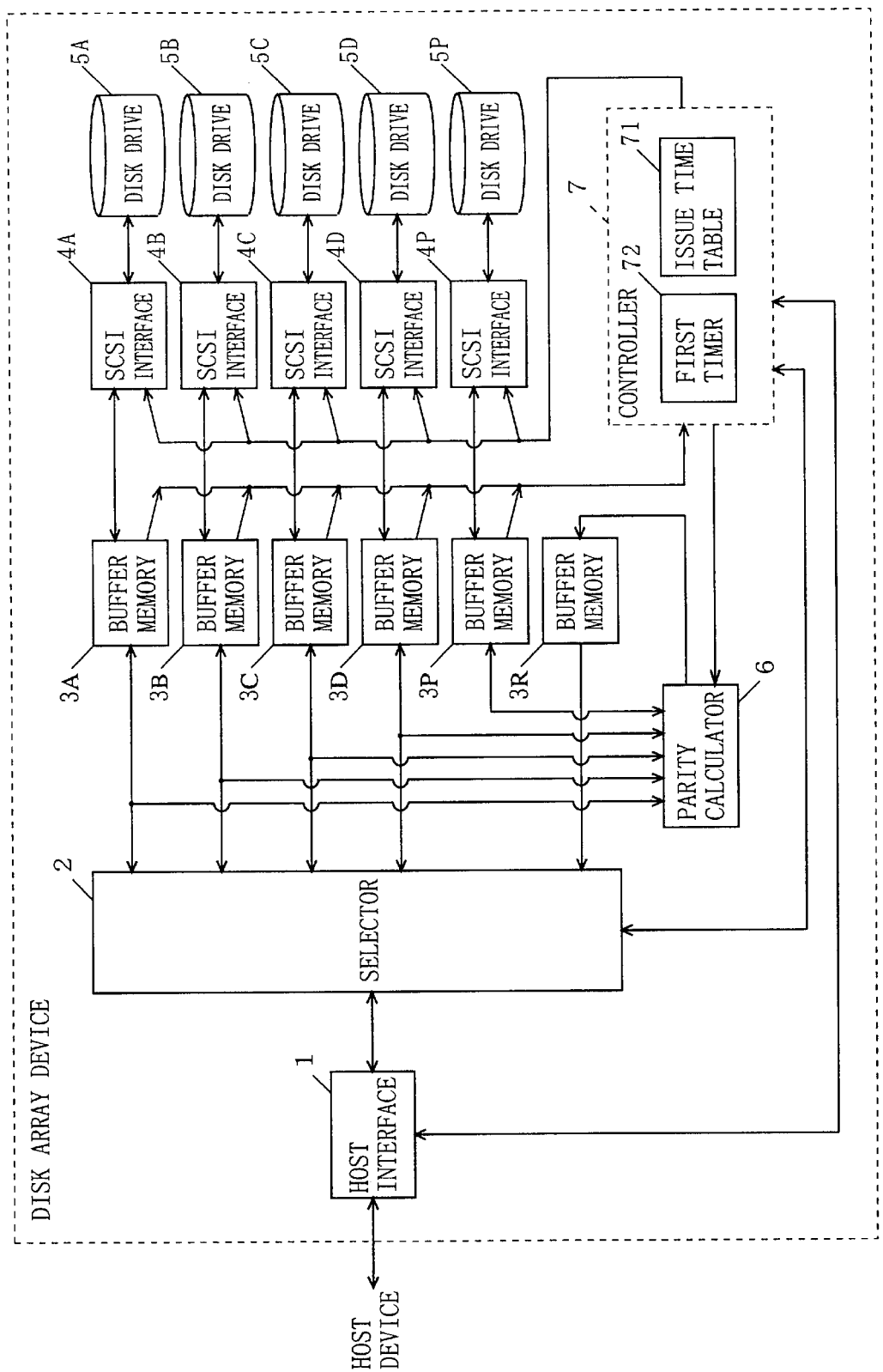
FIG. 11 is a block diagram showing the structure of a disk array device according to a third embodiment of the present invention.

FIG. 11 is a block diagram showing the disk array device according to the third embodiment. The disk array device of FIG. 11 is different from that of FIG. 1 in that the controller 7 includes a first timer 72. Since other structures are the same, the components in FIG. 11 are provided with the same reference numerals as those of FIG. 1 and their description is simplified herein.

The disk array device performs write operations as described in the first embodiment whenever transmission data arrives from the host device. To read data from the disk array device, the host device transmits a first read request specifying storage locations of the data to the disk array device.

Figure 12A:
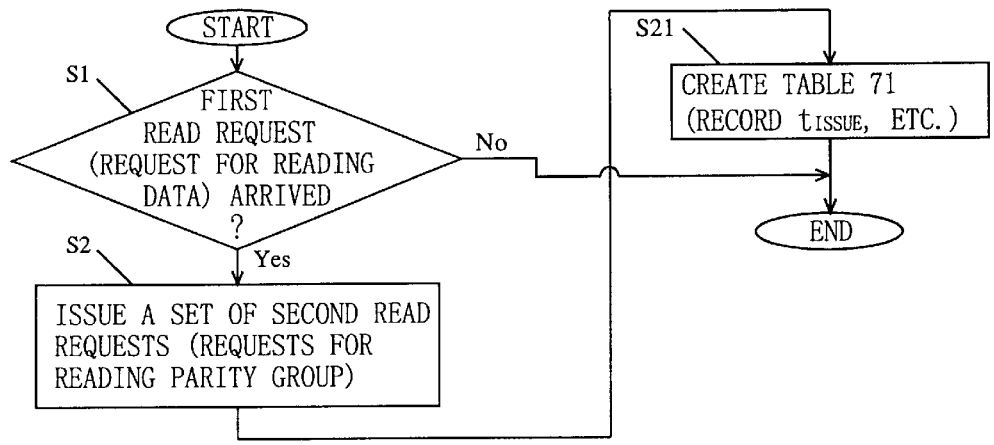
FIGS. 12a and 12b are flow charts showing the procedure of the controller 7 shown in FIG. 11.

In response to the first read request, the disk array device starts a read operation that is distinctive of the third embodiment, which is now described in detail with reference to flow charts of FIGS. 12a and 12b. Note that since the flow chart of FIG. 12a is equal to that of FIG. 8a, the steps in FIG. 12a are provided with the same step numbers as those in FIG. 8a. Through the execution of the flow chart of FIG. 12a, the controller 7 issues a set of second read requests (requests for reading a parity group) (steps S1 and S2), and further creates the issue time table 71 for the issued second read requests (step S21).

The second read requests issued by the processing of FIG. 12a are transmitted to the disk drives 5A to 5D and 5P as described in the first embodiment. In response to the second read request, each disk drive reads the data block or redundant data. The read data block and redundant data are stored through the SCSI interfaces 4A to 4D and 4P in the buffer memories 3A to 3D and 3P. After storing, each buffer memory transmits a first READ-COMPLETED to the controller 7 notifying that reading has been completed.

If four first READ-COMPLETED's have arrived (step S11 of FIG. 12b) by a time $t_{4th}$, the controller 7 detects and stores the time $t_{4th}$ (step S41). The controller 7 then determines whether reading of the redundant data has been completed or not (step S42).

If reading of the redundant data has not yet been completed (that is, if the first READ-COMPLETED's from the buffer memories 3A to 3D have arrived), this reading is not necessary. The controller 7 therefore issues a second read termination command to terminate the unnecessary reading (step S12), and then issues a second READ-COMPLETED (step S16). In response to the second READ-COMPLETED, the selector 2 fetches the data blocks from the buffer memories 3A to 3D to assemble the data to be transmitted to the host device. The selector 2 transmits the assembled data through the host interface 1 to the host device.

In step S42, if the redundant data has been completely read (that is, if the first READ-COMPLETED is received from the buffer memory 3P), the procedure advances to step S43, wherein the controller 7 calculates a timeout value $V_{TO1}$ to which a first timer 72 is to be set. The timeout value $V_{TO1}$ is described in detail below.

Now, assume the following simulation is performed on the disk array device. In this simulation, when second read requests are issued many times to one of the disk drives 5A to 5D and 5P from the controller 7, the corresponding first READ-COMPLETED's arrive at the controller 7. A time t from issuance of the second read request to arrival of the corresponding first READ-COMPLETED is measured in the simulation. The time t can be regarded as the time required for reading in one disk drive. Since the time t measured varies within a certain deviation, a probability distribution curve f(t) can be obtained as shown in FIG. 13a. In FIG. 13a, the horizontal axis indicates the time t, while the vertical axis indicates the probability f(t) that the disk drive has completed reading by the time t.

Therefore, the probability P(t) that the first READ-COMPLETED have arrived by the time t after issuance of the second read request is given by $$P(t) = \int_0^t f(t)dt.$$

Since the present disk array device includes five disk drives, the probability $P_{all}(t)$ that five first READ-COMPLETED's have arrived by the time t after issuance of the second read requests of one parity group is given by $$P_{all}(t) = \{P(t)\}^5.$$

Here, assuming that the time t when the probability $P_{all}$ becomes predetermined probability $P_0$ is $t_0$, $P_{all}(t_0) = P_0$. Appropriate values are selected for $t_0$ and $P_0$ according to the design specification of the disk array device so that the disk array device can ensure successive data transmission to the host device. In order words, $t_0$ and $P_0$ are values that can ensure that video being replayed at the host device is not interrupted.

As evident from above, in the present disk array device, it is expected with the probability $P_0$ that reading of one parity group has been completed by the time $t_0$ after issuance of the second read request. This time $t_0$ is hereinafter referred to as a completion-expectation value $t_0$. The controller 7 previously stores the completion-expectation value $t_0$ for calculating the timeout value $V_{TO1}$.

When four first READ-COMPLETED's have arrived at the controller 7, the progress of reading in the disk drives 5A to 5D and 5P is as shown in FIG. 13b, for example. In FIG. 13b, the second read requests issued at the time $t_{ISSUE}$ cause each disk drive to start reading. The disk drives 5A, 5B, 5D, and 5P have completed reading by a time $t_{4th}$.

Here, since reading of one parity group is expected to have been completed by the completion-expectation value $t_0$ with reference to the time $t_{ISSUE}$ with the probability $P_0$, reading of the disk drive 5C is expected to have been completed by a time $(t_{ISSUE}+t_0)$, as shown in FIGS. 13a and 13b, with the probability $P_0$.

Therefore, the controller 7, in step S43, first fetches the time $t_{4th}$ stored in step S41, the time $t_{ISSUE}$ in the issue time table 71, and the previously-stored completion-expectation value $t_0$. Then, $\{t_0-(t_{4th}-t_{ISSUE})\}$ is calculated, resulting in a time margin $t_{MARGIN}$ as shown in a hollow double-headed arrow in FIG. 13b. The controller 7 sets the first timer 72 to the calculated time margin $t_{MARGIN}$ as the timeout value $V_{TO1}$ (step S43 in FIG. 12b). This activates the first timer 72 to start a countdown.

The controller 7 then determines whether the remaining first READ-COMPLETED arrives (step S44). In other words, the controller 7 determines whether the remaining reading of the data block has been completed and four data blocks have been stored in the buffer memories.

Figure 14A:
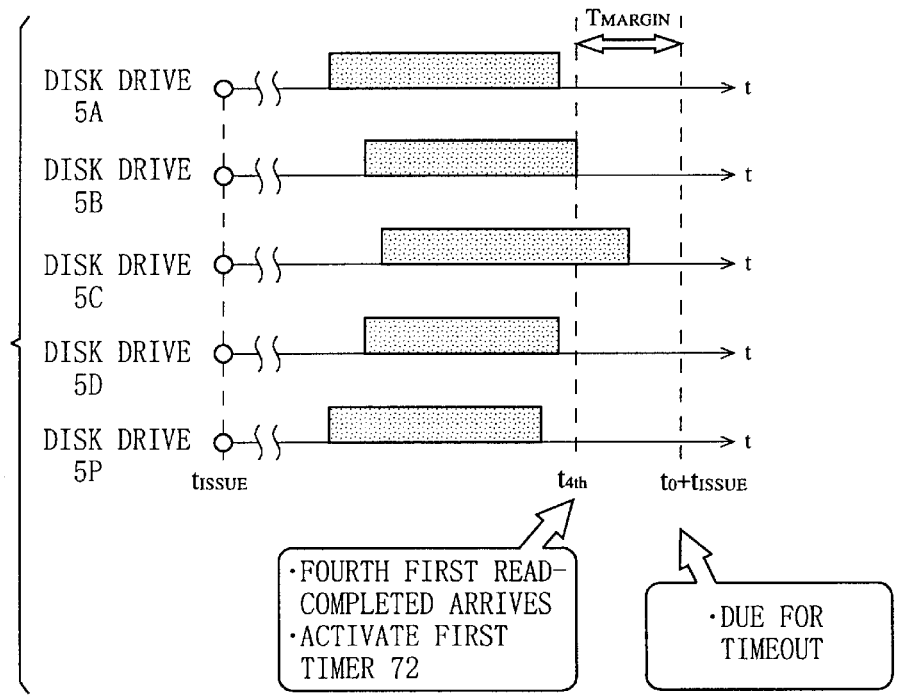
FIG. 14a is a diagram illustrating a case in which four data blocks are stored in step S44 of FIG. 12.

With reference to FIG. 14a, if four data blocks have been stored, all data blocks of the disk drives 5A to 5D have been stored in the buffer memories before the time margin $T_{MARGIN}$ calculated based on the time $t_{4th}$ is consumed (that is, by the time ($t_{ISSUE}+t_0$)). Further, reading of the redundant data has also been completed. Therefore, the controller 7 is not required to issue a read termination command, and the procedure directly advances from step S44 to step S16. In step S16, the controller 7 issues a second READ-COMPLETED. In response to the second READ-COMPLETED, the selector 2 fetches the data blocks from the buffer memories 3A to 3D to assemble the data to be transmitted to the host device. The selector then transmits the assembled data through the host interface 1 to the host device. The first timer 72 stops the countdown, as required.

On the other hand, in step S44, when the remaining first READ-COMPLETED has not yet arrived, the controller 7 determines whether the first timer 72 is timed-out (step S45). In other words, the controller 7 determines whether the time margin $T_{MARGIN}$ has elapsed from the time $t_{4th}$.

When the first timer 72 is not timed-out, the procedure returns to step S44, wherein the controller 7 determines again whether the remaining first READ-COMPLETED arrives.

Figure 14B:
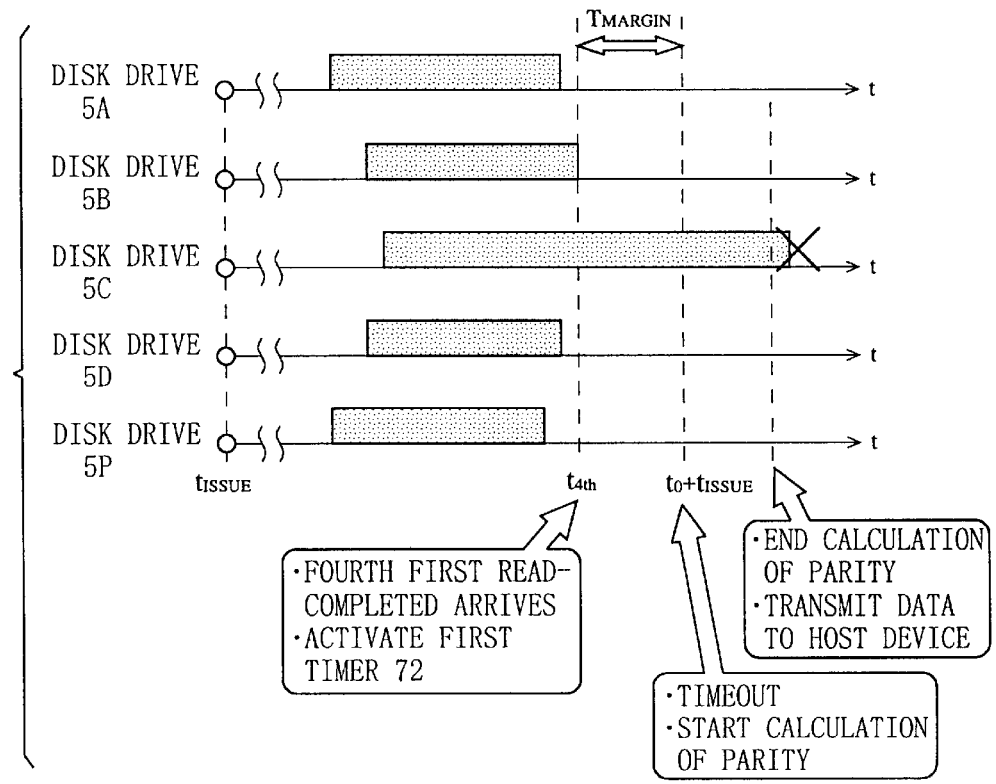
FIG. 14b is a diagram illustrating a case in which a first timer 72 is timed-out in step S45 of FIG. 12.

On the other hand when the first timer 72 is timed-out the controller 7 recognizes that reading of the remaining one data block has not been completed after a lapse of the time margin $t_{MARGIN}$ from the time $t_{4th}$. In FIG. 14b, the disk drive 5C is still reading the data block. After a lapse of the time margin $t_{MARGIN}$, the controller 7 determines that the data cannot be continuously transmitted if processing of the remaining first read request is waited more. Then, the procedure advances from step S45 to step S14 of FIG. 12b, wherein the controller 7 issues a recovery instruction to the parity calculator 6 immediately after the time ($t_{ISSUE}+t_0$) to request execution of calculation of parity. After ending calculation of parity, the parity calculator 6 issues a RECOVERY-COMPLETED indicating that recovery has been completed, and transmits the same to the controller 7. On receiving the RECOVERY-COMPLETED (step S15), the controller 7 determines that four data blocks have been stored in the buffer memories and that the data requested from the host device can be transmitted. The controller 7 then issues a read termination command to terminate unnecessary reading in the remaining disk drive (step S12). The controller 7 then issues a second READ-COMPLETED (step S16). In response to the second READ-COMPLETED, the selector 2 fetches the data blocks from the buffer memories 3A to 3D to assemble the data to be transmitted to the host device. The selector 2 transmits the assembled data to through the host interface 1 to the host device.

As described above, the disk array device of the third embodiment is different from that of the first embodiment in that an unread data block is not recovered immediately after four first READ-COMPLETED's arrive. In other words, the disk array device of the present embodiment waits until reading of the remaining data block has been completed within the time margin $T_{MARGIN}$ after four first READ-COMPLETED's arrive. A recovery instruction is issued to the parity calculator 6 only after a lapse of the time margin $T_{MARGIN}$. When the remaining data block is read within the time margin $t_{MARGIN}$, four data blocks are stored in the buffer memories which allows the disk array device to transmit data to the host device without operating calculation of parity. Note that the time margin $T_{MARGIN}$ is calculated, as described above with reference to FIG. 13a, based on the value $t_0$ which ensures that video being replayed at the host device is not interrupted. Furthermore, the time margin $T_{MARGIN}$ indicates a time period within which reading of the remaining data block is expected to have been completed. Therefore, in most cases, four data blocks are stored in the buffer memories 3A to 3D within the time margin $T_{MARGIN}$. The present disk array seldom requires calculation of parity which requires a large amount of arithmetic operation, thereby minimizing the number of operations of calculation of parity.

Moreover, since a probability that the redundant data has not yet been read by the time when the fourth first READ-COMPLETED arrives is 1/5, the present disk array device can quickly transmit data to the host device without operating calculation of parity with the 1/5 probability.

(Fourth Embodiment)

The forgoing embodiments issue a recovery instruction without consideration of the present state of the parity calculator 6, Therefore, the controller 7 may issue the next recovery instruction to the parity calculator 6 while the parity calculator 6 is still operating calculation of parity. The parity calculator 6, however, can process only one recovery instruction within a time period, and cannot receive another one. In a disk array device according to a fourth embodiment of the present invention, the controller 7 controls timing of issuing recovery instructions so as not to issue a new recovery instruction during operation of calculation of parity.

Figure 15:
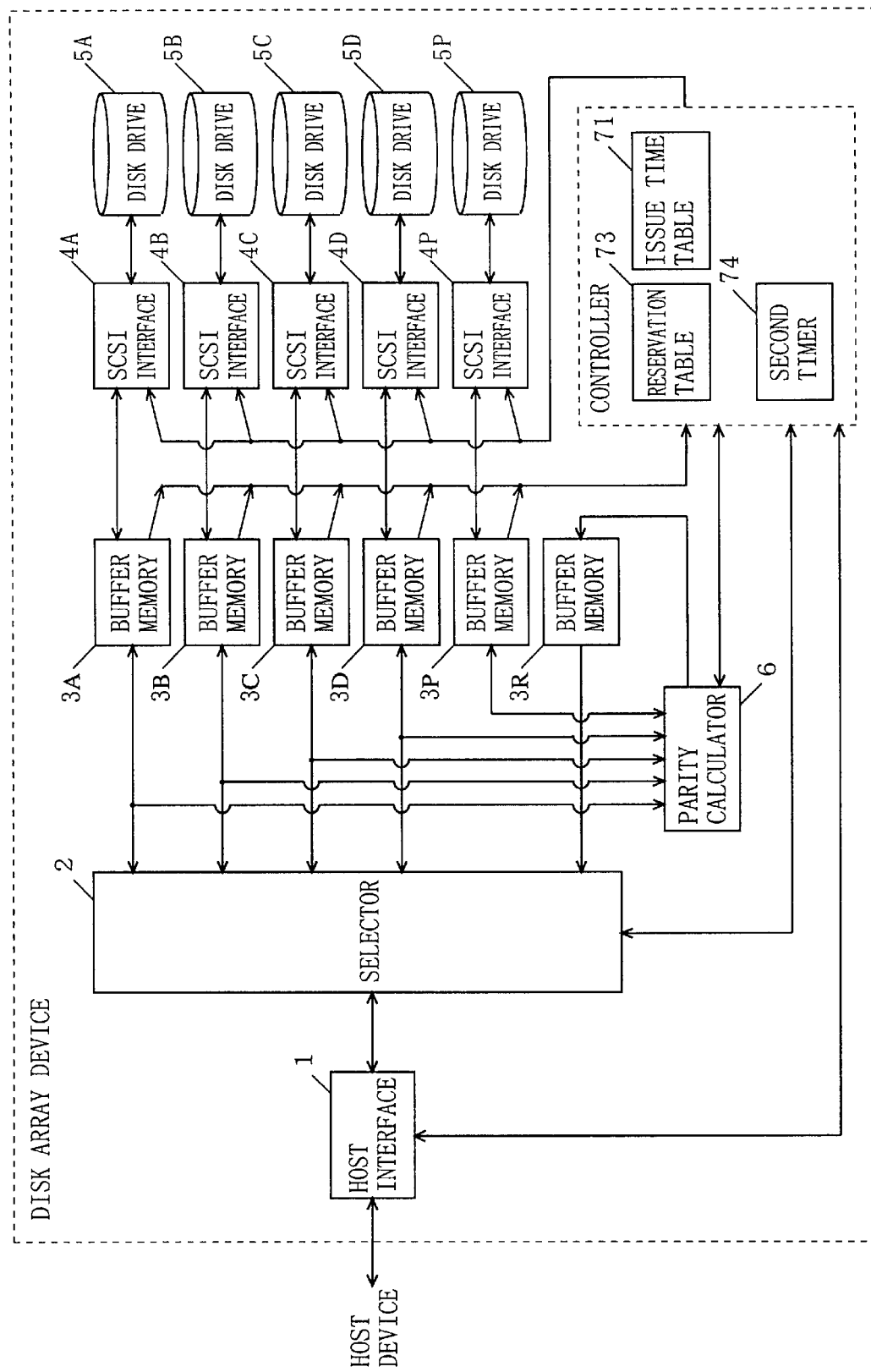
FIG. 15 is a block diagram showing the structure of a disk array device according to a fourth embodiment of the present invention.

FIG. 15 is a block diagram showing the disk array device according to the fourth embodiment of the present invention. The disk array device of FIG. 15 is different from that of FIG. 1 in that the controller 7 further includes a reservation table 73 and a second timer 74. Since other structures are the same, the components in FIG. 15 are provided with the same reference numerals as those in FIG. 1 and their description is simplified herein.

The disk array device of the fourth embodiment performs a write operation as described in the first embodiment whenever transmission data from the host device arrives. To read data from the disk array device, the host device transmits a first read request specifying storage locations of the data to the disk array device.

In response to the first read request, the disk array device starts a read operation that is distinctive of the present embodiment which is now described in detail with reference to the drawings.

As shown in FIG. 12a, the first read request causes the controller 7 to issue a set of second read requests (request for reading a parity group) (steps S1 and S2). Further, the issue time table 71 of FIG. 9 is created for the issued second read requests (step S21).

The second read requests issued by the processing shown in FIG. 12a is transmitted to the disk drives 5A to 5D and 5P, as described in the first embodiment. In response to the second read request, each disk drive reads the data block or redundant data. The read data blocks are stored through the SCSI interfaces 4A to 4D in the buffer memories 3A to 3D, and the read redundant data is stored through the SCSI interface 4P in the buffer memory 3P. After storing the data block or redundant data, each buffer memory transmits a first READ-COMPLETED to the controller 7 to notify that reading of the corresponding disk drive is completed.

Figure 16:
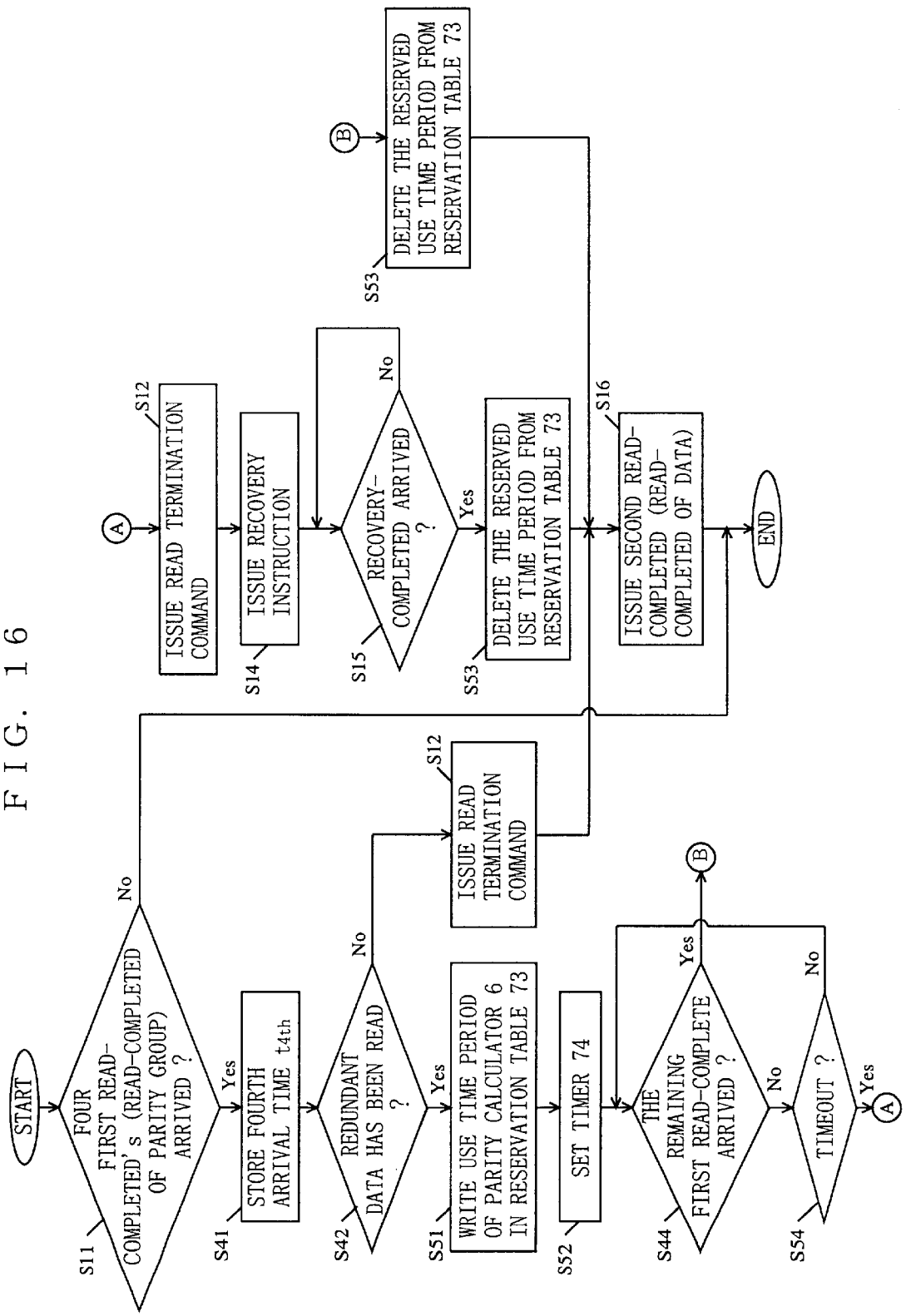
FIG. 16 is a flow chart to be executed by the controller 7 shown in FIG. 15 at reading processing.

Further, the controller 7 regularly performs the procedure shown in a flow chart of FIG. 16. Since the flow chart of FIG. 16 partially includes the same steps as that of FIG. 12b, the same steps in FIG. 16 are provided with the same step numbers as those in FIG. 12b, and their descriptions are omitted herein.

When four first READ-COMPLETED's arrive (step S11 of FIG. 16), the controller 7 stores the arrival time $t_{4th}$ in the storage area thereof (step S41). The controller 7 then determines whether the redundant data has been read or not (step S42).

If the redundant data has not yet been read, as described in the fourth embodiment, the controller 7 terminates unnecessary reading in the disk drive 5P (step S12), and then issues a second READ-COMPLETED (step S16). As a result, the data assembled by the selector 2 is transmitted through the host interface 1 to the host device.

Figure 17:
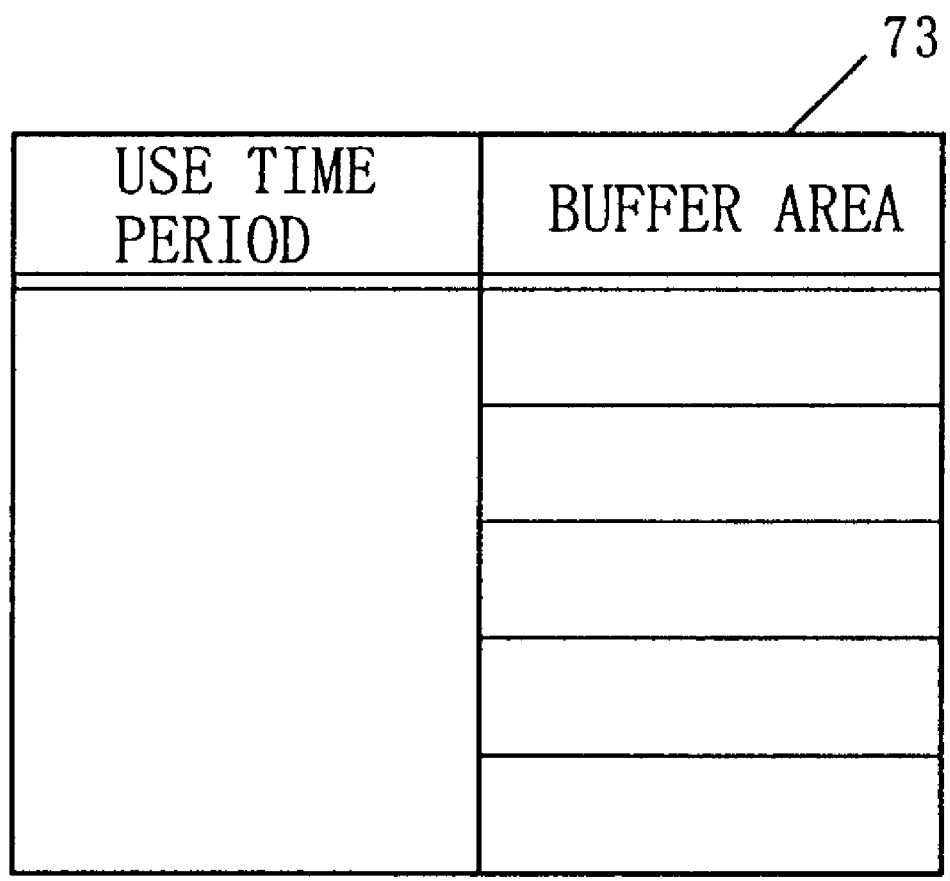
FIG. 17 is a reservation table 73 to be created by the controller 7 shown in FIG. 15 in a recording area therein.

Further, if the redundant data has already been read in step S42, the parity calculator 6 may operate calculation of parity. For this calculation of parity, the controller 7 writes necessary information in the reservation table 73 (step S51). As shown in FIG. 17, a use time period and buffer memory areas are written as the necessary information in the reservation table 73. The use time period indicates that the controller 7 uses the parity calculator 6 during that period. The buffer memory areas indicate the storage locations of the data blocks and redundant data to be used by the parity calculator 6, The controller 7 registers the information on the buffer memories included in the first READ-COMPLETED's obtained in step S11 in the reservation table 73 (step S51).

In step S51, the start time and the end time of calculation of parity are registered in the reservation table 73. The controller 7 then calculates a timeout value $V_{TO2}$ from a start time $t_S$ of calculation of parity and the fourth arrival time (present time) $t_{4th}$ by $t_{4th}-t_S$. The controller 7 then sets the timer 74 to the calculated timeout value $V_{TO2}$ (step S52). This activates the timer 74 to start countdown. When the timer 74 is timed-out, the parity calculator 6 completes calculation of parity, capable of receiving the next calculation of parity. That is, at that timeout, the controller 7 can issue another recovery instruction.

The controller 7 next determines whether the remaining first READ-COMPLETED has arrived or not (step S44).

If the remaining first READ-COMPLETED has arrived, all four data blocks have been stored in the buffer memories before the timer 74 is timed-out. Therefore, calculation of parity is not required. The time period for using the parity calculator 6 is, however, written in the reservation table 73. The controller 7 therefore deletes the information on the use time period and the buffer memories registered in step S51 (step S53).

Further, since reading of the redundant data has also been completed, the controller 7 is not required to issue a read termination command. The controller 7 therefore issues a second READ-COMPLETED (step S16). As a result, the data assembled by the selector 2 is transmitted through the host interface 1 to the host device. The timer 74 terminates countdown as required.

If the remaining first READ-COMPLETED has not yet arrived in step S44, the controller 7 determines whether the timer 74 is timed-out or not (step S54). In other words, the controller 7 determines whether the timeout value $V_{TO2}$ has elapsed from the time $t_{4th}$ or not.

When the timer 74 is not timed-out, the procedure returns back to step S44, wherein the controller 7 determines again whether the remaining first READ-COMPLETED has arrived or not.

On the other hand, when the timer 74 is timed-out, the controller 7 realizes that reading of the remaining data block has not been completed before the timeout value $V_{TO2}$ has elapsed from the time $t_{4th}$ and that the parity calculator 6 is now available. The procedure advances from step S54 to step S12, wherein the controller 7 terminates unnecessary reading in the remaining disk drive. Further, the controller 7 issues a recovery instruction to request the parity calculator 6 to operate calculation of parity (step S14). After calculation of parity ends, the parity calculator 6 issues a RECOVERY-COMPLETED indicative of ending of calculation of parity, and transmits the same to the controller 7. When receiving the RECOVERY-COMPLETED (step S15), the controller 7 realizes that the information on the use time period and the buffer memory areas registered in step S51 is no longer necessary. The controller 7 therefore deletes the unnecessary information from the reservation table 73 (step S53).

Moreover, upon receiving the RECOVERY-COMPLETED, the controller 7 determines that four data blocks have been stored in the buffer memories and that the data requested from the host device can be now transmitted. The controller 7 then issues a second READ-COMPLETED (step S16). As a result, the data assembled by the selector 2 is transmitted through the host interface 1 to the host device.

Figure 18:
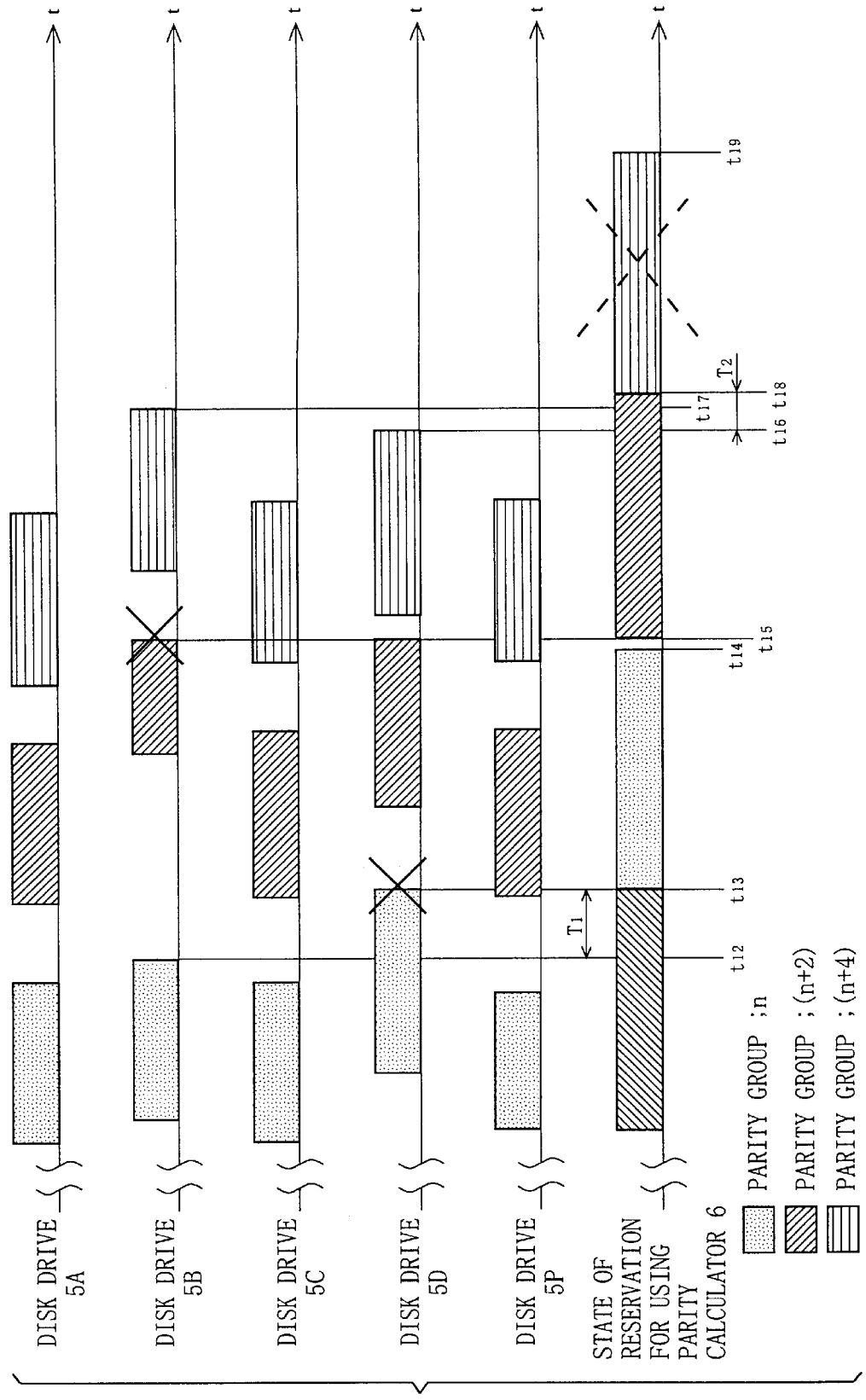
FIG. 18 is a diagram illustrating a specific example of reading processing in the disk array device shown in FIG. 15.

The general read operation of the present disk array device has been described in the forgoing. Now described is a specific example of the read operation of the present disk array device with reference to FIGS. 16 and 18. Assume that the host device requests data reading in the order as the parity groups n, (n+2), and then (n+4) of FIG. 3b. FIG. 18 is a schematic diagram showing timing of reading the parity groups n, (n+2), and (n+4), and a reservation state of the parity calculator 6 in a time axis in the present disk array device.

The second read requests of the parity groups n, (n+2), and (n+4) are sent to each of the disk drives 5A to 5D and 5P. For simplifying description, assume that each disk drive reads the parity group in the order in which the second read requests arrive. Also assume that the reservation table 73 includes information that currently-operated calculation of parity will end at a time $t_{12}$ (refer to a lower-leftward hatched part).

Under the above conditions, each disk drive first executes reading of the parity group n. In FIG. 18, the disk drive 5B completes reading at the time $t_{12}$, and therefore the fourth first READ-COMPLETED arrives at the controller 7 at the time $t_{12}$ (step S11 of FIG. 16). The controller 7 stores the time $t_{12}$ as the arrival time $t_{4th}$ (step S41). Further, since the disk drive 5P has already completed reading of the redundant data, the controller 7 executes step S51 to register a time period $t_{13}$ to $t_{14}$ as the use time period in the reservation table 73 shown in FIG. 17. The controller 7 also registers $3A_i$, $3B_i$, $3C_i$, and $3P_i$ as the buffer memory areas (step S51). The controller 7 calculates a timeout value $V_{TO2}$ ($T_1=t_{13}-t_{12}$), and sets the second timer 74 to the timeout value $V_{TO2}$ (step S52).

At the time $t_{12}$, the disk drive 5D is still reading the data block. However, assume that this reading will not have been completed by the time $t_{13}$. In this case, when the timer 74 is timed-out, the controller 7 terminates the reading of the disk drive 5D, and issues a recovery instruction to the parity calculator 6 (steps S12 and S14). The parity calculator 6 recovers the data block recorded in the disk drive 5D between the time $t_{13}$ to $t_{14}$. Since a RECOVERY-COMPLETED from the parity calculator 6 arrives at the controller 7 at the time $t_{14}$ (step S15), the controller 7 deletes the information on the use time period $t_{13}$ to $t_{14}$ and the buffer memory areas $3A_i$, $3B_i$, $3C_i$, and $3P_i$ from the reservation table 73 (step S53) The controller 7 then issues a second READ-COMPLETED (step S16).

After completing reading of the parity group n, each disk drive starts reading of the parity group (n+2). In FIG. 18, since a first READ-COMPLETED from the disk drive 5D arrives at the controller 7 at a time $t_{15}$, the controller 7 stores the time $t_{15}$ as the arrive time $t_{4th}$ (steps S11 and S41). Furthermore, since the redundant data has already been read by the time $t_{15}$, the controller 7 writes the use time period $t_{15}$ to $t_{18}$ and the identifiers of the buffer memory areas $3A_i$, $3C_i$, $3D_i$, and $3P_i$ (step S51). Note that the time $t_{15}$ is after the time $t_{14}$, and the parity calculator 6 is not performing calculation of parity at that time $t_{15}$. The timeout value $V_{TO2}$ is therefore "0" (step S52). The controller 7 immediately terminates currently-executing reading in the disk drive 5B, and then issues a recovery instruction to the parity calculator 6 (steps S12 and S14). The following operation is evident from the above description and therefore its description is omitted herein.

After completing reading of the parity group (n+2), each disk drive starts reading of the parity group (n+4). A first READ-COMPLETED from the disk drive 5D arrives at the controller 7 at a time $t_{16}$ (before the time $t_{18}$). Since the redundant data has already been read by the time $t_{16}$, the controller 7 writes the time period $t_{18}$ to $t_{19}$ as the use time period in the reservation table 73. The controller 7 also writes $3A_i$, $3C_i$, $3D_i$, and $3P_i$ as the identifiers of the buffer memory areas. Further, the controller 7 calculates a timeout value $V_{TO2}$ ($T_2 = t_{18} - t16$), and sets the timeout value $V_{TO2}$ in the second timer 74 (step S52).

Note that, however, a first READ-COMPLETED from the disk drive 5B arrives at a time $t_{17}$ (before the time $t_{18}$) at the controller 7. In other words, the first READ-COMPLETED arrives at the controller 7 before the timer 74 is timed-out. Therefore, the controller 7 does not issue a recovery instruction, and the parity calculator 7 does not operate calculation of parity which was supposed to be executed between the time $t_{18}$ and $t_{16}$ (refer to x by dotted lines). The controller 7 then deletes the use time period $t_{18}$ to $t_{19}$ and the identifiers of the buffer memory areas $3A_i$, $3C_i$, $3D_i$, and $3P_i$ from the reservation table 73 (step S53), and issues a second READ-COMPLETED (step S16).

As described above, the disk array device of the fourth embodiment is different from that of the first embodiment in that when four first READ-COMPLETED's arrive, the use time period of the parity calculator 6 is written in the reservation table 73. As the use time period, the time period after the calculation of parity being executed ends is written therein. Since the controller 7 issues a recovery instruction during that time period, the controller 7 does not issue any recovery instruction during calculation of parity, thereby preventing an overload on the disk array device.

Moreover, when the remaining data block arrives by the time the timer 74 is timed-out, the controller 7 does not issue any recovery instruction but issues a second READ-COMPLETED to assemble the data from the four data blocks and transmit the same to the host device. Therefore, the disk array device can minimize the number of operations of calculation of parity which requires a large amount of arithmetic operation.

(Fifth Embodiment)

Figure 19:
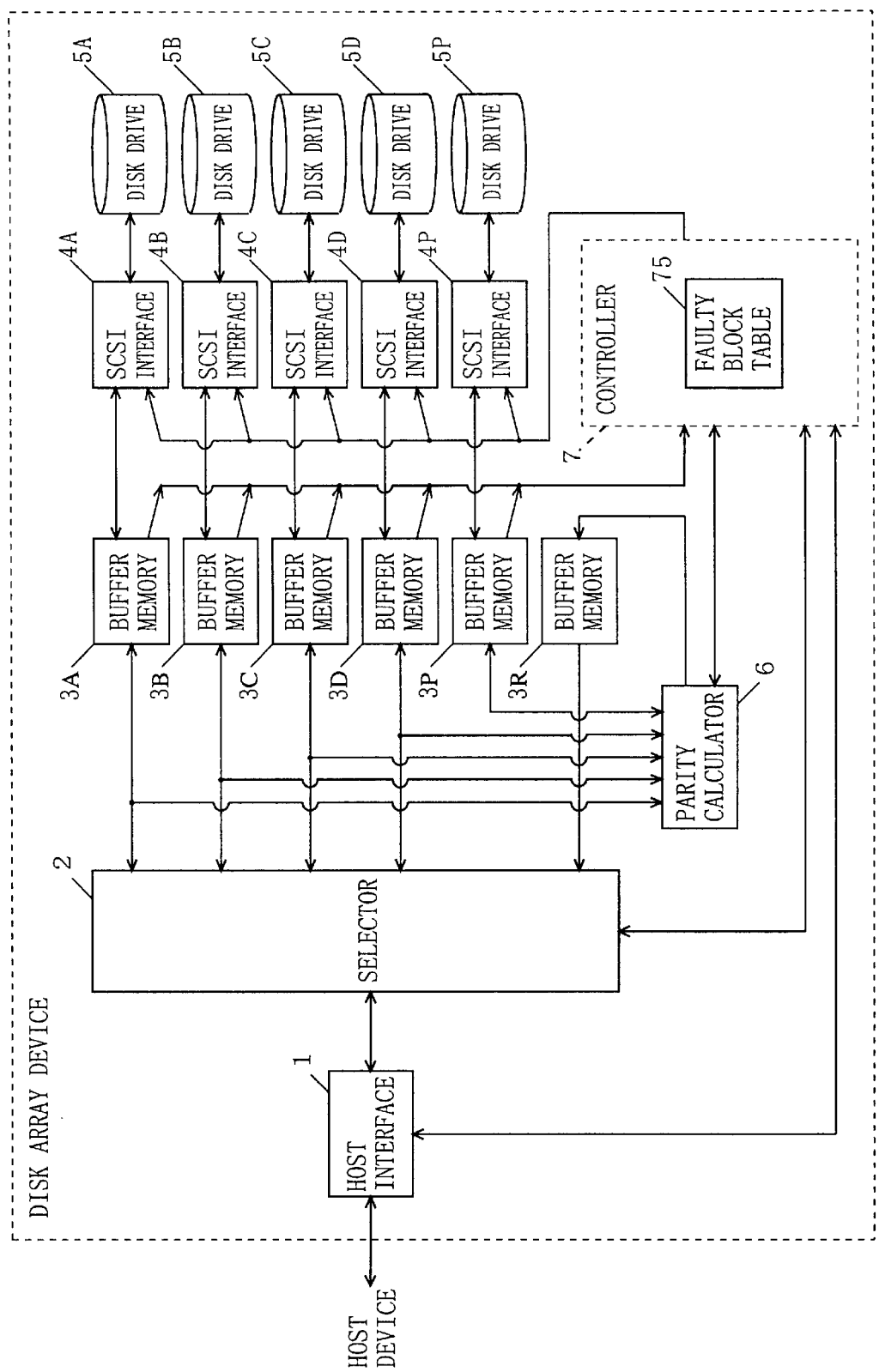
FIG. 19 is a block diagram showing the structure of a disk array device according to a fifth embodiment of the present invention.

FIG. 19 is a block diagram showing a disk array device according to a fifth embodiment of the present invention. The disk array device of FIG. 19 is different from that of FIG. 1 in that the controller 7 further includes a faulty block table 75. Since other structures are the same, the components in FIG. 19 are provided with the same reference numerals as those in FIG. 1 and their description is simplified herein. Note that the present disk array device does not always require the issue time table 71.

Figure 3A:
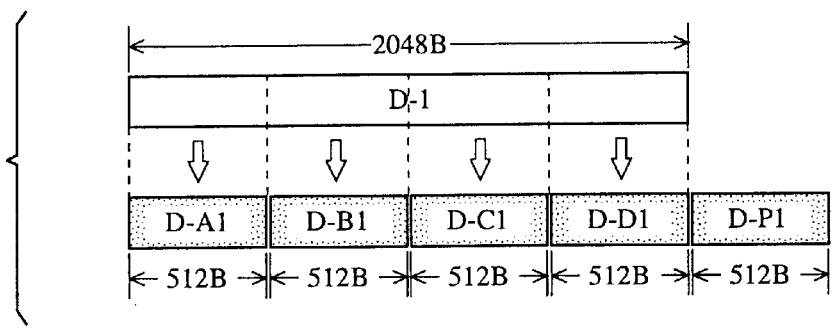
FIGS. 3a and 3b are conceptual diagrams showing parity groups.
Figure 3B:
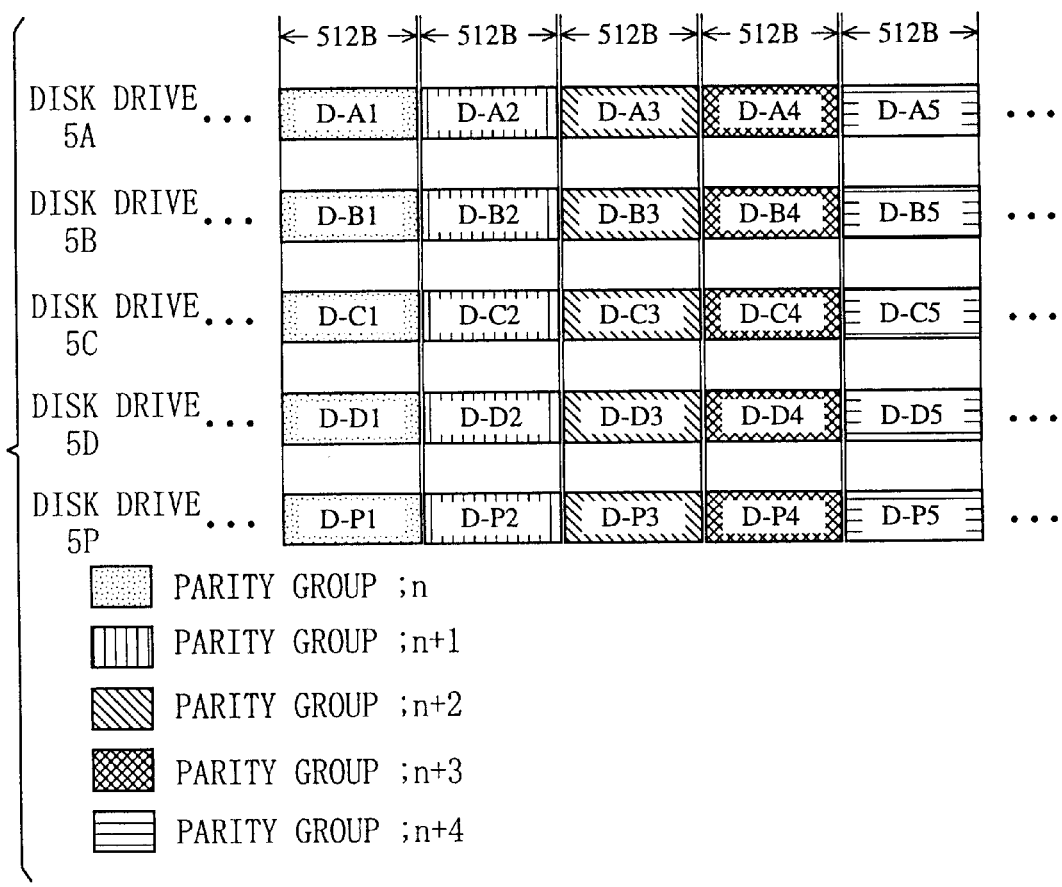
Figure 20:
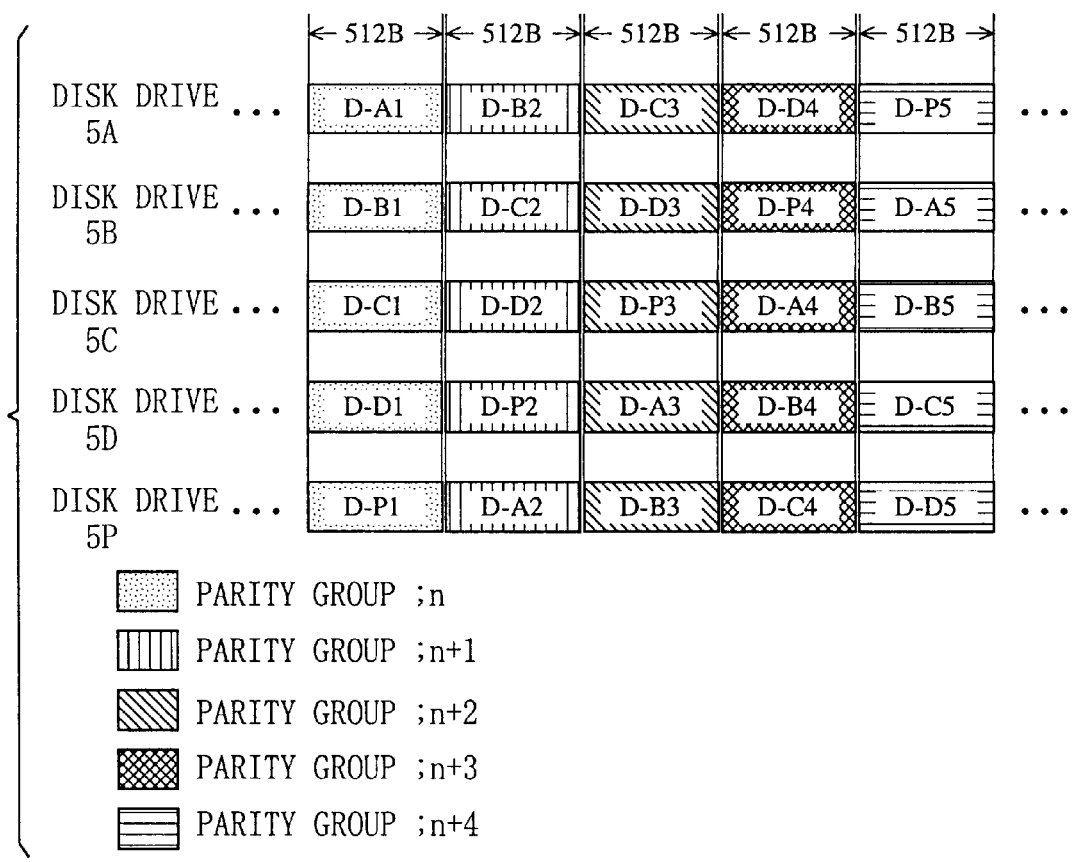
FIG. 20 a conceptual diagram showing data blocks and redundant data distributed across the disk drives 5A to 5D and 5P shown in FIG. 19.

Also note that the data blocks and redundant data are stored in the disk drives 5A to 5D and 5P not in the way as shown in FIGS. 3a and 3b. The disk array device is constructed based on the level architecture. In the level-5 disk array device, the redundant data is not stored in a fixed drive (refer to FIGS. 3a and 3b), but distributed across the disk drives 5A to 5D and 5P as shown in FIG. 20.

To read data from the disk array device, the host device transmits a first read request to the disk array device. The first read request specifies storage locations of the data.

Figure 21:
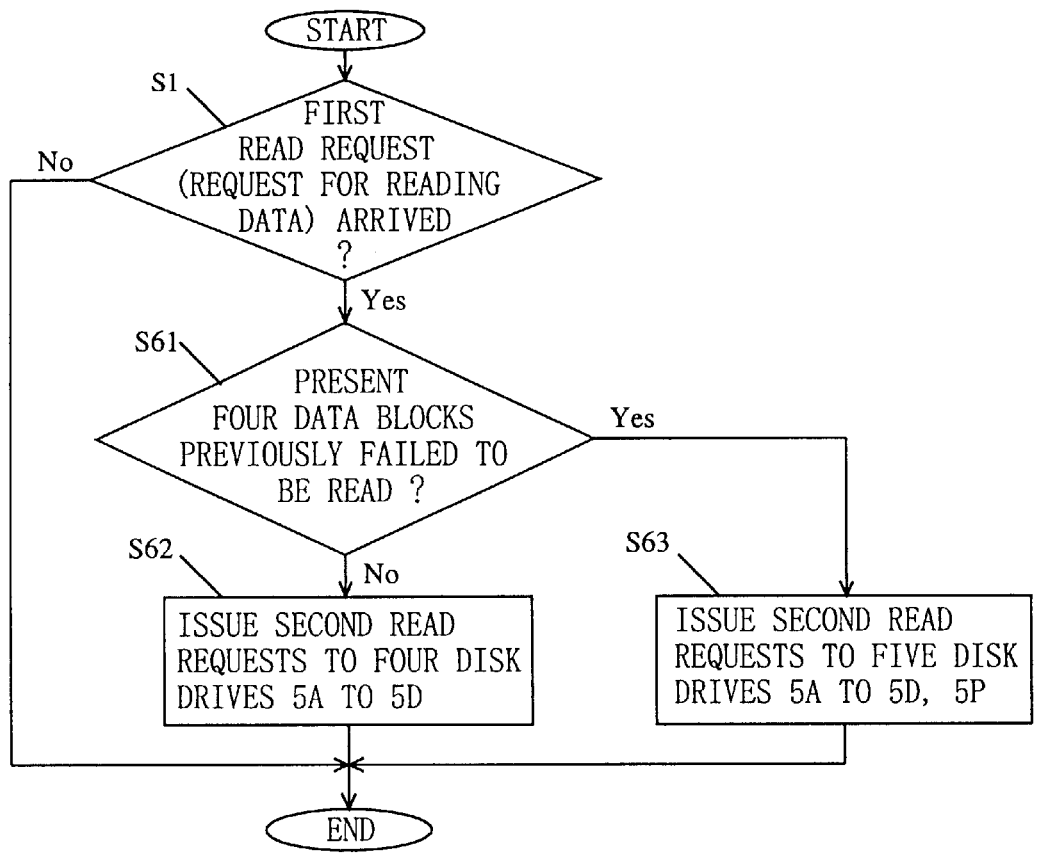
FIG. 21 is a flow chart showing the procedure of the controller 7 shown in FIG. 19.

In response to the first read request, the disk array device starts a read operation that is distinctive of the present embodiment, which is now described in detail with reference to a flow chart in FIG. 21. Since FIG. 21 partially includes the same steps as those in FIG. 2a, the same steps in FIG. 21 are provided with the same step numbers as those in FIG. 2a and their description is simplified herein.

The first read request is sent to the controller 7 through the host interface 1 (step S1). The controller 7 extracts the storage locations of the data from the first read request. According to the storage locations of the data, the controller 7 specifies the storage locations of the parity group (four data blocks and redundant data) generated based on that data. Note that the processing of obtaining the storage locations of the parity group from those of the data is known art, and is defined according to the RAID architecture.

Figure 22:
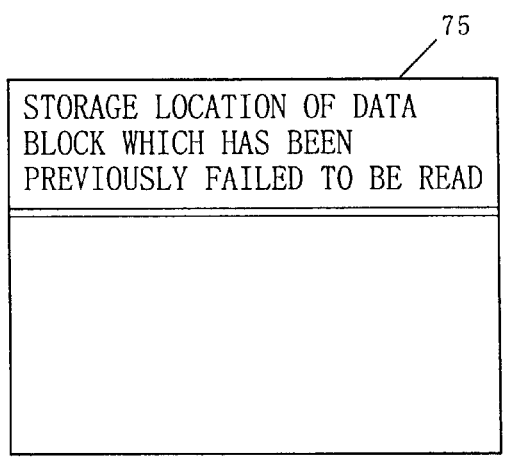
FIG. 22 is a diagram showing a faulty block table 75 to be created by the controller 7 shown in FIG. 19 in a recording area therein.

The controller 7 then determines whether any four of the disk drives 5A to 5D and 5P have previously failed to read four data blocks to be read this time (step S61). For determination of step S61, the faulty block table 75 is referred to. The storage locations of the data blocks failed to be read are listed in the faulty block table 75 as shown in FIG. 22. Alternatively, the storage locations of the data blocks which have been retried to be read or those which have been successfully read but with more than a predetermined time period required may be listed in the faulty block table 75.

If the four disk drives have not failed to read the four data blocks, the controller 7 determines that there is a low possibility of failing to read the four data blocks this time, and issues a set of second read requests to read the parity group (step S62). In step S62, note that the second read requests are issued only to the four disk drives in which the data blocks are recorded, but not to the remaining disk drive in which the redundant data is recorded.

If the four disk drives have failed to read the four data blocks, the controller 7 determines that there is a high possibility of failing to read the four data blocks also this time, and issues a set of second read requests to read the parity group (step S63). In step S63, note that the second read requests are issued to the four disk drives in which the data blocks are recorded and the remaining disk drive in which the redundant data is recorded.

When first READ-COMPLETE D's from the disk drives 5A to 5D and 5P arrive, the controller 7 performs an operation as shown in FIG. 2b. When any data block is failed to be read during this operation, the storage location of that data block is added to the faulty block table 75.

Figure 23A:
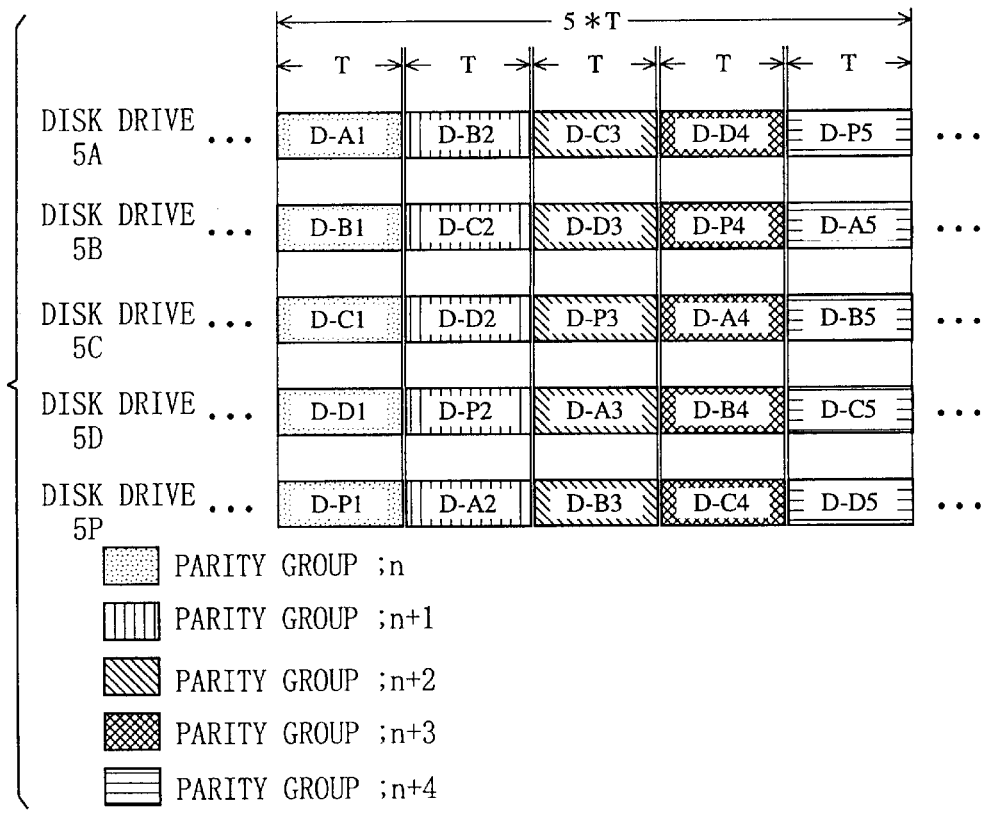
FIGS. 23a and 23b are diagrams illustrating one technical effect of the fifth embodiment.
Figure 23B:
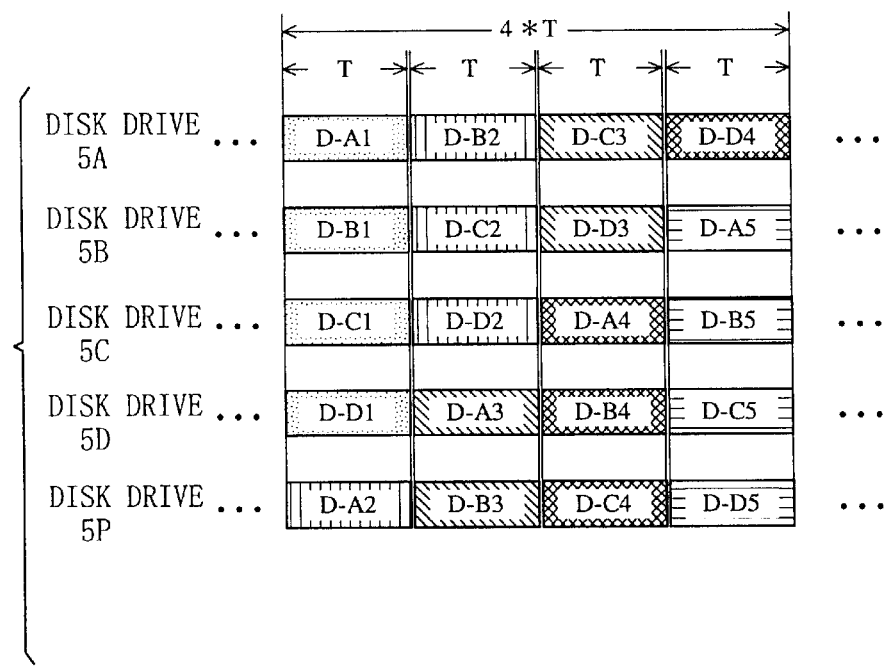

As evident from the above, in the fifth embodiment, the number of second read requests to be issued varies depending on the determination result in step S61. Such second read requests bring technical effects as shown in FIGS. 23a and 23b. FIG. 23a shows a case in which, as described in the previous embodiments, a set of five second read requests are always issued, while FIG. 23b shows a case in which a set of four second read requests are issued for clarification of the technical effects of the present embodiment.

In FIG. 23a, the redundant data is read every time. Therefore, assuming a time required for reading one data block (or redundant data) is T, 5×T is required for reading the parity groups n to (n+4). In FIG. 23b, however, the redundant data is not read. Therefore, while four disk drives are reading one parity group, the remaining disk drive can execute reading of another parity group. The present disk array device thus may read the parity groups n to (n+4) in a shorter period of time than the time period 5×T. FIG. 23b shows the fastest case, in which the disk array device reads these parity groups in a time period 4×T.

As described above, in the present disk array device, the redundant data is read only when the data blocks which have been failed to be read are to be read this time. Therefore, as described with reference to FIGS. 23a and 23b, the present disk array device can read a larger volume of data per unit of time. Furthermore, since the redundant data is read when there is a high possibility of failing to read the data blocks, the present disk array device can readily operate calculation of parity when the reading is actually failed, and transmit data to the host device as soon as possible.

(Sixth Embodiment)

One of the reasons why reading is delayed in any of the disk drives 5A to 5D and 5P is that a defect occurs in a recording area of the disk drive. If the data block or redundant data is continuously stored in such defective area, reading of the data block or redundant data will be delayed every time. Therefore, in a sixth embodiment, the disk array device for executing so-called reassign processing is realized. Here, the reassign processing means that an alternate recording area (hereinafter referred to as alternate recording area) is assigned to a defective recording area (hereinafter referred to as defective area), and the data block or redundant data stored in the defective area is stored again in the newly-assigned alternate area.

Figure 24:
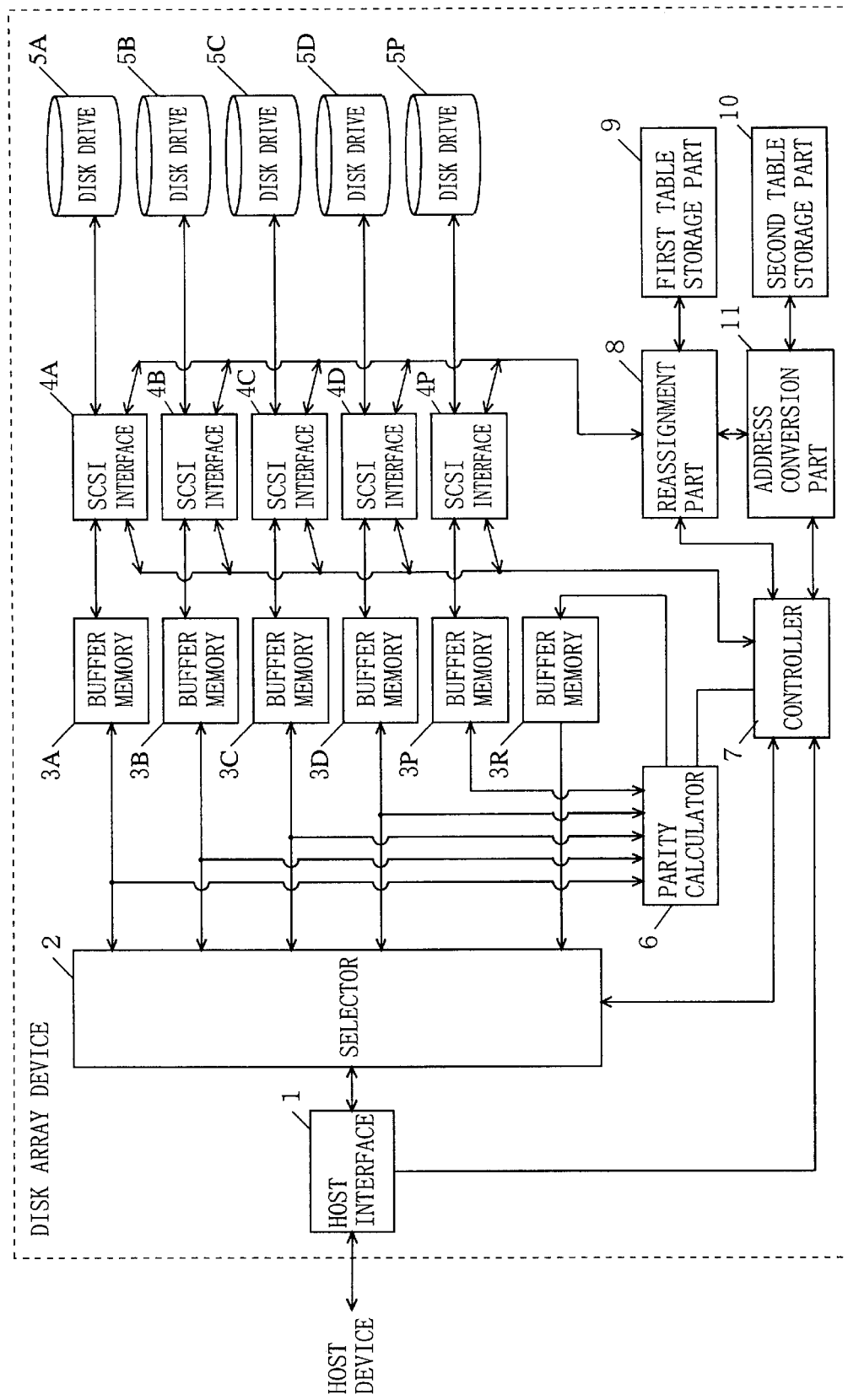
FIG. 24 is a block diagram showing the structure of a disk array device according to a sixth embodiment of the present invention.

FIG. 24 is a block diagram showing the disk array device according to the sixth embodiment of the present invention. The disk array device is different from the disk array device of FIG. 1 in that a reassignment part 8, a first table storage part 9, a second table storage part 10, and an address conversion part 11 are further included. By adding the reassignment part 8, functions that are different from those in the previous embodiments are added to the SCSI interfaces 4A to 4D and 4P. These new functions of the SCSI interfaces are not shown in FIG. 24 as space does not allow detailed illustration, but shown later in FIG. 29. Other than that, the disk array device has the same structures as those of the first embodiment. Therefore, the components in FIG. 24 are provided with the same reference numerals as those in FIG. 1 and their description is simplified herein. Note that, even though not shown in FIG. 24, the first timer 72 as described in the third embodiment is included in the controller 7.

Figure 25:
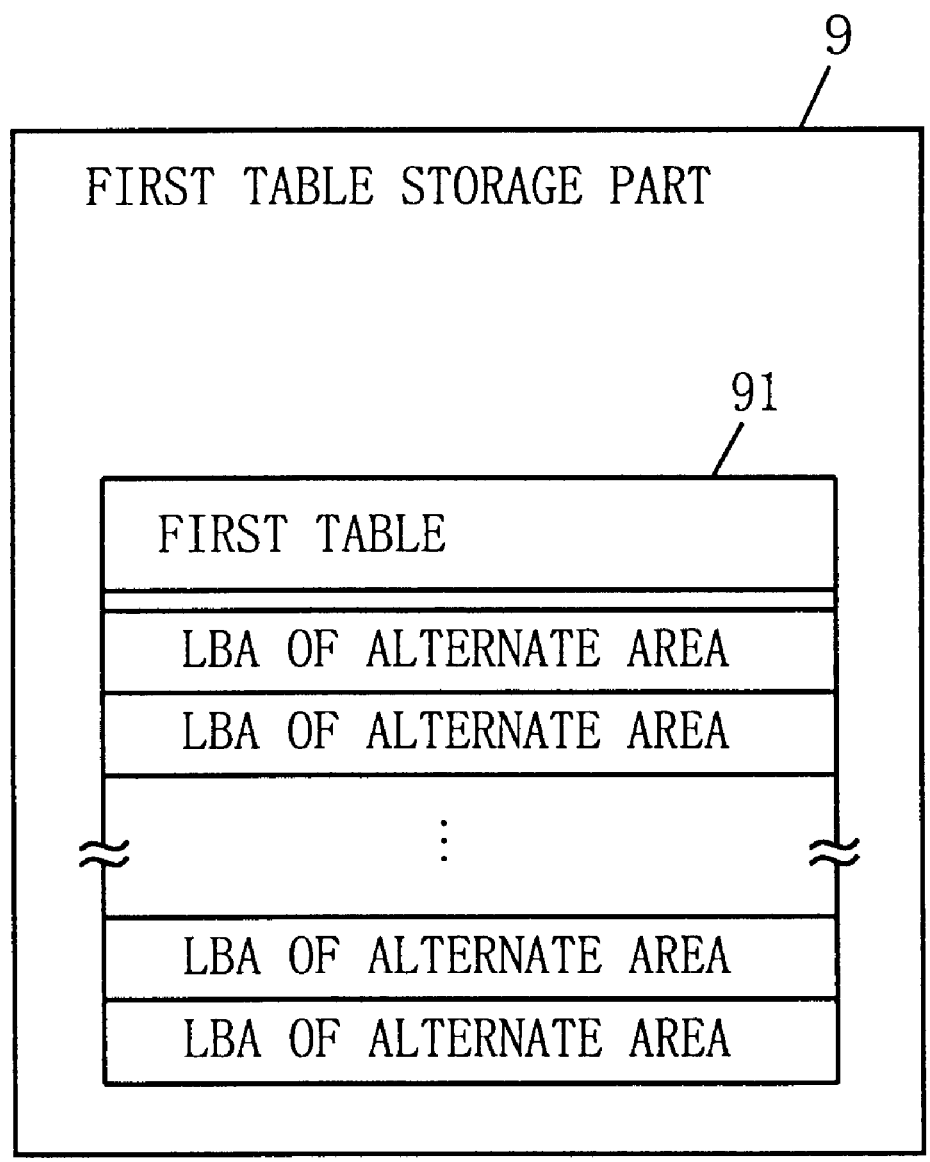
FIG. 25 is a diagram showing a first table 91 being managed by a first table storage part 9 shown in FIG. 24.

As known, each of the disk drives 5A to 5D and 5P manages its own recording area by a sector unit of a predetermined size (512 bytes, in the present embodiment). A number called LBA is 20 assigned to each sector. LBA is an acronym for Logical Block Address. At initialization of the disk array device, part of the sectors in the recording areas of the disk drives are allocated for the alternate areas. The first table storage part 9 manages a first table 91 shown in FIG. 25 to manage such alternate areas. In FIG. 25, the LBA's specifying the allocated alternate areas are registered in the first table 91.

The host device (not shown) is placed outside the disk array device and connected to the host interface 1, requesting the host device to write or read data. The RAID device performs the same write operation as described in the first and other embodiments. When the disk array device is configured based on the RAID-3 architecture as shown in FIG. 3, the redundant data is recorded only in the fixed disk drive 5P. When the disk array device is configured based on the RAID-5 architecture as shown in FIG. 20, the redundant data is distributed across the disk drives 5A to 5D and 5P. Note that the data blocks and redundant data are written in the areas other than the alternate areas when reassignment is not performed.

The host device transmits a first read request to the RAID device to request reading data of a parity group, as described in the previous embodiments. To request reading of five parity groups n to (n+4) (refer to FIGS. 3a and 3b), the host device has to transmit five first read requests to the RAID device. Each first read request includes information specifying the storage locations of the parity group to be read, as described above. In the sixth embodiment, the LBA's are used for the information specifying the storage locations.

Figure 26:
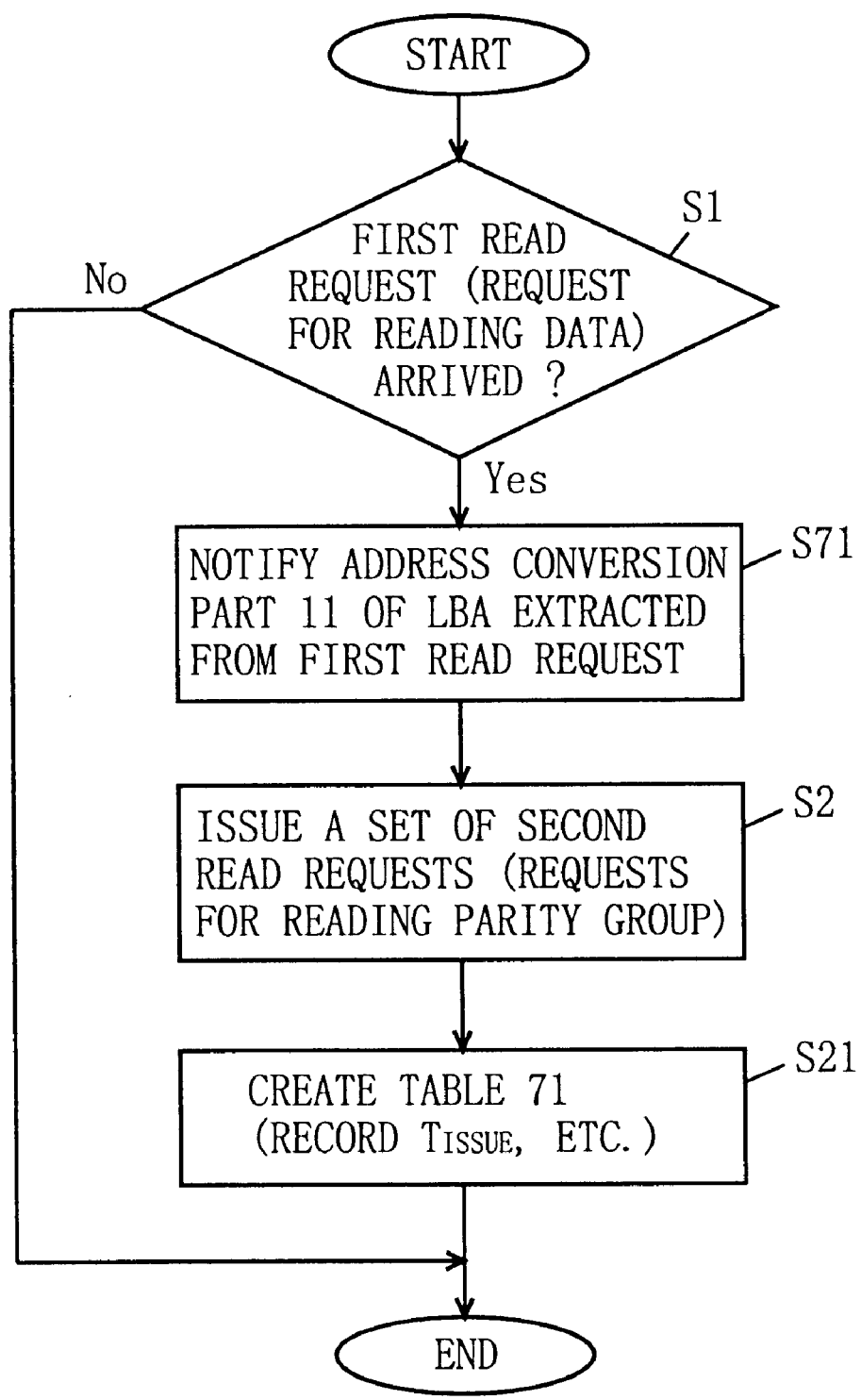
FIG. 26 is a flow chart illustrating the procedure of the controller 7 after the arrival of a first read request.

In response to the first read request, the present disk array device starts a read operation that is distinctive of the sixth embodiment which is now described with reference to FIG. 26. FIG. 26 shows a flow chart showing the procedure of the controller 7 after the first read request arrives. Since the flow chart of FIG. 26 partially includes the same steps as those of FIG. 12, the steps of FIG. 26 are provided with the same step numbers as those of FIG. 12 and their description is simplified herein.

A first read request arrives at the controller 7 through the host interface 1 (step S1 in FIG. 26). The controller 7 extracts the LBA's as information indicating the storage locations of the parity group to be read this time from the first read request. The controller 7 notifies the address conversion part 11 of the extracted LBA's (step S71). The address conversion part 11 executes arithmetic operation defined by RAID-3 or RAID-5, drawing original LBA's of the data blocks and redundant data from the storage locations (LBA's) of the parity group obtained from the controller 7. The original LBA's indicate the storage locations on the disk drives 5A to 5D and 5P in which the data blocks and redundant data are stored by the disk array device upon the write request from the host device.

Figure 27:
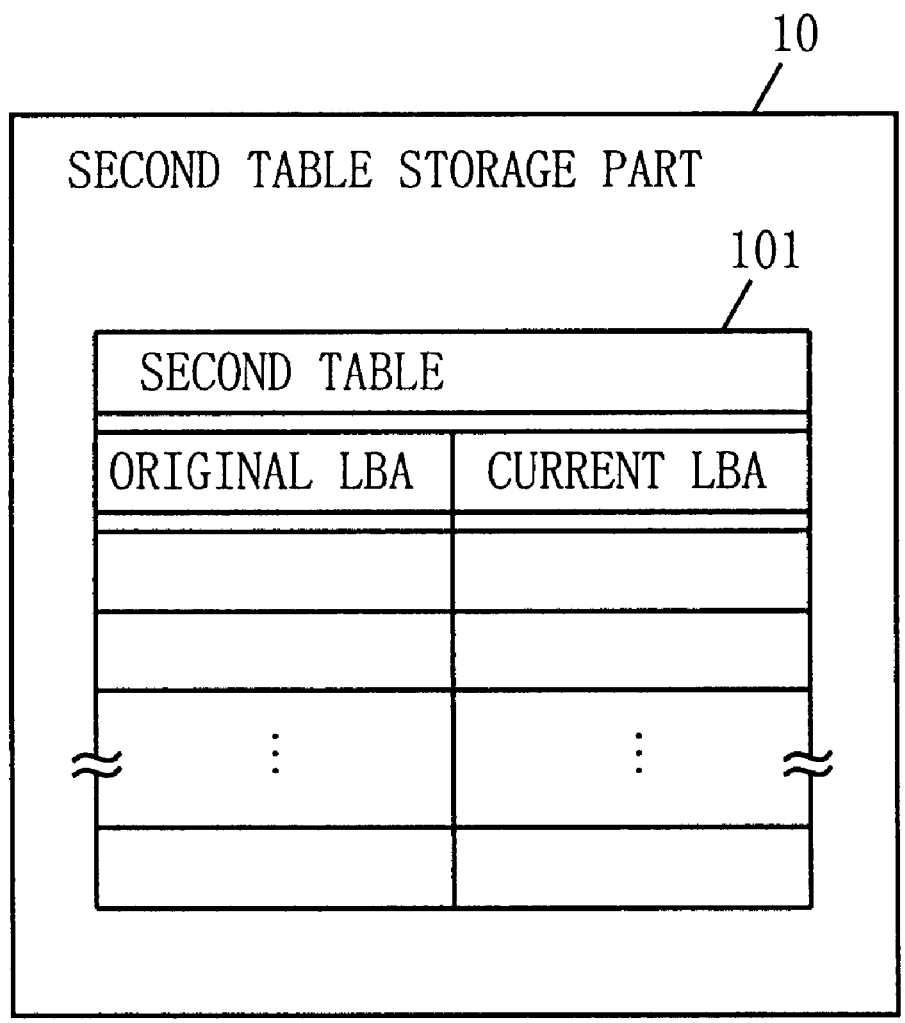
FIG. 27 is a diagram showing a second table 10 being managed by a second table storage part 10 shown in FIG. 24.

Described below is the arithmetic operation executed by the address conversion part 11. Since the present disk array device executes reassignment, the storage locations of the data block and redundant data may change after reassignment. In the following description, a current LBA indicates an LBA indicating a current storage location of the data block or redundant data. First, when notified of the storage locations of the parity group by the controller 7, the address conversion part 11 accesses to the second table storage part 10 to specify the original LBA of the data block or redundant data. The second table storage part 10 manages a second table 101 as shown in FIG. 27. In FIG. 27, the current LBA of the data block or redundant data is registered with its original LBA in the second table 101. Registration processing of the current LBA will be described later.

When the current LBA is registered for the currently-drawn original LBA, the address conversion part 11 extracts the current LBA from the second table 101. The address conversion part 11 determines that the data block or redundant data to be read is stored in the recording area indicated by the extracted current LBA. On the other hand, when no current LBA is registered for the currently-drawn original LBA, the address conversion part 11 determines that the data block or redundant data to be read is stored in the recording area indicated by the original LBA. In this way, the address conversion part 11 specifies the LBA's indicating correct recording areas of the data blocks and redundant data to be read. The address conversion part 11 notifies the controller 7 of the specified LBA's.

The controller 7 issues a set of second read requests to read the parity group (four data blocks and redundant data) using the LBA's from the address conversion part 1 (step S2). In the present embodiment, since the parity group is distributed across five disk drives 5A to 5D and 5P as shown in FIG. 3 or 20, five second read requests are issued. Each second read request includes, as described in the first embodiment, the LBA as the storage location of the data block or redundant data, and information on the buffer area (any of $3A_i$ to $3D_i$ and $3P_i$) for storing the read data block or redundant data. The second read requests are transmitted to each of SCSI interfaces 4A to 4D and 4P.

When transmitting the second read requests to the SCSI interfaces 4A to 4D and 4P, the controller 7 creates the issue time table 71 as shown in FIG. 9 (step S21). Since the processing of creating the issue time table 71 has been described above, its description is omitted herein.

The SCSI interfaces 4A to 4D and 4P transmit the received second read requests to the disk drives 5A to 5D and 5P, respectively. In response to the second read requests, the disk drives 5A to 5D and 5P start reading of the data blocks and redundant data. However, reading will be successfully completed, or eventually failed.

When reading has been successfully completed, the disk drives 5A to 5D and 5P transmit the read data blocks and redundant data to the SCSI interfaces 4A to 4D and 4P. Further, each disk drive transmits an ACK, a read response indicating that reading has been successfully completed, to its corresponding SCSI interface. Upon receiving the ACK, each SCSI interface identifies which second read request the received ACK corresponds to, and stores the read data block or redundant data in the corresponding one of the buffer areas $3A_i$ to $3D_i$ and 3P (refer to FIG. 2) specified by the controller 7. Further, each SCSI interface transmits the received ACK to the controller 7.

On the other hand, when reading has been failed, the disk drives 5A to 5D and 5P transmit a NAK, a read response indicating that reading has been failed, to its corresponding SCSI interface. On receiving the NAK, each SCSI interface transmits the received NAK to the controller 7.

As evident from above, either one of the read responses, an ACK or a NAK is transmitted from each SCSI interface to the controller 7. Note that, in most cases, the read response from the SCSI interfaces 4A to 4D and 4P arrive at different times. For example, when the disk drive 5A takes much time to read the data block, the read response from the SCSI interface 4A arrives at the controller 7 later than other read responses.

Figure 28:
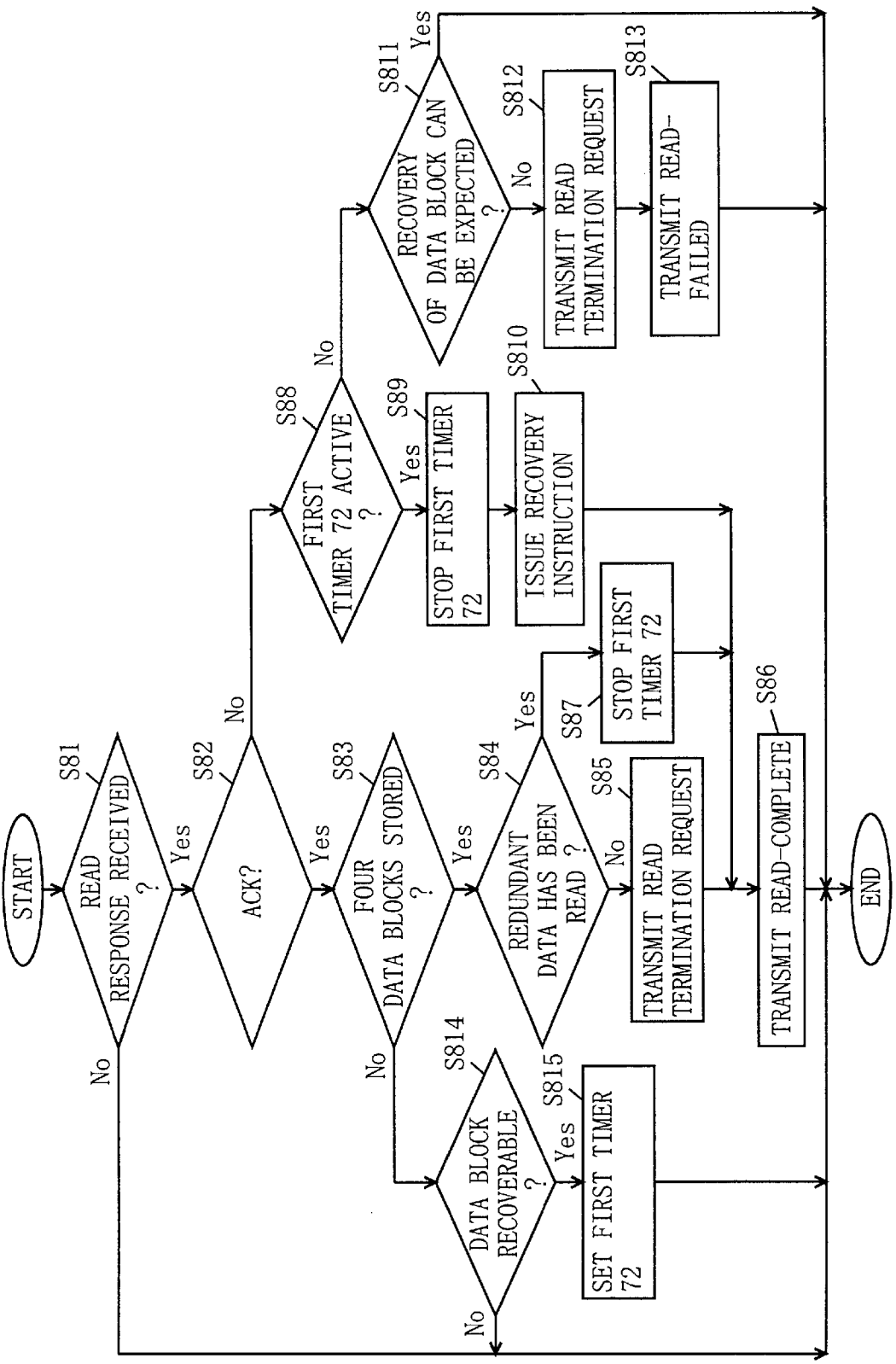
FIG. 28 is a flow chart showing the procedure of the controller 7 after the arrival of one read response.

The controller 7 executes the procedure as shown in a flow chart of FIG. 28 whenever a read response arrives at the controller 7. When receiving a read response (step S81), the controller 7 determines whether the signal is an ACK or NAK (step S82). When it is a NAK, the procedure advances to step S88, which will be described later. On the other hand, when it is an ACK, the controller 7 determines whether four data blocks of the same parity group have been stored in the buffer areas (step S83). More specifically, in step S83, it is determined whether the data block has been successfully read or not in each of the disk drive 5A to 5D. In other words, the controller 7 determines whether all ACK's from the SCSI interfaces 4A to 4D have been received.

When determining that four data blocks have been all stored, the procedure advances to step S84, which will be described later. When determining in step S83 that four data blocks have not been yet stored, the controller 7 determines whether the remaining data block can be recovered by calculation of parity or not (step S814). More specifically, in step S814, it is determined whether three data blocks and redundant data of the same parity group have been successfully read or not. In other words, it is determined whether the controller 7 has received three ACK's from any three of the SCSI interfaces 4A to 4D and an ACK from the SCSI interface 4P.

When determining in step S814 that the remaining data block cannot be recovered, that is, four ACK's have not been received during execution of step S814, the controller 7 temporarily terminates the procedure shown in the flow chart of FIG. 28. The controller 7 then waits for a new read response from any of the SCSI interfaces 4A to 4D and 4P.

When the procedure advances from step S83 to step S84, four data blocks of the same parity group have been stored in the buffer memories, as describe above. The disk array device of the third embodiment waits until reading of the remaining data block is completed for a lapse of the time margin $T_{MARGIN}$ from the time three data blocks and the redundant data are stored in the buffer memories (the time $T_{4th}$). Similarly, the disk array device according to the present embodiment waits until reading of the remaining data block is completed even if three data blocks and the redundant data are stored in the buffer memories. Therefore, at the execution of step S84, four data blocks of the same parity group may be stored in the buffer memories 3A to 3D, or four data blocks and the redundant data of the same parity group may be stored in the buffer memories 3A to 3D and 3P. The controller 7 therefore determines whether reading of the redundant data has been completed or not (step S84). In other words, the controller 7 determines whether it has received an ACK from the SCSI interface 4P.

When determining in step S84 that reading of the redundant data has not yet been completed, the controller 7 generates a read termination request and transmits the same to the reassignment part 8 (step S85). The read termination request is now described. At the time of step S84, since four data blocks have been stored, the data can be assembled without execution of calculation of parity. The controller 7 therefore realizes that the redundant data being read is no longer necessary. The read termination request transmitted in step S85 is a signal for requesting the reassignment part 8 to terminate reading of such unnecessary redundant data. This read termination request includes information on the storage location (LBA) of the unnecessary redundant data. In response to the read termination request, the reassignment part 8 executes processing shown in a flow chart of FIG. 34, which will described later. After the controller 7 ends the processing of step S85, the procedure advances to step S86.

On the other hand, when the controller 7 determines in step S84 that the redundant data has been read, the procedure advances to step S87. To advance to step S87, the procedure satisfies that four data blocks and the redundant data have been completely read. In other words, reading of the last data block is completed while the first timer 72 set in step S815 (described later) is active. Therefore, the first timer 72 does not have to count down any more. The controller 7 stops the active first timer 72 (step S87), and then the procedure advances to step S86.

In step S86, the controller 7 generates a READ-COMPLETED, and transmits the same to the selector 2. The READ-COMPLETED is a signal for notifying the selector 2 that four data blocks of the same parity group have been stored in the buffer memories 3A to 3D to allow data assembling. The READ-COMPLETED includes information for specifying four buffer areas $3A_i$ to $3D_i$ in which the four data blocks of the same parity group are stored. According to the received READ-COMPLETED, the selector 2 sequentially selects the four buffer areas $3A_i$ to $3D_i$ to read the four data blocks. The selector 2 further assembles the data of 2048 bytes from the read four data blocks. The assembled data is transmitted through the host interface 1 to the host device.

When the procedure advances from step S814 to S815, three data blocks and redundant data of the same group have been stored in the buffer memories, as described above. The disk array device according to the present embodiment waits until reading of the remaining data block has been completed. Therefore, the controller 7 calculates a timeout value $V_{TO1}$, and sets the first timer 71 to the calculated timeout value $V_{TO1}$ (step S815). This activates the first timer 72 to start countdown. The processing of step S815 is the same as that of S43 of FIG. 12b, and therefore its description is omitted herein.

After the first timer 72 is set in step S815, the controller 7 waits until a new read response from any of the SCSI interfaces 4A to 4D and 4P arrives.

When the procedure advances from step S82 to S88, a NAK has arrived at the controller 7. The controller 7 determines in step S88 whether the first timer 72 is active or not. When determining that the first timer 72 is not active, the procedure advances to step S811, which will be described later. On the other hand, when determining that the first timer 72 is active, the NAK indicates that reading of the remaining data block which had not yet been completed in step S814 has been eventually failed thereafter. The controller 7 realizes that countdown by the first timer 72 is no longer necessary, and stops the countdown (step S89). The controller 7 also realizes that reading of the remaining data block has failed and that the data block has to be recovered. The controller 7 thus issues a recovery instruction to the parity calculator 6 for operating calculation of parity (step S810). The parity calculator 6 recovers the remaining unread data block, and stores the same in the buffer memory 3P. The parity calculator 6 then issues a RECOVERY-COMPLETED, a signal indicating that recovery of the data block has been successfully completed, to the controller 7. In response to the RECOVERY-COMPLETED, the controller 7 issues a READ-COMPLETED to the selector 2 (step S86). As a result, the data is transmitted to the host device.

When the procedure advances from step S88 to S811, three read responses at the maximum have arrived. The disk array device of the present embodiment distributes the parity group across five disk drives 5A to 5D and 5P. When reading of two of these disk drives are failed, data block recovery by calculation of parity cannot become expected. Therefore, the controller 7 determines in step S811 whether data block recovery by calculation of parity can be expected or not. More specifically, in step S811, it is determined whether two of the read responses in the controller 7 are NAK's.

When determining in step S811 that data block recovery by calculation of parity can be expected (that is, when determining for the first time that one of the read responses is a NAK), the controller 7 temporarily ends the procedure shown in FIG. 28. The controller 7 then waits until a new read response from any of the SCSI interfaces 4A to 4D and 4P arrives.

On the other hand, when the controller 7 determines in step S811 that data block recovery by calculation of parity cannot be expected (that is, when it determines for a second time that the read response is a NAK), the procedure advances to step S812, wherein the controller 7 issues a read termination request to the reassignment part 8. This read termination request is now described. In step S812, some of the disk drives 5A to 5D and 5P have not yet completed reading. For example, when first and second read requests are both NAK's, three of the disk drives have not completed reading. Since data block recovery cannot be expected if two read response are NAK's, the controller 7 determines that the data blocks or redundant data which have not yet been completely read are not necessary in step S812. Therefore, the controller 7 transmits a read termination request in step S812 for requesting the reassignment part 8 to terminate reading of such unnecessary data blocks or redundant data. This read termination request includes information on the storage locations (LBA) of the unnecessary data blocks or redundant data. In response to the read termination request from the controller 7, the reassignment part 8 executes processing shown in a flow chart of FIG. 34, which will described later. After the controller 7 ends the processing of step S812, the procedure advances to step S813.

When the data block cannot be recovered, the data cannot be transmitted to the host device, and therefore the controller 7 generates a READ-FAILED (step S813). The generated READ-FAILED is transmitted to the host device.

Figure 12B:
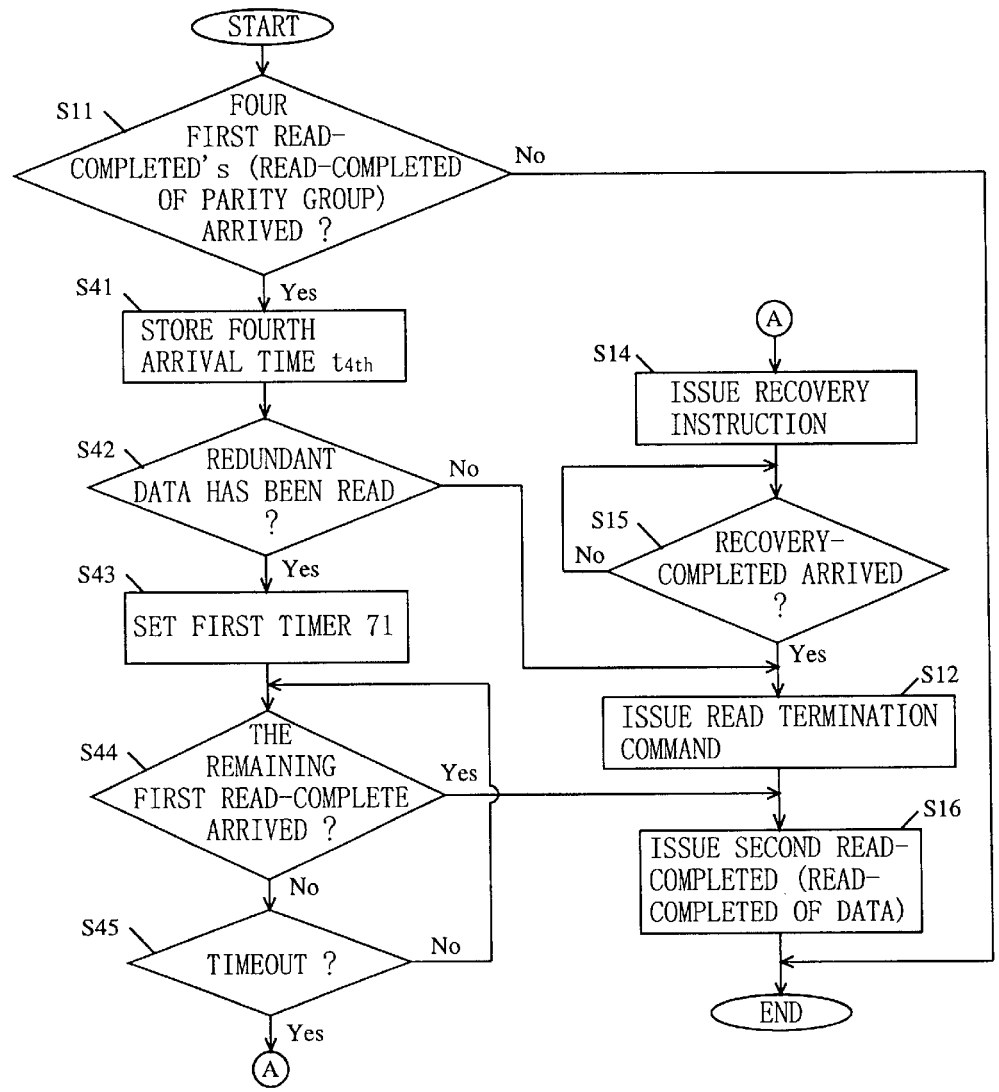

When the first timer 72 is timed-out, the controller 7 executes the procedure shown in FIG. 12b. Note that, since the procedure has been described before, its description is omitted herein.

When issuing a set of second read requests, the controller 7 subtracts the issue time $t_{ISSUE}$ from the present time $t_{PRE}$ by referring to the issue time table 71. The controller 7 then determines whether the calculated value $(t_{PRE}-t_{ISSUE})$ exceeds the limit time $T_{LIMIT}$. When two of the disk drives 5A to 5D and 5P have not yet completed reading by the time it is determined that the value exceeds the limit time $T_{LIMIT}$, the controller 7 specifies the disk drives in which reading has not yet been completed. The controller 7 then issues a read termination command to each of the specified disk drives. Note that, since such procedure has been described with reference to FIG. 8b, its description is omitted herein.

Figure 29:
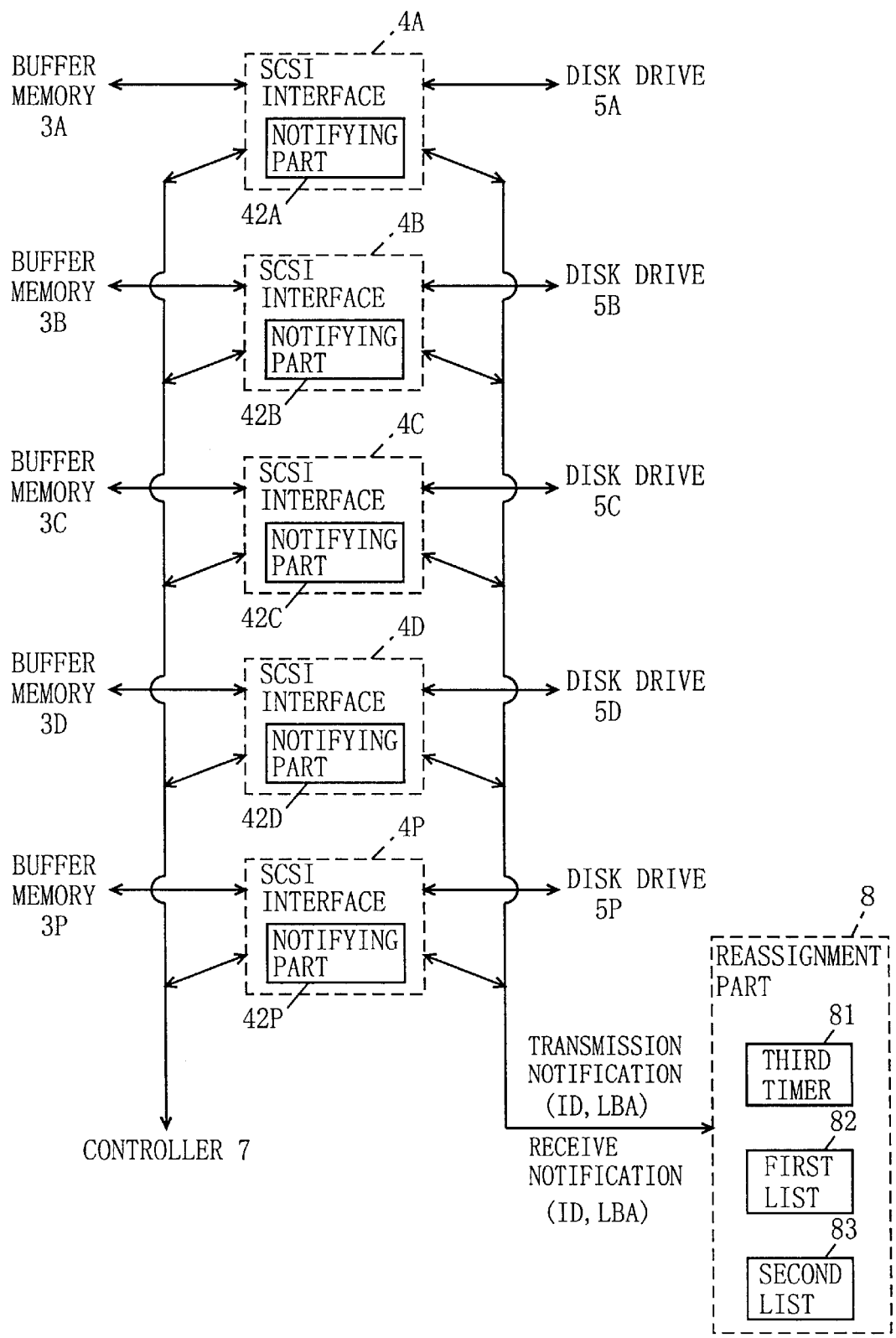
FIG. 29 is a block diagram showing the detailed structure of SCSI interfaces 4A to 4D and 4P shown in FIG. 24 and a reassignment part 8.

Described next is operation of the reassignment part 8 with reference to FIGS. 29 to 34. As described above, the SCSI interfaces 4A to 4D and 4P are additionally provided with a new structure relating to the reassignment part 8. The new structure includes, as shown in FIG. 29, notifying parts 42A to 42D and 42P. When the SCSI interfaces 4A to 4D and 4P transmit second read requests to the disk drives 5A to 5D and 5P, respectively, each of the notifying parts 42A to 42D and 42P generates a transmission notification indicating the transmission of the second read request. The generated notifications are transmitted to the reassignment part 8. Each notification includes an ID uniquely specifying the transmitted second read request, and the LBA specified by the second read request. When the SCSI interfaces 4A to 4D and 4P receive a read response (ACK or NAK) from the disk drives 5A to 5D and 5P, respectively, each of the notifying parts 42A to 42D and 42P further generates a receive notification indicating the receiving of the read response. The generated receive notifications are transmitted to the reassignment part 8. Each receive notification includes an ID uniquely specifying the second read request corresponding to the received read response, and the LBA specified by the second read request. The reassignment part 8 can operate correctly, even if the LBA is not included in the receive notification.

Figure 30:
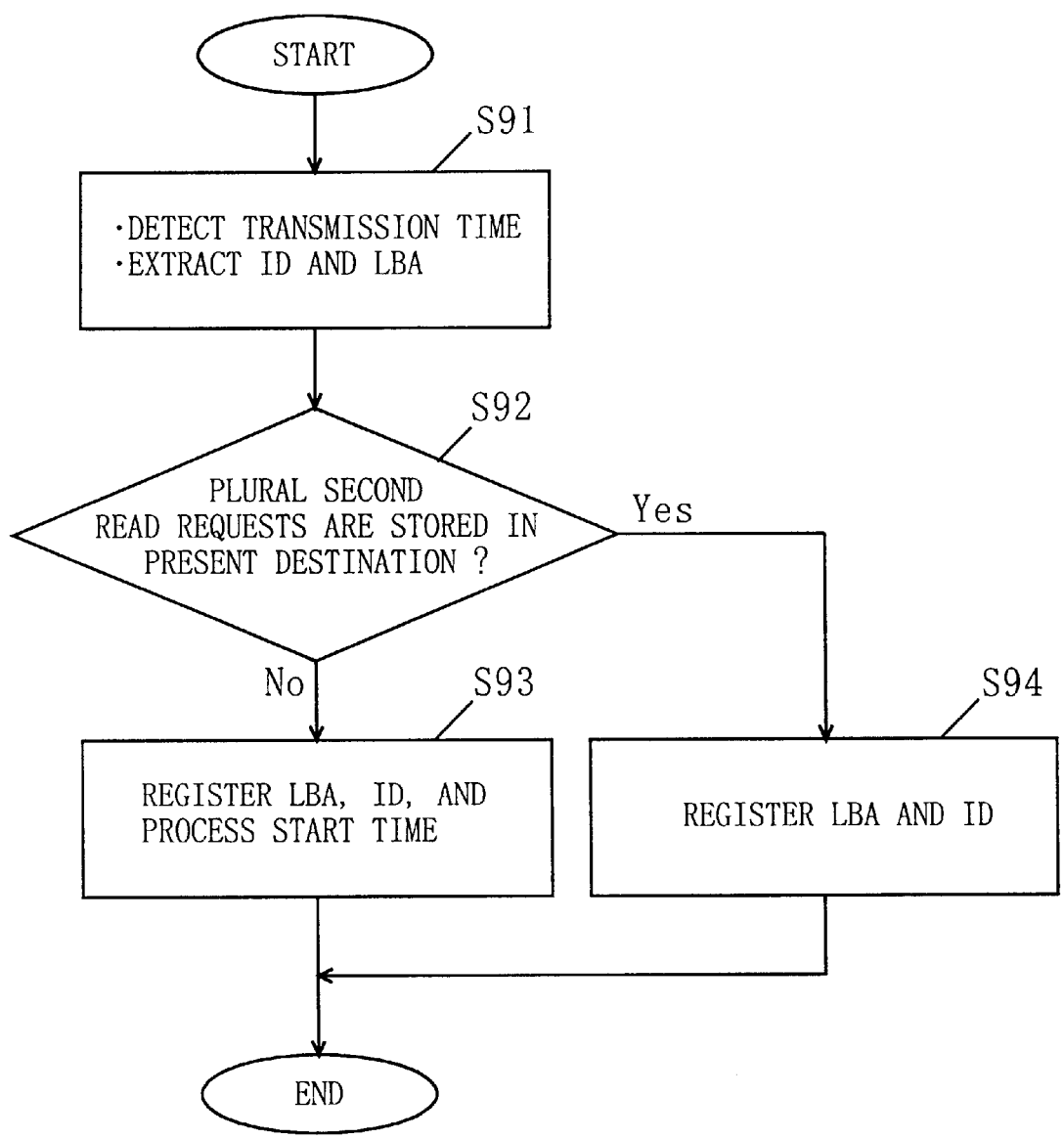
FIG. 30 is a flow chart showing the procedure of the reassignment part 8 after the arrival of a transmission notification.

Moreover, the reassignment part 8 includes, as shown in FIG. 29, a third timer 81 indicating the present time of day, a first list 82, and a second list 83, executing the procedure for reassignment shown in a flow chart of FIG. 30 whenever the reassignment part 8 receives a transmission notification. For a specific description, assume herein that the reassignment part 8 receives a transmission notification from the SCSI interface 4A. The received transmission notification includes the ID "b" and the LBA "a".

The reassignment part 8 first detects a receive time when receiving the transmission notification based on the present time indicated by the third timer 81. The reassignment part 8 uses this receive time as the time when the SCSI interface 4A transmits a second read request to the disk drive 5A. Now assume that the time when the second read request is transmitted is $t_{t1}$. The reassignment part 8 extracts the ID "b" and the LBA "a" from the received transmission notification (step S91).

Figure 31:
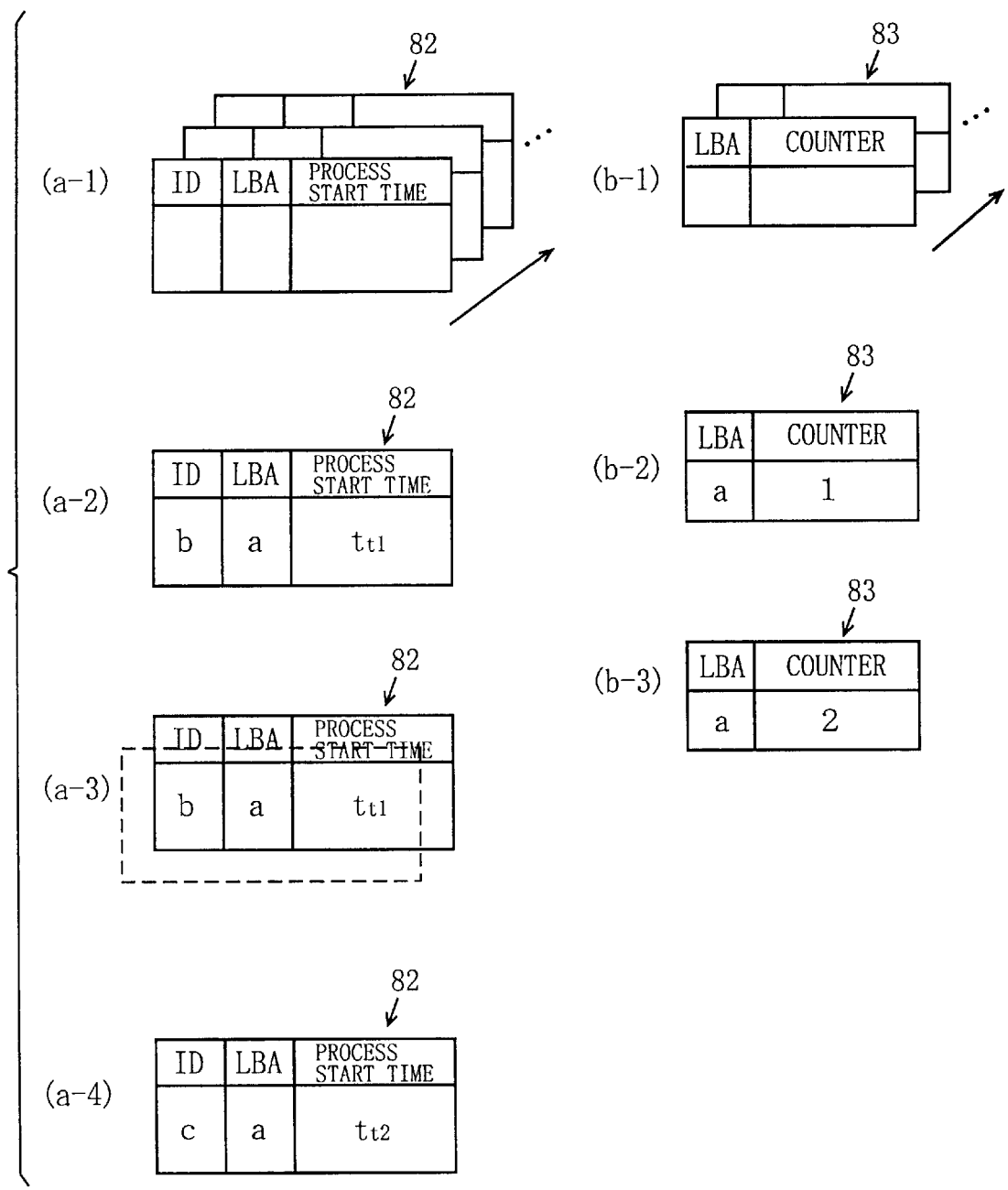
FIG. 31 is a diagram illustrating a first list 82 and a second list 83 shown in FIG. 29.

Now described below are the first list 82 and the second list 83. The first list 82 has, as shown in FIG. 31(a-1), fields in which the ID, LBA, and processing start time are registered. The first list 82 is created whenever a second read request is transmitted (that is, whenever the reassignment part 8 receives a transmission notification). The reassignment part 8 classifies and manages the created first lists 82 for each destination of the second read request. In other words, the first lists 82 are classified and managed for each of the disk drives 5A to 5D and 5P (that is, SCSI interfaces 4A to 4D and 4P). Furthermore, the first lists 82 for each disk drive are sorted in the transmission order of the second read requests. Now assume that the plurality of first lists 82 shown in FIG. 31(a-1) are created in response to the second read requests to be transmitted to the disk drive 5A. In FIG. 31(a-1), as indicated by an arrow, the information on a new (later-transmitted) Second read request is registered in the first list 82 located frontward, while the information on an old (earlier-transmitted) second read request is registered in the first list 82 located backward.

The second list 83 has, as shown in FIG. 31(b-1), fields in which the LBA storing the data block or redundant data and a counter value N are registered.

After step S91, the reassignment part 8 determines whether plural second read requests are kept in the destination of the present second read request (hereinafter referred to as present target disk drive) (step S92), which is now more specifically described. Here, the present target disk drive is the disk drive 5A. As described above, the first list 82 is created whenever a second read request is transmitted to the disk drives 5A to 5D and 5P, and the created first lists 82 are sorted and managed for each disk drive. Further, the first list 82 is deleted when the corresponding second read request has been completely processed or forcefully terminated in the disk drive. Therefore, the reassignment part 8 can know the number of second read requests kept in the present target disk drive (disk drive 5A) if, for example, counting the number of first lists 82 managed therefor. Note that, in step S92, the reassignment part 8 determines that plural second read requests are kept in the present target disk drive (disk drive 5A) if only one first list 82 is managed, for the following reason: The first list 82 has not yet been created for the present second read request in step S91. The reassignment part 82 manages only the first list(s) 81 for the second read request transmitted to the disk drive 5A before step S91. In step S92, however, the second read request(s) transmitted before step S91 and the present second read request are kept in the present target disk drive (disk drive 5A), and therefore the reassignment part 8 determines that plural second read requests are kept.

When determining in step S92 that plural second read requests are not kept, the reassignment part 8 creates a new first list 82, and registers the LBA "a" and ID "b" extracted in step 91 therein. The reassignment part 8 also registers the transmission time $t_{t1}$ detected in step S91 as the process start time in that first list 82. Further, having received the transmission notification from the SCSI interface 4A in step S91, the reassignment part 8 classifies the created first list 82 as for the disk drive 5A and manages the same (step S93). As a result, such information as shown in FIG. 31(a-2) is registered in the created first list 82.

On the other hand, when determining in step S92 that plural second read requests are kept, the procedure advances to step S94. The present second read request is not processed in the present target disk drive until other previous read requests have completely been processed. In other words, the present second read request has to wait for being processed in the present target disk drive. If the procedure advances from step S92 to step S93, the transmission time $t_{t1}$ detected in step S91 is improperly set as the process start time in the first list 82. Therefore, the procedure advances from step S92 not to step S93 but to step S94, in which the reassignment part 8 registers only the LBA "a" and the ID "b" extracted in step S91 in the first list 82 and manages the same. Here, note that the process start time not registered in step S94 will be registered later (refer to the following step S104 of FIG. 32 for detail).

Figure 32:
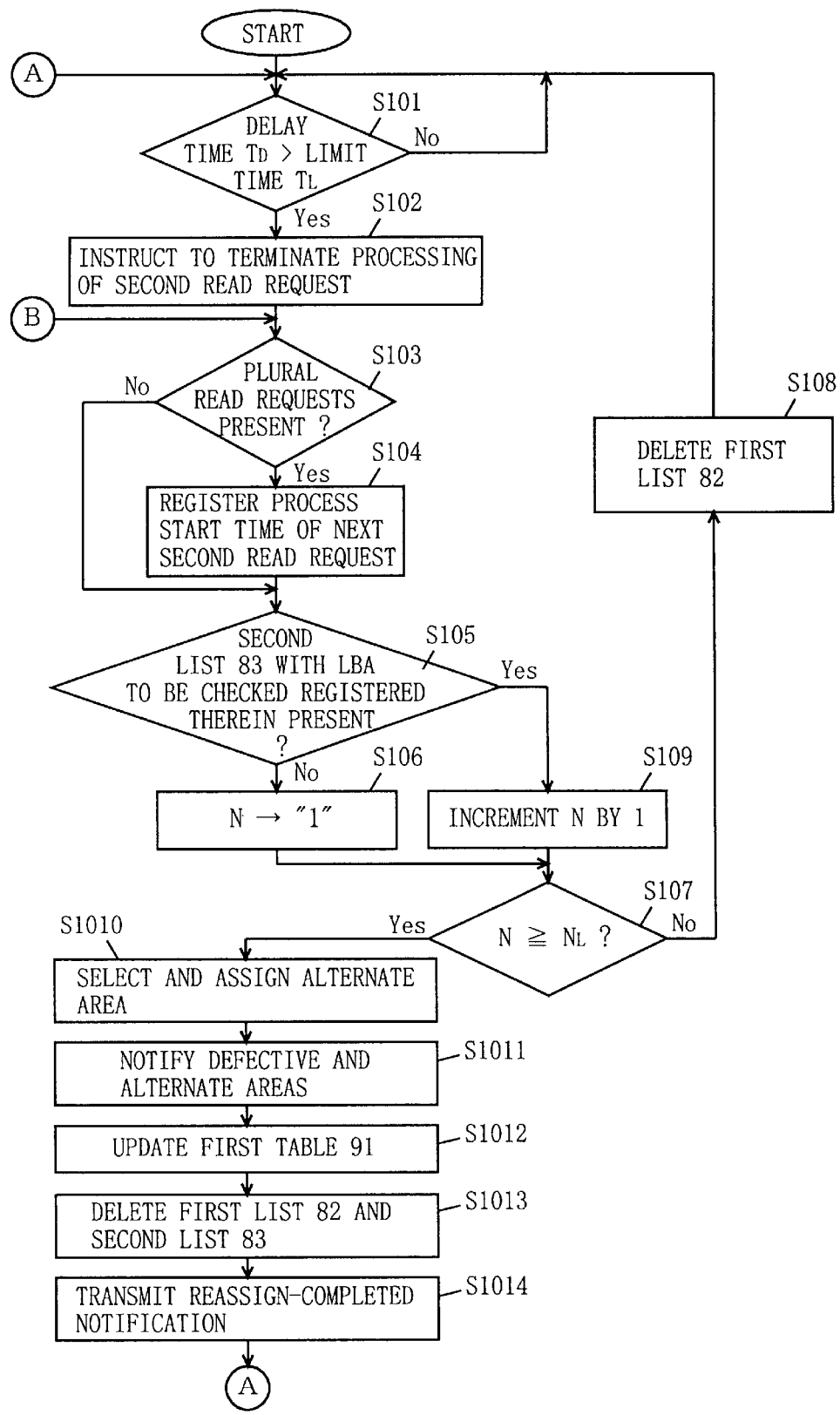
FIG. 32 is a flow chart showing the procedure of reassignment to be executed by the reassignment part 8 shown in FIG. 24.

In addition to the procedure shown in FIG. 30, the reassignment part 8 executes another procedure shown in a flow chart of FIG. 32. FIG. 32 shows processing of the reassignment part 8 for detecting a defective area. First, the reassignment part 8 refers to the first lists 82 presently kept, and measures a delay time $T_D$ of each second read request transmitted to each of the disk drives 5A to 5D and 5P. The delay time $T_D$ indicates the time between a start of processing the second read request by each disk drive and the present time.

Measurement processing of the delay time $T_D$ is now described more specifically. As evident from above, one first list 82 is created whenever the SCSI interface 4A transmits a second read request to the disk drive 5A. This applies to the other disk drives 5B to 5D and 5P. Some of the first lists 82 include the process start time of the second read request registered therein. The reassignment part 8 selects one of the first lists 82 with the process start time registered as the first list 82 to be processed. The reassignment part 8 then fetches the process start time from the selected first list 82. The reassignment part 8 also obtains the present time $T_P$ from the timer 81. The reassignment part 8 subtracts the extracted process start time from the present time $T_P$. The subtraction result is used as the delay time $T_D$ of the second read request corresponding to the first list 82 to be processed.

The reassignment part 8 previously stores the limit time $T_L$ therein. The limit time $T_L$ is a previously-determined indicator for determining whether each disk drive includes a defective area or not. The limit time $T_L$ is preferably the time which ensures data transmission without interruption of video and audio at the host device. The reassignment part 8 determines whether the calculated delay time $T_D$ exceeds the limit time $T_L$ or not (step S101 of FIG. 32). When the delay time $T_D$ exceeds the limit time $T_L$, the reassignment part 8 determines that the processing of the second read request specified by the first list 82 to be processed is delayed, and that there is a possibility that the LBA specified by the second read request is defective.

The processing in step S101 is now described more specifically. Assume that the reassignment part 8 selects the first list 82 shown in FIG. 31(*a*-2). This first list 82 includes the ID "b", the LBA "a", and process start time "$t_{r1}$" registered therein. Therefore, the delay time $T_D$ of the second read request specified by the ID "b" is calculated by $T_P-t_{r1}$. Further, the reassignment part 8 determines whether $T_D>T_L$ is satisfied. If not, the reassignment part 8 selects another first list 82 for process, and executes step S101. When not being able to select another first list 82, the reassignment part 8 ends the procedure of FIG. 32.

On the other hand, when $T_D>T_L$ is satisfied in step S101, the reassignment part 8 instructs the SCSI interface 4 to terminate the processing of the second read request specified by the first list 82 to be processed (step S102). In step S102, in order to terminate the processing of the second read request, the assignment part 8 generates an ABORT_TAG message, one of the SCSI messages, and transmits the same to the SCSI interface 4. The SCSI interface 4 transmits the ABORT_TAG message to the disk drive 5 connected thereto. In response to the received ABORT_TAG message, the disk drive 5 terminates the second read request specified by the ID "b". Here, since the second read request specified by the ID "b" has been transmitted through the SCSI interface 4A to the disk drive 5A, the reassignment part 8 transmits the ABORT_TAG message to the disk drive 5A through the SCSI interface 4A, causing the disk drive 5A to terminate the processing of the second read request specified by the ID "b".

After transmitting the ABORT_TAG message, the SCSI interface 4 transmits a NAK indicating that the processing of the second read request specified by the ID "b" has been failed, to the controller 7.

After step S102, the reassignment part 8 determines the disk drive 5 specified by the first list 82 to be processed. The reassignment part 8 determines whether plural second read requests are kept in the determined disk drive 5 to be processed (step S103).

When the reassignment part 8 determines in step 5103 that plural second read requests are kept, that is, plural first lists 82 are managed in the reassignment part 8, the procedure advances to step S104. Here, plural first lists 82 are managed for the disk drive 5A to be processed. Further, in step S108 or S1013 described later, the selected first list 82 is deleted. Therefore, at this time, as shown in FIG. 31(*a*-3), the reassignment part 8 manages the first list 82 to be processed and the first list 82 created next (hereinafter referred to as "next first list 82") therein. The next first list 82 is shown as surrounded by a dotted line in FIG. 31(*a*-3). Note that the next first list 82 does not include the process start time registered because it was created in step S94 of FIG. 30. To register the process start time, the reassignment part 8 first obtains the present time $T_P$ from the third timer 81, and registers the present time $T_P$, in the next first list 82 (step S104). The procedure then advances to step S105.

On the other hand, when the reassignment part 8 determines in step S103 that plural second read requests are not kept, the procedure skips step S104 to advance to step S105.

The reassignment part 8 then fetches the registered LBA from the first list 82 to be processed. The fetched LBA is hereinafter referred to as an LBA to be checked. Here, the LBA to be checked is "a", and may possibly be defective. The reassignment part 8 searches the second lists 83 managed therein (refer to FIG. 31(*b*-1)) based on the LBA to be checked to determined whether any second list 83 with the LBA to be checked registered therein is present (step S105).

As described above, the second list 83 includes the fields for registering the LBA and the counter value N therein. The counter value N indicates how many times the LBA to be checked has successively satisfied $T_D>T_L$ in step S101. Therefore, if any second list 83 with the LBA to be checked registered therein is found in step S105, the LBA to be checked is determined to be possibly defective also at a previous check. That is, the second read request for reading the data block or redundant data from the LBA to be checked has been transmitted successively at least twice (at previous time and this time) by now. Moreover, the reassignment part 8 has successively determined that the LBA to be checked satisfies $T_D>T_P$, twice in step S101 executed in response to each second read request. On the other hand, when any second list 83 with the LBA to be checked registered therein cannot be found, the LBA to be checked is determined for the first time to possibly be defective.

When the second list 83 with the LBA to be checked registered therein can be found in step S105, the procedure advances to step S109. Otherwise, the procedure advances to step S106, wherein a new second list 83 is created. As shown in FIG. 31(*b*-2), the reassignment part 8 registers the LBA to be checked ("a", in this example) in the LBA field of the created second list 83. The reassignment part 8 also registers a default value "1" in the counter field thereof (step S106).

After step S106, the reassignment part 8 determines whether the counter value N in the second list 83 with the LBA to be checked registered therein (hereinafter referred to as the second list 83 to be processed) reaches a limit value $N_L$ or not (step S107). The limit value $N_L$ is a predetermined threshold for determining whether the LBA to be checked is defective or not. The limit value $N_L$ is a natural number of 1 or more, determined according to the specifications of the present disk array device. In the present embodiment, assume that "2" is selected for the limit value $N_L$. Since the second list 83 to be processed is the newly-created one in step S106, the counter value N "1" is registered in the second list 83 to be processed (refer to FIG. 31(*b*-2)). The reassignment 8 therefore determines that the counter value N does not reach the limit value $N_L$, and the procedure advances to step S108.

The reassignment part 8 then determines that the first list 82 to be processed is no longer necessary, and deletes the first list 82 (step S108). This processing prevents the first list 82 from being redundantly selected for process. Here, the reassignment part 8 deletes the first list 82 with the ID "b", the LBA "a", and the process start time "$t_{r1}$" registered therein. Note that the second list 83 to be processed is not deleted in step S108. After step S108, the procedure returns to step S101, wherein the reassignment part 8 selects another first list 82 to be processed to continue the procedure. When the counter value N reaches the limit value $N_L$ in step S106, the procedure advances to step S109.

Furthermore, another first read request may arrive at the controller 7 from the host device. In response to the other first read request, the controller 7 transmits a set of second read requests to the SCSI interfaces 4A to 4D and 4P. The SCSI interfaces 4A to 4D and 4P transmit the received second read requests to the disk drives 5A to 5D and 5P, respectively. Assume that the second read request transmitted to the disk drive 5A indicates reading the data block from the LBA "a". In this case, the notifying part 42A of the SCSI interface 4A generates a transmission notification for the second read request transmitted to the disk drive 5A, and transmits the notification to the reassignment part 8. Here, assume that this transmission notification includes the ID "c" and the LBA "a".

Upon receiving the transmission notification, the reassignment part 8 starts the procedure as shown in FIG. 30, first obtaining the present time $T_P$ from the third timer 81.

The present time $T_P$ is used, as described above, as the time when the SCSI interface 4A transmits the second read request to the disk drive 5A. Here, assume that the transmission time of the second read request is $t_{r2}$. The reassignment part 8 extracts ID "c" and the LBA "a" from the received transmission notification (step S91). The reassignment part 8 then executes steps S92 and then S93, or steps S92 and then S94 to create a new first list 82 for the present second read request, and then ends the procedure of FIG. 30. Assuming that the present target disk drive (disk drive 5A) keeps only one second read request, the first list 82 includes the LBA "a", the ID "c", and the process start time "$t_{r2}$" registered therein (refer to FIG. 31(a-4)).

The reassignment part 8 further executes the procedure of FIG. 32. The reassignment part 8 first selects the first list 82 to be processed from the first lists 81 stored therein. The reassignment part 8 then determines whether the delay time $T_D$ calculated by referring to the first list 82 to be processed exceeds the limit time $T_L$ (step S101). Here, assume that the first list 82 to be processed is as shown in FIG. 31(a-4). In this case, the delay time $T_D$ can be obtained by $T_P - t_{r2}$. When $T_D$ (=$T_P - t_{r2}$)>$T_L$ is satisfied, the reassignment part 8 terminates processing of the second read request specified by the first list 82 to be processed (step S102), and then determines whether another first list 82 is managed therein for the target disk drive (disk drive 5A) (step S103). Here, since the present target disk drive (disk drive 5A) keeps one second read request, the procedure directly advances from step S103 to step S105. The reassignment part 8 then fetches the LBA in the first list 82 to be processed as the LBA to be checked ("a" at present). The reassignment part 8 then searches the managed second lists 83 based on the LBA to be checked to determine whether any second list 83 with the LBA to be checked registered therein is present (step S105).

As described above, since the reassignment part 8 manages the second list 83 as shown in FIG. 31(b-2), the procedure advances to step S109. Here, the second list 83 with the LBA to be checked registered therein is to be processed by the reassignment part 8, as described above.

The reassignment part 8 increments the counter value N registered in the second list 83 to be processed by "1" (step S109). Here, the counter value N in FIG. 31(b-2) is incremented by "1", resulting in "2" as shown in FIG. 31(b-3). After step S109, the reassignment part 8 determines whether the counter value N reaches the limit value $N_L$ ("2", as described above) or not (step S107). Since the counter value N is "2", the reassignment part 8 assumes that recording area specified by the LBA to be checked (the LBA "a" of the disk drive 5A, at present) is defective, and the procedure advances to step S1010.

The reassignment part 8 accesses to the first table 91 (refer to FIG. 25) managed by the first table storage part 9, selecting one of the LBA's specifying currently available alternate areas. The reassignment part 8 thus selects the alternate area to be assigned to the defective area (step S1010). The size of the selected alternate area is equal to that of the data block or redundant data (512 bytes, in the present embodiment).

The reassignment part 8 notifies the address conversion part 11 of the LBA of the defective area (the LBA "a" of the disk drive 5A, at present) and the LBA of the selected alternate area (step S1011). The address conversion part 11 registers the LBA's of the defective and alternate areas received from the reassignment part 8 in the second table 101 (refer to FIG. 27) managed by the second table storage part 10. Note that, in FIG. 27, the LBA of the defective area specifies the original storage location of the data block or redundant data, and is therefore described as the original LBA in the second table. Furthermore, the LBA of the alternate area specifies the current recording area of the data block or redundant data previously recorded in the defective area, and is therefore described as the current LBA. With the address information thus updated, the controller 7 uses the current LBA when the controller 7 next generates a second read request for reading the reassigned data block or redundant data.

After step S1011, the reassignment part 8 updates the first table 91 in the first table storage part 9 so as not to redundantly select the alternate area selected in step S1010 (step S1012). This updating prevents the reassignment part 8 from redundantly selecting the present alternate area, and ends the reassign processing. After the reassignment, the first list 82 and second list 83 to be processed are not necessary any more, and therefore the reassignment part 8 deletes these lists (step S1013). Furthermore, the reassignment part 8 generates a REASSIGN-COMPLETED notification, a signal indicating that the reassign processing ends, and transmits the same to the controller 7 (step S1014). The REASSIGN-COMPLETED notification includes information on the LBA's of the defective area and alternate area.

In response to the REASSIGN-COMPLETE notification from the reassignment part 8, the controller 7 recovers the unread data block or redundant data by reassignment according to the architecture of the RAID level adopted in the present embodiment, and then writes the recovered data block and redundant data in the alternate area of the disk drive (on which the reassignment has been executed) of the present target disk drive. Since this processing is known art, its description is omitted herein. With this writing of the data block and redundant data, the parity group recorded over the disk drives 5A to 5D and 5P can maintain consistency before and after reassignment.

As described above, in the disk array device according to the present embodiment, reassign processing is executed when a defective area is detected on any of the disk drives 5A to 5D and 5P. As a result, an alternate area is assigned to the defective area. The unread data block or redundant data is stored in the alternate area. In other words, the data block or redundant data is not left in the defective area. Therefore, after detection of a defective area, the disk array device accesses not to the defective area but to the alternate area, attempting to read the data block or redundant data. Consequently, delay of reading due to continuous access to the defective area as described at the outset of the present embodiment can be prevented.

In the present embodiment, to clarify the timing of assigning an alternate area, operation when a read response is received by each of the SCSI interfaces 4A to 4D and 4P has been described, with part of the operation omitted. When a read response is returned to each SCSI interface, the contents of the first list 82 is changed according to the time when the read response returned and the like. Described next is operation of updating the first list 82 when a read response is returned.

The notifying parts 42A to 42D and 42P generate a receive notification signal whenever the SCSI interfaces 4A to 4D and 4P receive a read response from the disk drives 5A to 5D and 5P, respectively, and transmits the receive notification to the reassignment part 8. The receive notification includes the ID of the second read request on which the received read response is based, and the LBA specified by the second read request. More specifically, assume that the SCSI interface 4A receives the read response including the ID "b" and the LBA "a". In this case, the SCSI interface 4A transmits the receive notification to the reassignment part 8. Note that the processing of updating the first list 82 is irrespective of whether the read response is an ACK or NAK.

Figure 33:
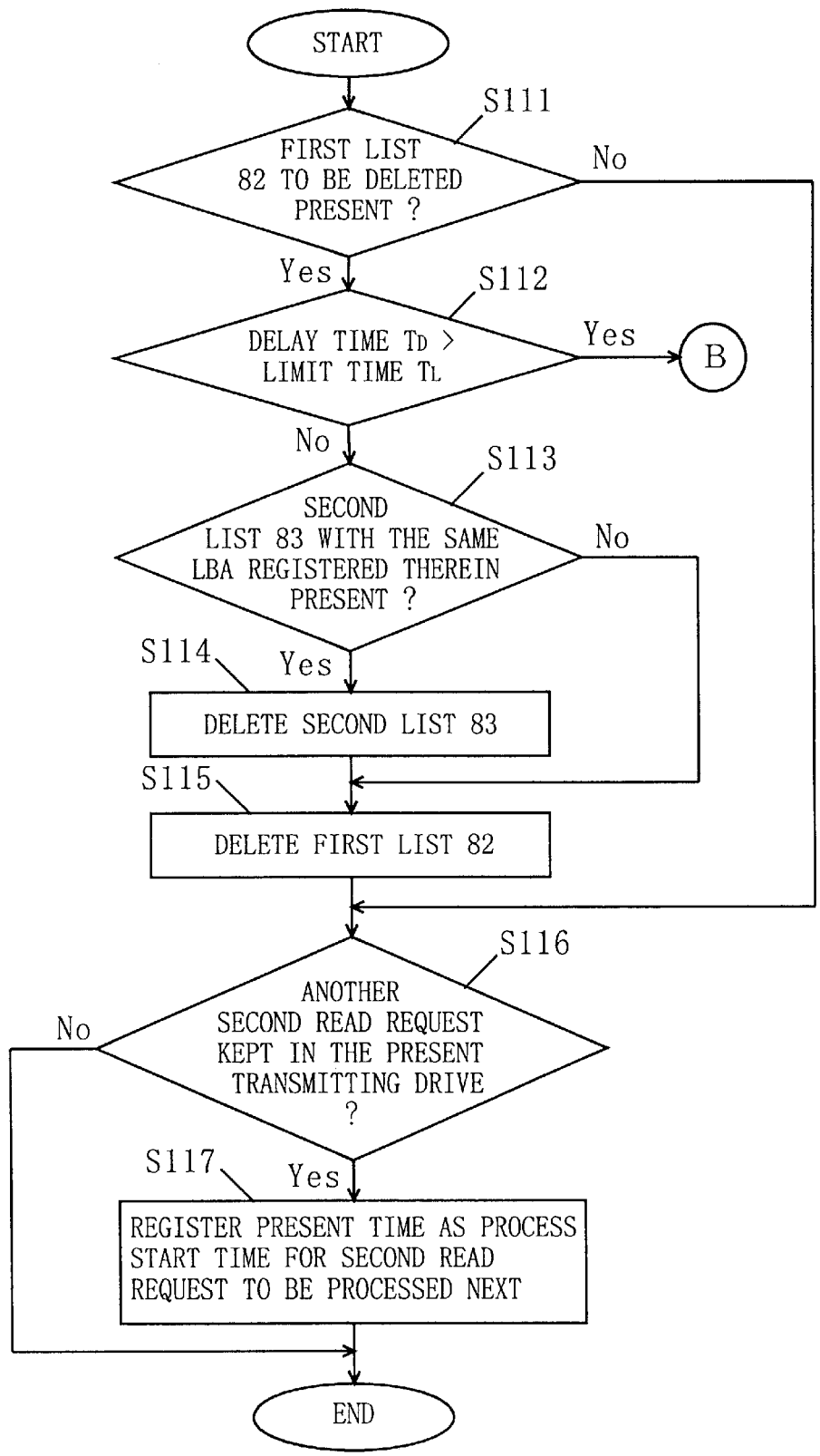
FIG. 33 is a flow chart showing the procedure of the reassignment part 8 after the arrival of a receive notification.

In response to the receive notification, the reassignment part 8 executes the procedure shown by a flow chart of FIG. 33. The reassignment part 8 first extracts the ID "b" and the LBA "a" from the received receive notification. The reassignment part 8 also search the first lists 82 being managed therein for the one in which the ID "b" is registered (hereinafter referred to as first list 82 to be deleted) (step S111). When the reassignment part 8 does not manage the first list 82 with the ID "b" registered therein even though the second read request has been transmitted, that means such list has been deleted in step S108 or S1013 of FIG. 32. In this case, that is, when the reassignment part 8 cannot find the first list 82 to be deleted in step S111, execution of steps S112 to S115 of FIG. 33 is not required, and the procedure directly advances from step S111 to S116.

On the other hand, when the reassignment part 8 finds the first list 82 to be deleted in step S111, $T_D > T_L$ has not been satisfied in step S101 of FIG 32 by the time immediately before receiving the receive notification (that is, immediately before the present read response is returned thereto). Thus, the reassignment part 8 determines whether $T_D > T_L$ is satisfied or not at this time based on the information registered in the first list 82 to be deleted (step S112). When the delay time $T_D$ exceeds the limit time $T_L$, the reassignment part 8 has to determine whether the alternate area has to be assigned to the defective area, and the procedure therefore advances to steps S103 and thereafter as shown in FIG. 32, which are shown by "B" in the flow chart of FIG. 33.

On the other hand, when the delay time $T_D$ does not exceed the limit time $T_L$, that means the reading of the disk drive 5A does not take a long time, and the LBA specified by "a" is not defective. Therefore, the reassignment part 8 determines whether the reassignment part 8 manages the second list 83 in which the same LBA as that in the first list 82 to be deleted is registered (step S113). When managing such second list 83, the reassignment part 8 deletes the second list 83 (step S114), and the procedure advances to step S115. Otherwise, the procedure directly advances from step S113 to step S115, wherein the reassignment part 8 deletes the first list 82 to be deleted.

The reassignment part 8 determines whether another second read request is kept in the disk drive 5 (hereinafter referred to as present transmitting drive) from which the present read response was transmitted, based on the number of first lists 82 being managed for the present transmitting drive (step S116). When another second read request is kept, the process start time has not yet been registered in the first list 82 created in response to the other second read request (the next first list 82). The reassignment part therefore obtains the present time $T_P$ from the third timer 81, defining that processing of the other second read request is started at $T_P$ in the present transmitting drive. The reassignment part 8 registers the obtained present time $T_P$ as the process start time for the other second read request in the next first table 82 (step S117), and ends the procedure of FIG. 33.

On the other hand, when another second read request is not kept, the reassignment part 8 does not execute step S117, and ends the procedure of FIG. 33.

In step S85 of FIG. 28, the controller 7 transmits the read termination request for terminating reading of the redundant data to the reassignment part 8. The controller 7 also transmits, in step S812 of FIG. 28, the read termination request for terminating reading of the unnecessary data block or redundant data. As described above, each read termination request includes the LBA for specifying the storage location of the data block or redundant data reading of which is to be terminated. Described next is the procedure when the reassignment part 8 receives a read termination request with reference to FIG. 34.

The reassignment part 8 extracts the LBA from the received read termination request, determining whether reading of the data block or redundant data from the LBA has been started (step S121). More specifically, the reassignment part 8 first searches the first lists 82 being managed therein for the one with the LBA reading of which should be terminated registered therein. The reassignment part 8 then determines whether the process start time has been registered in the found first list 82 or not. As evident from above, the process start time is not necessarily registered on creation of the first list 82. Therefore, at start of the procedure of FIG. 34, the reassignment part 8 includes the first lists 82 with and without the process start time registered therein. Here, if the process start time has been registered in the first list 82, that means reading of the data block or redundant data from the corresponding LBA has been started. Therefore, based on whether the process start time has been registered in the found first list 82, the reassignment part 8 determines whether processing of the second read request corresponding to the first list 82.

Figure 34:
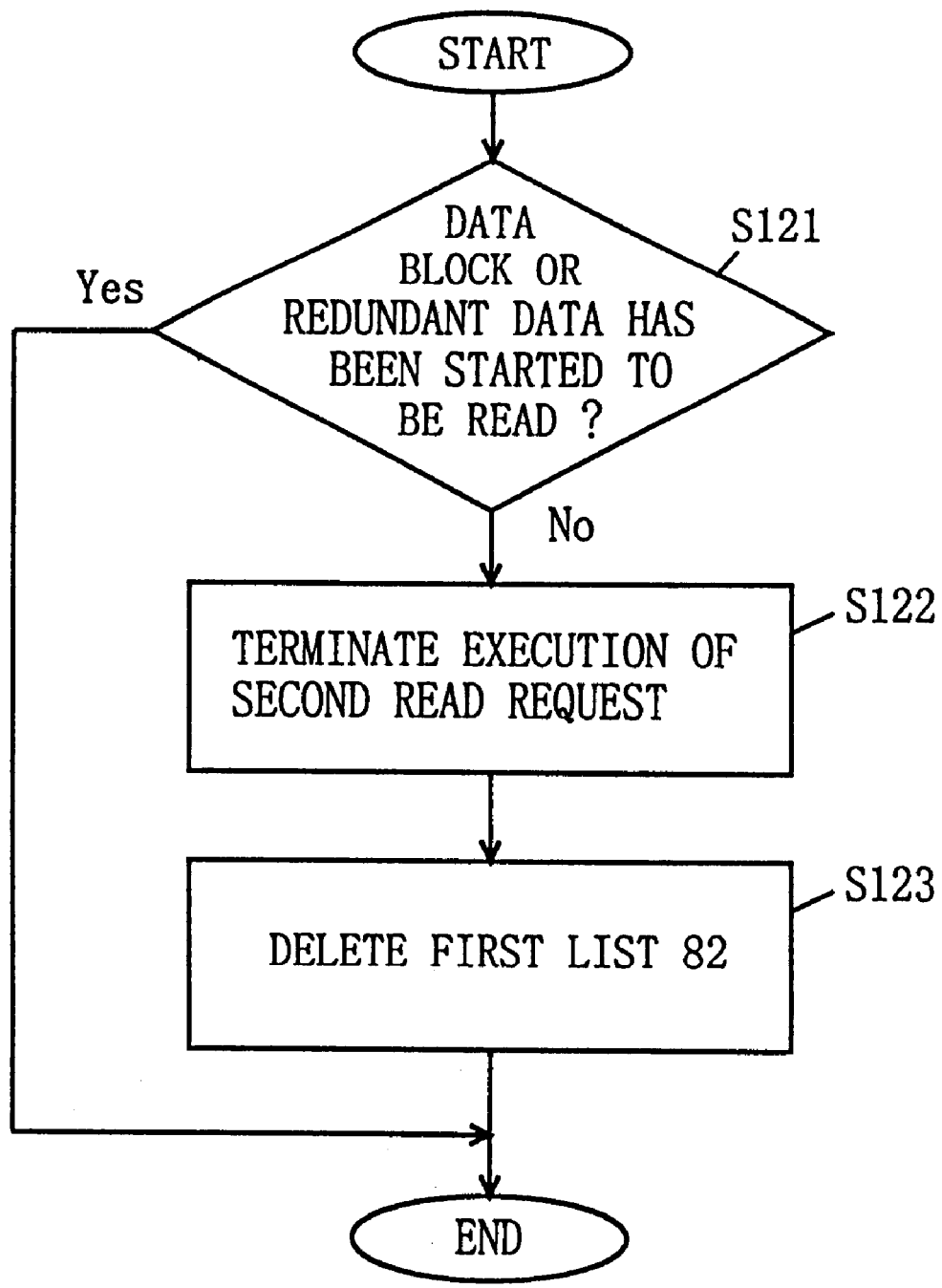
FIG. 34 is a flow chart showing the procedure of the reassignment part 8 after the arrival of a read termination request.

When determining in step S121 that reading from the LBA extracted from the read termination request has been started, the reassignment part 8 ends the procedure of FIG. 34.

On the other hand, when determining that the reading from the LBA has not yet been started, the reassignment part 8 transmits an ABORT_TAG message, one of the SCSI messages, to the disk drive 5 including the extracted LBA through the SCSI interface 4, terminating the execution of processing of the second read request corresponding to the found first list 82 (step S122). The SCSI interface 4 also transmits a NAK, indicating that the reading for the corresponding second read request has been failed, to the controller 7.

After step S122, the reassignment part 8 deletes the first list 82 found in step S121 (step S123).

As described above, the reassignment part 8 terminates the processing of the second read request in response to the read termination request from the controller 7 only when the conditions of step S111 are satisfied, allowing correct detection of the defective area in the disk drives 5A to 5D and 5P. If the reassignment part 8 unconditionally terminates the processing in response to the read termination request, $T_D > T_L$ is not satisfied for most of the second read requests. As a result, the reassignment part 8 may not be able to correctly detect the defective area.

(Seventh Embodiment)

In the disk array device according to the fifth embodiment, the storage location of the data block requiring much time to be read is stored in the faulty block table 75. By referring to such faulty block table 75, the controller 7 determines whether to transmit five or four second read requests, thereby realizing the disk array device capable of reading a large volume of data per unit of time. However, the more faulty data blocks requiring much time to be read are written into the faulty block table 75, the more often the disk array device transmits five second read requests. As a result, the volume of data to be read per unit of time become smaller. Therefore, a seventh embodiment is to solve the above problem, realizing a disk array device capable of reading a larger volume of data per unit of time.

Figure 35:
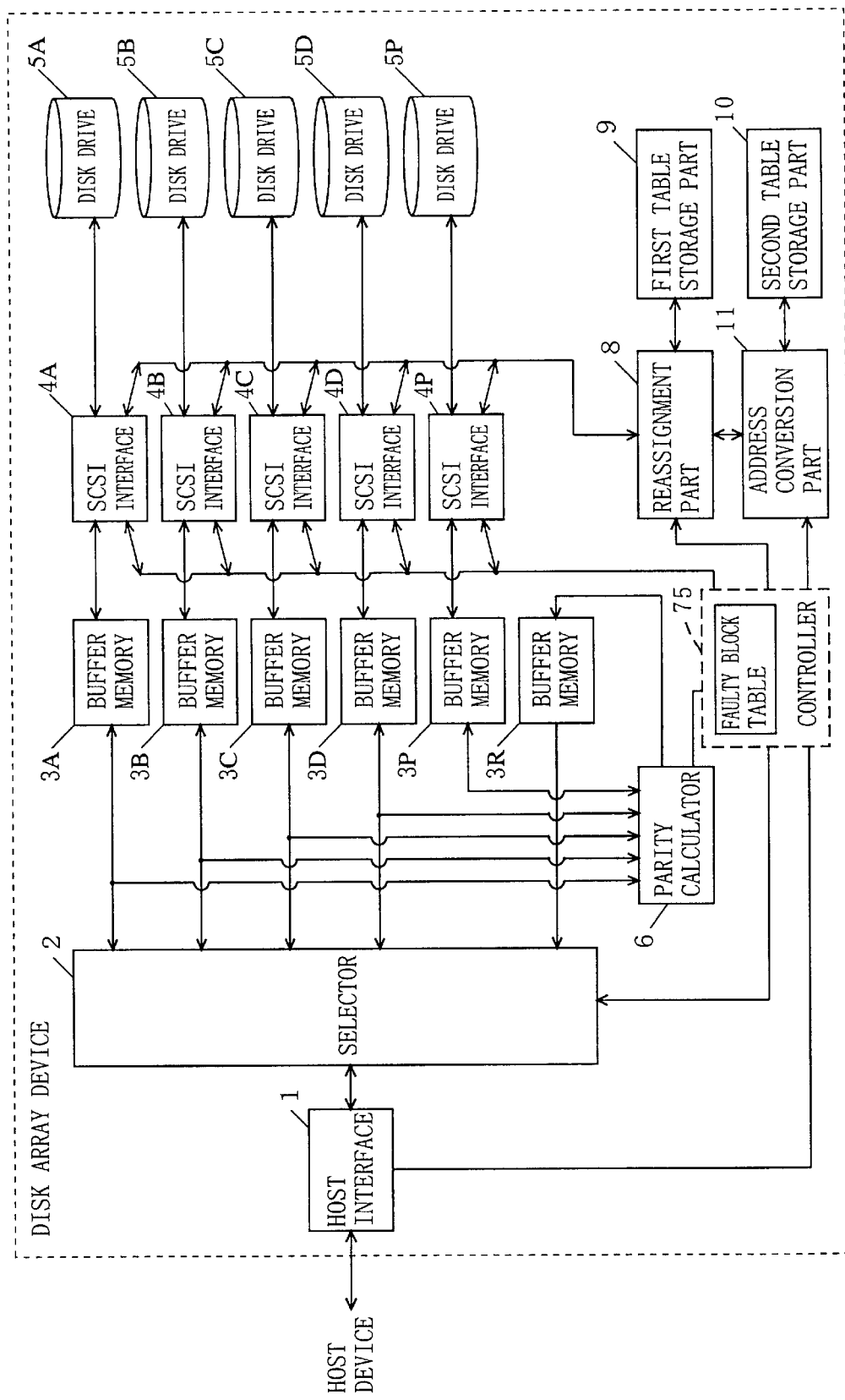
FIG. 35 is a block diagram showing the structure of a disk array device according to a seventh embodiment of the present invention.

FIG. 35 is a block diagram showing the structure of the disk array device according to the seventh embodiment of the present invention. The disk array device of FIG. 35 is different from that of FIG. 24 in that the controller 7 includes the same faulty block table 75 as that shown in FIG. 19. Since other structures is the same, the components in FIG. 35 are provided with the same reference numerals as those in FIG. 24 and their description is omitted herein.

Furthermore, note that, in the present embodiment, the redundant data is distributed across the disk drive 5A to 5D and 5P as shown in FIG. 20.

Figure 36:
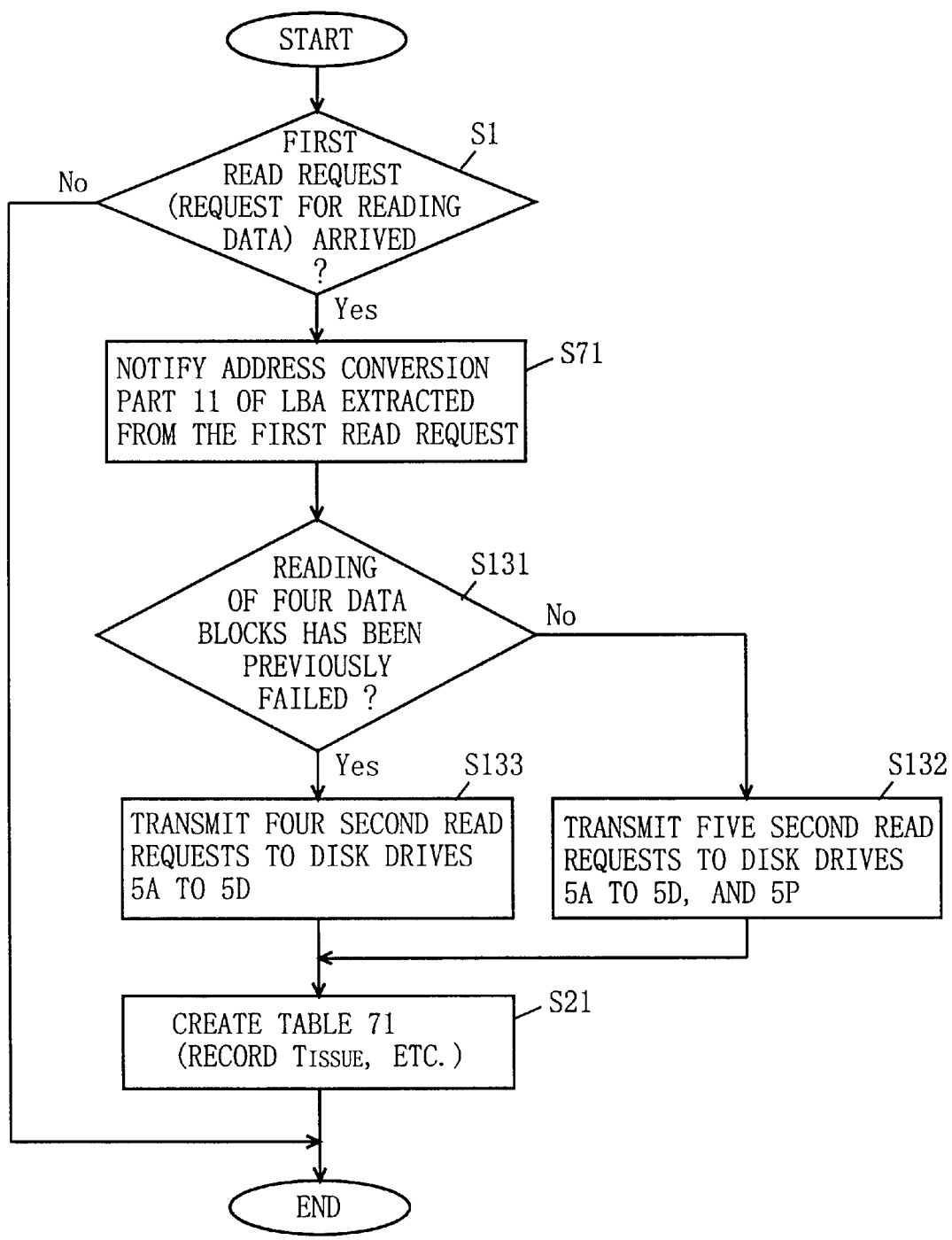
FIG. 36 is a flow chart showing the procedure of the controller 7 after the arrival of a first read request.

Like the sixth embodiment, in response to the first read request, the present disk array device also starts read operation that is distinctive of the present embodiment, which is now described in detail with reference to a flow chart in FIG. 36. FIG. 36 is the flow chart showing the procedure from the time when the first read request arrives at the controller 7 to the time when a set of second reading requests are transmitted. Since the flow chart in FIG. 36 partially includes the same steps as those in FIG. 26, the steps in FIG. 36 are provided with the same step numbers as those in FIG. 26 and their description is simplified herein.

When provided with the first read request (step S1), the controller 7 fetches the LBA's specifying the storage locations of the parity group to be read from the address conversion part 11 (step S71). In other words, the controller 7 fetches the LBA's indicative of the storage locations of the data blocks and redundant data of the same parity group.

The controller 7 next determines whether any four of the disk drives 5A to 5D and 5P have previously failed to read the four data blocks to be read this time (step S131). For determination in step S131, the controller 7 refers to the faulty block table 75, in which storage locations of the data block reading of which has been previously failed are listed, as shown in FIG. 22 (Note that the storage locations are indicated by the LBA's in the present embodiment). Therefore, the controller 7 can easily make determination in step S131 by comparing the LBA of each data block fetched from the address conversion part 11 with the LBA's listed in the faulty block table 75.

When determining in step S131 that reading of the four data blocks has not previously failed, the controller 7 determines that there is a low possibility of failing to read the four data blocks this time, and issues a set of second read requests to read the parity group (step S132). In step S132, however, the second read requests are issued only to the four disk drives storing the data blocks, and not to the remaining disk drive storing the redundant data.

When determining in step S131 that reading of the four data blocks has previously failed, the controller 7 determines that there is a high possibility of failing to read the four data blocks this time, and issues a set of second read requests to read the parity group (step S133). In step S133, however, the second read requests are issued to the four disk drives storing the data blocks as well as the remaining disk drive storing the redundant data.

Figure 37:
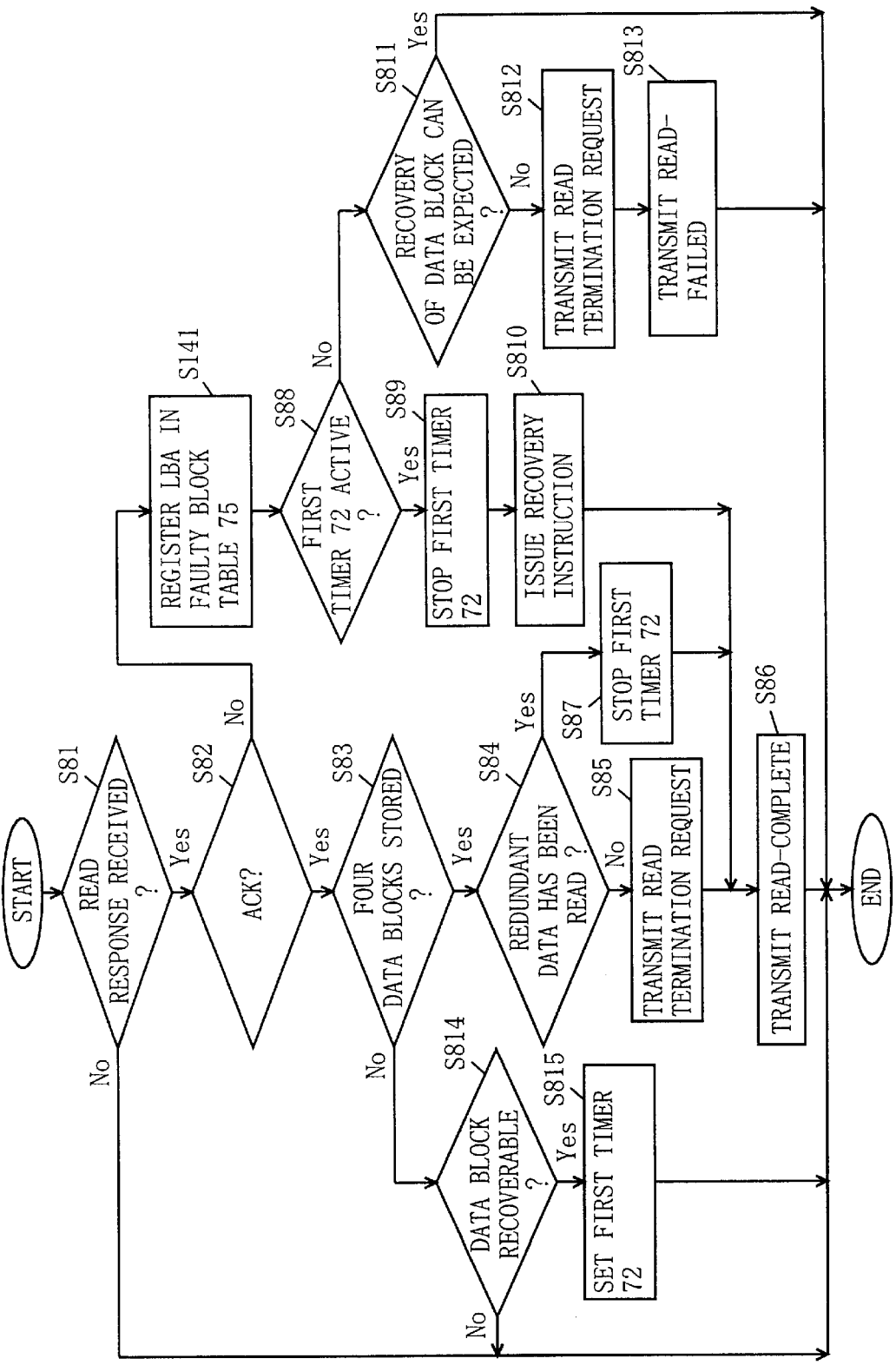
FIG. 37 is a flow chart showing the procedure of the controller 7 after a REASSIGN-COMPLETED notification.

The second read requests issued in step S132 are processed by the four disk drives storing the data blocks of the same parity group, while those issued in step S133 are processed by the five disk drives storing the data blocks and redundant data of the same parity group. In either case, each of the four or five disk drives generates a read response indicating reading has succeeded or failed. The four or five disk drives transmit the generated read responses through the SCSI interfaces connected thereto to the controller 7. The controller 7 executes the procedure shown in FIG. 37 whenever the read response arrives. The flow chart of FIG. 37 includes the same steps as those in the flow chart of FIG. 28, and further includes step S141. Therefore, the steps in FIG. 37 are provided with the same step numbers as those in FIG. 28 and their description is omitted herein.

When determining that a NAK has arrived (step S82), the controller 7 extracts the LBA from the NAK. The LBA included in the NAK indicates the storage location of the data block or redundant data which has failed to be read. The controller 7 registers the LBA extracted from the NAK in the faulty block table 75 (step S141). Note that step S141 may be executed at any time as long as after it is determined in step S82 that the present read response is a NAK. That is, the execution timing of step S141 is not restricted to the timing immediately after determined in step S82 that the present read response is a NAK.

The reassignment part 8 executes the procedure described above in the sixth embodiment. Description of this procedure is therefore omitted herein. The important point here is that, when the reassignment ends, the reassignment part 8 transmits a REASSIGN-COMPLETED notification, indicating the reassignment has ended, to the controller 7. This REASSIGN-COMPLETED notification includes the LBA indicative of the storage location that is determined to be defective by the reassignment part 8. Since it takes much time to read from the defective area, the LBA indicative of such defective storage area is also written in the faulty block table 75.

When receiving the REASSIGN-COMPLETED notification, the controller 7 executes the procedure shown in FIG. 38. First, upon receiving REASSIGN-COMPLETED notification, the controller 7 determines that the reassignment part 8 has executed reassignment (step S151), and the procedure advances to step S152. In step S152, the controller 7 extracts the LBA from the REASSIGN-COMPLETED notification. The controller 7 then accesses to the faulty block table 75, and deletes the LBA matching the one extracted from the REASSIGN-COMPLETED notification from the faulty block table 75, thereby updating the faulty block table 75 (step S152).

As described above, also in the disk array device according to the seventh embodiment, the storage location requiring much time to be read is assumed to be defective, and an alternate storage location is assigned thereto. That is, the storage location of the data block or redundant data is changed from the defective area to the alternate area. In response to such reassignment, the controller 7 updates the faulty block table 75, preventing the data block or redundant data from being kept stored in the defective area for a long time. Furthermore, in the present embodiment, the number of LBA's written in the faulty block table 75 for every reassignment decreases. Consequently, as possibilities that the storage location (LBA) of the data block from the address conversion part 11 is written in the faulty block table 75 decreases, the controller 7 can transmit four second read requests more often. As a result, it is possible to realize the disk array device capable of reading a larger volume of data per unit of time.

In the above described first to seventh embodiments, the disk array device includes five disk drive. The number of disk drives, however, may be changed according to design requirements of the disk array device such as the data length and the data block length, and therefore is not restricted to five. Note that "m" in the claims corresponds to the number of disk drives included in the disk array device.

Furthermore, in the above described first to seventh embodiments, the host device transmits data of 2048 bytes to the disk array device of each embodiment, and the disk array device divides the received data into data blocks of 512 bytes each. The sizes of the data and the data block are, however, just one example for simplifying description, and are not restricted to 2048 bytes and 512 bytes, respectively.

(Eighth Embodiment)

As described in the Background Art section, the disk array device executes reconstruction processing in some cases. In an eighth embodiment of the present invention, reconstruction is to recover the data block or redundant data in a faulty disk drive and rewrite the recovered data block or redundant data in a disk drive (another disk drive or a recording area without a defect in the faulty disk drive). Furthermore, the disk array device has to transmit video data so that the video being replayed at the host device is not interrupted. To prevent this interruption of video, when a read request for video data arrives, the disk array device has to process the read request in real time to transmit the video data. The eighth embodiment realizes a disk array device capable of transmitting video data without interruption and executing reconstruction.

Figure 39:
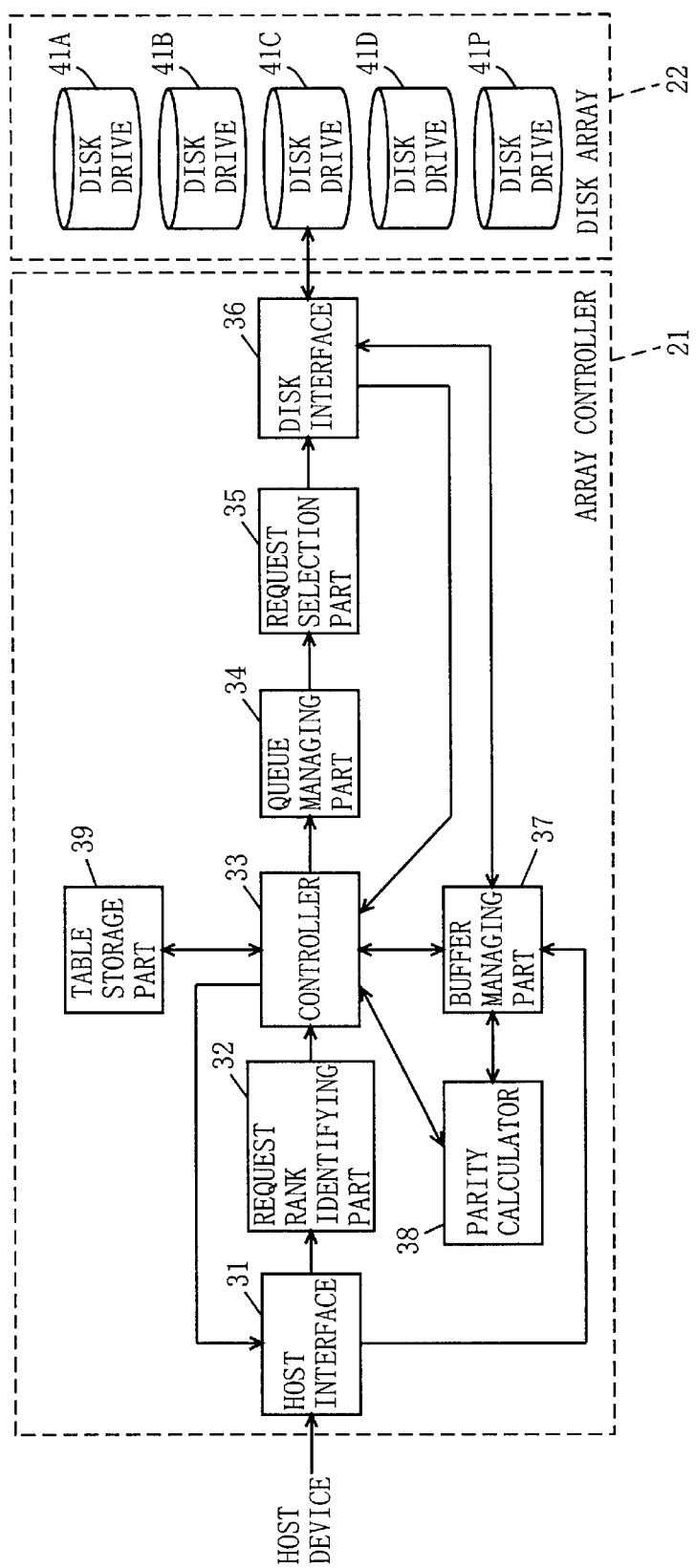
FIG. 39 is a block diagram showing the structure of a disk array device according to an eighth embodiment of the present invention.

FIG. 39 is a block diagram showing the structure of the disk array device according to the eighth embodiment of the present invention. In FIG. 39, the disk array device is constructed of a combination of RAID-4 and RAID-5 architectures, including an array controller 21 and a disk array 22. The array controller 21 includes a host interface 31, a request rank identifying part 32, a controller 33, a queue managing part 34, a request selector 35, a disk interface 36, a buffer managing part 37, a parity calculator 38, and a table storage part 39. The disk array 22 is constructed of five disk drives 41A to 41D and 41P.

Figure 40:
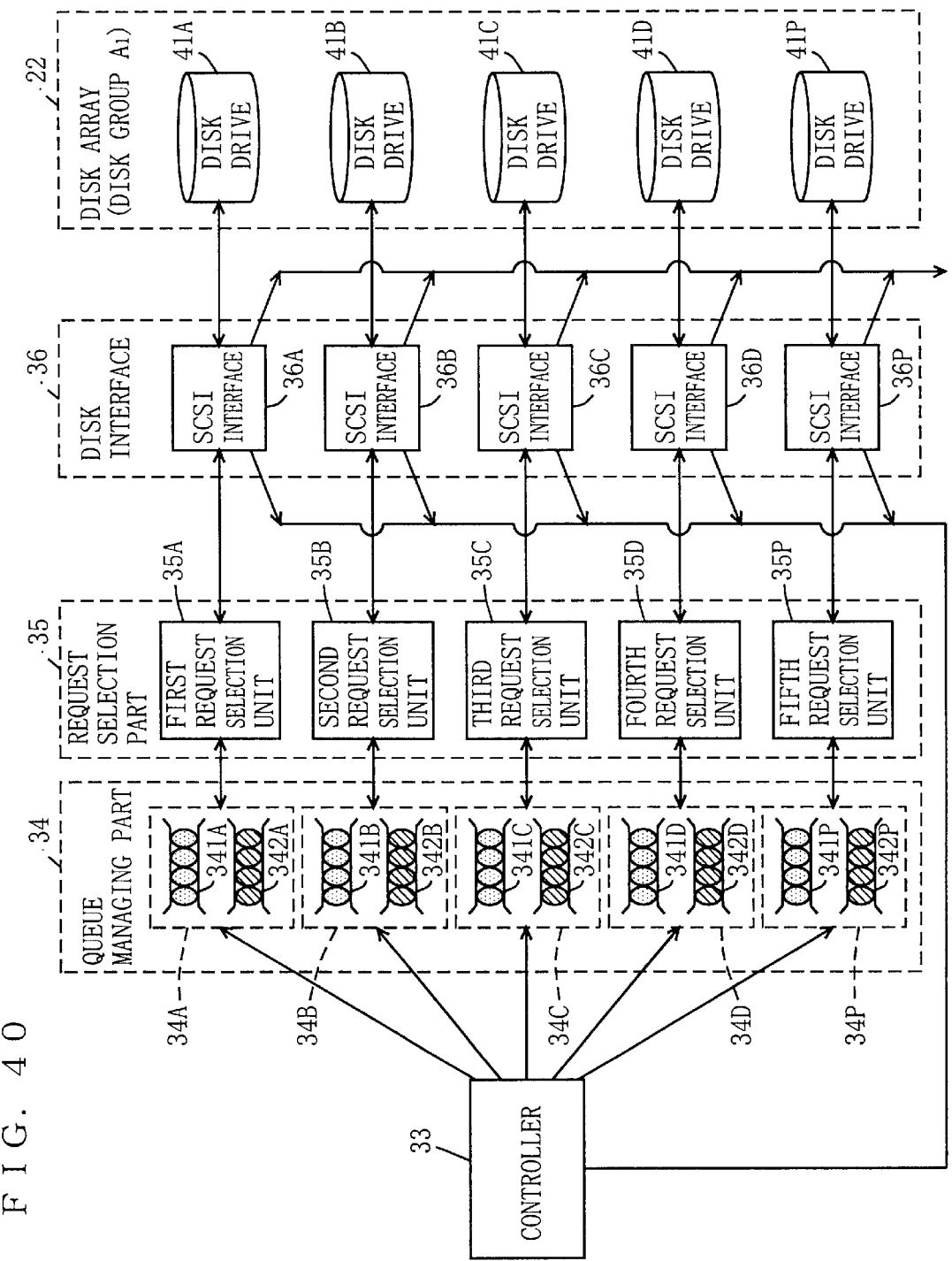
FIG. 40 is a block diagram showing the detailed structure of a queue managing part 34, a request selection part 35, and a disk interface 36 shown in FIG. 39.

Illustration of the structure is partly simplified in FIG. 39 as space does not allow detailed illustration. With reference to FIG. 40, described next in detail is the structure of the queue managing part 34, the request selector 35, and the disk interface 36. In FIG. 40, the queue managing part 34 is constructed of queue managing units 34A to 34D and 34P, which are assigned to the disk drives 41A to 41D and 41P, respectively. The queue managing unit 34A manages a non-priority queue 341A and a priority queue 342A. The queue managing unit 34B manages a non-priority queue 341B and a priority queue 342B. The queue managing unit 34C manages a non-priority queue 341C and a priority queue 342C. The queue managing unit 34D manages a non-priority queue 341D and a priority queue 342D. The queue managing unit 34P manages a non-priority queue 341P and a priority queue 342P. The request selector 35 is constructed of request selection units 35A to 35D and 35P, which are assigned to the disk drives 41A to 41D and 41P, respectively. The disk interface 36 is constructed of SCSI interfaces 36A to 36D and 36P, which are assigned to the disk drives 41A to 41D and 41P, respectively.

Figure 41:
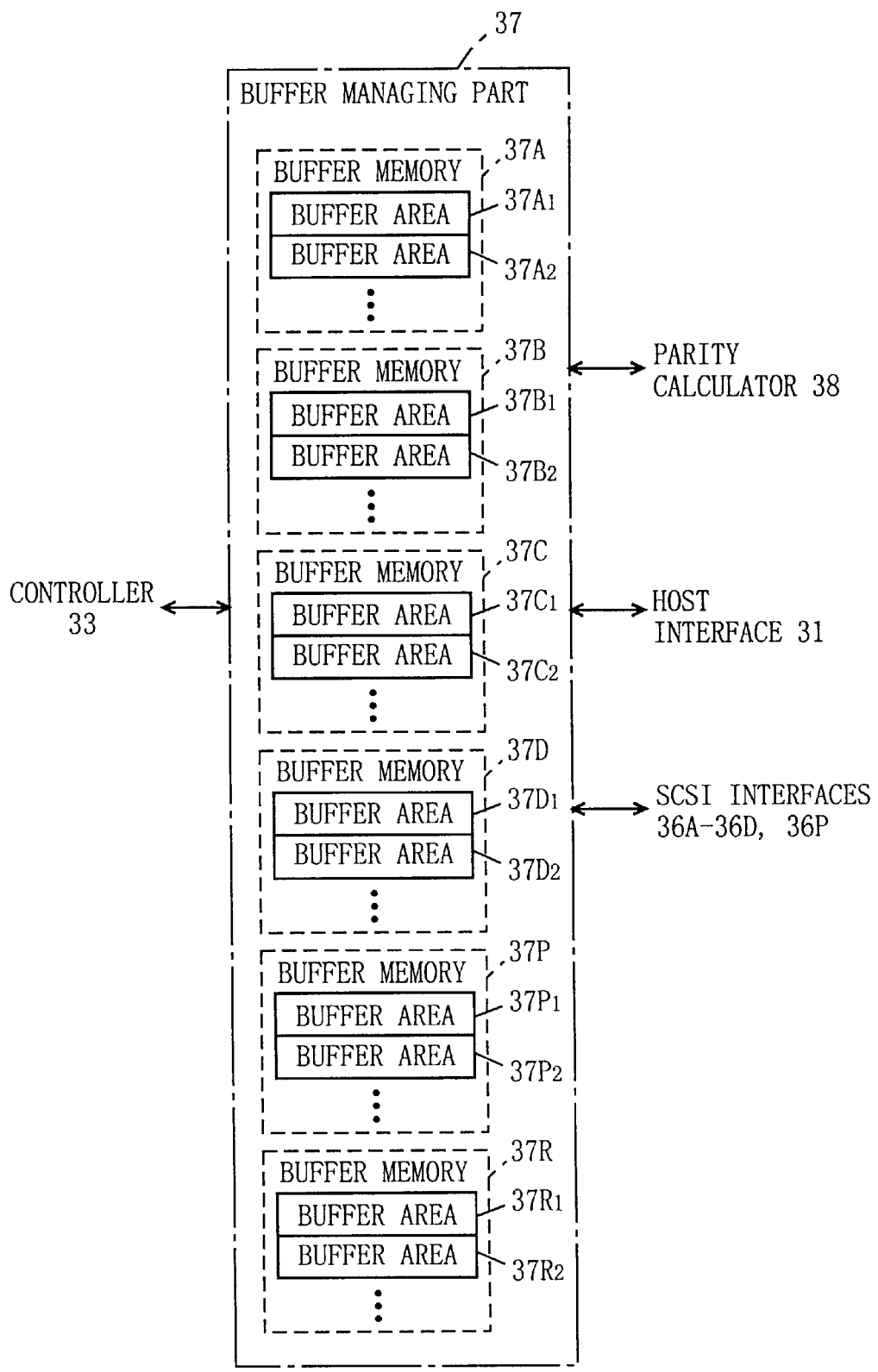
FIG. 41 is a diagram showing the detailed structure of a buffer managing part 37 shown in FIG. 39.

Described next is the detailed structure of the buffer managing part 37 with reference to FIG. 41. In FIG. 41, the buffer managing part 37 manages buffer memories 37A to 37D, 37P, and 37R. The buffer memory 37A is divided into a plurality of buffer areas $37A_1$, $37A_2$ . . . each buffer area having a capacity of storing a data block or redundant data, which will be described below. Further, an identifier (normally, top address of each buffer area) is assigned to each buffer area to uniquely identify each buffer area. The identifier of each buffer area is hereinafter referred to as a pointer. Each of the other buffer memories 37B to 37D, 37P, and 37R is also divided into a plurality of buffer areas. A pointer is also assigned to each buffer area, like the buffer area $37A_1$.

Referring back to FIG. 40, the disk group of the disk drives 41A to 41D and 41P is now described. Since the architecture of the present disk array device is based on the combination of RAID-3 and RAID-4, the data blocks and redundant data of the same parity group are distributed across the disk drives 41A to 41D and 41P, which form one disk group. Here, the parity group is, as described in the Background Art section, a set of data blocks and redundant data generated based on one piece of data transmitted from the host device. The disk group is a set of plurality of disk drives into which the data blocks and redundant data of the same parity group are written. In the present embodiment, the disk group of the disk drives 41A to 41D and 41P is hereinafter referred to as a disk group "A". Further, a plurality of LUN's (Logical Unit Number) are assigned to each disk group. The plurality of LUN's are different for each disk group, and the LUN's in one disk group are also different each other. Such LUN's are used for specifying a disk group to be accessed and the level of priority of an access request. In the present embodiment, "non-priority" and "priority" are previously defined as the level of priority of an access request. Two LUN's "0" and "1" are assigned to the disk group A. The LUN "0" represents that the access request is given "non-priority", while the LUN "1" represents the access request is given "priority".

Described briefly next is the host device placed outside the disk array device. The host device is connected to the host interface 31 so as to be able to bi-directionally communicate therewith. The I/O interface between the host device and the host interface is based on SCSI (Small Computer System Interface). To write or read data, the host device requests access to the disk array device. The procedure of access is now described below. First, the host device gains control of the SCSI bus through the ARBITRATION phase. The host device then specifies a target disk array device through the SELECTION phase. The host device then transmits an Identify message (refer to FIG. 42a), one of the SCSI messages, to specify the LUN, thereby specifying the disk group to be accessed and the level of priority of the access request. Further, the host device transmits a Simple_Queue_Tag (refer to FIG. 43b), one of the SCSI messages, to transmit a plurality of access requests to the disk array device. To read data, the host device sends a Read_10 command of a SCSI command (refer to FIG. 43a) to the disk array device. The Read_10 command specifies the LBA specifying the storage location of the data to be read and the length of the data. To write data, the host device sends a Write_10 command (refer to FIG. 43b) to the disk array device. The Write_10 command specifies the LBA specifying the storage location of the data to be written and the length of the data. The host device further transmits the data to be written to the disk array device. In this manner, the host device requests access to the disk array device.

The data to be written into the disk array device is now described. The transmission data from the host device includes two types: real-time data and non-real-time data. The real-time data is the data to be processed in the disk array device in real time such as video data. The non-real-time data is the data to be processed in the disk array device not necessarily in real time such as computer data. The real-time data and non-real-time data are large in general. A plurality of host devices are connected to the disk array device, sharing one SCSI bus. Assuming that such large real-time data or non-real-time data is written into the disk array device all at once, the SCSI bus is used exclusively by a specific host device, and cannot be used by the other host devices. To prevent such detriment, the host device divides the large real-time data or non-real-time data into a predetermined size, and transmits the data to the disk array device by that size. In other words, the host device sends only part of the data by the predetermined size in one request, and executes this sending operation several times to write the whole data, thereby preventing the SCSI bus from being used exclusively by a specific host device.

Described next is how the disk array device operates when the host device requests the disk group "A" to write non-real-time data with reference to a flow chart of FIG. 44. Since the non-real-time data is processed in the disk array device not necessarily in real time, the LUN composed of a set of "0" and "A" is set in the Identify message to be sent during the access request. Further, the host device sends the non-real-time data to be written and a Write_10 command to the disk array device.

When receiving the SCSI message, SCSI command and data (non-real-time data) to be written from the host device (step S161), the host interface 31 determines that the host device requests access, and the procedure advances to step S162. The host interface 31 then generates a first process request based on the access request from the host device.

FIG. 45 shows a format of the first process request to be generated by the host interface 31. In FIG. 45, the first process request includes information on a command type, an identification number, LUN, control information, LBA, and data length. As the command type, the operation code of the Write_10 command is set. For convenience in description, assume herein that "W" is set in the command type for the Write_10 command. With this command type, the host interface 31 specifies that the generated first process request is for writing. As the identification number, the number indicative of a queue tag included in the received Simple_Queue_Tag command is set. As the LUN, the number indicative of the LUN included in the received Identify command from the host interface 31 is set. When the host device requests the disk group "A" to write non-real-time data, a set of "0" indicative of priority of the present access request and "A" indicative of the disk group to be accessed is set as the present LUN's. As the control information, cache control information such as DPO and FUA included in the Read_10 or Write_10 received by the host interface 31 is set. As the LBA, the value specifying the LBA included in the Read_10 or Write_10 is set. As the data length, the length of the data to be read by the Read_10 or to be written by the Write_10 is set. Furthermore, only when the host interface 31 receives Write_10, the data is set in the first process request. The data in the first process request is the data itself (non-real-time data or real-time data) transmitted with the Write_10 from the host device. The first process request generated in the above manner is transmitted to the request rank identifying part 32 (step S162).

When receiving the first process request, the request rank identifying part 32 extracts the information on the LUN from the request (step S163). The request rank identifying part 32 further identifies the level of priority of the received first process request, determining to which disk group is requested to be accessed (step S164). Since the set of "0" and "A" is extracted as the LUN's from the present first process request, the request rank identifying part 32 identifies the level of priority as "non-priority" and the disk group as "A". After the identification ends, the request rank identifying part 32 transmits the received first process request, the identification results ("non-priority" and the disk group "A") to the controller 33 (step S165).

When receiving the first process request and identification results from the request rank identifying part 32, the controller 33 determines whether the first process request has priority or not (step S166). When the information on priority is "non-priority", the controller 33 determines whether the operation called "Read_Modify_Write" is required or not (step S167). More specifically, in step S167,the controller 33 determines whether to read the data blocks required for updating the redundant data stored in the disk drive 41P (these data block are hereinafter referred to as data blocks for update) or not. When the controller 33 determines not to read the data blocks for update, the procedure directly advances to step S1612, which will be described later. That is, write operation according to the RAID-3 architecture is executed.

On the other hand, when determining to read the data blocks for update, the controller 33 generates first read requests to read the data blocks for update. The first read request has a format shown in FIG. 46, which is different from that shown in FIG. 45 in that the information of the LUN is replaced with the level of priority and the disk group. Since the level of priority is "non-priority" and the disk group is "A" in the present first process request, the controller 33 enqueues the generated first read requests to the non-priority queue 341A to 341D assigned to the disk drives 41A to 41D, respectively (step S168).

Each of the request selection units 35A to 35D and 35P executes the processing of step S169. Specifically, when the disk drive 41A ends processing (read or write), the request selection unit 35A first determines whether any request generated by the controller 33 such as the second read request has been enqueued to the priority queue 342A assigned to the disk drive 41A. When determining that a request has been enqueued, the request selection unit 35A selects and dequeues one of the requests from the priority queue 342A, and transmits the dequeued request to the SCSI interface 36A assigned to the disk drive 41A. The SCSI interface 36A instructs the disk drive 41A to execute the received request.

When determining that any request has not been enqueued to the priority queue 342A, that is, the priority queue 342A is empty, the request selection unit 35A determines whether any request generated by the controller 33 such as the first read request has been enqueued to the non-priority queue 341A assigned to the disk drive 41A. When determining that a request has been enqueued, the request selection unit 35A selects and dequeues one of the requests from the non-priority queue 341A. The SCSI interface 36A instructs the disk drive 41A to execute the request dequeued from the non-priority queue 341A.

When determining that any request has not been enqueued to the priority queue 341A, that is, the priority queue 342A and the non-priority queue 341A are both empty, the request selection unit 35A waits for the disk drive 41A ending the present processing (step S169).

As described above, the request selection unit 35A transmits the request in the priority queue 342A to the SCSI interface 36A with higher priority than the request in the non-priority queue 341A. Since the other request selection units 35B to 35D and 35P perform the same processing as described for the request selection unit 35A, its description is omitted herein.

When the request is sent from the SCSI interfaces 36A to 36D and 36P, the disk drives 41A to 41D and 41P respectively process the received request (step S1610). Therefore, the first read requests enqueued to the non-priority queues 341A to 341D are processed by the disk drives 41A to 41D with lower priority than the requests enqueued to the priority queues 342A to 342D. Therefore, the data blocks for update of non-real time data are read by the disk drives 41A to 41D without affecting reading and writing of the real-time data.

When reading of the data blocks for update has been successfully completed, the disk drives 41A to 41D transmit the read data blocks for update and a READ-COMPLETED, a signal indicating that reading has been successfully completed, to the SCSI interfaces 36A to 36D, respectively.

When receiving the data blocks for update and the READ-COMPLETED, the SCSI interfaces 36A to 36D store the data blocks for update in predetermined buffer areas $37A_i$ to $37D_i$, (i=1, 2, . . . ). The buffer areas $37A_i$ to $37D_i$ are specified by the controller 33. That is, pointers indicative of the buffer areas $37A_i$ to $37D_i$ are set in the first read requests which have triggered reading of the data blocks for update. According to the pointers in the first read requests, the SCSI interfaces 36A to 36D specify the buffer areas $37A_i$ to $37D_i$ in which the data blocks for update are to be stored. The SCSI interfaces 36A to 36D transmit the received READ-COMPLETED's to the controller 33.

Based on the READ-COMPLETED's, the controller 33 determines whether the disk drives 41A to 41D have ended reading of the data blocks for update. When the data blocks for update have been stored in the buffer areas $37A_i$ to $37D_i$ (step S1611), the controller 33 extracts the non-real time data included in the present process request. When "Read_Modify_Write" is executed, since the extracted non-real-time data belongs to the same parity group as that of the data blocks for update stored in the buffer areas $37A_i$ to $37D_i$, the data blocks composing the parity group to be updated are updated. The controller 33 stores the extracted non-real-time data in the buffer areas in which the data blocks to be updated are stored. For example, to update the entire data block in the buffer area $37A_i$, the controller 33 writes the extracted non-real-time data on the data block in the buffer area $37A_i$.

The controller 33 then instructs the parity calculator 38 to operate calculation of parity. In response to the instruction, the parity calculator 38 operates calculation of parity to create new redundant data according to the present updating of the non-real-time data. The created redundant data is stored in the buffer area $37R_i$ (i=1, 2, . . . ). Thus, the entire data blocks and redundant data (the parity group) to be updated are stored in the buffer areas.

The procedure then advances to step S1612. The controller 33 first generates a first write request to write the updated redundant data in the disk drive 41P. The controller 33 then reconfirms that the level of priority of the present first process request is "non-priority. After reconfirmation, the controller 33 enqueues the generated first write request to the non-priority queue 341P assigned to the disk drive 41P (step S1612).

The controller 33 next replaces the information on the LUN in the present first process request with the received information on priority and the disk group, thereby converting the first process request into second write requests to the disk drives 41A to 41D. The controller 33 generates second write requests as many as the number of disk drives 41A to 41D. Here, the second write request has the same format as that of the first read request (refer to FIG. 46). The controller 33 then enqueues the generated second write requests to the non-priority queues 341A to 341D assigned to the disk drives 41A to 41D, respectively, according to the information of "non-priority" and the disk group "A" (step S1613).

Each of the request selection units 35A to 35D and 35P executes processing as described above in step S169. Thus, the first write request enqueued to the non-priority queue 341P is processed by the disk drive 41P with lower priority. The new redundant data stored in the buffer area $37P_i$ is therefore written into the disk drive 41P. The second write requests in the non-priority queues 341A to 341D are also processed by the disk drives 41A to 41D, respectively, with lower priority. Thus, the data blocks in the buffer areas $37A_i$ to $37D_i$ are written in the disk drives 41A to 41D. Thus, according to the access request by the host device, the non-real-time data is made redundant, and distributed across the disk drives 41A to 41D and 41P in the disk array 22.

After completing its writing, each disk drive generates a WRITE-COMPLETED, a signal indicating that writing has been completed. The generated WRITE-COMPLETED's are transmitted through the SCSI interfaces 36A to 36D and 36P to the controller 33. When receiving all WRITE-COMPLETED's generated by the disk drives 41A to 41D and 41P (step S1614), the controller 33 determines that the non-real-time data requested from the host device has been completely written in the disk drives. Further, the controller 33 notifies the host device through the host interface 31 that writing of the non-real-time data has been ended (step S1615).

Described next is how the present disk array device operates when the host device requests the parity group "A" to write real-time data with reference to a flow chart shown in FIG. 44. Since real-time data has to be processed in the disk array device in real time, the LUN composed of a set of "1" and "A" is set in the Identify message (refer to FIG. 42a) to be sent during the process of access request. Further, the host device transmits the real-time data to be written and a Write_10 command to the disk array device.

When receiving the access request (a series of the SCSI message, the SCSI command, and the real-time data) transmitted from the host device (step S161), the host interface 31 generates a second process request, and transmits the request to the request rank identifying part 32 (step S162). Here, the second process request has the same format as that of the first process request (refer to FIG. 45).

When receiving the second process request, the request rank identifying part 32 identifies the level of priority of the received second process request, determining to which disk group is requested to be accessed (steps S163 and S164). Since the set of "1" and "A" is extracted as the LUN from the present second process request, the request rank identifying part 32 identifies the level of priority as "priority" and the disk group as "A". After the identification ends, the request rank identifying part 32 transmits the received second process request, the identification results ("priority" and the disk group "A") to the controller 33 (step S165).

When the level of priority received is "priority", the procedure from steps S1616 to S1622 is similar to that from steps S167 to S1613, and therefore mainly described below is the difference between steps S167 to S1613 and steps S1616 to S1622.

By referring to the information on priority included in the received identification results, the controller 33 determines whether the first process request has priority or not (step S166). Even when the information on priority is "priority", the controller 33 also determines whether the operation called "Read_Modify_Write" is required or not (step S1616). More specifically, in step S1616, the controller 33 determines whether to read the data blocks for update or not. When the controller 33 determines not to read the data blocks for update, the procedure directly advances to step S1621. That is, write operation according to the RAID-3 architecture is executed.

On the other hand, when determining to read the data blocks for update, the controller 33 generates second read requests to read the data blocks for update. The second read request has the same format as that of the first read request (refer to FIG. 46), but the information on priority "non-priority" is replaced with "priority". Since the level of priority is "priority" and the disk group is "A" in the present second process request, the controller 33 enqueues the generated second read requests to the priority queues 342A to 342D assigned to the disk drives 41A to 41D, respectively (step S1617).

Each of the request selection units 35A to 35D and 35P executes step S1618, which is the same as step S169. Each of the disk drives 41A to 41D then executes step S1619, which is the same as step S1610. As a result, the second read requests in the priority queues 342A to 342D are processed by the disk drives 41A to 41D with higher priority than those in the non-priority queues 341A to 341D. When processing of the second read requests is normally ended, each of disk drives 41A to 41D transmits the read data block for update and a READ-COMPLETED to each corresponding buffer areas $37A_i$ to $37A_i$ and the controller 33 through the SCSI interfaces 36A to 36D, respectively.

If the data blocks for update have been stored in the buffer areas $37A_i$ to $37A_i$ (step S1620), the controller 33 extracts the real-time data included in the second process request, and stores the extracted real-time data in the buffer area in which the data block to be updated is stored.

The controller 33 then instructs the parity calculator 38 to operate calculation of parity. In response to this instruction, the parity calculator 38 operates calculation of parity, creating new redundant data according to the update of the real-time data, and storing the same in the buffer area $37R_i$ (i=1, 2, . . . ).

The procedure then advances to step S1622, wherein the controller 33 generates a third write request for writing the updated redundant data in the disk drive 41P. The controller 33 reconfirms that the level of priority of the present second process request is "priority". After reconfirmation, the controller 33 enqueues the generated third write request to the priority queue 342P (step S1621).

The controller 33 next replaces the information on the LUN in the present second process request with the received information on priority and the disk group, thereby converting the second process request into fourth write requests to the disk drives 41A to 41D. The controller 33 generates fourth write requests as many as the number of disk drives 41A to 41D. Here, the fourth write request has the same format as that of the first read request (refer to FIG. 46). The controller 33 then enqueues the generated fourth write requests to the priority queues 342A to 342D according to the information of "priority" and the disk group "A" (step S1622).

Each of the request selection units 35A to 35D and 35P executes processing of step S1618. Thus, the third write request enqueued to the priority queue 342P is processed by the disk drive 41P with lower priority. The new redundant data stored in the buffer area $37P_i$ is therefore written into the disk drive 41P. The fourth write requests in the priority queues 342A to 342D are also processed by the disk drives 41A to 41D, respectively, with priority. Thus, the data blocks in the buffer areas $37A_i$ to $37D_i$ are written in the disk drives 41A to 41D. Thus, according to the access request by the host device, the real-time data is made redundant, and distributed across the disk drives 41A to 41D and 41P in the disk array 22.

After completing its writing, each disk drive transmits a WRITE-COMPLETED through the SCSI interfaces 36A to 36D and 36P to the controller 33. When receiving all WRITE-COMPLETED's generated by the disk drives 41A to 41D and 41P (step S1614), the controller 33 determines that the real-time data requested from the host device has been completely written in the disk drives. Further, the controller 33 notifies the host device through the host interface 31 that writing of the real-time data has been ended (step S1615).

Described next is how the disk array device operates when the host device requests the disk group "A" to read non-real-time data with reference to a flow chart of FIG. 47. Since the non-real-time data is processed in the disk array device not necessarily in real time, the LUN composed of a set of "0" and "A" is set in the Identify message to be sent during the access request. Further, the host device transmits a Read_10 command to the disk array device.

Figure 47:
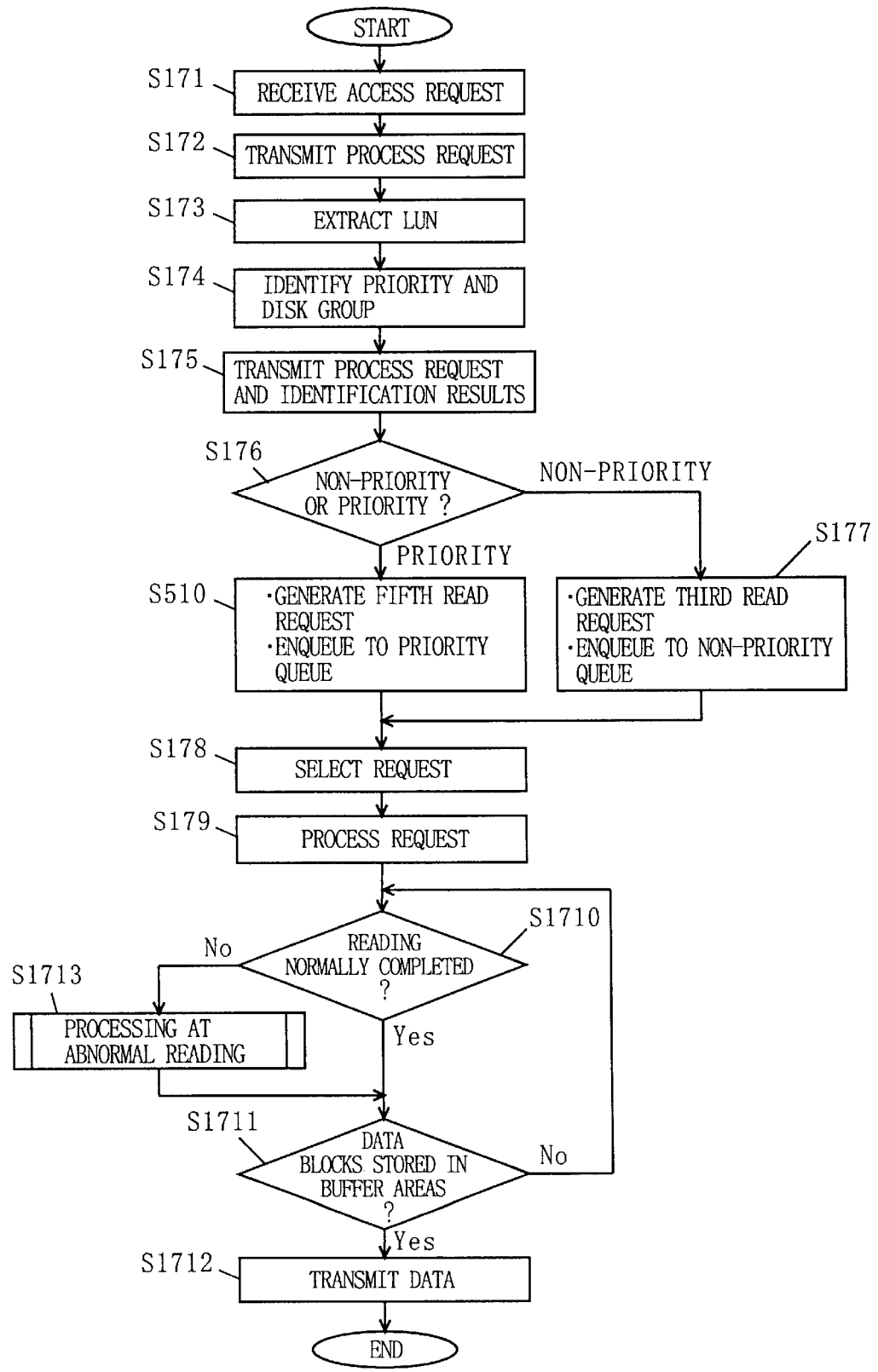
FIG. 47 is a flow chart showing the operation of the disk array device when the host device requests reading.

As shown in the flow chart of FIG. 47, when receiving the SCSI message, SCSI command and data (non-real-time data) to be read from the host device (step S171), the host interface 31 determines that the host device requests access, and the procedure advances to step S172. The host interface 31 then generates a third process request having the same format as that of the first process request based on the access request from the host device (step S172).

When receiving the third process request, the request rank identifying part 32 extracts the information on the LUN from the request (step S173). The request rank identifying part 32 further identifies the level of priority of the received third process request, and determines to which disk group is requested to be accessed (step S174). Since the set of "0" and "A" is extracted as the LUN from the present third process request, the request rank identifying part 32 identifies the level of priority as "non-priority" and the disk group as "A". After the identification ends, the request rank identifying part 32 transmits the received third process request and the identification results ("non-priority" and the disk group "A") to the controller 33 (step S175).

When receiving the third process request and identification results from the request rank identifying part 32, the controller 33 determines whether the third process request has priority or not (step S176).

When the information on priority is "non-priority", the controller 33 replaces the information on the LUN in the present third process request with the received information on priority and the disk group, thereby converting the third process request into third read requests to the disk drives 41A to 41D. The controller 33 generates third read requests as many as the number of disk drives 41A to 41D. Here, the third read request has the same format as that of the first read request (refer to FIG. 46). The controller 33 then enqueues the generated third read requests to the non-priority queues 341A to 341D assigned to the disk drives 41A to 41D, respectively, according to the information "non-priority" and the disk group "A" (step S177).

When the disk drives 41 to 41D end processing (read or write), each of the request selection units 35A to 35D executes the processing of step S178, which is the same as step S169. Thus, the third read requests in the non-priority queues 341A to 341D are processed by the disk drives 41A to 41D with lower priority (step S179). Therefore, the data blocks composing the non-real-time data are read by the disk drives 41A to 41D without affecting reading and writing of the real-time data. If reading the data blocks has been normally completed, the disk drives 41A to 41D transmit the read data blocks and a READ-COMPLETED to the SCSI interfaces 36A to 36D, respectively. When receiving the data blocks and the READ-COMPLETED's, the SCSI interfaces 36A to 36D store the data blocks for update in predetermined buffer areas $37A_i$ to $37D_i$ (i=1, 2, . . . ). The buffer areas $37A_i$ to $37D_i$ are specified by the controller 33. That is, pointers indicative of the buffer areas 37A$_i$ to 37D$_i$ are set in the third read requests which have triggered reading of the data blocks. According to the pointers in the third read requests, the SCSI interfaces 36A to 36D specify the buffer areas 37A$_i$ to 37D$_i$ in which the data blocks are to be stored. The SCSI interfaces 36A to 36D transmit the received READ-COMPLETED's to the controller 33.

On the other hand, if reading of the data blocks (non-real-time data) has not been normally completed due to failure and the like, each of disk drives 41A to 41D generates a READ-FAILED, a signal indicating that the reading has not been normally completed. The generated READ-FAILED's are transmitted to through the SCSI interfaces 36A to 36D to the controller 33.

The controller 33 determines whether the disk drives 41A to 41D have successfully completed reading the data blocks (non-real-time data) or not (step S1710). When receiving READ-COMPLETED's from the disk drives 41A to 41D, the controller 33 determines that the disk drives 41A to 41D have successfully completed reading the data blocks, and further realizes that the data blocks have been stored in the buffer areas 37A$_i$ to 37D$_i$ (step S1711). The controller 33 then transmits the pointers of the buffer areas 37A$_i$ to 37D$_i$ and the information for specifying the order of the data blocks to the host interface 31, instructing to transmit the non-real-time data to the host device. When receiving such information, the host interface 31 accesses to the buffer areas 37A$_i$ to 37D$_i$ according to the order of the data blocks to fetch the data blocks from these buffer areas. Thus, the data blocks are assembled into the non-real-time data to be transmitted to the host device. The host interface 31 transmits the assembled non-real-time data to the host device (step S1712).

On the other hand, in step S1710, when receiving a READ-FAILED from any of the disk drives 41A to 41D, the controller 33 determines that all disk drives 41A to 41D have not successfully completed reading. The procedure then advances to step S1713, wherein the processing at the time of abnormal reading is executed.

Figure 48:
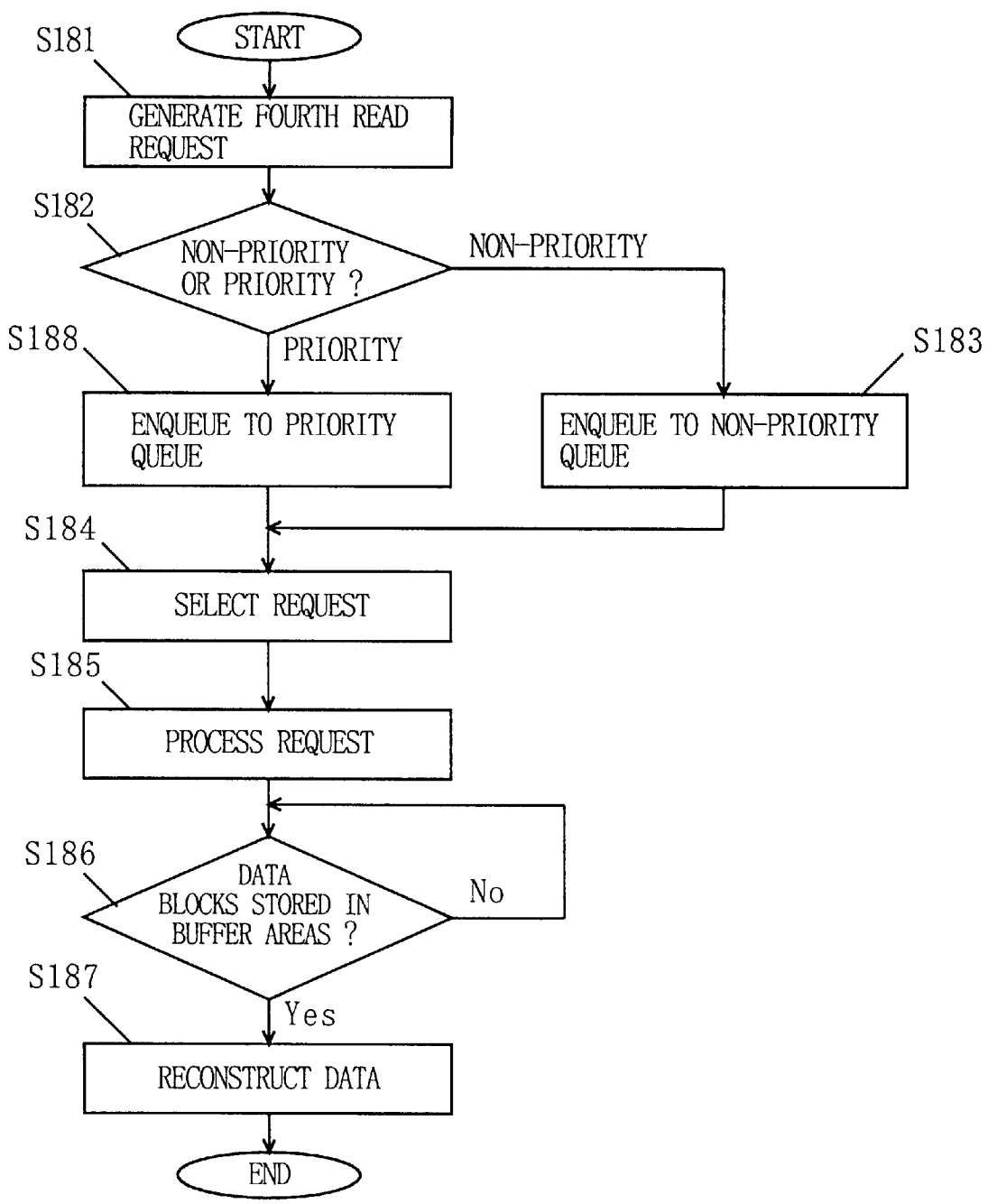
FIG. 48 is a flow chart showing the detailed procedure of step S1713 shown in FIG. 47.

FIG. 48 is a flow chart showing the procedure of step S1713 in detail. The controller 33 generates a new fourth read request to recover the unread data block (step S181). The processing in step S181 is defined by the RAID-3 architecture. The fourth read request is a signal for reading the redundant data from the disk drive 41P.

The controller 33 then reconfirms whether the information on priority is "priority" or "non-priority" (step S182). When "non-priority", the controller 33 enqueues the generated fourth read request to the non-priority queue 341P (step S183).

If the disk drive 41P has completed processing (read or write), the request selection unit 35P executes the similar processing to that of step S178 in FIG. 47 (step S184). With step S184, each fourth read request in the non-priority queue 341P is processed by the disk drive 41P with lower priority (step S185). As a result, the redundant data composing the non-real-time data requested to be read is read from the disk drive 41P without affecting the processing (read or write) of the real-time data. If reading has been normally completed, the disk drive 41P transmits the redundant data and a READ-COMPLETED to the SCSI interface 36P. When receiving the redundant data and READ-COMPLETED, the SCSI interface 36P stores the redundant data in the predetermined buffer area 37P$_i$ (i=1, 2, . . . ). The buffer area 37P$_i$ is specified by the controller 33. That is, a pointer indicative of the buffer area 37P$_i$ is set in the fourth read request which has triggered reading of the redundant data. According to the pointer in the fourth read request, the SCSI interface 36P specifies the buffer area 37P$_i$ in which the redundant data is to be stored. The SCSI interface 36P transmits the received READ-COMPLETED to the controller 33.

When receiving the READ-COMPLETED, the controller 33 instructs the parity calculator 38 to operate calculation of parity. In response to this instruction, the parity calculator 38 operates calculation of parity to recover the faulty data block. The faulty data block is stored in the buffer area 37R$_i$ (i=1, 2, . . . ) (step S186) The controller then exits from the procedure of FIG. 48 to return to step S1711 of FIG. 47. When the processing shown in FIG. 48 at the time of abnormal reading ends, all data blocks composing the requested non-real-time data have been stored in the buffer areas (step S1711). Then, the host interface 31 transmits the non-real-time data to the host device, as described above.

Described next is how the present disk array device operates when the host device requests the disk group "A" to read real-time data with reference to the flow chart of FIG. 47. Since the real-time data has to be processed in the disk array device in real time, the LUN composed of a set of "1" and "A" is set in the Identify message to be sent during the access request. Further, the host device transmits a Read_10 command to the disk array device.

As shown in the flow chart of FIG. 47, when receiving the SCSI message, SCSI command and data (real-time data) to be read from the host device (step S171), the host interface 31 generates a fourth process request having the same format as that of the first process request based on the access request from the host device. The generated fourth process request is transmitted to the request rank identifying part 32 (step S172).

The request rank identifying part 32 extracts the information on the LUN from the received fourth process request (step S173). The request rank identifying part 32 identifies the level of priority of the received fourth process request, and determines to which disk group is requested to be accessed (step S174). Since the set of "1" and "A" is extracted as the LUN from the present fourth process request, the request rank identifying part 32 identifies the level of priority as "priority" and the disk group as "A". After the identification ends, the request rank identifying part 32 transmits the received fourth process request and the identification results ("priority" and the disk group "A") to the controller 33 (step S175).

The controller 33 determines whether the fourth process request has priority or not by referring to the information on priority included in the received identification results (step S176).

When the information on priority is "priority", the controller 33 replaces the information on the LUN in the present fourth process request with the received information on priority and the disk group, thereby converting the fourth process request into fifth read requests to the disk drives 41A to 41D. The controller 33 generates fifth read requests as many as the number of disk drives 41A to 41D. Here, the fifth read request has the same format as that of the first read request (refer to FIG. 46). The controller 33 then enqueues the generated fifth read requests to the priority queues 342A to 342D assigned to the disk drives 41A to 41D, respectively, according to the information "priority" and the disk group "A" (step S177).

Each of the request selection units 35A to 35D executes processing as described above in step S178. Thus, the data blocks composing the requested real-time data are read in real time by the disk drives 41A to 41D.

Since the following steps S1710 to S1713 are the same as for reading of the non-real-time data, their description is omitted herein. However, the data to be processed in the disk array device is not non-real-time data but real-time data. Therefore, when the processing of step S1713 at the time of abnormal reading is executed, the controller 33 enqueues the generated fifth read request to the priority queue 342P (step S188).

As described above, the host device transmits the access request including the information on priority and others to the disk array device. Based on the received access request, the array controller 21 generates a request (read or write) for each of the disk drives 41A to 41D and 41P, and enqueues the request to a predetermined queue (non-priority queue or priority queue) according to its priority. Therefore, requests with higher priority are processed with priority in the disk array 22. Thus, when a higher-priority access request to be processed in real time and a lower-priority access request to be processed not necessarily in real time are both transmitted to the disk array device, processing of non-real-time data does not affect processing of real-time data.

Described next is data reconstruction processing in the present disk array device. In the following description, a faulty disk drive is a disk drive in which a data block recorded therein has a fault, and reconstruction is processing of recovering a data block or redundant data in a faulty drive and rewriting the recovered data block or redundant data into a disk drive (another disk drive or normal recording area in the faulty drive). The present disk array device executes two types of reconstruction: a first reconstruction processing is to prevent adverse effect on processing of real-time data executed in the disk array device, while a second reconstruction processing is to ensure the time limit of data reconstruction using predetermined part of the bandwidth of the disk first.

Figure 49:
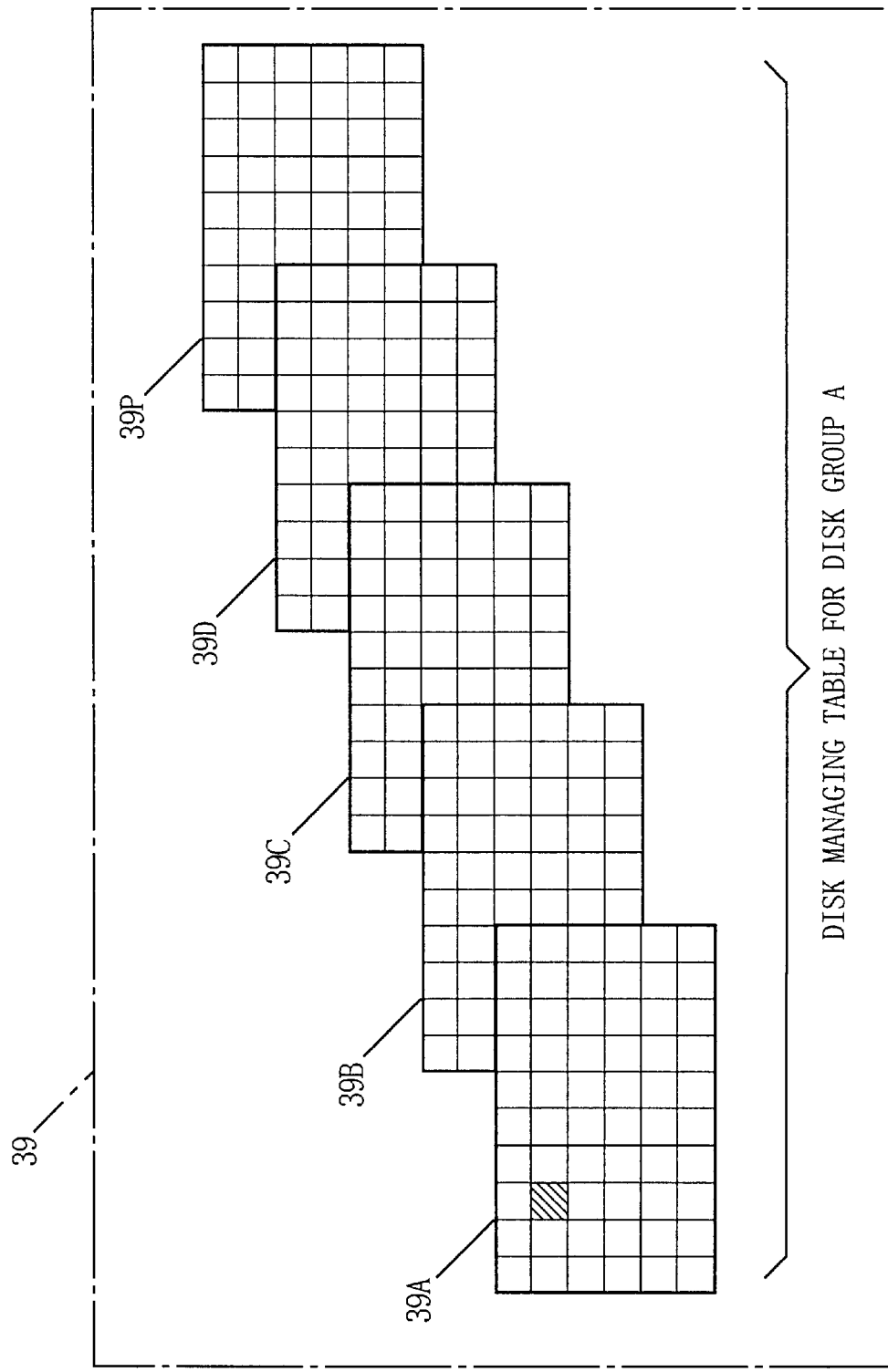
FIG. 49 is a diagram showing management tables 39A to 39D stored in a table storage part 39.

In these two types of reconstruction, a table storage part 39 shown in FIG. 49 is used. The table storage part 39, as shown in FIG. 49, stores managing tables 39A to 39D and 39P for the disk drives 41A to 41D and 41P (the disk group "A"). LBA statuses assigned to each entire recording area of the disk drives 39A to 39D and 39P are stored in the managing tables 39A to 39D and 39P, respectively. For example, the LBA status is set in each corresponding section in the managing table 39A.

Figure 50:
FIG. 50 is a diagram showing types of status to be set in the management tables 39A to 39D.

As shown in FIG. 50, the types of status include "normal", "defective" (not shown in FIG. 50), "reconstruction-required", and "under reconstruction". The status "normal" indicates that the LBA is not defective. The status "defective" indicates that the LBA is defective. The "reconstruction-required" indicates that the LBA is required to be reconstructed. The status "under reconstruction" indicates that the LBA is being reconstructed.

When detecting that one of the disk drives 41A to 41D and 41P failed, the SCSI interfaces 36A to 36D and 36P first notifies the controller 33 that the disk drive is defective. Here, the faulty disk drive is detected when a notification of the faulty disk drive is received or when a response from the disk drives 41A to 41D to 41P does not return to the SCSI interfaces 36A to 36D and 36P within a predetermined time.

When detecting the faulty disk drive, the controller 33 accesses to the table storage part 39, updating the managing table for the faulty disk drive and setting the status of the faulty LBA to "defective". For example, when all of the recording areas in the faulty disk drive become defective, all of the LBA statuses are set to "defective".

Figure 51:
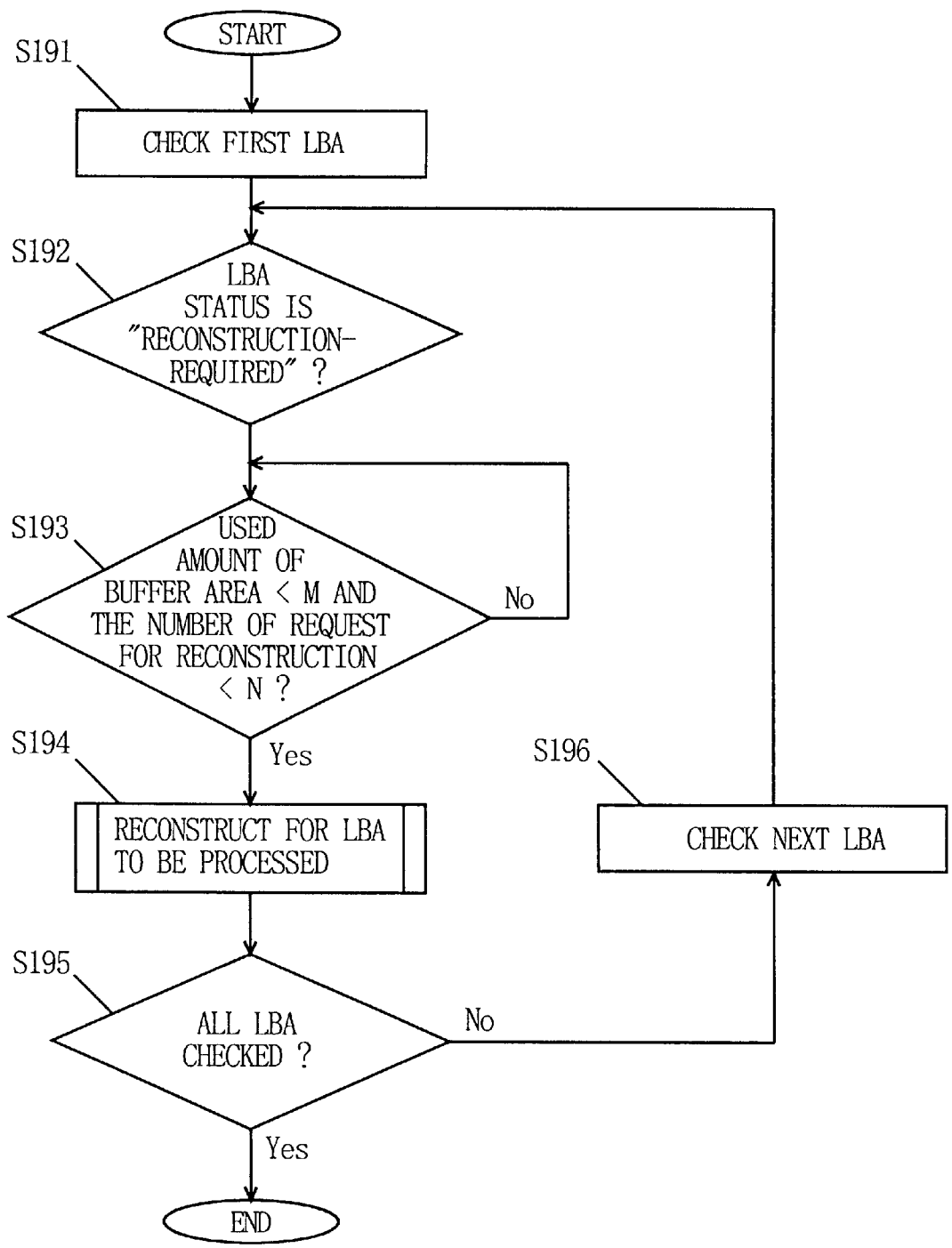
FIG. 51 is a flow chart showing the overall procedure of first reconstruction processing.

Described next is the first reconstruction processing when all of the LBA's in the disk drive 41A are defective. FIG. 51 is a flow chart showing the general procedure of the first reconstruction.

The controller 33 separates the faulty disk drive 41A from the disk group "A", and puts a spare disk drive (not shown) into the disk group. Further, the controller 33 creates a managing table (not shown in FIG. 49) for the spare disk drive in the table storage part 39. In the newly created managing table, all LBA status are initially set to "reconstruction-required". Furthermore, since the faulty disk drive 41A is replaced with the spare disk drive, the controller 33 assigns the non-priority queue 341A, the priority queue 342A, the request selection unit 35A, and the SCSI interface 36A to the spare disk drive.

The controller 33 then checks the first LBA of the new managing table (step S191). When the status of the first LBA is "reconstruction-required" (step S192), that LBA is to be processed. The controller 33 then accesses to the queue managing part 34, determining whether or not the number of buffer areas currently used is less than a predetermined number "M", and the number of requests for reconstruction enqueued to the non-priority queues 341A to 341D and 341P (described later) is less than a predetermined number "N" (step S193).

In step S193, a large number of requests for reconstruction can be prevented from occurring at the same time. Two reasons why the number of occurrence of requests has to be limited are described below. The first reason is that the large number of occurrence increases the possibility that the access request from the host device having the same level of priority as the request for reconstruction will be left unprocessed. For example, if the number of requests for reconstruction is kept less than "N", it can be ensured that the access request from the host device will be processed after the Nth request at the latest. The predetermined number "N" is determined based on how many access requests from the host device with the same priority as the request for reconstruction are to be processed during reconstruction processing.

The second reason is that the large number of occurrence of requests may cause shortage of memory (not shown) in the array controller 21. More specifically, the request for reconstruction requires memory (buffer area) for storing information on the request, and also memory for storing data in write operation. Therefore, when the array controller 21 generates a large number of requests for reconstruction in a short time, shortage of the memory (buffer areas) therein may occur. Further, with shortage of the internal memory, the disk array device cannot receive any access request from the host device. For example, assuming that "M" buffer areas are used for storing the access requests from the host device at maximum, the array controller 21 stops generating the requests for reconstruction when the number of remaining buffer areas becomes "M". As evident from above, the predetermined number "M" is determined according to the number of buffer areas used when the disk array device receives the access requests from the host device at maximum.

The controller 33 waits until the conditions in step S193 are satisfied, and then executes the first reconstruction for the LBA to be processed (step S194). Here, when the conditions in step S193 are still satisfied after new reconstruction processing is activated, the controller 33 selects a new LBA to be processed, activating the next first reconstruction processing. Similarly, the controller 33 continues activating the first reconstruction processing until the conditions in step S193 become not satisfied. Described next is the detailed procedure in step S194 with reference to a flow chart of FIG. 52.

The controller 33 first changes the status of the LBA to be processed from "reconstruction-required" to "under reconstruction" (step S201). The controller 33 generates sixth read requests for reading the data required for recovering the data to be recorded in the LBA to be processed by calculation of parity (hereinafter referred to as data for recovery). Here, in the first reconstruction processing, the data for recovery is not restricted to a data block, but is the data storable in one LBA. The controller 33 generates the sixth read requests as many as the number of disk drives 41B to 41D and 41P excluding the faulty disk drive 41A and the spare disk drive. Each sixth read request has the same format as the first read request (refer to FIG. 46). The controller 33 enqueues the created sixth read requests to the non-priority queues 341B to 341D and 341P (step S202).

The request selection units 35A to 35D and 35P executes the same processing as that in step S169 (step S203). Therefore, the present sixth read requests are dequeued from the non-priority queues 341B to 341D and 341P by the request selection units 35B to 35D and 35P, and transmitted to the SCSI interfaces 36B to 36D and 36P. The disk drives 41B to 41D and 41P process the received sixth read requests to read the data for recovery (step S204). In this way, enqueued to the non-priority queues 341B to 341D and 341P, the present sixth read requests are processed by the disk drives 41B to 41D and 41P with lower priority. When completing reading, each of the disk drives 41B to 41D and 41P transmits a READ-COMPLETED, a signal indicating that reading has been completed, and the data for recovery to the SCSI interfaces 36B to 36D and 36P. Each data for recovery is stored in each of the buffer areas $37B_i$ to $37D_i$ and $37P_i$, like the data blocks composing non-real-time data or the like. Further, each READ-COMPLETED is transmitted through the SCSI interfaces 36B to 36D and 36P to the controller 33.

The controller 33 determines whether the data for recovery from the disk drives 41B to 41D and 41P has been stored in the buffer areas $37B_i$ to $37D_i$ and $37P_i$ according to the READ-COMPLETED's (step S205). If the data for recovery has been stored, the controller 33 instructs the parity calculator 38 to operate calculation of parity. Thus, the parity calculator 38 recovers the data to be recorded in the LBA to be processed, and stores the same in the buffer area $37R_i$ (step S206).

The controller 33 then fetches the data stored in the buffer area $37R_i$, generates a fifth write request for writing the data in the LBA to be processed, and then enqueues the same to the non-priority queue 341A assigned to the spare disk drive (step S207).

The request selection unit 35A executes the same processing as that in step S169 (step S208). Therefore, the present fifth write request is dequeued from the non-priority queue 341A by the request selection unit 35A, and transmitted to the SCSI interface 36A. The SCSI interface 36A processes the received fifth write request, and the disk drive 41 writes the recovered data in the LBA to be processed (step S209). In this way, enqueued to the non-priority queue 341A, the present fifth write request is processed by the disk drive 41A with lower priority. When completing write operation, the disk drive 41A transmits a WRITE-COMPLETED, a signal indicating that writing has been completed, to the controller 33 through the SCSI interface 36A.

At present, the status of the LBA to be processed is "under reconstruction" in the new managing table. When receiving the WRITE-COMPLETED from the spare disk drive (step S2010), the controller 33 updates the status to "normal" (step S2011). After step S2011, the controller 33 exits the processing of FIG. 52, thereby bringing the processing of one LBA to be processed in step S194 to an end. The controller 33 then determines whether all of the LBA's in the spare disk drive have been subjected to the processing of step S194 (step S195). The determination in step S195 is based on whether the status "reconstruction-required" set in the new managing table is present or not. When that status is present, the controller 33 selects the next LBA as the LBA to be processed (step S196), and executes a loop of steps S192 to S196 until all of the LBA's are subjected to the processing of step S194.

According to the above first reconstruction processing, the requests for data reconstruction (the sixth read request and the fifth write request) are enqueued to the non-priority queue. This allows the disk array device to reconstruct data without affecting processing of the high-priority requests (second and fourth process requests).

Figure 53:
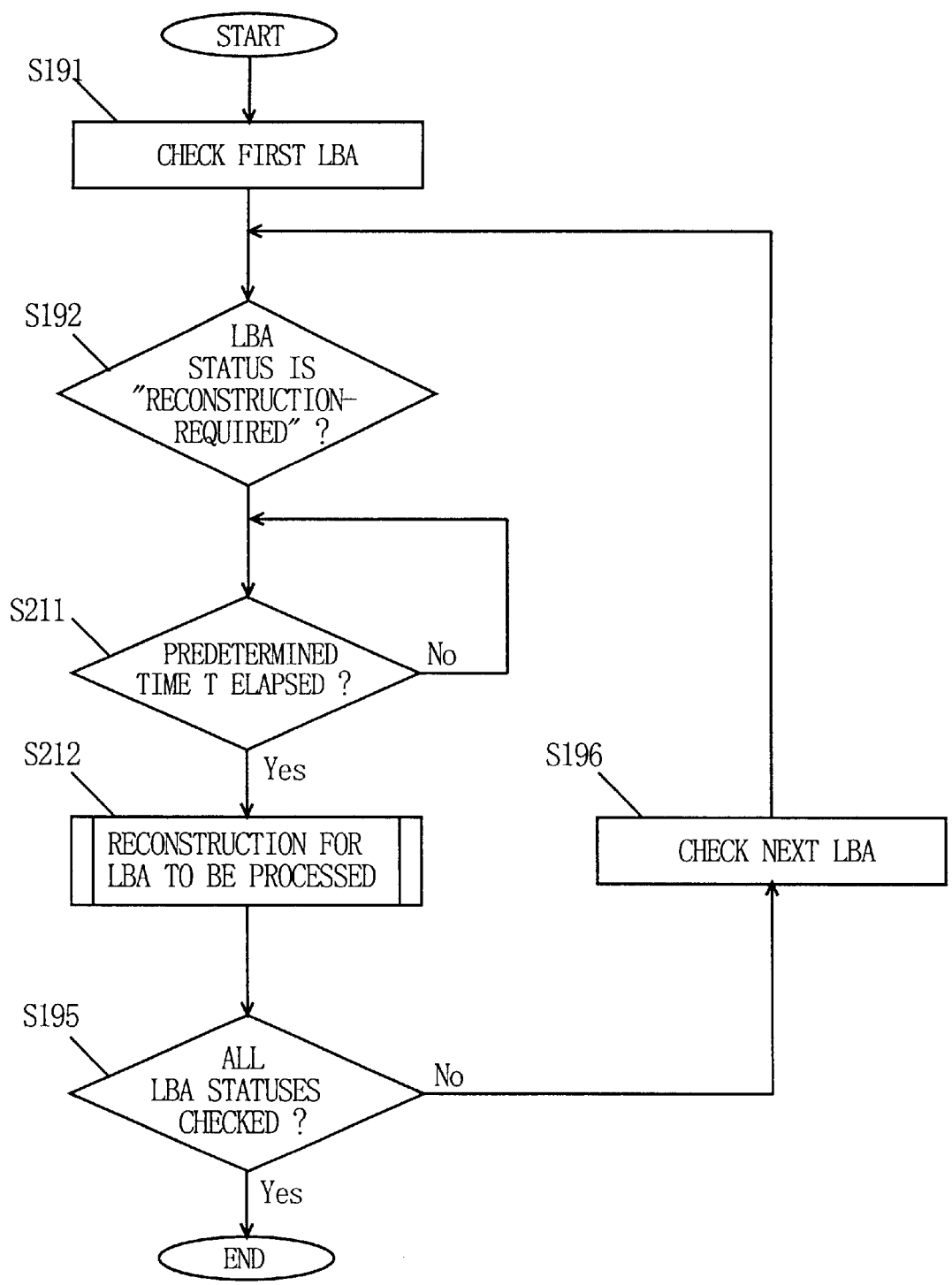
FIG. 53 is a flow chart showing the overall procedure of second reconstruction processing.

Described next is the second reconstruction processing when all of the LBA's in the disk drive 41A are defective. FIG. 53 is a flow chart showing the general procedure of the second reconstruction processing. The flow chart of FIG. 53 is different from that of FIG. 51 only in that steps S193 and S194 are replaced with steps S211 and S212. Therefore, in FIG. 53, the steps corresponding to the similar steps in FIG. 51 are provided with the same step numbers as those in FIG. 51, and their description is omitted herein.

As in the first reconstruction processing, the faulty disk drive 41A is replaced with the spare disk drive. The non-priority queue 341A, the priority queue 342A, the request selection unit 35A, and the SCSI interface 36A are then assigned to that spare disk drive. Furthermore, a new managing table is created for the spare disk drive.

The controller 33 next executes steps S191 and S192 to select the LBA to be processed, and then determines whether a predetermined time T has been elapsed from the previous execution of step S194 or not (step S211).

The bandwidth in each of the disk drives 41B to 41D and 41P and the spare disk drive is limited. Therefore, as the disk array device tries to execute processing for reconstruction more, the access requests from the host device less tend not to been processed. In step S211, the frequency of reconstruction processing is determined as once in a predetermined time T, and thereby the array controller 21 controls adverse effects from the request for reconstruction onto the processing of the access request. The array controller 21 executes the second reconstruction processing once in the predetermined time T as set. For example, assuming the number of LBA's required for reconstruction is "X" and the second reconstruction processing reconstructs the data of "Z" LBA's in "Y" minutes, the second reconstruction processing ends in X/(Z/Y) minutes. Further, the controller 33 generates one request for reconstruction for every Y/Z minutes. That is, T is selected so that Z requests for reconstruction is generated in Y minutes.

Figure 52:
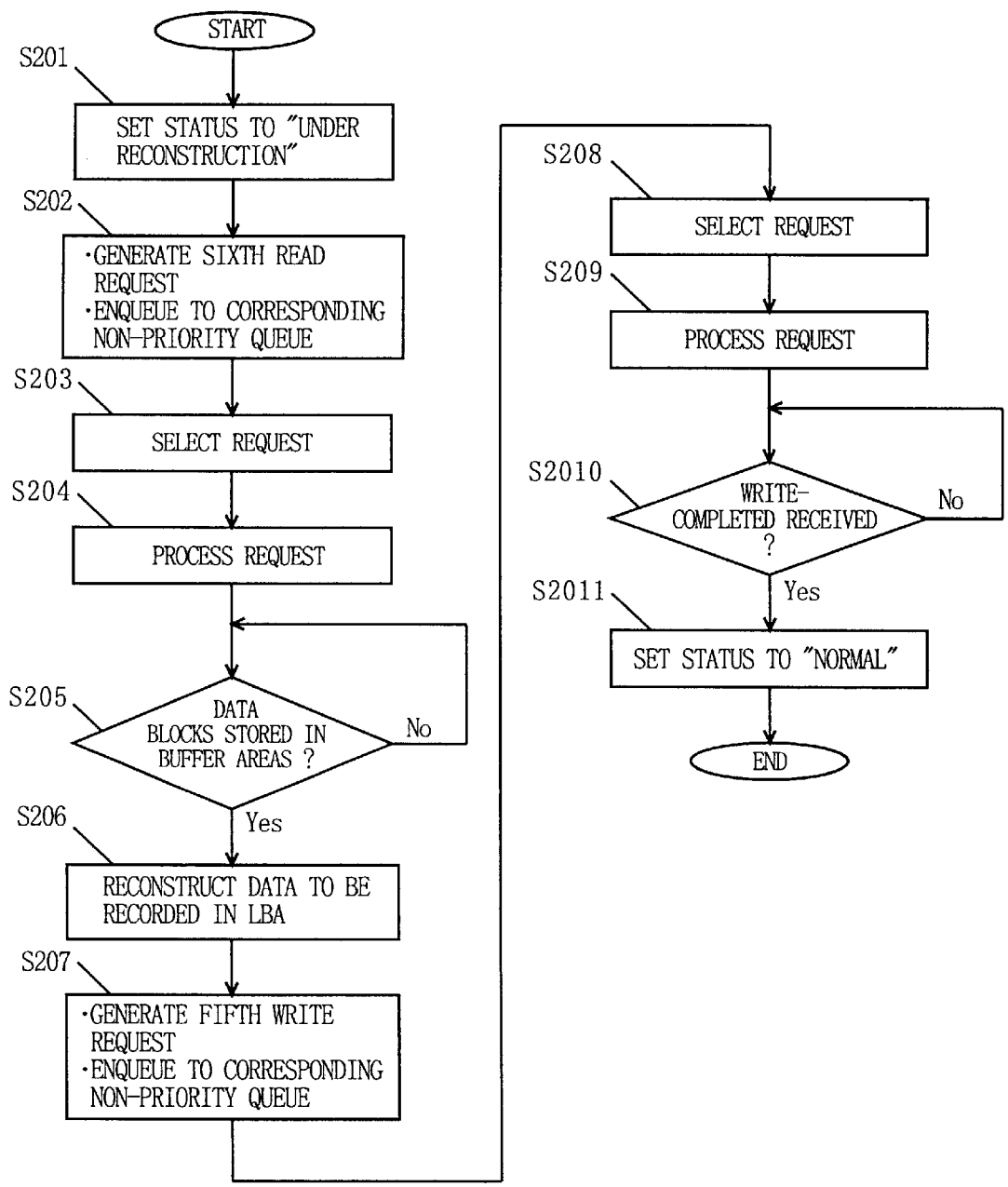
FIG. 52 is a flow chart showing the detailed procedure of step S194 shown in FIG. 51.
Figure 54:
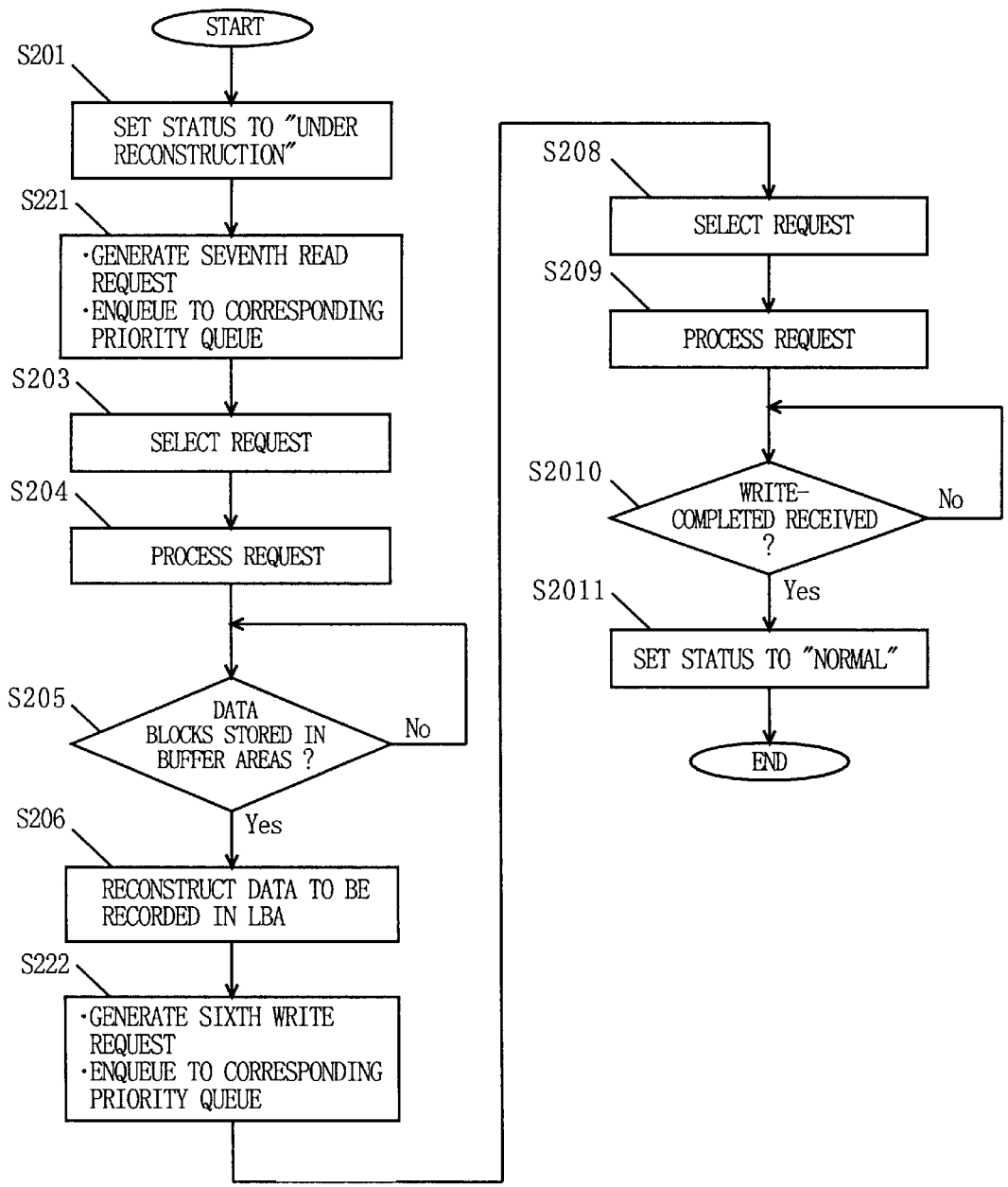
FIG. 54 is a flow chart showing the detailed procedure of step S212 shown in FIG. 53.

When determining in step S212 that the predetermined time T has elapsed, the controller 33 executes the second reconstruction processing for the LBA to be processed (step S212). FIG. 54 is a flow chart showing the detailed procedure in step S212. FIG. 54 is different from FIG. 52 only in that steps S202 and S207 are replaced with steps S221 and S222. Therefore, in FIG. 54, the steps corresponding to the steps in FIG. 52 are provided with the same step numbers as those in FIG. 52 and their description is simplified herein.

The controller 33 executes step S201, setting the status of the LBA to be processed to "under reconstruction" and generating four seventh read requests for reading the data for recovery. The controller 33 then enqueues the generated seventh read requests not to the priority queue 342A assigned to spare disk drive, but to the priority queues 342B to 342D and 342P (step S221).

The request selection units 35B to 35D and 35P execute step S203, and in response thereto, the disk drives 41B to 41D and 41P execute step S204. Consequently, the seventh read requests are processed by the disk drives 41B to 41D and 41P with priority. When completing reading, the disk drives 41B to 41D and 41P transmit the read data for recovery and READ-COMPLETED's to the SCSI interfaces 36B to 36D and 36P. The SCSI interfaces 36B to 36D and 36P store the received data for recovery in the buffer areas 37B$_i$ to 37D$_i$ and 37P$_i$, and transmit the received READ-COMPLETED's to the controller 33.

Then, with the execution of steps S205 and 206, the data to be recorded in the LBA to be processed (the same data recorded in the faulty disk drive 41A) is recovered.

The controller 33 then fetches the data stored in the buffer area 37R$_i$, generating a sixth write request to write the data in the LBA to be processed and enqueuing the same to the priority queue 342A assigned to the spare disk drive (step S222).

The request selection unit 35A executes the same processing as in step S169 (step S208). Therefore, the present sixth write request is dequeued from the priority queue 342A by the request selection unit 35A and transmitted to the SCSI interface 36A. The SCSI interface 36A processes the received sixth write request, and the disk drive 41A writes the recovered data in the LBA to be processed (step S209). In this way, enqueued to the priority queue 342A, the present sixth write request is processed by the disk drive 41A with priority. When completing the write operation, the disk drive 41A transmits a WRITE-COMPLETED, a signal indicating that writing has been completed, to the controller 33 through the SCSI interface 36A.

The controller 33 then executes steps S2010 and S2011, bringing the processing of step S194 to an end. Furthermore, the controller 33 executes the loop of steps S192 to S196 until all of the LBAs are subjected to the processing of step S194.

According to the second reconstruction, the requests for reconstruction (seventh read request and sixth write request) are enqueued to the priority queues. This can shorten the time the request waits to be processed in the queue managing part 34, thereby ensuring the time when the data is fully reconstructed. Furthermore, the array controller 21 enqueues each request and controls the second reconstruction processing for each disk drive, thereby effectively performing the second reconstruction processing.

Figure 44:
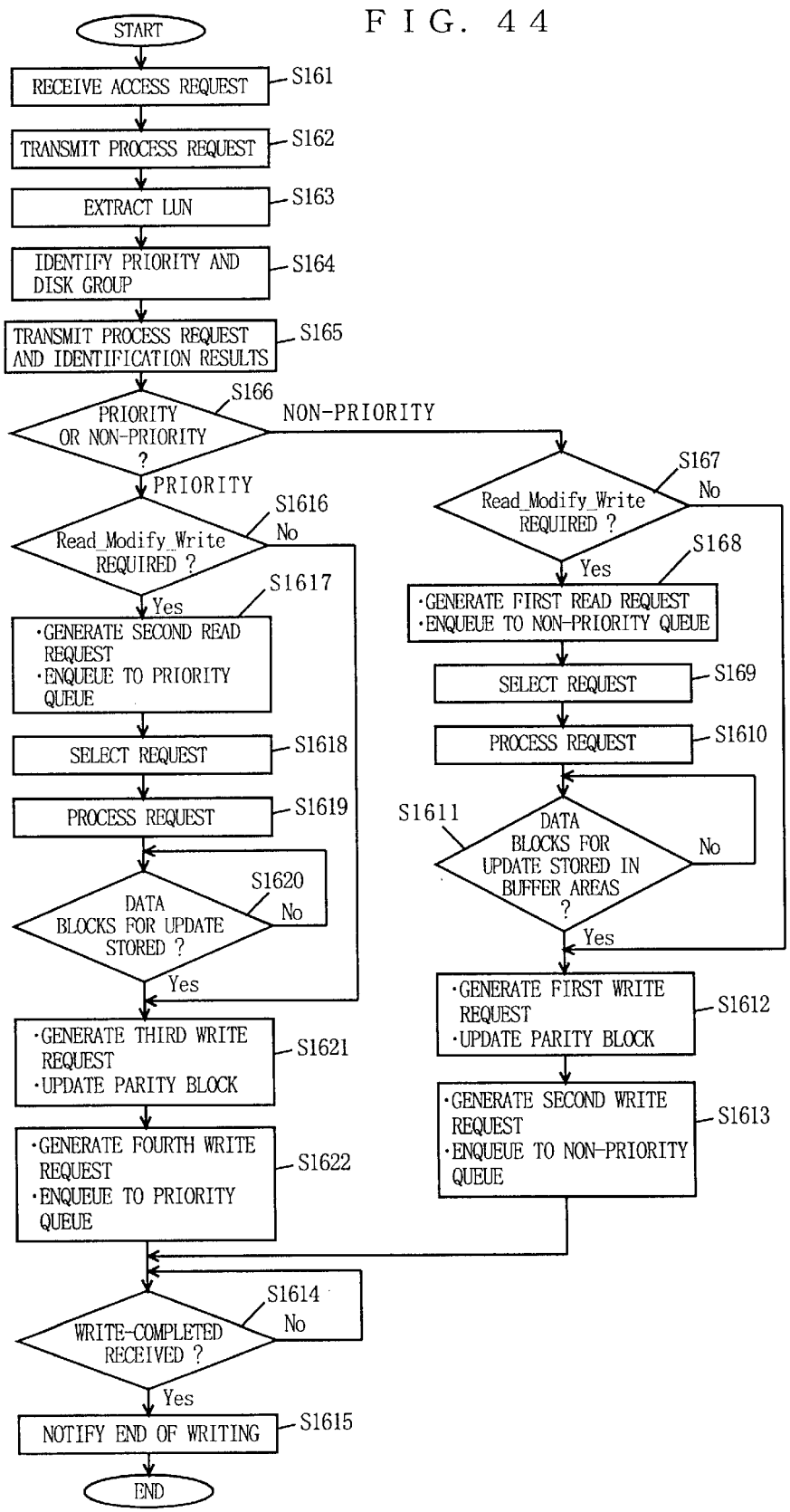
FIG. 44 is a flow chart showing operation of the disk array device when a host device requests writing.

Described next is how the disk array device operates when the host device requests access to the LBA "reconstruction-required" or when the status of the LBA recording the data blocks for update in FIG. 44 is "reconstruction-required".

By referring to the table storage part 39, when reading the data block, the controller 33 can determine whether the LBA recording the data block is to be subjected to reconstruction processing or not. That is, when the status of the LBA to be accessed is "reconstruction-required", the controller 33 can recognize that data cannot be read from the LBA. The controller 33 then accesses to the table storage part 39, changing the status of the LBA be processed to "under reconstruction" and generating read requests for reading the data for recovery required for recovering the data recorded in the LBA to be processed. The controller 33 enqueues the generated read requests to the non-priority queue or priority queue assigned to the faulty disk drive. If the priority information indicative of "priority" is set in the access request from the host device, the controller 33 enqueues the read request to the priority queue. If the priority information indicative of "non-priority" is set, the controller 33 enqueues the read request to the non-priority queue.

Thereafter, the data for recovery is read from the disk drives except the faulty disk drive, and stored in predetermined buffer areas in the buffer managing part 37. The controller 33 causes the parity calculator 38 to operate calculation of parity when the entire data for recovery are stored in the buffer areas, recovering the data to be recorded in the LBA to be processed. With the recovered data, the controller 33 continues processing for transmitting the data to the host device, and also generates a seventh write request for writing the recovered data in the LBA to be processed. The seventh write request is enqueued to the non-priority queue assigned to the disk drive including this LBA. The controller 33 accesses to the table storage part 39 when the recovered data is written in the disk drive, changing the status of the LBA to "normal".

Described next is how the disk array device operates when writing data to the LBA "reconstruction-required" in the first or second reconstruction processing. In this case, the operation is similar to that described in FIG. 44, except the following two points. First, when the controller 33 generates write requests to the disk drive 41A to 41D and 41P, the controller 33 confirms that the status of the LBA to be accessed is "reconstruction-required", and then changes the status to "under reconstruction". Second, when the disk drive including the LBA "under reconstruction" completes writing, the controller 33 changes the status of the LBA to "normal".

As described above, when the host device requests access to the LBA "reconstruction-required" in the newly-created managing table, the disk array device writes the data recovered with calculation of parity in the LBA. The write request for this writing is enqueued to the non-priority queue. Therefore, the recovered data is written in the disk array 22 with lower priority together with the access request from the host device. As described above, the LBA "reconstruction-required" is subjected to the first or second reconstruction processing. However, the first and second reconstruction processings are executed in parallel, decreasing the number of LBA "reconstruction-required" in either processing. This shortens the time required for the first or second reconstruction processing. Furthermore, since the seventh write request is enqueued to the non-priority queue, it can be ensured that writing of the recovered data does not affect other processing with higher priority to be executed by the disk array device.

When the host device requests access to the LBA "reconstruction-required" for writing the data, the controller 33 changes the status of the LBA to "normal" when the disk array device completes writing. Therefore, the disk array device is not required to execute unnecessary reconstruction processing, and the processing time in the disk array device can be shortened.

Further, although the disk array device is constructed based on the RAID-3 and RAID-4 architecture in the present embodiment, the disk array device may have the RAID-5 architecture. Furthermore, the present embodiment can be applied even to the disk array device with the RAID-1 architecture.

Still further, although the disk array device includes one disk group in the present embodiment, the disk array device may include a plurality of disk groups. Moreover, although the host device specifies priority using the LUN in the present embodiment, information indicative of priority may be added to the LUN and higher priority is given to the request if the first bit of the LUN is "1".

Still further, although two levels of priority are defined in the disk array device according to the present embodiment, more than three levels of priority may be defined. In this case, the number of queues are determined according to the number of levels of priority. In this case, the request generated in the first reconstruction processing is preferably enqueued to a queue with lower priority than a queue to which a request for non-real-time data is enqueued. The first reconstruction processing is thus executed without affecting processing of non-real-time data. On the other hand, the request generated in the second reconstruction processing is preferably enqueued to a queue with higher priority than a queue to which a request for real-time data is enqueued. The second reconstruction processing is thus executed without being affected by the processing of real-time data and non-real time data, and thereby the end time of the second reconstruction processing can be ensured more.

Still further, when the host device always requests processing exclusively for either of real-time data or non-real-time data, it is not required to set priority information in the access request, and thus the request rank identifying part 32 is not required. Further, although the first and second reconstruction processings are independently executed in the present embodiment, if these are executed simultaneously, more effective reconstruction can be achieved with ensuring its end time.

(Ninth Embodiment)

In a ninth embodiment, as in the previous embodiments, real-time data is data to be processed in real time in the disk array device.

Figure 55:
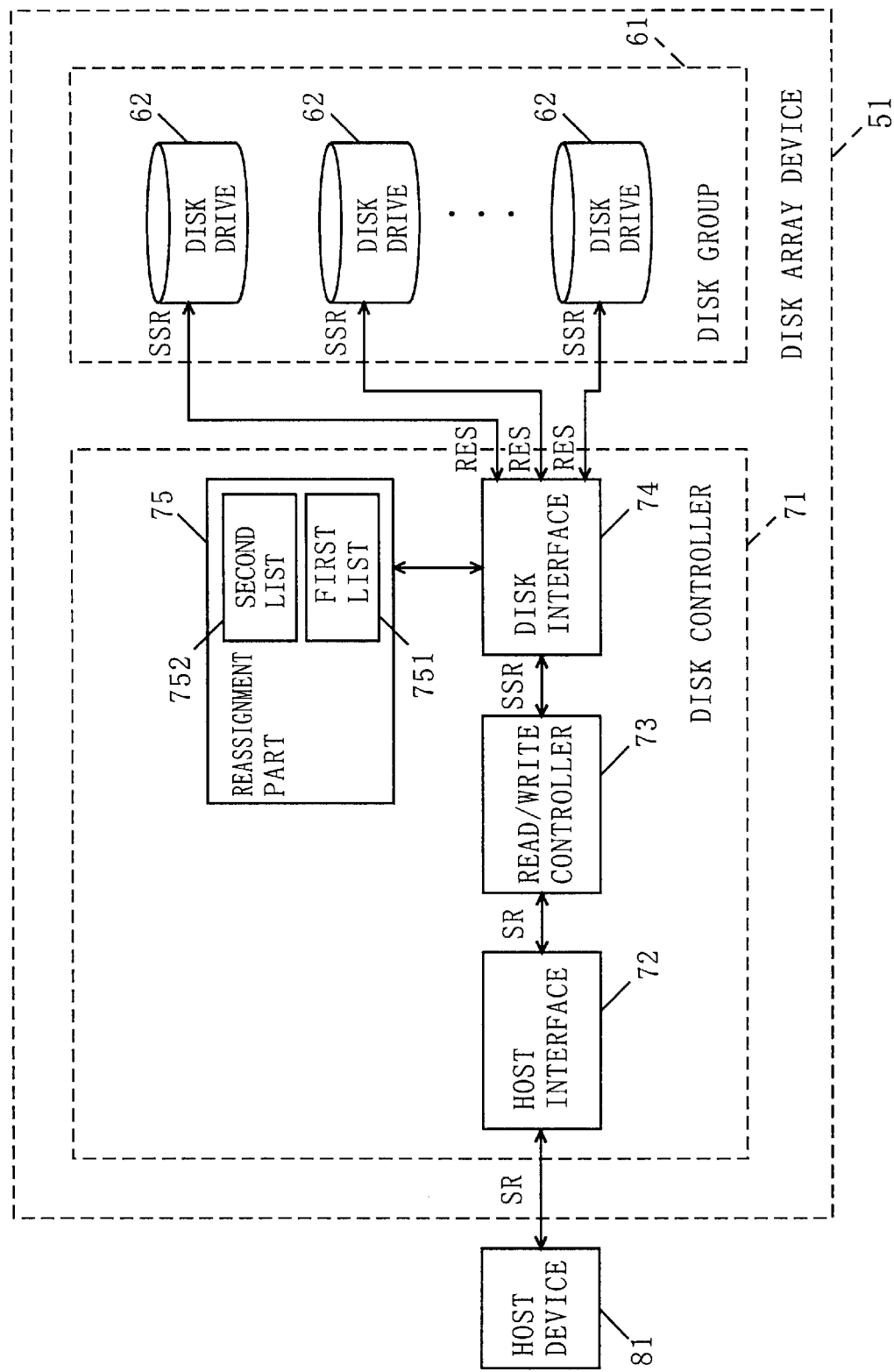
FIG. 55 is a block diagram showing the structure of a disk array device 51 according to a ninth embodiment of the present invention.

FIG. 55 is a block diagram showing the structure of a disk array device 51 according to the ninth embodiment of the ninth embodiment. In FIG. 55, the disk array device 51 is constructed by the architecture of a predetermined RAID level, including a disk group 61 and a disk controller 71. The disk array device 51 is communicably connected to a host device 81 placed outside.

The disk group 61 is typically composed of a plurality of disk drives 62. A logical block address (LBA) is previously assigned to each recording area of each disk drive 62. Each disk drive 62 manages its own entire recording areas by block (generally called sector) of a predetermined fixed length (generally 512 bytes). Each disk drive 62 reads or writes redundant data (that is, sub-segment and parity). Note that only one disk drive 62 can compose the disk group 61.

The disk controller 71 includes a host interface 72, a read/write controller 73, a disk interface 74, and a reassignment part 75. The host interface 72 is an I/O interface between the disk array device 51 and the host device 81, structured conforming to SCSI (Small Computer System Interface) in the present embodiment. SCSI is described in detail in Japan Standards Association X6053-1996 and others, but is not directly related to the present invention, and therefore its detailed description is omitted herein. The read/write controller 73, communicably connected to the host interface 72, controls reading or writing of the redundant data over the disk group 61 according to the I/O request SR from the host device 81. The disk interface 74, communicably connected to the read/write controller 73, is an I/O interface between the disk controller 71 and the disk group 61. In the present embodiment, this interface is also conforms to SCSI.

The reassignment part 75 is a component unique to the present disk array device 51, communicably connected to the disk interface 74. The reassignment part 75 monitors delay time calculated from a predetermined process start time, and by referring to first and second lists 751 and 752 created therein, finds the disk drive 62 having a defective (faulty) area and instructs to that disk drive 62 to execute processing of assigning an alternate area to the defective area (reassign processing).

Described next is the general outlines of input/output of data between the host device 81 and the disk array device 51. The host device 81 transmits an I/O request signal SR to the disk array device 51 to request for inputting/outputting real-time data. The host device 81 and the disk array device 51 may communicate a plurality pieces of real-time data simultaneously. The host device 81 requests for inputting/outputting the real-time data by data (segment data) of a predetermined size which the plurality pieces of data are divided into. This allows the disk array device to input/output the plurality pieces of real-time data in parallel. This parallel processing contributes to input/output of data in real time.

For example, when requesting input/output of first and second real-time data, the host device 81 first transmits an I/O request SR 1 for one segment composing the first real-time data, and then an I/O request SR 2 for one segment composing the second real-time data, and this operation is repeated in the disk array device. In other words, the segments of each real-time data are regularly processed so that one segment of the first real-time data and one segment of the second real-time data are alternately processed.

Figure 56:
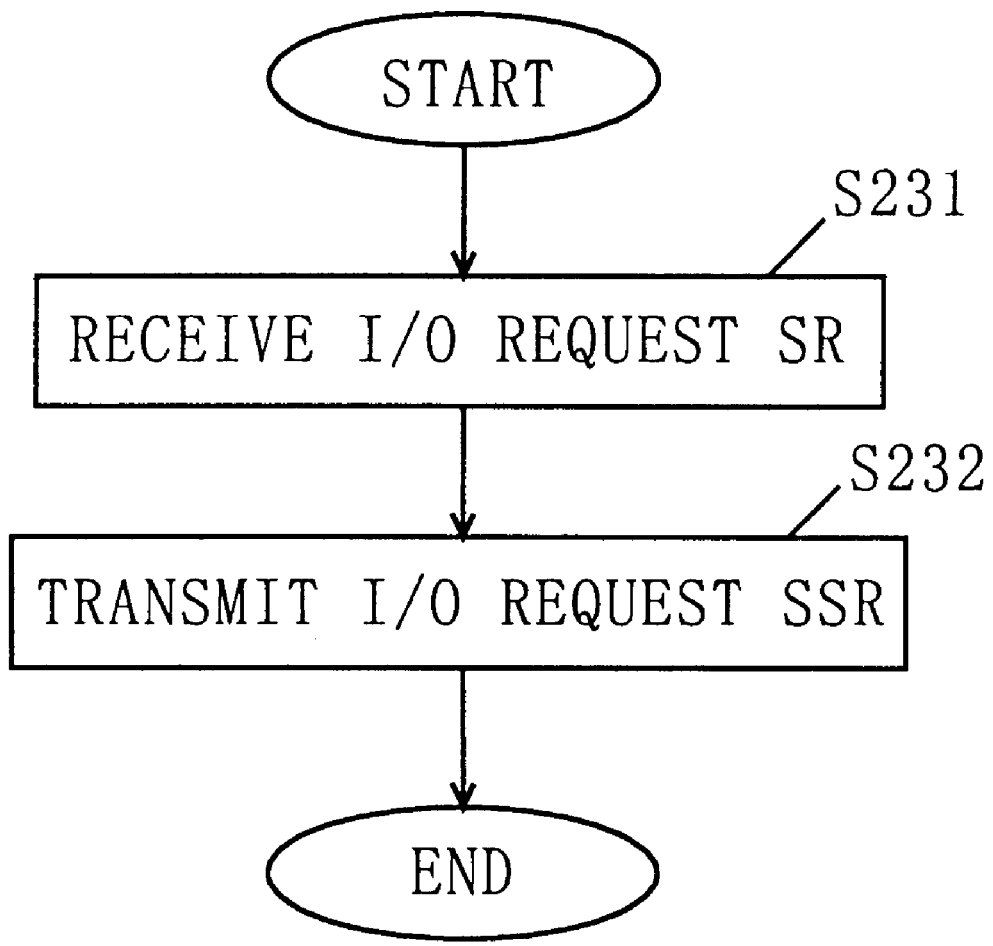
FIG. 56 is a flow chart of operation of a read/write controller 73.

Described next is the operation of the read/write controller 73 in the disk array device 51 with reference to a flow chart of FIG. 56. The read/write controller 73 receives an I/O request SR from the host device 81 through the host interface 72 (step S231). This I/O request SR specifies the recording area of one segment, generally using the LBA. The read/write controller 73 then converts the I/O request SR according to the RAID architecture to generate an I/O request SSR for each sub-segment. The relation between a segment and a sub-segment is now described. A segment is divided into a plurality of sub-segments according to the RAID architecture, and these sub-segments are distributed over the disk drives 62. Further, the sub-segments may be made redundant in the disk controller 71 to cope with failure of one disk drive 62 according to the level of the RAID. Furthermore, parity generated in the disk controller 71 may be recorded only in one disk drive 62.

The read/write controller 73 transmits an I/O request SSR for each sub-segment to each of the disk drives 62 through the disk interface 74 (step S232). At this time, the read/write controller 73 transmits an I/O request for parity, as required. The interface between the disk controller 71 and the disk group 61 conforms to SCSI, and the sub-segments are recorded in successive LBA area in the disk drive 62. Therefore, the read/write controller 73 is required to generate only one SCSI command (READ or WRITE) as the I/O request SSR of these sub-segments. The I/O request SSR specifies the successive LBA area. These steps S231 and S232 are executed whenever an event of receiving an I/O request occurs.

Each disk drive 62 accesses to the successive LBA area specified by the I/O request SSR to read or write the sub-segments. When reading or writing ends normally, the disk drive 62 returns a response RES to the received I/O request SSR to the disk controller 71. The read/write controller 73 receives the response RES from each disk drive 62 through the disk interface 74. When the host device 81 requests write operation, the read/write controller 74 notifies the host device 81 through the host interface 72 that writing has been completed. When the host device 81 requests read operation, the read/write controller 74 transmits all of the read sub-segments at once as a segment to the host device 81.

The sub-segments are recorded in the successive LBA area in each disk drive 62, thereby being successively transmitted in real time between the disk controller 71 and each disk drive 62. In other words, overhead (typically, seek time plus rotational latency) in each disk drive 62 is within a range of a predetermined time $T_1$ during which input/output in real time is not impaired. However, in the conventional disk array device, reassign processing is executed by each fixed-block length in the disk drive, and therefore a fixed-block in part of the successive LBA area may be subjected to reassign processing. As a result, even if the sub-segments after reassignment are recorded in the successive LBA area, the physical recording areas of the sub-segments are distributed over the disk drive (fragmentation of sub-segments), and the overhead in the disk drive 62 become long. As a result, the capability of input/output in real time in the conventional disk array device is impaired after reassignment. Therefore, the reassignment part 75 in the present disk array device 51 executes processing of flow charts shown in FIGS. 57 to 59 to maintain its capability for input/output in real time.

The disk interface 74 transmits a signal "transmission notification" to the reassignment part 75 whenever the disk interface 74 transmits the I/O request SSR to the disk drive 62. This transmission notification includes the ID specifying the transmitted I/O request SSR, and the successive LBA area specified by the I/O request SSR. The reassignment part 75 executes the flow chart of FIG. 57 whenever it receives such transmission notification. Here, assume that the reassignment part 75 receives the transmission notification including the ID "b" and the successive LBA area "a", and that this transmission notification is generated due to the I/O request SSR 1. The reassignment part 75 has a time-of-day clock, detecting a receive time $T_{T1}$ (that is, transmission time of the I/O request SSR 1) when the transmission notification is received. The reassignment part 75 also extracts the ID "b" and the successive LBA area "a" from the transmission notification (step S241).

Figure 60:
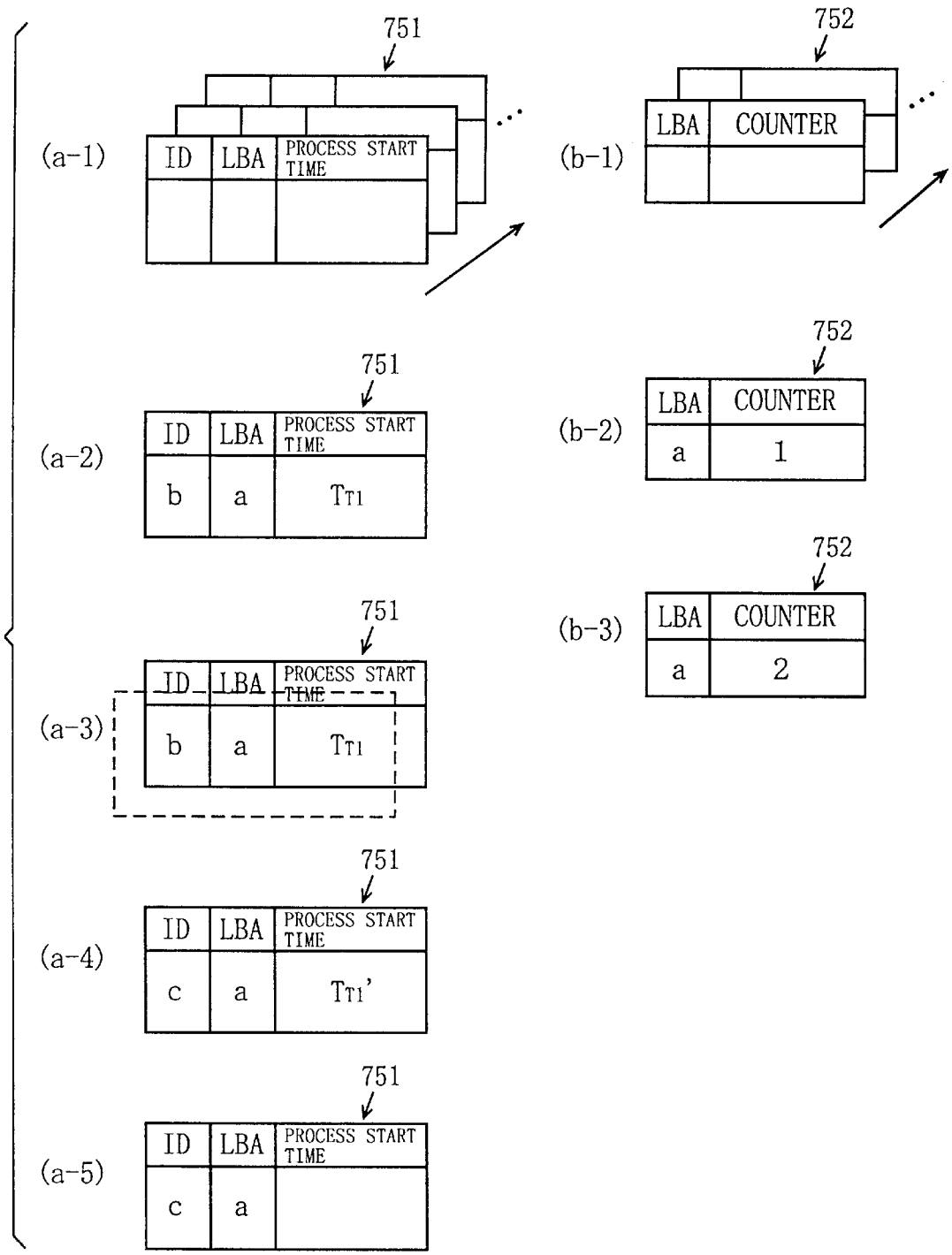
FIG. 60 is a diagram illustrating a first list 751 and a second list 752.

The reassignment part 75 creates and manages a first list 751 and a second list 752 therein. The first list 751, created for each disk drive 62, includes, as shown in FIG. 60(a-1), fields of the ID, LBA (successive LAB area) and process start time. In the first list 751, the ID, LBA and process start time are registered for each I/O request SSR together with the transmission order of the I/O requests to the corresponding disk drive 62. The order of transmitting the I/O requests is indicated by an arrow in FIG. 60(a-1). As indicated by an arrow, the information on a new I/O request is registered in the first list 751 located frontward, while the information on an old I/O request is registered in the first list 751 located backward. The second list 752 includes, as shown in FIG. 60(b-1), fields of the successive LBA area in which the sub-segment is stored and the counter. In the second list 752, the successive LBA area and the counter value of the counter are registered.

After step S241, the reassignment part 75 determines whether plural I/O requests SSR have been sent to the target disk drive 62 (that is, target disk drive of the present I/O request SSR) (step S242). The first lists 751 includes only the transmitted I/O requests SSR for each disk drive 62. The reassignment part 75 refers to these first lists 751 for determination in step S242.

When determining that plural I/O requests are not present in the target disk 62, the reassignment part 75 registers the successive LBA area "a" and the ID "b" in the first list 751 extracted in step S241, and also registers the transmission time $T_{T1}$ detected in step S241 as the process start time in the first list 751 (step S243). As a result, information as shown in FIG. 60(a-2) is registered in the first list 751 for the present I/O request SSR.

When it is determined that plural I/O requests are present, not only the present I/O request SSR but also at least one other I/O request transmitted immediately before the present one has been sent to the target disk drive 62. In this case, the process start time for the present I/O request is the time when the reassignment part 75 receives a response to the immediately preceding I/O request (described later in detail).

Figure 57:
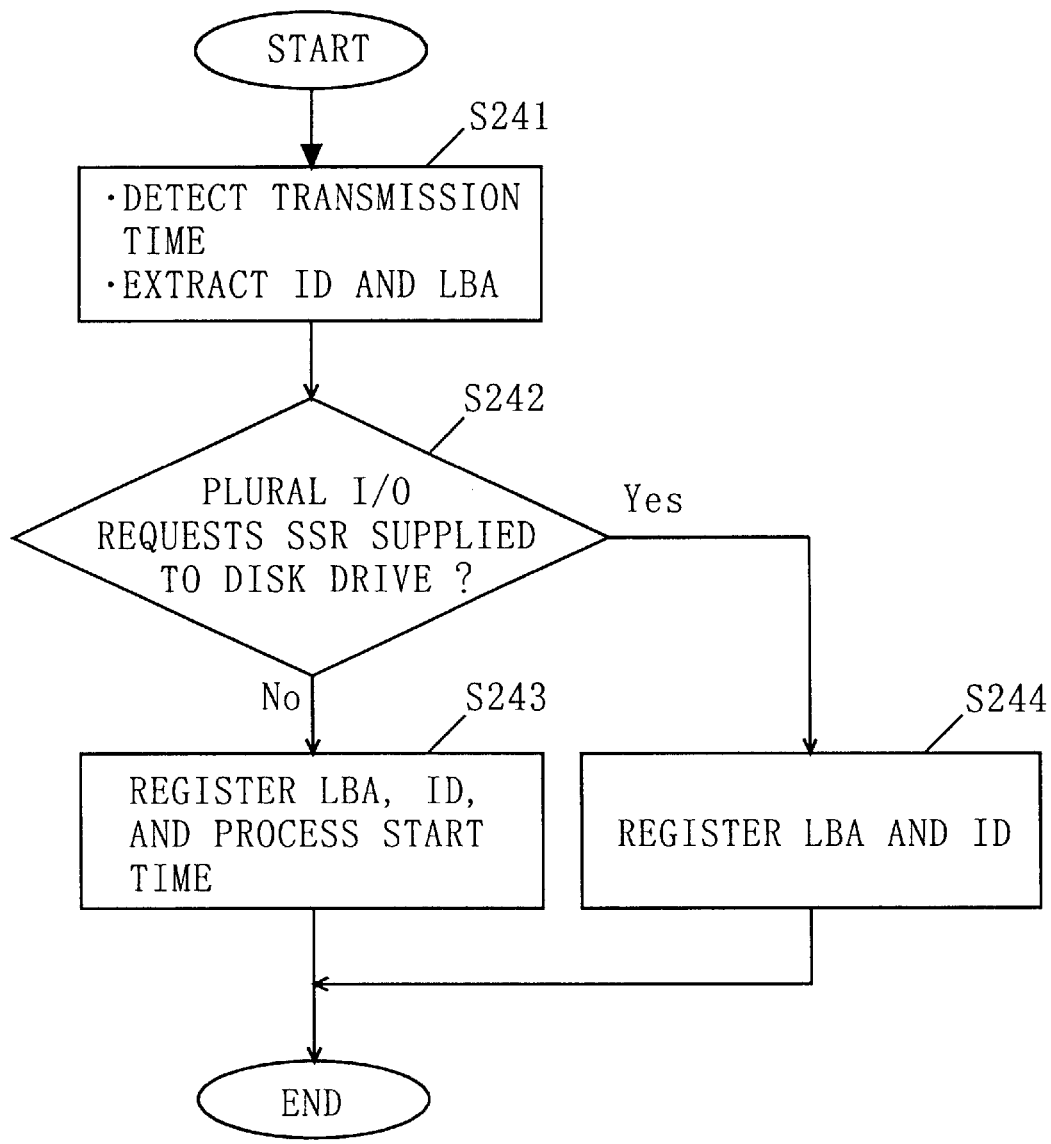
FIG. 57 is a flow chart showing operation of a reassignment part 75 when receiving a transmission notification.

When the event "transmission notification received" occurs, the processing in step S241 is executed. Therefore, the flow chart of FIG. 57 is event-driven. In addition to the procedure shown in FIG. 57, the reassignment part 75 also executes the procedure shown in the flow chart in FIG. 58 during operation of the disk array device 51. The reassignment part 75 monitors whether the delay time $T_D$ exceeds the limit time $T_1$ for the ID recorded in each first list 751 (that is, each I/O request SSR) to detect a defective recording area (step S251). Note that, in step S251, the reassignment part 75 does not monitor for the I/O request SSR in which the process start time has not yet been registered. The delay time $T_D$ is the time between the registered process start time and the present time $T_P$. Predetermined in the present disk array device 51, the limit time $T_L$ is an indicator for determining whether successive LBA area in the disk drive 62 includes a defective fixed-block and also for determining whether input/output of the sub-segment in real time can be satisfied. That is, when the delay time $T_D$ exceeds the limit time $T_1$, the reassignment part 75 assumes that the successive LBA area may possibly include a defective fixed-block.

Described next is the processing in step S251 in detail, taking the ID "b" for example. In the first list 751 (refer to FIG. 60(a-2), the I/O request SSR 1 is specified by the ID "b", and its delay time $T_{D1}$ therefore can be given by $T_P - T_{T1}$. When $T_{D1} > T_L$ is satisfied, the procedure advances to step S252. When not satisfied, the reassignment part 75 executes the processing in step S251 again to find the ID for reassignment. Note again that, in step S251, the reassignment part 75 does not monitor for the I/O request SSR in which the process start time has not yet been registered.

When determining in step S251 that $T_{D1} > T_L$ is satisfied for the ID "b", the reassignment part 75 instructs the disk interface control part 74 to terminate execution of the I/O request SSR 1 specified by the ID "b" (step S252). In response to this instruction, the disk interface 74 transmits a ABORT_TAG message, which is one of the SCSI messages, to terminate execution of the I/O request SSR 1. The disk interface 74 then notifies the read/write controller 73 that the processing of the I/O request SSR 1 has failed. In response, the read/write controller 73 executes the processing, which will be described later.

After step S252, the reassignment part 75 checks whether another I/O request SSR waits to be processed in the disk drive 62 which has terminated execution of the I/O request SSR 1 by referring to the first list 751 (step S253). Since the first list 751 is created for each disk drive 62, the reassignment part 34 determines that another I/O request SSR waits if the ID other than "b" is registered. The process start time of the other I/O request SSR has not yet been registered in the first list 751. Therefore, when finding the ID other than the ID "b" in the first list 751, as shown in FIG. 60(a-3), the reassignment part 75 registers the present time as the process start time for the I/O request to be processed following the I/O request SSR 1 (step S254). On the other hand, when the reassignment part 75 does not find another ID in step S253, the procedure skips step S254 to step S255.

The reassignment part 75 then fetches the successive LBA area "a" from the first list 751 by referring to the ID "b". The reassignment part 75 then determines whether the counter is created for the successive LBA area "a" to check whether it is successively determined that there is a high possibility of including a defective fixed-block in the successive LBA area "a" (step S255). The counter value N, indicating how many times $T_D>T_L$ is successively satisfied, is registered in the field of the counter in the second list 752. Since the second list 752 is created for every successive LBA area, if the counter has been created, it was determined in the previous check that there is a high possibility of including a defective fixed-block in the corresponding successive LBA area (that is, it has been successively determined that $T_D>T_L$ is satisfied). On the other hand, if the counter has not been created, it is determined for the first time that there is a high possibility of including a defective fixed-block in the successive LBA area. Here, assuming that the counter has not been created for the successive LBA area "a", the reassignment part 75 newly creates the second list 752, registering "a" for the successive LBA area and "1" for the corresponding counter, as shown in FIG. 60(b-2) (step S256). When it is determined in step S255 that the counter has been created, the procedure advances to step S259.

After step S256, the reassignment part 75 next determines whether the counter value N reaches the limit value $N_L$ or not (step S257). The limit value $N_L$ is predetermined in the present disk array device 51. When the counter value N reaches the limit value $N_L$, the limit value $N_L$ becomes a predetermined threshold for determining that all or part of the fixed-blocks in the successive LBA area is defective. The limit value $N_L$ is a natural number of 1 or more, determined in view of input/output in real time according to the specifications of the present disk array device 51. In the present embodiment, assume that "2" is selected for the limit value $N_L$. Since the counter value N of the successive LBA area "a" is "1" (refer to FIG. 60(b-2)), the procedure advances to step S258. When the counter value N exceeds the limit value $N_L$, the procedure advances to step S2510, which will be described later.

The reassignment part 75 deletes the ID "b", the successive LBA area "a", and the process start time "$T_{T1}$" from the first list 751 (step S258). This processing prevents the counter for the I/O request SSR 1 specified by the ID "b", the successive LBA area "a", and the process start time "$T_{T1}$" from being redundantly incremented. Note that the successive LBA area "a" and the counter value N in the second list 752 are not deleted. Therefore, when another I/O request specifies the successive LBA area "a", it is also correctly checked whether this successive LBA area "a" includes a defective fixed-block. That is, if the successive LBA area "a" and the counter value N in the second list 752 are deleted, it cannot be determined whether the counter value N reaches the limit time $N_L$ or not, and therefore reassign processing cannot be executed correctly.

As described above, a response RES 1 to the I/O request SSR 1 returns from the disk drive 62 through the disk interface 74 to the read/write controller 73. The response RES 1 includes the successive LBA area "a", information indicative of read or write, and the ID of the I/O request SSR 1 "b". The disk interface 74 transmits a receive notification to the reassignment part 75 whenever the disk interface receives the response RES to each I/O request SSR. In response to the receive notification, the reassignment part 75 executes the processing in steps S261 to S267 shown in FIG. 59, which will be described later.

When the response RES 1 indicates that writing has failed, the read/write controller 73 generates an I/O request SSR 1' including the same information as the I/O request SSR 1 to retry to register the sub-segment in the successive LBA area "a", and then transmits the same to the disk drive 62. When the response RES 1 indicates that reading has failed, the read/write controller 73 recovers the unread sub-segment or retries to register the sub-segment as described above by using parity and other sub-segments according to the RAID architecture.

The disk interface 74 transmits a transmission notification of the I/O request SSR 1' to the reassignment part 75. This transmission notification includes the ID "c" and the successive LBA area "a". The reassignment part 75 detects the receive time of the transmission notification (the process start time $T_{T1}'$ of the I/O request SSR 1') and also extracts the ID "c" and the successive LBA area "a" from the receive notification (step S241 of FIG. 57).

The reassignment part 75 then refers to the first list 751 to determine whether plural I/O requests SSR have been sent to the target disk 62 (the destination of the I/O request SSR 1') or not (step S242) If one I/O request SSR, that is, only the I/O request SSR 1', has been sent, the reassignment part 75 registers the successive LBA area "a", the ID "c", and the process start time $T_{T1}'$ obtained in step S241 in the first list 751 (step S243), and then ends the processing of FIG. 57. As a result, the first list 751 becomes as such shown in FIG. 60(a-4). On the other hand, if another I/O request SSR other than the I/O request SSR 1' has been sent, the reassignment part 75 registers only the successive LBA area "a" and the ID "c" extracted in step S241 (step s244), and then ends the processing of FIG. 57. In this case, the first list 751 becomes as such shown in FIG. 60(a-5).

Figure 58:
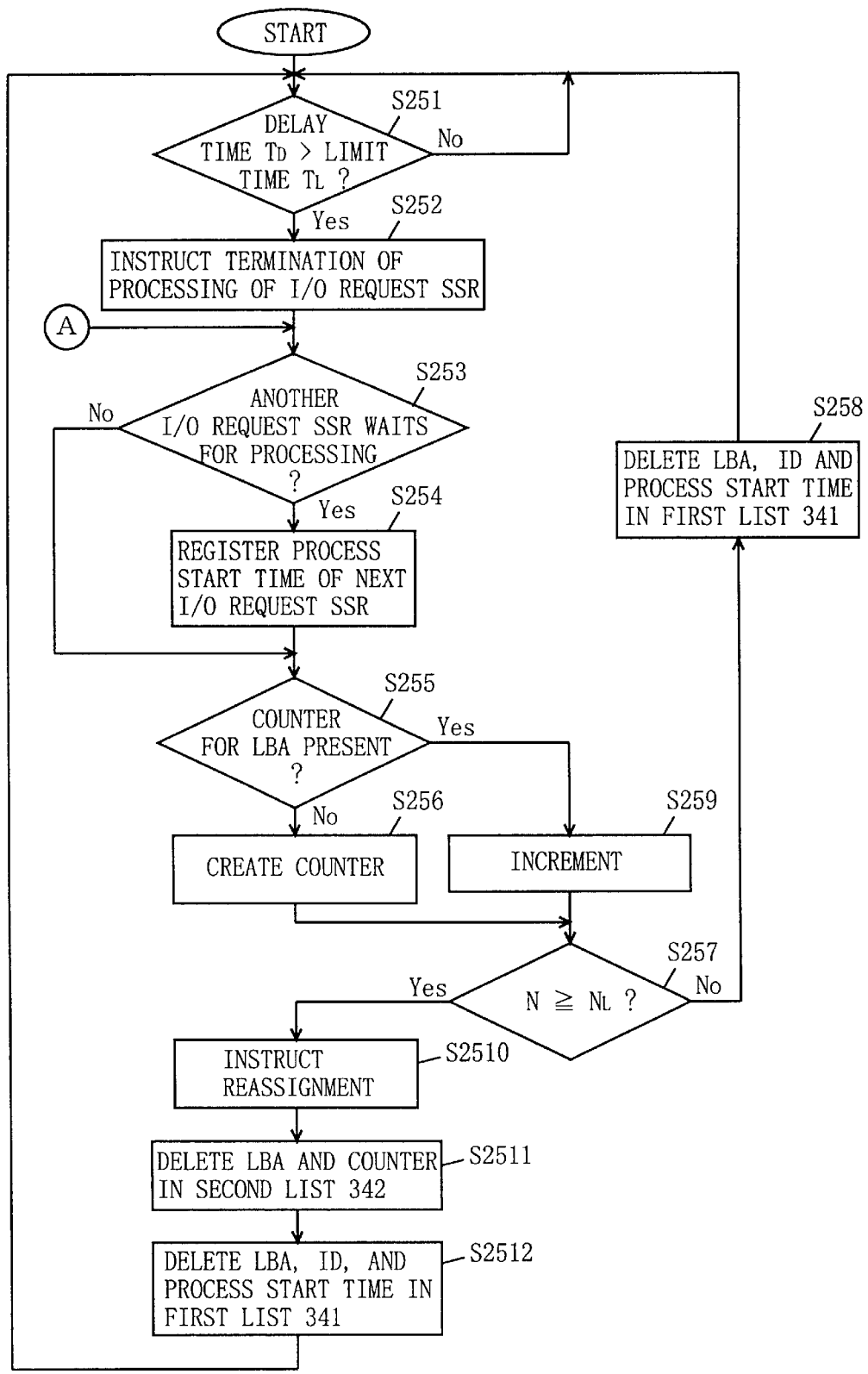
FIG. 58 is a flow chart showing the procedure to be steadily executed by the reassignment part 75.

When the processing of FIG. 57 ends, the reassignment part 75 executes the flow chart of FIG. 58. When $T_{D1}'$ (the present time $T_P$–the process start time $T_{T1}'$) exceeds the limit time $T_L$ as to the registered process start time $T_{T1}'$, the reassignment part 75 executes the above described processing of steps S252 to S254, and their description is omitted herein. The reassignment part 75 then checks whether the counter is created for the successive LBA area "a" corresponding to the process start time $T_{T1}'$ (step S255). In the present second list 752, as shown in FIG. 60(b-2), the counter is created for the successive LBA area "a", and therefore it is determined that there is a high possibility of including a defective fixed-block at previous check (that is, at the time of transmission of the I/O request SSR 1). Therefore, the reassignment part 75 increments the counter value N by "1", as shown in FIG. 60(b-2) (step S259).

As described above, assume herein that the limit time $N_L$ is "2". Since the counter value N is "2" at present, the reassignment part 75 determines that the successive LBA area "a" includes a defective fixed-block, instructing reassignment in step S257. The reassignment part 75 produces a REASSIGN_BLOCKS command (refer to FIG. 61), which is one of the SCSI commands, for specifying the successive LBA area including the defective fixed-block. The reassignment part 75 specifies the successive LBA area "a" in a defect list of the REASSIGN_BLOCKS command. The reassignment part 75 transmits the REASSIGN_BLOCKS command through the disk interface 74 to the disk drive 62, instructing reassignment (step S2510).

As the alternate area, the disk drive 62 assigns a fixed-block having a physical address which allows successive data transmission to the successive LBA area specified by the REASSIGN_BLOCKS command, and then returns an affirmative response ACK 1, a signal indicative of the end of reassignment, to the disk controller 71. As is the case in the present embodiment, when the disk controller 71 instructs the disk drive 62 with the REASSIGN_BLOCKS command to execute reassignment, the physical address to which the sub-segment is reassigned is changed in the disk drive 62 after reassignment, but the logical block address (LBA) to which the sub-segment is reassigned is not changed even after reassignment. Therefore, the disk controller 71 does not have to store the new LBA for the sub-segment after reassignment.

Described next is the physical address of the alternate recording area which allows successive data transmission in the disk drive 62. With such physical address, the above described overhead can be shortened so as to satisfy input/output in real time. Examples of the alternate recording areas in the disk drive 62 (that is, each fixed-block composing the successive LAB area specified by the REASSIGN_BLOCKS command) are as follows:

1. Fixed-blocks whose physical addresses are close to each other;
2. Fixed-blocks having successive physical addresses;
3. Fixed-blocks on the same track (or cylinder);
4. Fixed-blocks on tracks close to each other; and
5. Fixed-blocks on the track (or cylinder) close to the track (or cylinder) with the defective block assigned thereto.

When the successive LBA area including such fixed block as listed above is specified, the disk drive 62 can, as a natural consequence, successively transmit the requested sub-segment in real time to the disk controller 71.

With the affirmative response ACK 1, the disk drive 62 notifies the disk controller 71 of the end of reassignment. When receiving the affirmative response ACK 1, the host interface 72 transfers the same to the reassignment part 75 and the read/write controller 73. When the reassignment part 75 receives the affirmative response ACK 1, the procedure advances from step S2510 to step S2511. Since the successive LBA area "a" included in the affirmative response ACK 1 has been reassigned, the reassignment part 75 deletes the successive LBA area "a" and the counter value from the second list 752 (step S2511), and also deletes the first list 751 including the successive LBA area "a", the ID "c", and the process start time $T_{T1}'$ (step s2512). The procedure then returns to step S251.

Upon receiving the affirmative response ACK 1, the read/write controller 73 instructs the disk drive 62 subjected to reassignment to write the sub-segment when the I/O request SSR 1' requests write operation. When the I/O request SSR1' requests read operation, the read/write controller 73 recovers the sub-segment lost by reassignment using parity and other sub-segments according to the RAID architecture, and then transmits the recovered sub-segment to the host device 81 through the host interface 72 and also instructs the disk drive 62 through the disk interface 74 to write the recovered sub-segment. Thus, the recorded data in the disk drive 62 can maintain consistency before and after reassignment.

As described above, the essentials of the present disk array device are timing of reassignment and physical address of the alternate area. For easy understanding of these essentials, the operation of the reassignment part 75 has been described above with some part omitted when the response RES 1 is received by the array controller 2. That is, when the response RES 1 returns to the disk controller 71, the contents of the first list 751 vary according to the return time of the response RES 1 and the type of the response RES (read or write). Described below is the operation of the reassignment part 75 when the response RES 1 returns to the disk controller 71.

The disk interface 74 generates a signal "receive notification" whenever it receives the response RES to the I/O request SSR, and transmits the same to the reassignment part 75. This receive notification includes the ID and successive LBA area of the I/O request on which the received response RES is based. The reassignment part 75 executes the flow chart of FIG. 59 whenever it receives a receive notification. Now, assume herein that the disk interface 74 generates the receive notification upon receiving the response RES 1 and transmits the same to the reassignment part 75. The response RES 1 includes, as evident from above, the ID "b", the successive LBA information "a" and the information on whether read or write. Note that the information on whether read or write is not required for the reassignment part 75. Therefore, the receive notification only includes the ID "b" and the LBA "a".

The reassignment part 75 checks whether the ID "b" has been registered in the first list 751 or not (step S261). If the ID "b" has not been registered in the first list 751 even though the I/O request SSR 1 has been transmitted, that means that the ID "b", the successive LBA area "a", and the process start time "$T_{T1}$" were deleted in step S258 or S2512 of FIG. 28. Therefore, not required to change (update or delete) the first list 751, the assignment part 75 ends the processing of FIG. 58.

On the other hand, in step S261, if the ID "b" has been registered in the first list 751, that means that $T_{D1} > T_L$ has not been satisfied in step S251 (refer to FIG. 58) until the receive notification is received (that is, the response RES is returned). Therefore, the reassignment part 75 determines whether $T_{D1} > T_L$ is satisfied at present in the same manner as step S251 (step S262). When the delay time $T_{D1}$ exceeds the limit time $T_L$, it is required to determine whether the reassignment should be instructed or not, and therefore the procedure advances to steps S253 of FIG. 58 and thereafter, as shown by A in FIG. 59.

On the other hand, when the delay time $T_{D1}$ does not exceed the limit time $T_L$, that means that the response RES 1 has been received by the disk controller 71 before a lapse the limit time $T_L$. That is, the successive LBA area "a" does not include a defective fixed-block. Therefore, the reassignment part 75 checks whether the counter is created for the successive LBA area "a" in the second list 752 (step S263). If the counter has been created, the reassignment part 75 executes the step S265 to delete the ID "b" and the process start time "$T_{T1}$" (step S264). On the other hand, if the counter has not been created yet, the reassignment part 75 deletes only the ID "b" and the process start time "$T_{T1}$" from the first list 751 (step S265).

The reassignment part 75 determines whether the I/O request SSR has been sent to the target disk drive 62 (the disk drive 62 for transmitting the present response RES 1) or not (step S266). In the first list 751, the I/O request SSR transmitted to the target disk drive 62 is written. The reassignment part 75 can make determination in step S266 by referring to the first list 751. When the I/O request is present, as shown in FIG. 60(*a*-5), the first list 751 includes the ID and the successive LBA area of the present I/O request registered therein, but does not include the process start time. Therefore, the reassignment part 75 registers the present time as the process start time of the I/O request SSR to be processed next in the disk drive 62 (step S267) and then ends the processing of FIG. 59. The present time is the time when a response RES to one I/O request SSR returns from the disk drive 62 to the disk controller 71, and is also the time when the disk drive 62 starts processing of the I/O request SSR sent next. That is, the present time as the process start time is the time when processing of the I/O request SSR to the disk drive 62 starts.

In some cases, the reassignment part 75 may erroneously determine that there is a possibility of including a defective fixed-block in the successive LBA area "a" due to thermal aspiration, thermal calibration, and others occurred in the disk drive 62, creating a counter, even though the successive LBA area "a", in fact, does not include a defective fixed-block but is composed of normal fixed blocks. If the information on the successive LBA area "a" composed of normal fixed blocks has been registered in the first list 751 for a long time, the reassignment part 75 may instruct unnecessary reassignment. In step S264, if the counter has been created, that means that the reassignment part 75 determines that there is a possibility of including a defective area in the successive LBA area "a". Therefore, the reassignment part 75 deletes the successive LBA area "a" and the counter value N from the second list 752 (step S264), and then executes steps S265 to S267 to end the processing of FIG. 59.

As described above, according to the present embodiment, the reassignment part 75 in the disk controller 71 monitors the delay time $T_D$ of the response RES to each I/O request SSR from the process start time of each I/O request SSR, determining whether to instruct the disk drive 62 to execute reassignment based on the calculated delay time $T_D$. Here, the process start time is the time when each I/O request SSR is transmitted to each disk drive 62 if the number of I/O requests SSR sent to each disk drive is 1. When plural I/O requests SSR are sent to each disk drive, the process start time is the time when the disk controller 71 receives the response RES to the I/O request SSR to be processed immediately before the present I/O request SSR. By controlling reassign timing in this manner, even if the recording area of the sub-segment is accessible with several retries by the disk drive, the reassignment part 75 assumes that its delay in response becomes large (that is, input/output in real time cannot be satisfied), and instructs execution of reassignment. That is, the disk array device 51 can instruct execution of reassignment in such timing as to suppress a delay in response.

Further, a long delay in the response RES to one I/O request SSR affects processing of the following I/O requests SSR to be processed. That is, a delay in response to the following I/O requests SSR to be processed occurs in the same disk drive 62, causing adverse effects that transmission of the following responses RES in real time cannot be satisfied. Therefore, the reassignment part 75 monitors the delay time $T_D$ Of the I/O request SSR, and, when the delay time $T_D$ exceeds the limit time $T_L$, terminates execution of processing of the I/O request SSR. Thus, even if processing of one I/O request is delayed, such delay does not affect processing of the following I/O requests SSR.

Still further, the reassignment part 75 in step S251 of FIG. 58 determines whether the successive LBA area includes a defective fixed-block or not, using a criterion $T_D>T_L$. The reassignment part 75, however, does not instruct reassignment immediately after determining that $T_D>T_L$ is satisfied, but instructs using a REASSIGN-BLOCKS command after successively determining for a predetermined number of times that $T_D>T_L$ is satisfied. Thus, even if it is erroneously and sporadically determined due to thermal aspiration, thermal calibration, and others that the successive LBA area, which in fact includes only normal blocks, includes a defective block, the reassignment part 75 can prevent unnecessary reassign instruction. Note that, if unnecessary reassign instruction is not taken into consideration, the limit number N may be "1".

Still further, when instructing reassignment, the reassignment part 75 transmits a REASSIGN_BLOCKS command indicating all successive LBA areas in defect lists (refer to FIG. 61). The disk drive 62 assigns an alternate recording area a having the physical address allowing successive data transmission to the successive LBA area specified by the REASSIGN_BLOCKS command. Thus, the present disk array device 51 does not degrade its capability before and after executing reassignment, always allowing input/output in real time without a delay in response.

Still further, when the I/O request SR requests read operation, the read/write controller 73 recovers the unread sub-segment after assignment according to the RAID architecture. The recovered sub-segment is written in the alternate recording area (successive LBA area). On the other hand, when the I/O request SR requests write operation, the read/writ controller 73 transmits the I/O request SSR to write the sub-segment in the alternate recording area (successive LBA area) after reassignment. The LBA of that sub-segment is not changed before and after reassignment. Thus, the disk array device 51 can maintain consistency in the sub-segment recorded in the disk group 61 before and after reassignment.

In the present embodiment, for simple and clear description, other successive LBA area, ID, process start time, and counter have not been described, but such information for many successive LBA areas are actually registered in the first list 751 and the second list 752. Furthermore, in the actual disk array device 51, the read/write controller 73 may transmit plural I/O requests SSR to one sub-segment. In this case, for the successive LBA area with that sub-segment recorded therein, a plurality of sets of the ID, the successive LBA area, and process start time are registered in the first list 751.

Furthermore, in the present embodiment, the reassignment part 75 instructs execution of reassignment. However, if each disk drive 62 executes the conventional reassign method such as auto-reassign independently of the reassignment part 75, the capability of input/output in real time in the entire disk array device 51 can be further improved.

(Tenth Embodiment)

Figure 62:
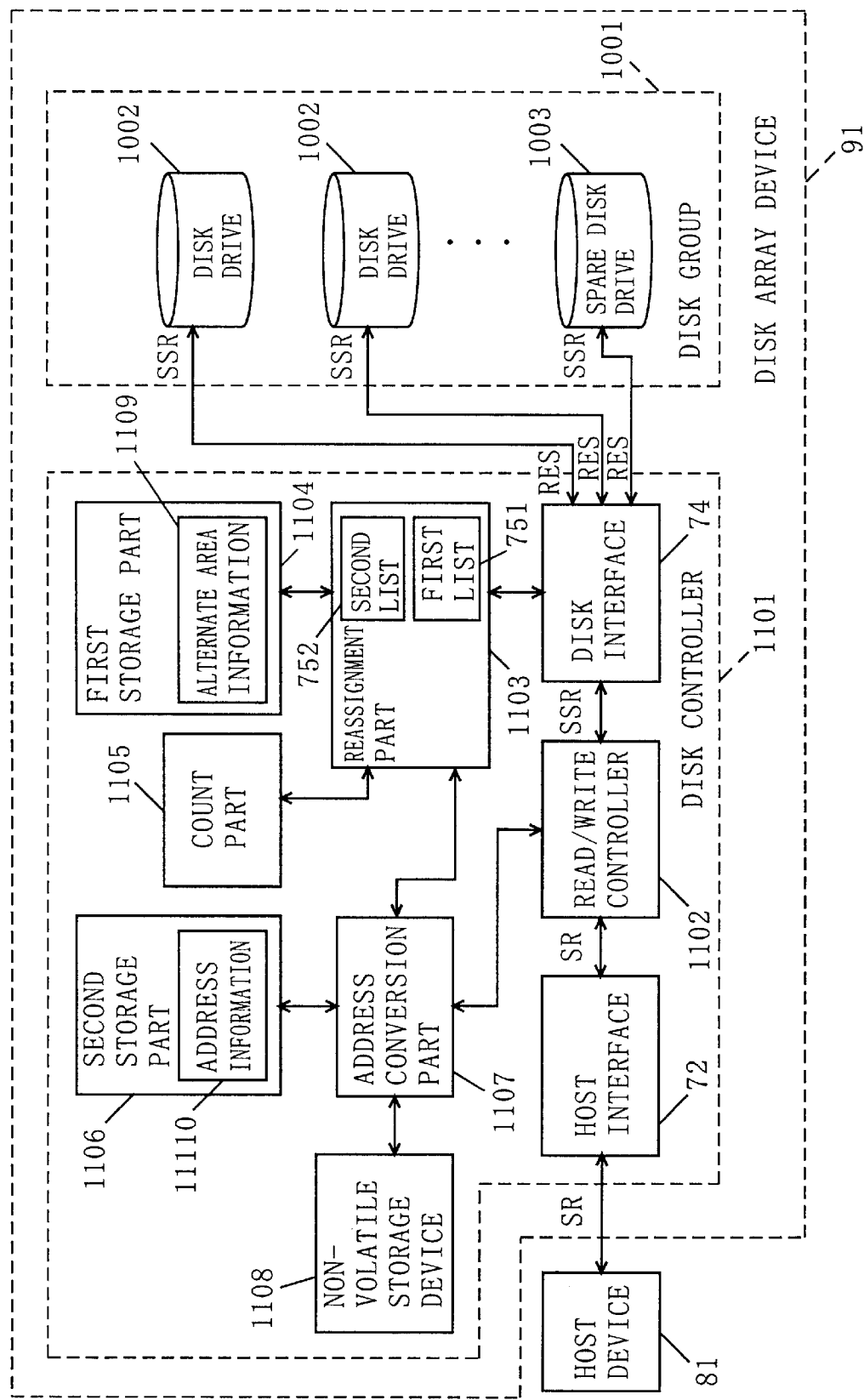
FIG. 62 is a block diagram showing the structure of a disk array device 91 according to a tenth embodiment of the present invention.

FIG. 62 is a block diagram showing the structure of a disk array device 91 according to a tenth embodiment of the present invention. In FIG. 62, the disk array device 91 is constructed according the RAID architecture of a predetermined level, including a disk group 1001 and a disk controller 1101. Furthermore, the disk array device 91 is communicably connected to the host device 81 as in the first embodiment. Since the disk array device 91 shown in FIG. 62 partially includes the same components as those in the disk array device 51 shown in FIG. 55, the corresponding components in FIG. 62 are provided with the same reference numbers as those in FIG. 55, and their description is omitted herein.

The disk group 1001 is constructed of two or more disk drives. A logical block address is previously assigned to each recording area in each disk drive. Each disk drive manages its own recording areas by a unit of block (typically, sector) of a predetermined fixed length (normally, 512 bytes). In the present embodiment, the disk drives in the disk group 1001 are divided into two groups. Disk drives 1002 of one group are normally used for data recording, reading and writing the data (sub-segment and parity), like the disk drives 62 shown in FIG. 55. A spare disk drive 1003 of the other group is used when the alternate areas in the disk drives 1002 become short. The spare disk drive 1003 is used as the disk drive 1002 for recording data after the data recorded in the disk drive 1002 is copied thereto.

The disk controller 1101 includes the same host interface 72 and disk interface 74 as those in the disk controller 71 of FIG. 55, a read/write controller 1102, a reassignment part 1103, a first storage part 1104, a count part 1105, a second storage part 1106, an address conversion part 1107, and a non-volatile storage device 1108. The read/write controller 1102 is communicably connected to the host interface 72, controlling read or write operation on a sub-segment according to an I/O request SR from the host device 81. The read/write controller 1102 controls read or write operation in cooperation with the address conversion part 1107. The reassignment part 1103 is communicably connected to the disk interface 74, executing reassign processing. The reassignment part 1103 creates the first list 751 and the second list 752 similar to those in the reassignment part 75 of FIG. 55, determining timing of start reassign processing. The reassignment part 1103 is different from the reassignment part 75, however, in that the reassignment part 1103 assigns an alternate recording area to a defective recording area by referring to alternate area information 1109 stored in the first storage area 1104. Furthermore, the reassignment part 1103 counts up the count part 1105 to count the used amount (or the remaining amount) of the alternate areas whenever the reassignment part 1103 assigns an alternate area. The address conversion part 1107 operates calculation according to the RAID architecture whenever the reassignment part 1103 assigns an alternate area, uniquely drawing the original recording area (LBA) and the current recording area (LBA) of the data. The address conversion part 1107 then stores the drawn original recording area and the current recording area as address information 11110 in the second storage part 1106 for each disk drive 1002. The non-volatile storage device 1108 will be described last in the present embodiment.

Described briefly next is the operation of the disk array device 91 on initial activation. In the disk group 1001, a defective fixed-block may already be present in the recording area of one disk drive 1002 or 1003 on initial activation. Further, there is a possibility that an unsuitable recording area for "successive data transmission" as described in the ninth embodiment may be present in one disk drive 1002 or 1003 due to this defective fixed-block. When the unsuitable area is used as the alternate area, input/output in real time is impaired. Therefore, the disk array device 91 executes processing described in the following on initial activation, detecting the defective fixed-block and also the recording area unsuitable as the alternate area.

On initial activation, the disk controller 1101 first reserves part of the recording areas included in each disk drive 1102 and each spare disk drive 1103. The disk controller 1101 generates the alternate area information 1109, and stores the same in the first storage part 1104. In FIG. 63, the first storage area 1104 manages the alternate areas reserved for each disk drive 1102 or 1103 by dividing the alternate areas into the size of sub-segment. The divided alternate areas are used as the alternate areas. Typically, each alternate area is specified by the first LBA. Further, the disk controller 1101 reserves part of the recording areas in each disk drive 1002 or 1003 as not only the alternate areas but also system areas. As a result, the sub-segments and parity are recorded in the recording areas other than the alternate areas and the system areas in each disk drive 1002 and 1003.

Each alternate area is used only after reassign processing is executed. A sub-segment or parity is not recorded in the alternate area unless reassign processing is executed. The system areas are areas where information for specifying the alternate area (that is, the same information as the alternate area information 1109), and the same information as the address information 11110 are recorded. Like the alternate areas, the system areas are managed so that a sub-segment or parity is not recorded therein. When the present disk array devise 91 is again powered on after initial activation, the information recorded in the system area of each disk drive 1002 is read into the first storage part 1104 or the second storage part 1106, and used as the alternate area information 1109 or the address information 11110.

Further, on initial activation, the recording areas in each disk drive 1002 or 1003 is checked whether each block in the size of the sub-segment is suitable for successive data transmission or not, that is, checked whether the recording area in the size of the sub-segment includes a defective fixed-blocks or not. In the recording area which is determined to include a defective fixed-block through this check, the system area and the alternate area information 1109 are updated so that the determined recording area is not used as the alternate area and the sub-segment or parity is not recorded therein. An alternate area is assigned to the recording area including the defective block. When it is determined that the recording area reserved as the alternate area includes a defective fixed-block through the check, the LBA of the recording area is deleted from the alternate area information 1109. Such check is executed through the following procedure, which is described in Japan Standards Association X6053-1996 and others, and therefore will be briefly described herein.

The disk controller 1101 first transmits a READ_DEFFECT_DATA command, one of the SCSI commands, to each disk drive 1002 or 1003 to extract a defect descriptor indicative of the defective area information. The disk controller 1101 extracts information on the defective LBA from the defect descriptor by using SCSI commands such as a SEND_DIAGONOSTIC command and a RECEIVE_DIAGONOSTIC_RESULTS command. The disk controller 1101 determines that the recording area including the defective LBA (defective fixed-block) is unsuitable for successive data transmission.

The above check is periodically executed to the recording area of the sub-segment or parity in each disk drive 1002 or 1003 even during the operation of the disk array device 91. When the defective area is detected through this check, an alternate area is assigned to the defective area.

Described next is the operation to be executed by the read/write controller 1102 with reference to a flow chart of FIG. 64. The host device 81, as is in the same manner as in the ninth embodiment, specifies the LBA of the segment by the I/O request SR to request the disk array device to execute read or write operation. Note that the LBA specifying the recording area of the sub-segment is changed before and after reassignment. At this point, the reassign processing is clearly different from that in the ninth embodiment. Therefore, in the LBA specified by the I/O request SR, the recording area of the sub-segment may not be correctly specified. Through processing by the address conversion part 1107 (will be described later), however, the read/write controller 1102 can obtain the recording area of the sub-segment correctly without any problems.

Figure 64:
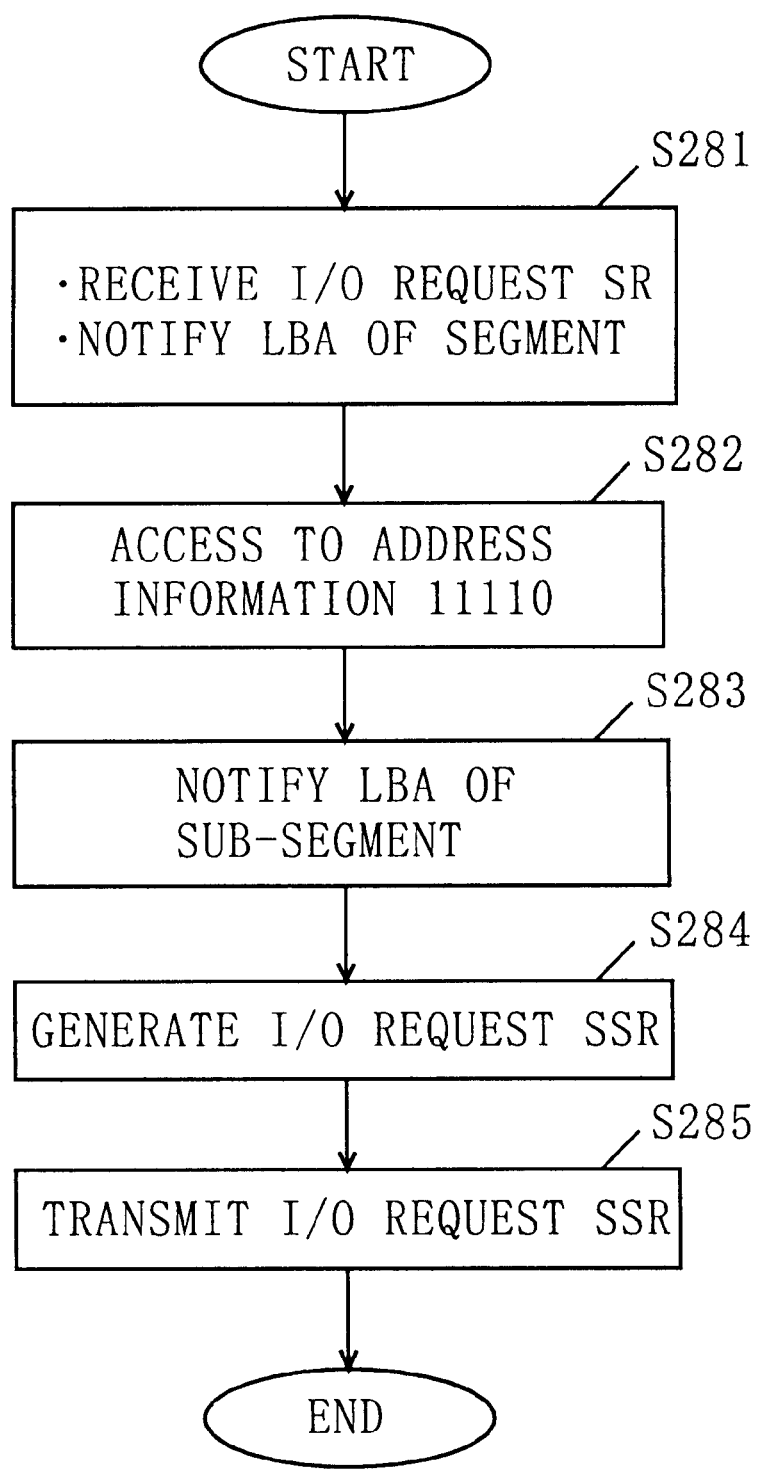
FIG. 64 is a flow chart showing the procedure to be executed by a read/write controller 1102.
Figure 65:
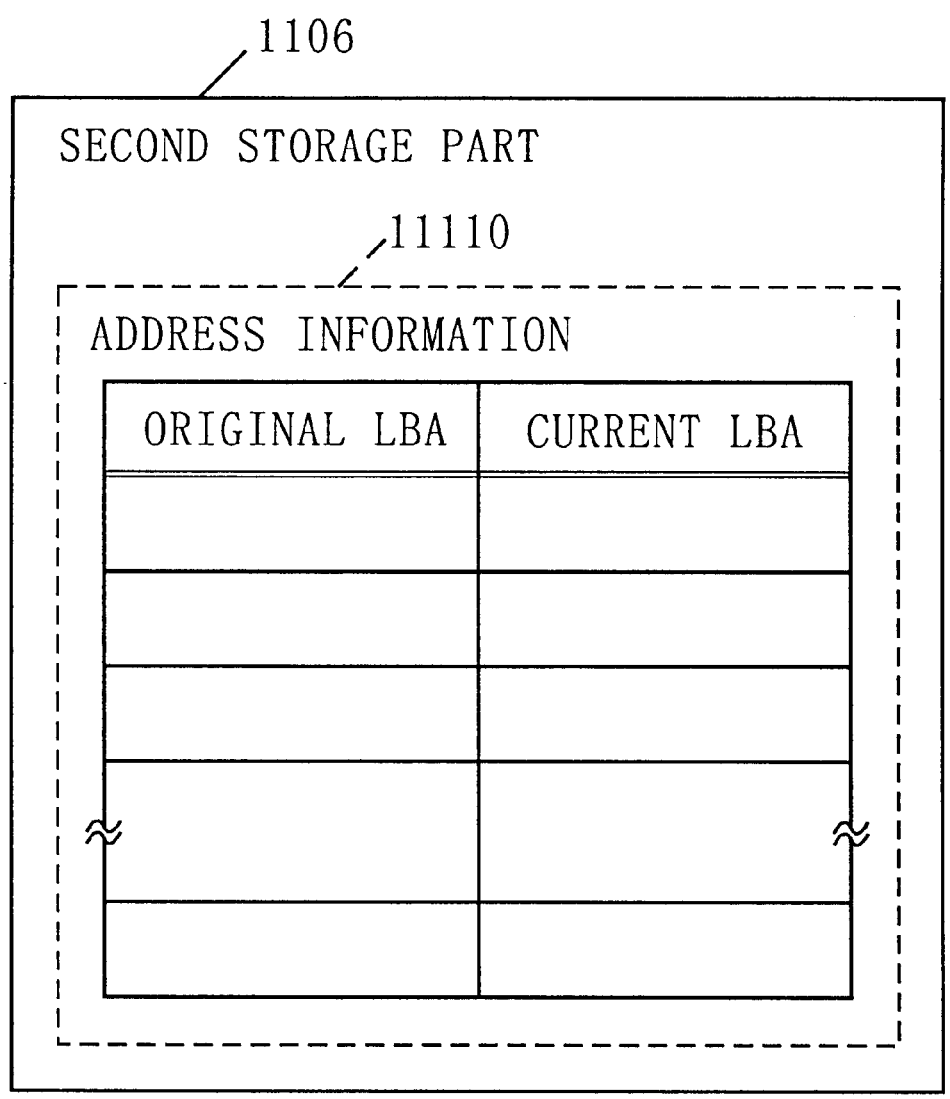
FIG. 65 is a diagram illustrating address information 11110 stored in a second storage part 1106.

When receiving an I/O request SR through the host interface 72, the read/write controller 73 notifies the address conversion part 1107 of the LBA specified by the I/O request SR (step S281 of FIG. 64). The address conversion part 1107 converts the notified LBA and block length of the I/O request SR into the LBA of the sub-segment according to the RAID architecture. The address conversion part 1107 determines whether an alternate area has been assigned to the LBA of the sub-segment by accessing to the address information 11110 managed by the second storage part 1106 (step S282). If an alternate area has been assigned, the address conversion part 1107 fetches the LBA of the alternate area from the address information 1108 to notify the read/write controller thereof. If an alternate area has not been assigned, the address conversion part 1107 notifies the read/write controller 1102 of the converted LBA as it is (step S283). As shown in FIG. 65, the address information 11110 is constructed in list form. In that list, the LBA specifying the recording area in which the sub-segment is currently recorded (shown as current LBA in FIG. 65) is registered for each LBA specifying the original recording area of the sub-segment (shown as original LBA in FIG. 65). The address conversion part 1107 can correctly recognize the LBA specifying the recording area of the sub-segment requested by the I/O request SR by referring to the address information 11110, notifying the read/write controller 1102 thereof.

The read/write controller 1102 generates an I/O request SSR in a unit of sub-segment using the sub-segment notified from the address conversion part 1107 (step S284). This I/O request SSR includes the LBA specifying the recording area of the sub-segment. The relation between a segment and a sub-segment has been described in the ninth embodiment, and therefore its description is omitted herein. Further, as described in the ninth embodiment, when accessing to the recording area of the sub-segment, the disk drive 1002 can successively input/output the sub-segment. The read/write controller 1102 transmits the generated I/O request SSR to the disk drive 102 through the disk interface 74 (step S285).

Figure 59:
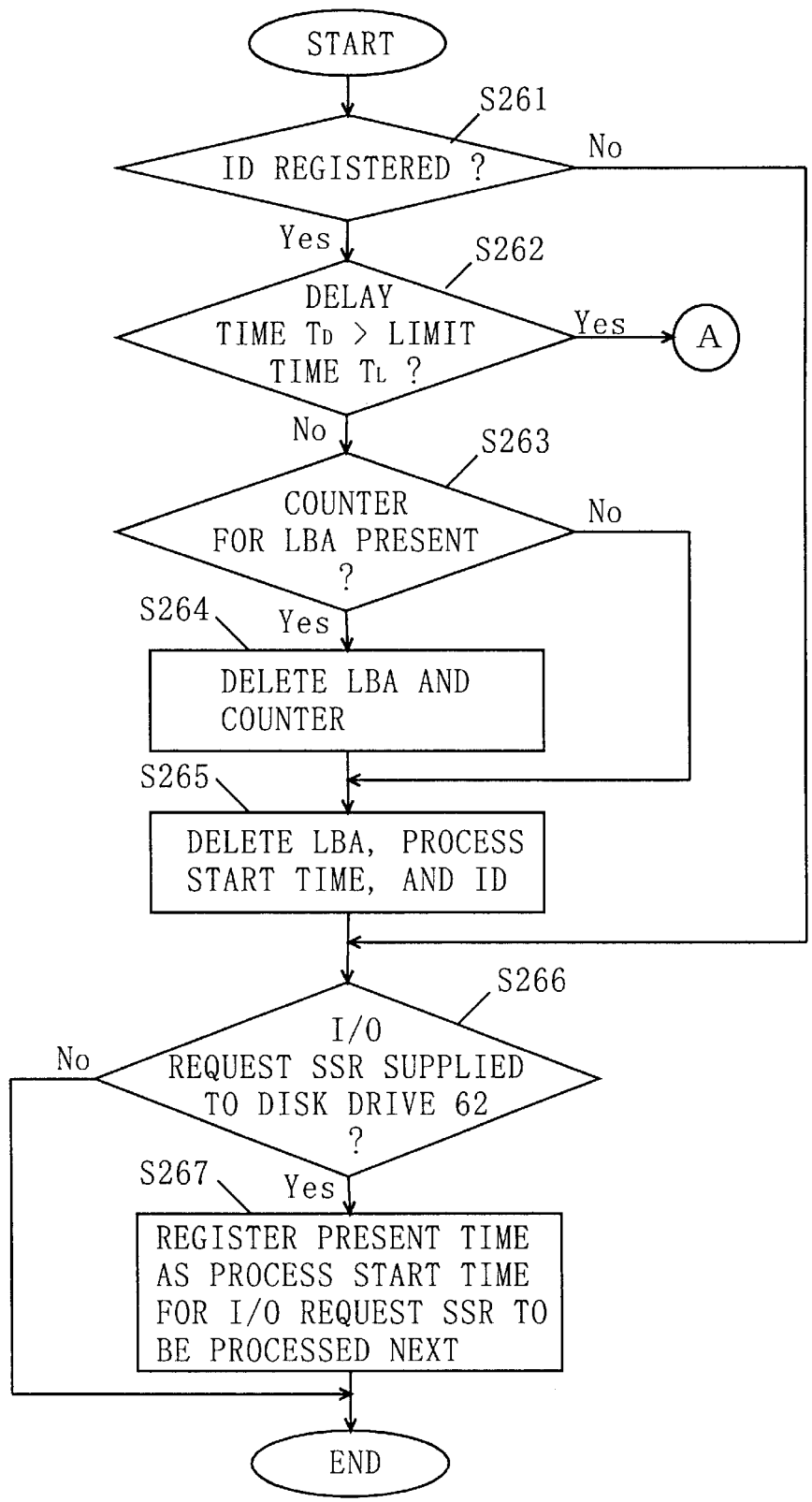
FIG. 59 is a flow chart showing operation of the reassignment part 75 when receiving a receive notification.
Figure 66:
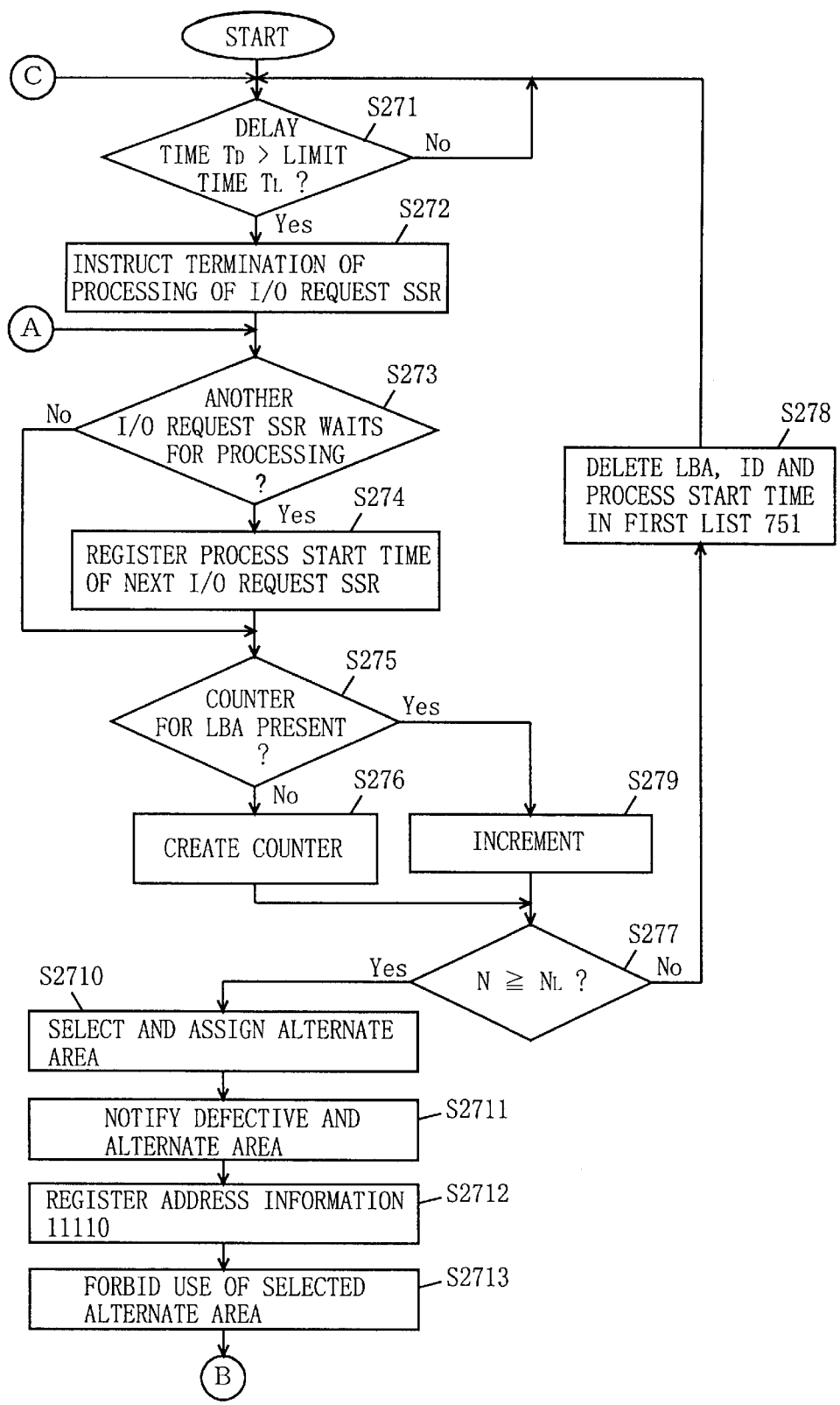
FIG. 66 is a diagram illustrating the procedure to be steadily executed by a reassignment part 1103.

The reassignment part 1103 executes the flow chart shown in FIG. 66, providing timing for executing reassignment (steps S271 to S279). Since the processing of steps S271 to S279 is the same as that of steps S251 to S259, their description is omitted herein. Although the reassignment part 1103 also executes the processing shown in the flow charts of FIGS. 57 to 59, illustration is herein omitted for the purpose of simplification of description. When the count value N≧the limit value $N_L$ is satisfied, the reassignment part 1103 assumes that the recording area of the sub-segment is defective, accessing to the alternate area information 1109 stored in the first storage part 1104 (refer to FIG. 63) to select the alternate area for the defective area from among the available alternate areas (step S2710). The alternate area is equal to the defective area, that is, the sub-segment, in size, as described above.

The reassignment part 1103 notifies the address conversion part 1107 of the LBA of the defective area (the LBA specified by the I/O request) and the LBA of the selected alternate area (step S2711). The address conversion part 1107 executes calculation according to the RAID architecture, drawing the LBA specifying the original recording area of the sub-segment (original LBA) and the LBA specifying the current recording area (alternate area) thereof (current LBA). The address conversion part 1107 accesses to the second storage part 1106 to register the drawn original LBA and current LBA in the address information 11110 (refer to FIG. 65) (step S2712). With the address information 11110 being updated, the read/write controller 1102 uses the current LBA when another I/O request for the sub-segment subjected to reassignment this time is generated next.

Figure 67:
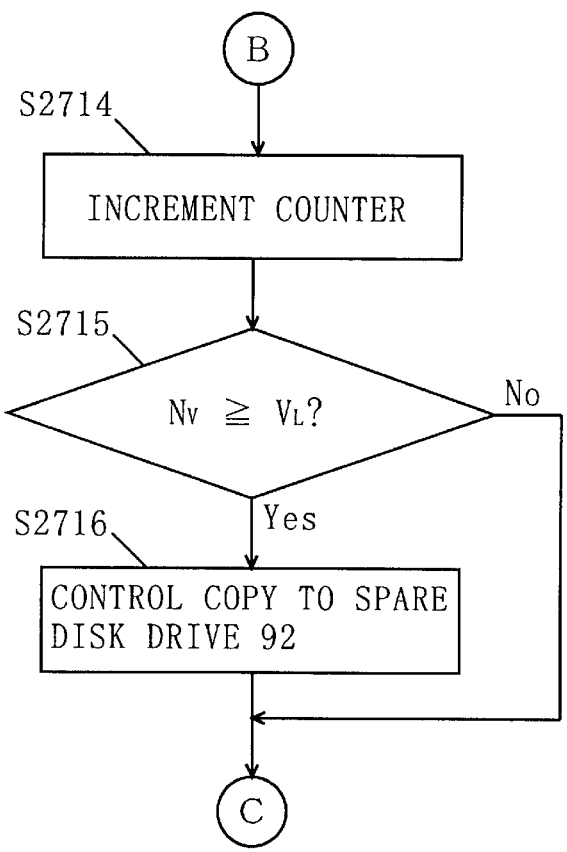
FIG. 67 is a flow chart showing the procedure after step S2713 shown in FIG. 66.
Figure 68:
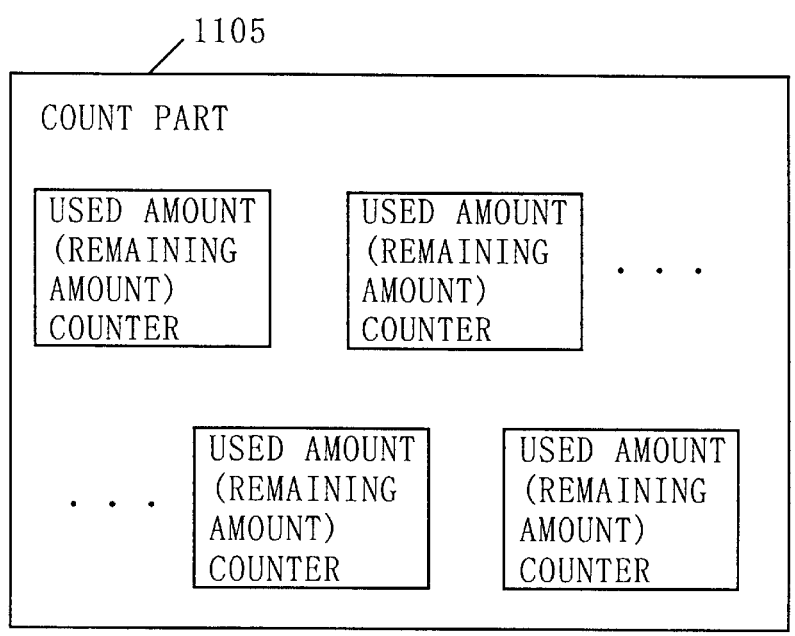
FIG. 68 is a diagram showing a counter included in a count part 1105.
Figure 69:
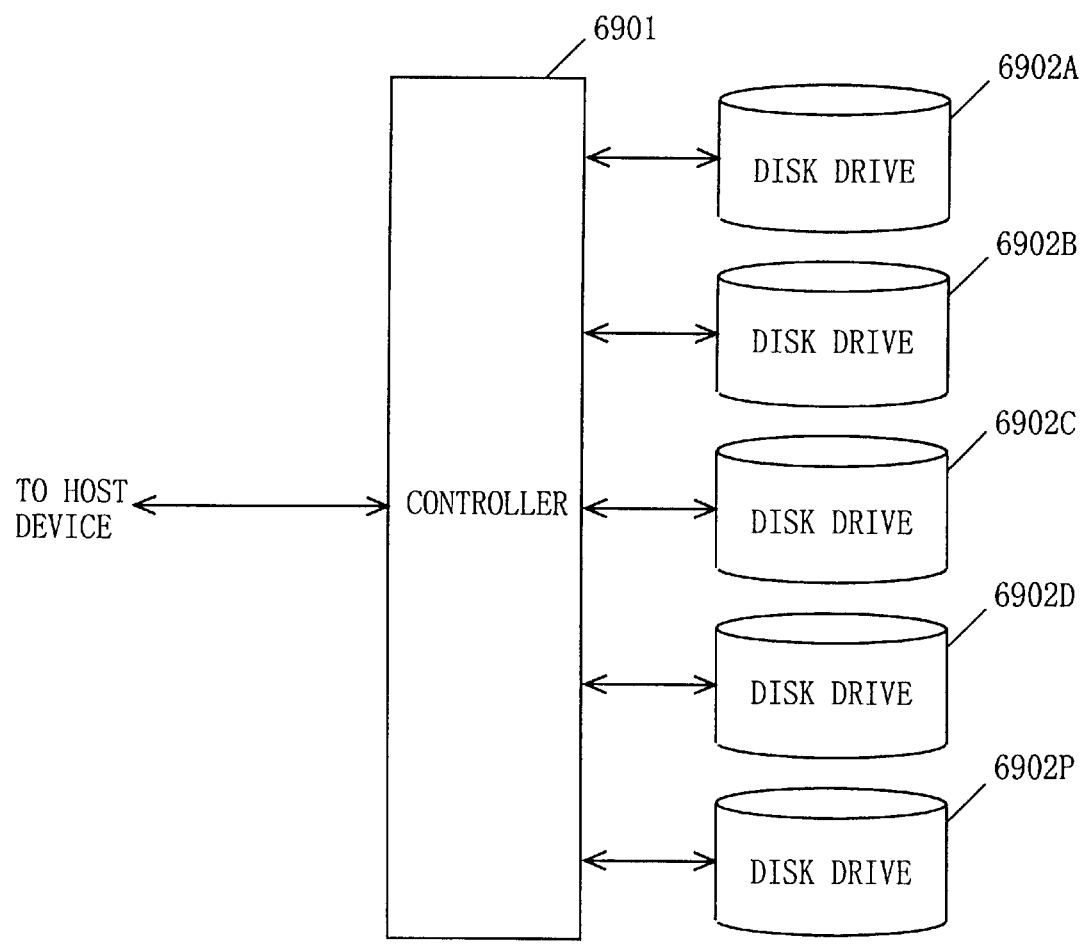
FIG. 69 is a diagram showing a conventional disk array device adopting the RAID-3 architecture.
Figure 70A:
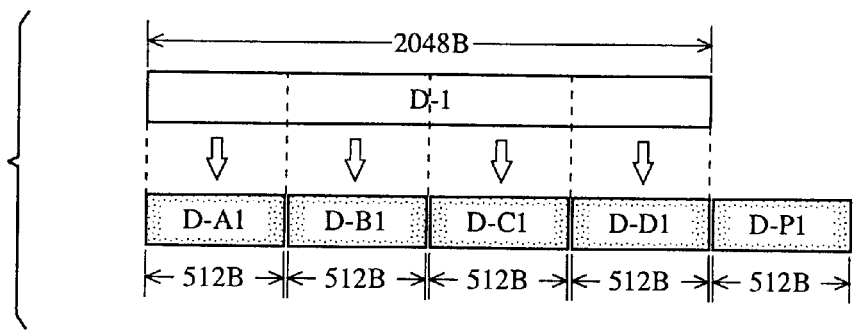
FIGS. 70a and 70b are diagrams illustrating a method of creating redundant data in the conventional disk array device.
Figure 70B:
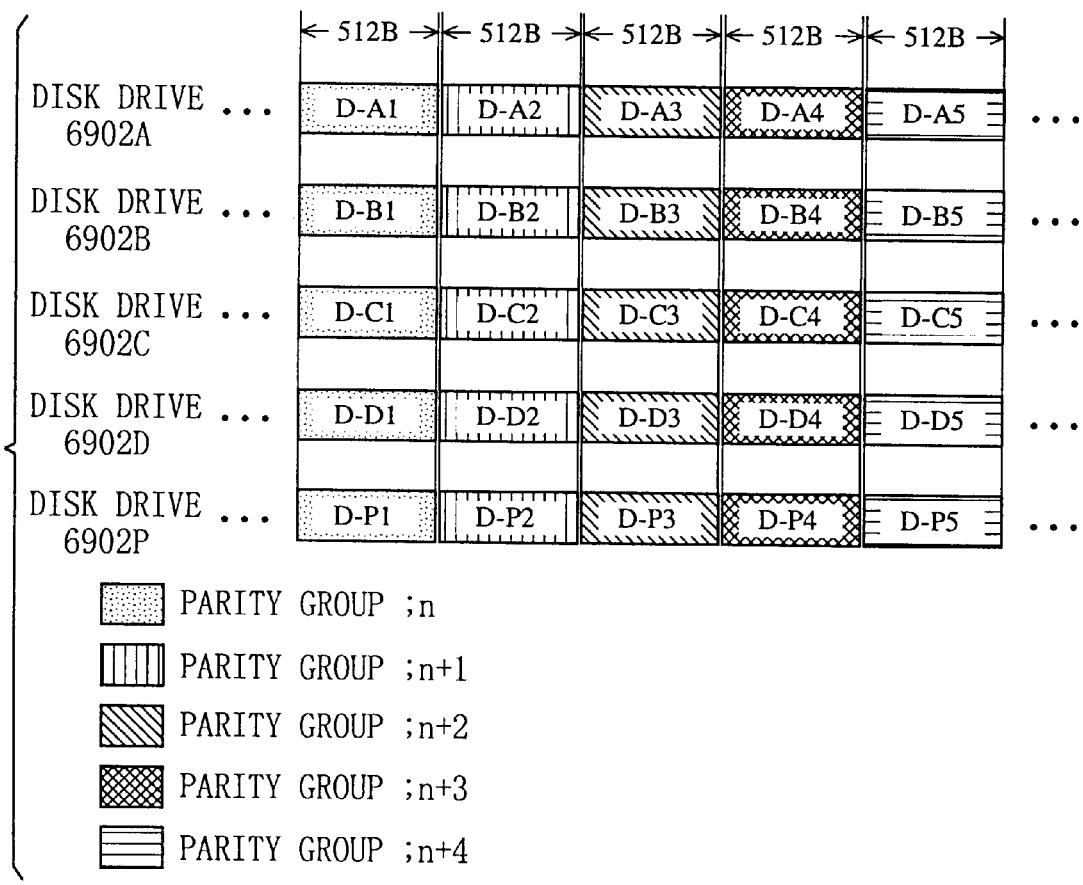
Figure 72A:
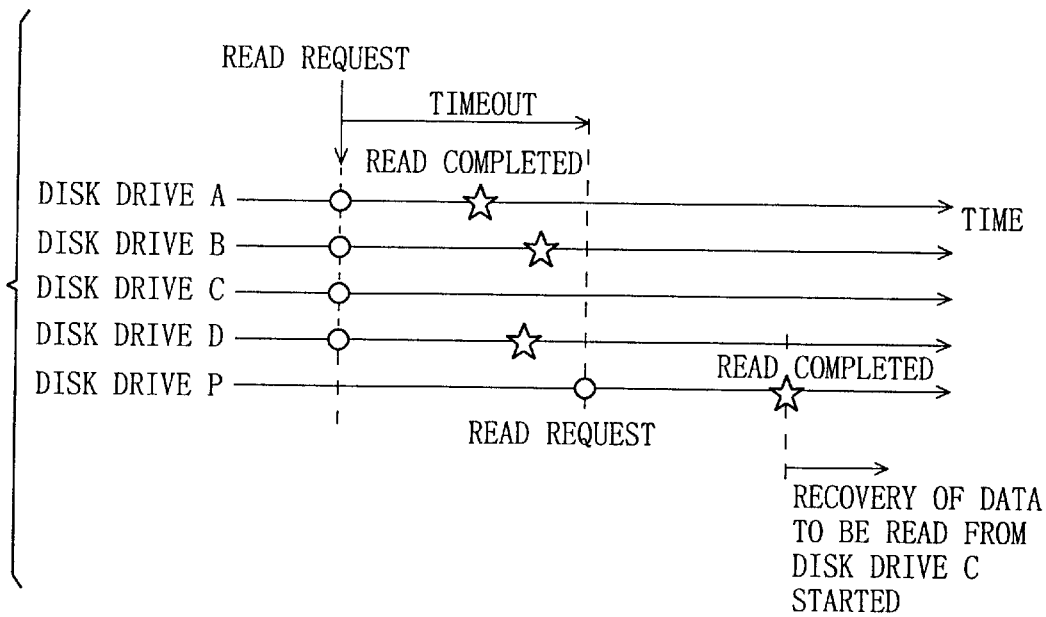
FIGS. 72a and 72b are diagrams illustrating the problems in a second disk array device disclosed in Japanese Patent Laying-Open No. 9-69027.
Figure 72B:
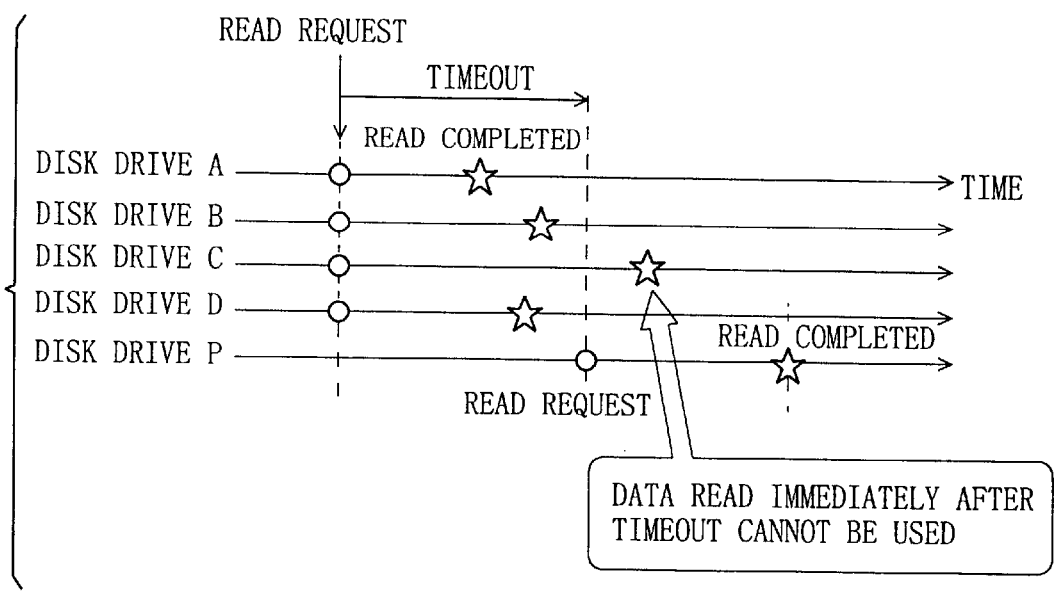

Further, the reassignment part 1103 updates the alternate area information 1109 stored in the first storage part 1104 so as not to select again the alternate area selected in step S2710, terminating the use of the selected alternate area for each disk drive 1002 (step S2713). The processing after the step S2713 is shown in the flow chart of FIG. 67 (refer to B in FIG. 66). The count part 11 includes, as shown in FIG. 68, counters for counting the used amount (or the remaining amount) of the alternate areas at present. The reassignment part 1103 increments the value of the counter for the present disk drive subjected to reassign processing by "1" (step S2714 of FIG. 67).

As described above, reassign processing is also executed in the present embodiment, and an alternate area is assigned to a defective area. When the I/O request SSR requests write operation, the read/write controller 1102 instructs the disk drive 1002 subjected to reassign processing to write the sub-segment. When the I/O request SSR requests read operation, the read/write controller 1102 recovers the unread sub-segment, transmitting the same to the host device 81 and instructing the disk drive 1002 subjected to reassign processing to write the recovered sub-segment. Thus, as in the ninth embodiment, the data recorded in the disk drives 1002 can maintain consistency before and after reassignment.

Further, when the alternate area information 1109 and the address information 11110 are updated in the above described manner, the disk controller 1101 stores the updated information in the system areas reserved in each disk drive 1002 and 1003.

Whenever processing in steps S271 to S2714 is executed on the same disk drive 1002, the alternate areas in that disk drive 1002 become short. In such disk drive 1002, the alternate areas are eventually all consumed, and therefore are unsuitable for the area for recording data. Thus, in step S2715 that follows step S2714, the reassignment part 1103 checks whether the counter value $N_V$ counting the used amount of the recording areas in the disk drive 1002 reaches a predetermined limit amount $V_L$ or not to determine whether the disk drive 1002 is suitable for recording data or not. As described above, the counter value $N_V$ of each counter indicates the used amount (or the remaining amount) of the alternate areas reserved for each disk drive 1002. That is, in step S2715, when the counter value $N_V$ reaches the limit amount $V_L$, the reassignment part 1103 assumes that the disk drive 1002 is unsuitable for recording data because of a shortage of the alternate areas. The limit amount $V_L$ is appropriately selected in consideration of the size of the alternate areas previously reserved in each disk drive 1002.

In step S2715, when determining that the disk drive 1002 is unsuitable for recording data, the reassignment part 1103 ceases to use the disk drive 1002 for data recording, and determines to use the spare disk drive 1003. In response to this determination, the disk controller 1101 controls the disk group 1001 to copy the data (sub-segment, parity, data recorded in the system area) recorded in the disk drive 1002 to the spare disk drive 1003 (step S2716). After this copy control ends, the disk controller 1101 updates the address information 11110 to provide consistency in the original LBA and the current LBA. Thus, even if receiving the I/O request SR specifying the original LBA from the host device 81, the read/write controller 1102 can fetch the current LBA of the sub-segment from the address conversion part 1107. In other words, the disk controller 1101 can correctly recognize the spare disk drive 1003 as the disk drive for recording data. Therefore, the host device 81 is not required to recognize the replacement of the disk drive 1002 with the spare disk drive 1003 in the disk group 1001.

When determining in step S2715 that the disk drive 1002 is suitable for recording data, the reassignment part 1103 returns to step S271 (refer to C) to use the disk drive 1002 for recording data.

As described above, according to the present embodiment, the reassignment part 1103 selects the alternate area referring to the alternate area information 1109 of the disk drive 1002 subjected to reassignment. All of the alternate areas registered in the alternate area information 1109 have been determined to be suitable for successive data transmission (not requiring unnecessary seek time or rotational latency) through the check on initial activation of the present disk array device 91. Thus, the present disk array device 91 can suppress additional occurrence of a delay in response, allowing input/output of sub-segment in real time after reassignment.

On initial activation and regularly during operation, the recording areas of the sub-segments and parity in each disk drive 1002 and 1003 are checked whether to be suitable for successive data transmission. An alternate area is assigned to the recording area which has been determined to be unsuitable through this check. Thus, in the disk array device 91, the recording areas of the sub-segments and parity are always kept suitable for successive data transmission, and unnecessary occurrence of a delay in response can be prevented.

Furthermore, in the present disk array device, when the alternate areas of the data disk drive 1002 become short, the spare disk drive 1003 is used as that disk drive 1002. The sub-segment or parity recorded in the disk drive 1002 with a shortage of the alternate areas is copied to the spare disk drive 1003. When the disk drive 1002 with a shortage of the alternate areas is continuously used for a long time, unnecessary delays in response tend to occur. In the present disk array device 91, however, use of the spare disk drive 1003 prevents the capability from being impaired due to such delay in response.

The first storage part 1104 and the second storage part 1106 are often constructed by a volatile storage device. Therefore, when the disk array device 91 is powered off, the alternate area information 1109 and the address information 11110 are deleted. In the system areas reserved in each disk drive 1102, however, the alternate area information 1109 and the address information 11110 can be recorded. In the present embodiment, the alternate area information 1109 and address information 11110, both of which are updated whenever reassignment is executed, are recorded in the system areas when the present disk array device 91 is powered off, and therefore it is not required for the disk controller 1101 to additionally include an expensive non-volatile storage device for storing the alternate area information 1109 and the address information 11110.

Described next is a non-volatile storage device 1108 shown in FIG. 62. In the disk array device 91, the system area is reserved in each disk drive 1002 and 1003. In the system area, information similar to the address information 11110 is recorded, as described above. In some cases, however, the disk drive 1002 or 1003 may be removed from the disk array device 91 while the disk array device 91 is powered off. If powered on without either the disk drive 1002 or 1003, the disk array device 91 is possibly not activated normally. Therefore, the non-volatile storage device 1108 is provided in the disk controller 1101, storing the address information 11110. When the disk array device 91 is powered on, the address information 11110 is read from the non-volatile storage device 1108 into the second storage part 1106. The present disk array device thus can be activated normally. Furthermore, in the disk array device 91, an alternate area may be assigned to the system area in each disk drive 1002 or 1003. In this case, the storage device 1108 stores the original LBA and the current LBA of the system area. The disk controller 1101 reads the current LBA of the system area from the storage device 1108, and then accesses to the read current LBA in the disk drive 1002 or 1003, thereby correctly accessing to the system area.

In the ninth and tenth embodiments, the alternate area is the area in which the overhead at the time of read or write operation of the disk drive 62 and 1002 is within a predetermined range. The alternate area may be, however, the area in which the time required for read and write operation is within a predetermined range in consideration of input/output in real time. Furthermore, in the ninth and tenth embodiments, the reassign timing determined by the reassignment part 75 and 1103 is when the delay time $T_D$>the limit time $T_L$ is satisfied successively a predetermined number of times for the same recording area in the same disk drive 62 and 1002. However, the reassign timing may be when the delay time $T_D$>the limit time $T_L$ is satisfied M times (M is a natural number of 1 or more and M<N) in recent N read or write operations (N is a natural number of 2 or more) for the same recording area in the same disk drive 62 and 1002. Further, the reassign timing may be when the average value of the delay time required in recent N read or write operations (N is a natural number of 2 or more) exceeds a predetermined threshold. In other words, the reassign timing may take any value as long as it is determined based on the delay time $T_D$ measured from the process start time of I/O request SSR.

In the tenth embodiment, the alternate area is equal to the sub-segment in size, that is, of a fixed length. However, the first storage part 1104 may manage the recording area allowing successive data transmission as the recording area of a variable length, and the reassignment part 1103 may select the alternate area of required size from the alternate area information 1109 when executing reassignment.

While the invention has been described in detail, the foregoing description is in all aspects illustrative and not restrictive. It is understood that numerous other modifications and variations can be devised without departing from the scope of the invention.

What is claimed is:

1. A disk array device for executing a read operation for reading data recorded therein in response to a first read request from a host device, said disk array device having recorded therein data blocks generated by dividing the data and redundant data generated from the data blocks, said disk array device comprising:

m disk drives across which the data blocks and the redundant data are distributed, wherein m≧2;

a parity calculation part operable to calculate parity from (m−2) of the data blocks and the redundant data to recover a remaining data block; and a control part operable to control the read operation, wherein said control part is operable to:

calculate a timeout period for at least one of said m disk drives based on previously required reading times of said at least one of said m disk drives;

issue second read requests to read the data blocks and the redundant data from said m disk drives in response to the first read request sent thereto;

when (m−1) of said m disk drives complete reading, detect whether a partial set of the data blocks and the redundant data has been read from said (m−1) disk drives;

when detected that the partial set of the data blocks and the redundant data has been read, issue a recovery instruction to said parity calculation part to recover the remaining data block not read from one remaining disk drive of said m disk drives after the timeout period corresponding to said one remaining disk drive has elapsed; and when the remaining data block is recovered by the calculation of parity in said parity calculation part, execute an operation for transmitting the data to the host device.

2. The disk array device according to claim 1, wherein when detecting that a full set of the data blocks has been read, said control part transmits the data to the host device without waiting for the timeout period to elapse.

3. The disk array device according to claim 1, wherein the timeout period is selected based on a start of reading of the data blocks and the redundant data and a probability of completing the reading in each of said m disk drives.

4. The disk array device according to claim 1, wherein said disk array device further comprises m SCSI interfaces corresponding to said m disk drives, and wherein said control part is operable to notify each of said m SCSI interfaces of a storage location selected from a storage area in each of said m disk drives, respectively.

5. A disk array device for executing a read operation for reading data recorded therein in response to a first read request from a host device, said disk array device having recorded therein data blocks generated by dividing the data and redundant data generated from the data blocks, said disk array device comprising:

m disk drives across which the data blocks and the redundant data are distributed, wherein $m \geq 2$;

a parity calculation part operable to calculate parity from (m−2) of the data blocks and the redundant data to recover one remaining data block; and a control part operable to control the read operation, wherein said control part is operable to:

calculate a variable timeout period based on a completion time of a (m−2)th read operation and a completion time of a previous recovery instruction by said parity calculation part;

issue second read requests to read the data blocks and the redundant data from said m disk drives in response to the first read request sent thereto;

when (m−1) of said m disk drives complete reading, detect whether a partial set of the data blocks and the redundant data has been read from said (m−1) disk drives;

when it is detected that the partial set of the data blocks and the redundant data has been read, issue a recovery instruction to said parity calculation part to recover the one remaining data block not read from one remaining disk drive of said m disk drives after the variable timeout period has elapsed; and when the one remaining block is recovered by the calculation of parity in said parity calculation part, execute an operation for transmitting the data to the host device.

6. The disk array device according to claim 5, further comprising:

a table including a time period during which said parity calculation part is able to calculate parity, wherein said control part is further operable to issue the recovery instruction when said parity calculation part does not operate to calculate parity by referring to the time period included in said table.

7. The disk array device according to claim 5, wherein said disk array device further comprises m SCSI interfaces corresponding to said m disk drives, and wherein said control part is operable to notify each of said m SCSI interfaces of a storage location selected from a storage area in each of said m disk drives, respectively.

8. A disk array device for reassigning an alternate recording area to a defective recording area of data, said disk array device comprising:

a plurality of disk drives across which data blocks generated by dividing the data and redundant data generated from the data blocks are distributed;

a reassignment part; and a read/write control part operable to specify recording areas of the data blocks and the redundant data on said plurality of disk drives, and produce an I/O request to request a read operation or a write operation, wherein said plurality of disk drives are operable to access the recording areas specified by the I/O request to read or write the data blocks and the redundant data when receiving the I/O request transmitted from said read/write control part, wherein said reassignment part is operable to, when receiving the I/O request transmitted from said read/write control part, calculate an elapsed time from a time when the I/O request transmitted from said read/write control part is started to be processed in said plurality of disk drives as a delay time, and determine whether or not any of the recording areas specified by the I/O request are defective based on the delay time, and wherein when the I/O request requests the read operation:

said read/write control part is further operable to produce the I/O request including the specified recording areas to read the data blocks and the redundant data from said plurality of disk drives, transmit the I/O request to said plurality of disk drives, detect, from among said plurality of disk drives, a disk drive from which reading of one of the data blocks or the redundant data is no longer required, produce a reading termination command for termination of the reading of the one of the data blocks or the redundant data from said detected disk drive, and transmit the reading termination command to said reassignment part, and said reassignment part is further operable to determine, based on the reading termination command transmitted from said read/write control part, whether the reading of the one of the data blocks or the redundant data from said detected disk drive has started, and when the reading from said detected disk drive has not started, produce and transmit a message for termination of the reading to said detected disk drive.

9. The disk array device according to claim 8, wherein said reassignment part is operable to assign the alternate recording area to the defective recording area only when determining successively a predetermined number of times that the recording area is defective.

10. The disk array device according to claim 8, wherein said reassignment part is further operable to instruct a disk drive to terminate the read operation or the write operation requested by the I/O request when a recording area of said disk drive is defective.

11. The disk array device according to claim 8, wherein said disk array device further comprises a plurality of SCSI interfaces corresponding to said plurality of disk drives, and wherein said read/write control part is operable to notify each of said plurality of SCSI interfaces of a storage location selected from a storage area in each of said plurality of disk drives.

12. A disk array device which reassigns an alternate recording area to a defective recording area of data, said disk array device comprising:

a read/write control part operable to specify a recording area of the data, and produce an I/O request to request a read operation or a write operation;

a disk drive operable to access the recording area specified by the I/O request to read or write the data when receiving the I/O request from said read/write control part; and a reassignment part operable to, when the recording area specified by the I/O request from said read/write control part is defective, instruct said disk drive to reassign an alternate recording area to the defective recording area, wherein when instructed to reassign by said reassignment part, said disk drive is operable to assign a recording area in which time required for the read or write operation is within a predetermined range, as the alternate recording area, the predetermined range being selected based on overhead in said disk array device.

13. The disk array device according to claim 12, wherein when at least a part of the recording area of the data is defective, said reassignment part assumes that a whole of the recording area is defective.

14. The disk array device according to claim 12, wherein:

said reassignment part is operable to transmit a reassign block specifying a logical address block of the defective recording area to said disk drive for reassignment; and said disk drive is operable to assign a physical address with which the time required for the read or write operation is within the predetermined range to a logical address specified by the reassign block transmitted from said reassignment part as the alternate recording area.

15. The disk array device according to claim 12, wherein when said read/write control part requests said disk drive to read the data, and the recording area of the data is defective, said read/write control part is operable to recover the data recorded in the defective recording area based on predetermined parity and other data, specify the assigned alternate recording area, and request said disk drive to write the recovered data to the assigned alternate recording area.

16. The disk array device according to claim 12, wherein when said read/write control part requests said disk drive to write data and the recording area of the data is defective, said read/write control part is operable to specify the assigned alternate recording area, and request disk drive to write the data to the assigned alternate recording area.

17. The disk array device according to claim 12, wherein said disk array device further comprises an SCSI interface corresponding to said disk drive, and wherein said read/write control part is operable to notify said SCSI interface of a storage location selected from a storage area in said disk drive.

18. A reassignment method of assigning an alternate area to a defective recording area of data in a disk array device including a plurality of disk drives, said reassignment method comprising:

transmitting an I/O request operable to request the plurality of disk drives to perform a read operation or a write operation by specifying recording areas of data blocks and redundant data according to a request from outside;

when the I/O request is transmitted in said transmitting operation, calculating an elapsed time from a time when the transmitted I/O request is started to be processed in the plurality of disk drives as a delay time and determining whether the recording areas specified by the I/O request are defective or not based on the delay time;

when one of the recording areas is determined to be defective, instructing a corresponding disk drive of the plurality of disk drives to assign an alternate recording area to the defective recording area; and wherein when the I/O request requests that the plurality of disk drives perform the read operation:

detecting, from among the plurality of disk drives, a disk drive from which reading of one of the data blocks or the redundant data is no longer required;

producing a reading termination command for termination of the reading from the detected disk drive, and transmitting the reading termination command;

determining, based on the transmitted reading termination command, whether the reading of the one of the data blocks or the redundant data from the detected disk drive has been started; and when the reading from the detected disk drive has not been started, producing a message for termination of the reading, and transmitting the message to the detected disk drive.

19. A reassignment method of assigning an alternate recording area to a defective recording area of data, said reassignment method comprising:

transmitting an I/O request for requesting a disk drive to read or write by specifying a recording area of the data according to a request from outside; and when the recording area specified by the I/O request transmitted in said transmitting operation is defective, instructing the disk drive to assign an alternate recording area to the defective recording area, wherein in said instructing operation, the disk drive is instructed to assign the recording area with which a time required for the reading or writing is within a predetermined range as the alternate recording area, the predetermined range being selected based on overhead in a disk array device to which the disk drive belongs.

* * * * *